US012800873B2

(12) United States Patent
Hsu et al.

(10) Patent No.: US 12,800,873 B2
(45) Date of Patent: Nov. 17, 2026

(54) OPTICAL SYSTEM

(71) Applicant: Actutek Corporation, Taoyuan City (TW)

(72) Inventors: Chan-Jung Hsu, Taoyuan City (TW); I-Mei Huang, Taoyuan City (TW); Yi-Ho Chen, Taoyuan City (TW); Shao-Chung Chang, Taoyuan City (TW); Ichitai Moto, Taoyuan City (TW); Chen-Chi Kuo, Taoyuan City (TW); Ying-Jen Wang, Taoyuan City (TW); Ya-Hsiu Wu, Taoyuan City (TW); Wei-Jhe Shen, Taoyuan City (TW); Chao-Chang Hu, Taoyuan City (TW); Che-Wei Chang, Taoyuan City (TW); Sin-Jhong Song, Taoyuan City (TW); Shu-Shan Chen, Taoyuan City (TW); Chih-Wei Weng, Taoyuan City (TW); Chao-Hsi Wang, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 19 days.

(21) Appl. No.: 18/489,323

(22) Filed: Oct. 18, 2023

(65) Prior Publication Data

US 2024/0045171 A1 Feb. 8, 2024

Related U.S. Application Data

(63) Continuation of application No. 17/155,964, filed on Jan. 22, 2021, now Pat. No. 11,829,001.

(Continued)

(51) Int. Cl.

| | |
|---|---|
| ***G02B 7/09*** | (2021.01) |
| ***G02B 27/64*** | (2006.01) |

(52) U.S. Cl.

CPC ............ *G02B 7/09* (2013.01); *G02B 27/646* (2013.01)

(58) Field of Classification Search

CPC ...... G02B 27/646; G02B 6/3514; G02B 7/08; G02B 7/09; G02B 7/182; G02B 15/173;

(Continued)

(56) References Cited

U.S. PATENT DOCUMENTS

| | | | |
|---|---|---|---|
| 7,519,282 | B2 | 4/2009 | Shin et al. |
| 2006/0017815 | A1 | 1/2006 | Stavely et al. |

(Continued)

FOREIGN PATENT DOCUMENTS

| | | | |
|---|---|---|---|
| CN | 110352371 | A | 10/2019 |
| CN | 214474265 | U | 10/2021 |

(Continued)

OTHER PUBLICATIONS

European Search Report issued on Apr. 26, 2024 for the corresponding Application No. 23211699.6.; pp. 1-20.

(Continued)

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical system is provided. The optical system includes an immovable part, a second movable part, a second drive mechanism, and a second circuit mechanism. The second movable part is used for connecting to a second optical element. The second movable part is movable relative to the immovable part. The second drive mechanism is used for driving the second movable part to move relative to the immovable part. The second circuit mechanism is electrically connected to the second drive mechanism.

20 Claims, 136 Drawing Sheets

Related U.S. Application Data

(60) Provisional application No. 63/121,415, filed on Dec. 4, 2020, provisional application No. 63/058,932, filed on Jul. 30, 2020, provisional application No. 63/056,183, filed on Jul. 24, 2020, provisional application No. 63/017,313, filed on Apr. 29, 2020, provisional application No. 62/964,377, filed on Jan. 22, 2020.

(58) Field of Classification Search

CPC ...... G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; H02K 41/0356

See application file for complete search history.

(56) References Cited

U.S. PATENT DOCUMENTS

| | | | | |
|---|---|---|---|---|
| 2007/0024739 | A1 | 2/2007 | Konno | |
| 2008/0187301 | A1 | 8/2008 | Takahashi | |
| 2008/0266404 | A1 | 10/2008 | Sato | |
| 2010/0166401 | A1 | 7/2010 | Akutsu | |
| 2011/0217029 | A1 | 9/2011 | Wu et al. | |
| 2011/0221915 | A1 | 9/2011 | Takano et al. | |
| 2012/0249815 | A1 | 10/2012 | Bohn et al. | |
| 2013/0321931 | A1* | 12/2013 | Nakayama | H04N 5/222 359/685 |
| 2015/0286033 | A1 | 10/2015 | Osborne | |
| 2015/0350500 | A1 | 12/2015 | Gutierrez et al. | |
| 2017/0242225 | A1 | 8/2017 | Fiske | |
| 2017/0272658 | A1 | 9/2017 | Ito | |
| 2018/0364446 | A1 | 12/2018 | Osaka et al. | |
| 2019/0058832 | A1 | 2/2019 | Huang et al. | |
| 2019/0141224 | A1* | 5/2019 | Park | H04N 23/55 |
| 2020/0057313 | A1* | 2/2020 | Lee | G03B 5/00 |

FOREIGN PATENT DOCUMENTS

| | | | | |
|---|---|---|---|---|
| JP | 2011107470 | A * | 6/2011 | G02B 27/646 |
| JP | 2017003934 | A | 1/2017 | |
| KR | 1020150071408 | A | 6/2015 | |
| WO | WO-2018/202819 | A | 11/2018 | |
| WO | WO-2020069391 | A1 | 4/2020 | |

OTHER PUBLICATIONS

Office Action with partial Search Report issued in corresponding EP Application No. 21152963.1 on Jun. 17, 2021 (13 pages).

European Search Report mailed Oct. 11, 2021 in EP Application No. 21152963.1, 15 pages.

Search Report of corresponding EP Application No. 23211699.6 dated Feb. 22, 2024, 19 pages.

Office Action of CN Application No. 202310838822.6 dated Mar. 18, 2026, 8 pages.

Office Action issued on Mar. 26, 2026 for the corresponding Application No. 202310838812.2 in China; pp. 1-5.

* cited by examiner 6-100

OPTICAL SYSTEM

CROSS REFERENCE TO RELATED APPLICATIONS

This application is a Continuation application of U.S. patent application Ser. No. 17/155,964, filed on Jan. 22, 2021, which claims the benefit of U.S. Provisional Application No. 62/964,377, filed on Jan. 22, 2020, U.S. Provisional Application No. 63/017,313, filed on Apr. 29, 2020, U.S. Provisional Application No. 63/056,183, filed on Jul. 24, 2020, U.S. Provisional Application No. 63/058,932, filed on Jul. 30, 2020, and U.S. Provisional Application No. 63/121,415, filed on Dec. 4, 2020, the entirety of which are incorporated by reference herein.

BACKGROUND OF THE INVENTION

Field of the Invention

The present invention relates to an optical system.

Description of the Related Art

As technology has developed, optical elements and optical systems, which are used for driving optical elements, have become miniaturized. Many electronic devices (such as tablet computers and smartphones) are equipped with at least one optical element, at least one optical system, and at least one light-detection element for capturing images and recording videos. When a user uses an electronic device, shock or vibration may occur, and this may cause the images or videos to come out blurry. However, as the demand for higher quality in images and videos is increasing, an optical system that is able to perform displacement-correction and shake-compensation has been developed.

The optical system may drive the optical element to move along a direction that is parallel with the optical axis to autofocus (AF) on the scene to be shot. Additionally, the optical system may also drive the optical element to move along a direction that is perpendicular to the optical axis to perform optical image stabilization (OIS), which compensates for the deviation of the image caused by shaking or impact, and solve the problem of blurry images and videos. AF and OIS may enhance the quality of the image.

BRIEF SUMMARY OF THE INVENTION

An optical system is provided. The optical system includes an immovable part, a second movable part, a second drive mechanism, and a second circuit mechanism. The second movable part is used for connecting to a second optical element. The second movable part is movable relative to the immovable part. The second drive mechanism is used for driving the second movable part to move relative to the immovable part. The second circuit mechanism is electrically connected to the second drive mechanism.

BRIEF DESCRIPTION OF THE DRAWINGS

The present invention can be more fully understood by reading the subsequent detailed description and examples with references made to the accompanying drawings, wherein:

FIG. 102 is a perspective view of an optical module according to an embodiment of the disclosure.

FIG. 103 is an exploded view of the optical module according to an embodiment of the disclosure.

FIG. 104 is a perspective view of a partial structure of the optical module according to an embodiment of the disclosure.

FIG. 105 is a cross-sectional view of the optical module taken along the line A-A' in FIG. 102.

FIG. 106 is a schematic diagram of the configuration of reference elements in an optical module according to an embodiment of the disclosure.

FIG. 107 is a schematic diagram of a partial structure of an optical module according to another embodiment of the disclosure.

FIG. 108 is a schematic diagram of a partial structure of an optical module according to another embodiment of the disclosure.

FIG. 109 is a schematic diagram of a partial structure of an optical module according to another embodiment of the disclosure.

FIG. 110 is a schematic diagram of a partial structure of an optical module according to another embodiment of the disclosure.

FIG. 111 is a schematic diagram of a partial structure of an optical module according to another embodiment of the disclosure.

FIG. 112 is a schematic diagram of a partial structure of an optical module according to an embodiment of the disclosure.

FIG. 113 is a schematic diagram of a partial structure of an optical module according to an embodiment of the disclosure.

Figure 114:
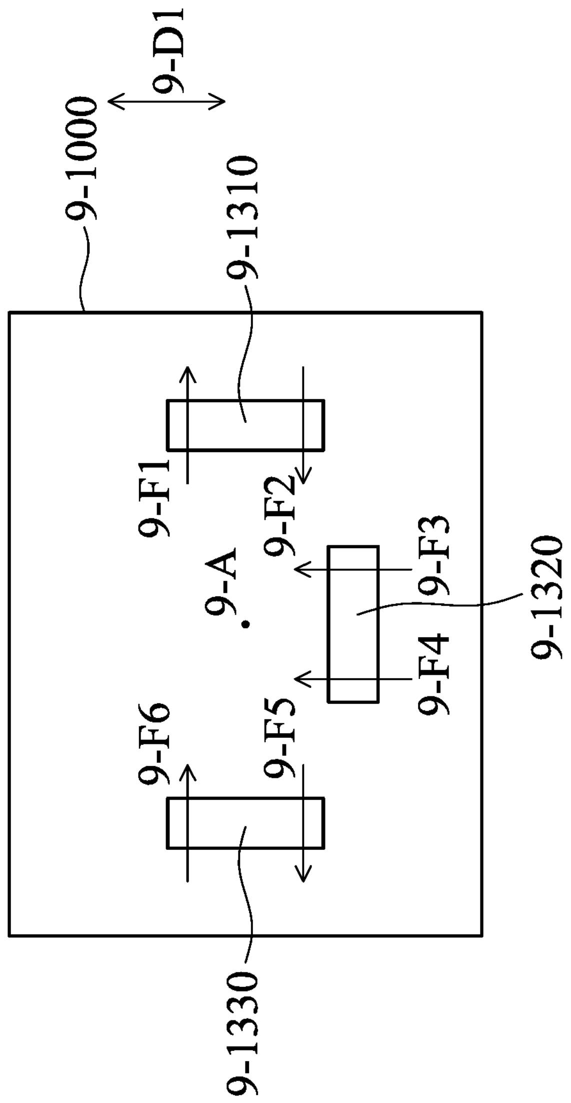

FIG. 114 is a schematic diagram of a partial structure of an optical module according to an embodiment of the disclosure.

DETAILED DESCRIPTION OF THE INVENTION

The following description is made for the purpose of illustrating the general principles of the invention and should not be taken in a limiting sense. The scope of the invention is best determined by reference to the appended claims.

Some groups of embodiments are provided.

The First Group of Embodiments

Figure 1:
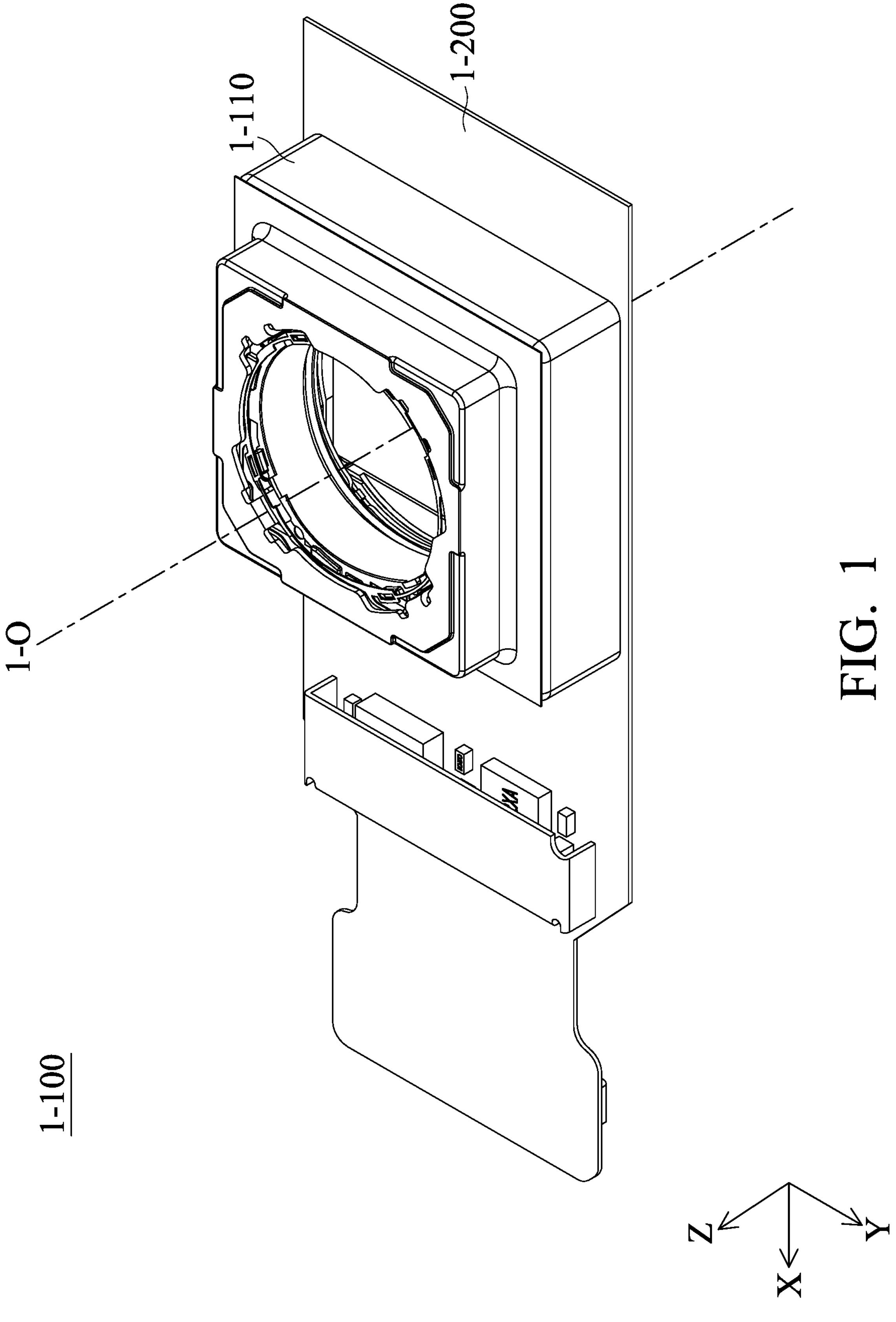
FIG. 1 is a perspective view of an optical system in some embodiments of the present disclosure.
Figure 2:
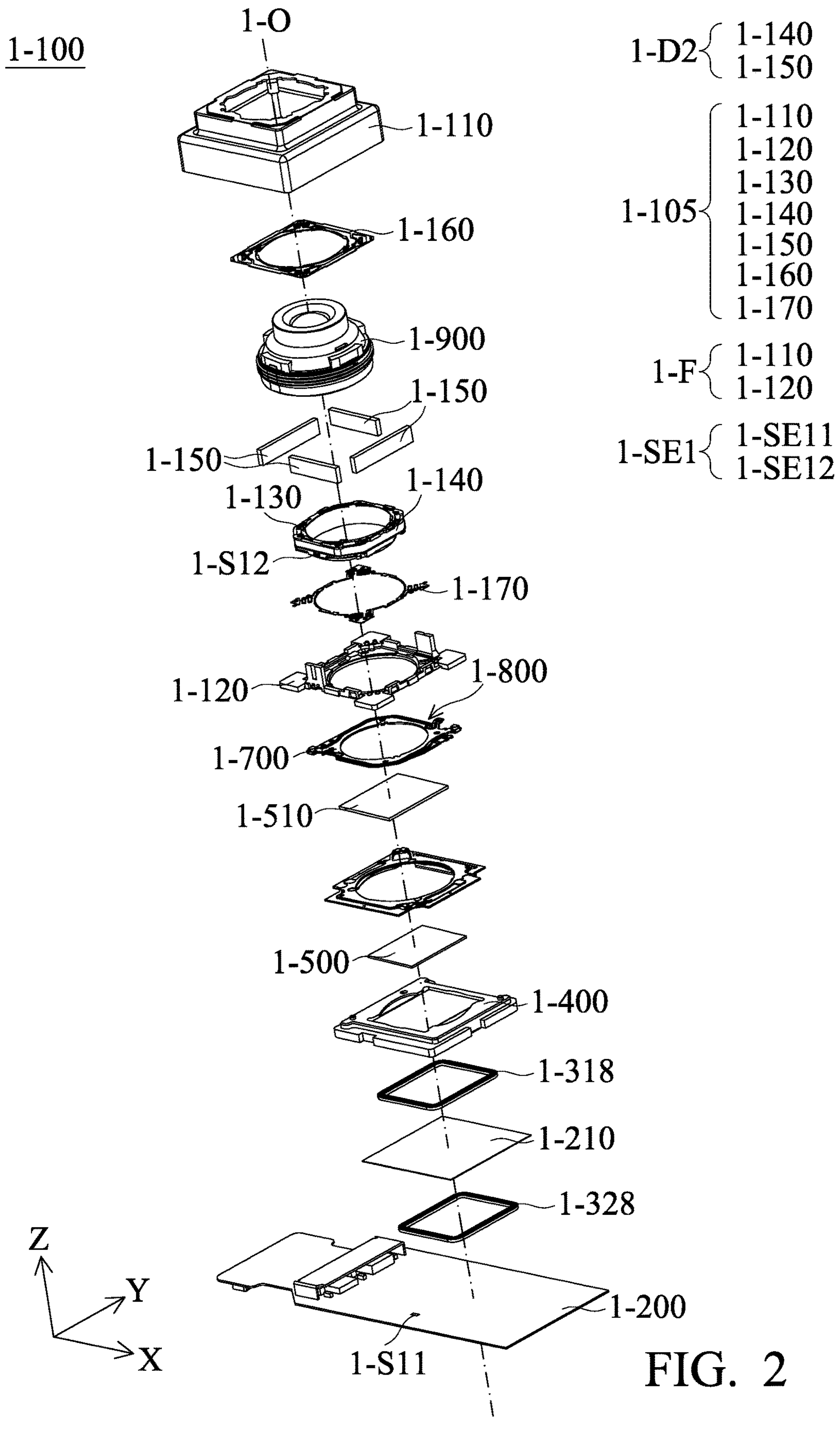
FIG. 2 is an exploded view of the optical system.
Figure 3:
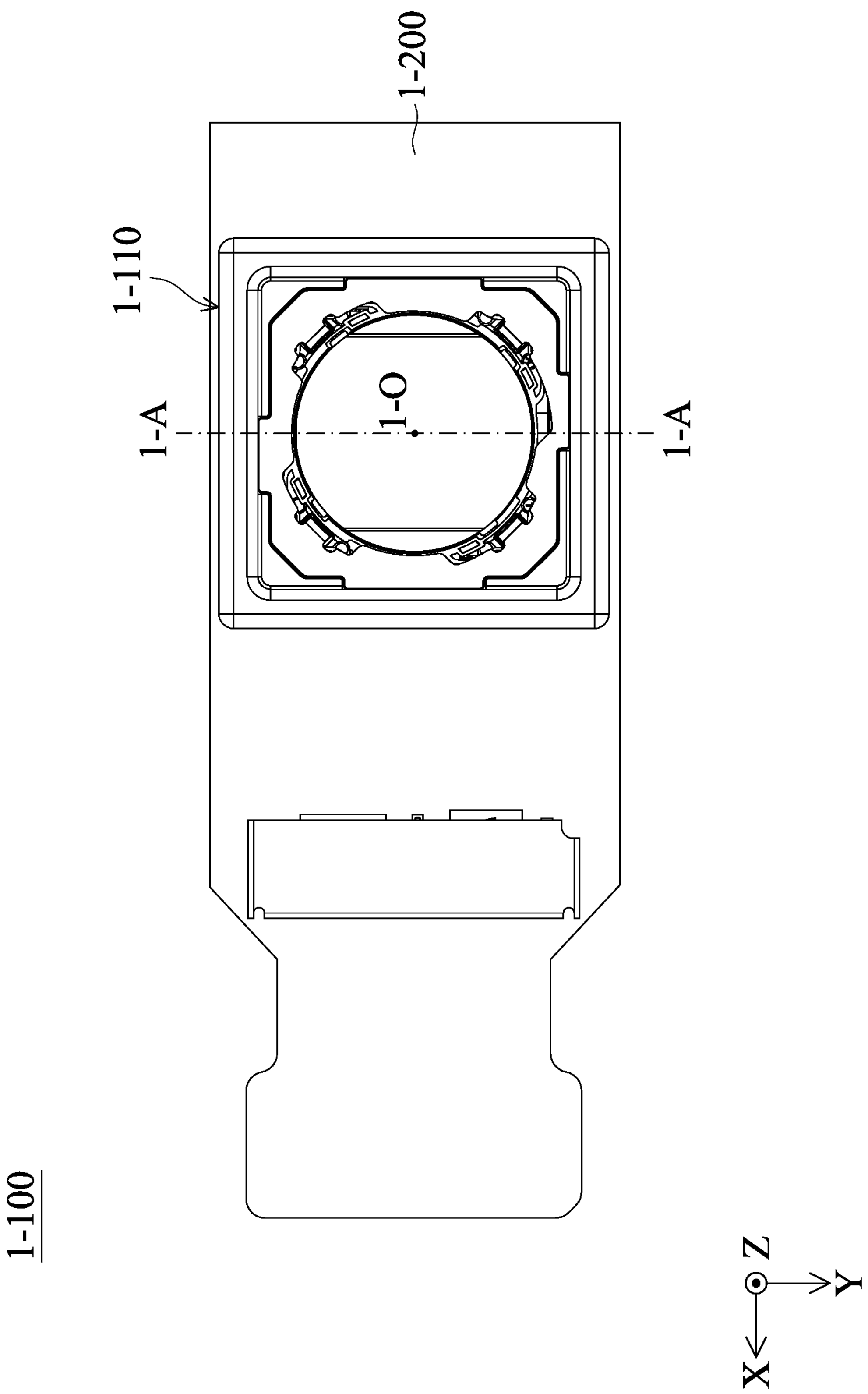
FIG. 3 is a top view of the optical system.
Figure 4:
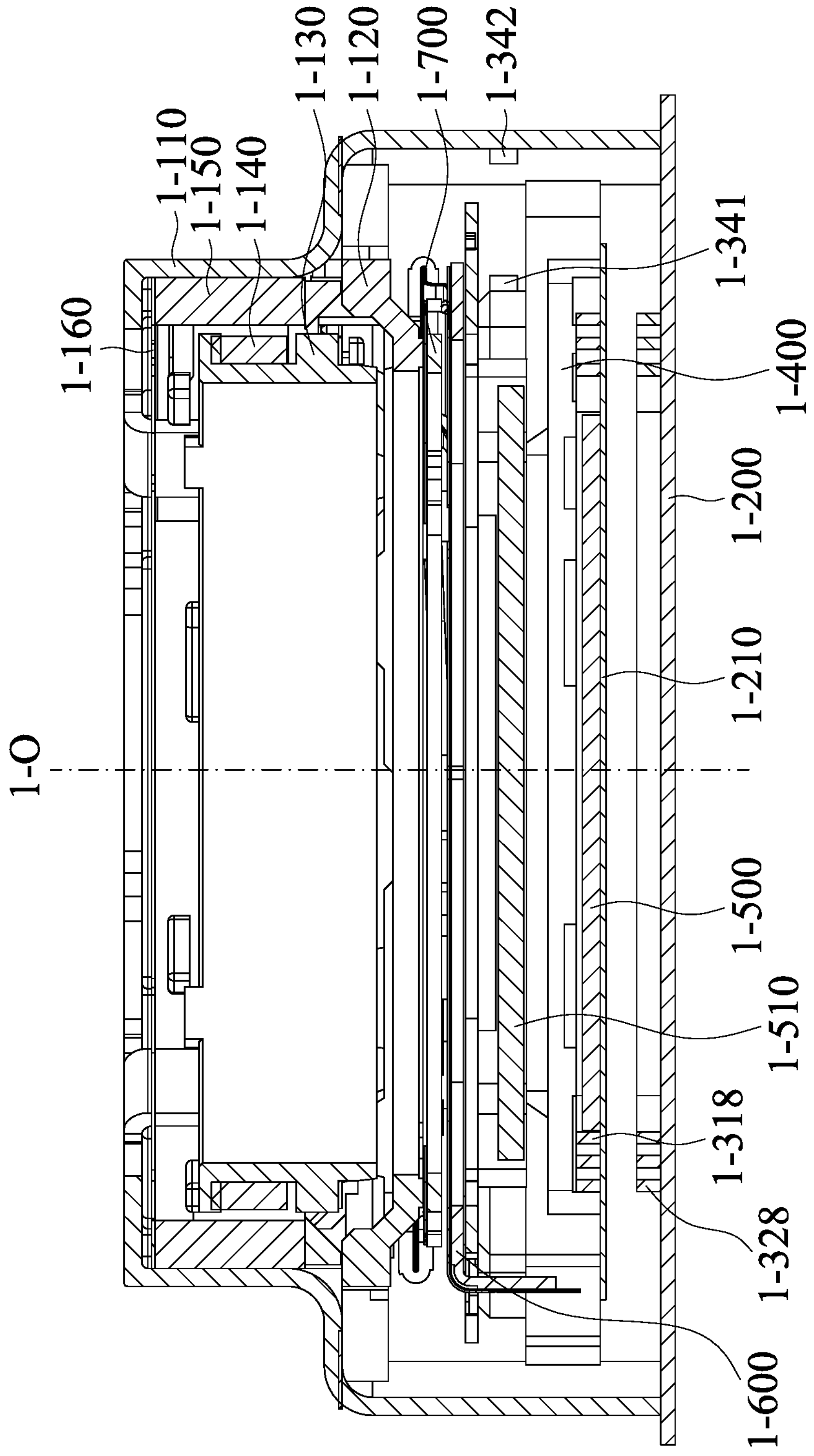
FIG. 4 is a cross-sectional view illustrated along the line 1-A-1-A in FIG. 3.

FIG. 1 is a perspective view of an optical system 1-100 in some embodiments of the present disclosure. FIG. 2 is an exploded view of the optical system 1-100. FIG. 3 is a top view of the optical system. FIG. 4 is a cross-sectional view illustrated along a line 1-A-1-A in FIG. 3.

In some embodiments, the optical system 1-100 may mainly include a case 1-110, a bottom 1-120, a third movable portion 1-130, a first coil 1-140, a first magnetic element 1-150, a first resilient element 1-160, a second resilient element 1-170, a first substrate 1-200, a circuit assembly 1-210, a ninth coil element 1-318, a tenth coil element 1-328, a first movable portion 1-400, a first optical element 1-500, a light filter element 1-510, a second substrate 1-600, a resilient assembly 1-700, and a first driving assembly 1-800 arranged along a main axis 1-O. The optical system 1-100 may be disposed on an electronic apparatus, such as a cell phone, a tablet, or a notebook, but it is not limited thereto.

The optical system 1-100 may be used for driving a second optical element 1-900, or may be used for driving various optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the case 1-110, the bottom 1-120, the third movable portion 1-130, the first coil 1-140, the first magnetic element 1-150, the first resilient element 1-160, and the second resilient element 1-170 may be called together as a first optical assembly 1-105 used for driving the second optical element 1-900 to move in X, Y, and Z direction. Moreover, the case 1-110 and the bottom 1-120 may be affixed on the first substrate 1-200, so the case 1-110, the bottom 1-120, and the first substrate 1-200 may be called as a fixed portion 1-F. The first movable portion 1-400 and the third movable portion 1-130 may move relative to the fixed portion 1-F. In some embodiments, the third movable portion 1-130 may move relative to the first movable portion 1-400.

It should be noted that a case opening is formed on the case 1-110, and a bottom opening is formed on the bottom 1-120. The center of the case opening corresponds to the main axis 1-O (e.g. the main axis 1-O included in the fixed portion 1-F, and the case 1-110 and the bottom 1-120 may arranged along the main axis 1-O). The bottom opening corresponds to the first optical element 1-500, and the first optical element 1-500 may be disposed on the first substrate 1-200. Therefore, the first optical element 1-500 may corresponds to the second optical element 1-900, such as may arrange along the main axis 1-O (e.g. the Z direction), and the second optical element 1-900 may perform focus with the first optical element 1-500 along the main axis 1-O.

In some embodiments, the third movable portion 1-130 has a through hole, and the second optical element 1-900 may be affixed in the through hole to move with the third movable portion 1-130. In other words, the third movable portion 1-130 may use for holding the second optical element 1-900. In some embodiments, the first magnetic element 1-150 and the first coil 1-140 may be called as second driving assembly 1-D2 used for driving the third movable portion 1-130 to move relative to the fixed portion 1-F.

The first magnetic element 1-150 and the first coil 1-140 may be respectively disposed on the fixed portion 1-F and the third movable portion 1-130, or their positions may be interchanged, depending on design requirement. It should be noted that the interaction between the first magnetic element 1-150 and the first coil 1-140 may generate a magnetic force to move the second optical element 1-900 disposed on the third movable portion 1-130 relative to the fixed portion 1-F, so auto focus (AF) or optical image stabilization (OIS) may be achieved. In some embodiments, the second driving assembly 1-D2 may include piezoelectric element or shape memory alloy elements.

In this embodiment, the third movable portion 1-130 and the second optical element 1-900 disposed therein may movably disposed in the fixed portion 1-F. More specifically, the third movable portion 1-130 may be connected to the fixed portion 1-F and suspended in the fixed portion 1-F by the first resilient element 1-160 and the second resilient element 1-170 that are made by metal. When current is passed to the first coil 1-140, the first coil 1-140 may interact with the magnetic force generated by the first magnetic element 1-150 to generate an electromagnetic force to move the third movable portion 1-130 and the second optical element 1-900 relative to the fixed portion 1-F along the main axis 1-O, so auto focus may be achieved.

In some embodiments, a first sensing assembly 1-SE1 may be disposed in the optical system 1-100 to detect the position of the third movable portion 1-130 relative to the fixed portion 1-F. The first sensing assembly 1-SE1 may include a first sensing element 1-SE11 and a second sensing element 1-SE12. In some embodiments, the first sensing element 1-SE11 may be affixed on the fixed portion 1-F (e.g. the first substrate 1-200 or the bottom 1-120), and the second sensing element 1-SE12 may be disposed on the third movable portion 1-130.

The first sensing element 1-SE11 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The second sensing element 1-SE12 may include magnetic elements, and the first sensing element 1-SE11 may detect the magnetic field variation of the second sensing element 1-SE12 generated by the movement of the third movable portion 1-130, so the position of the third movable portion 1-130 relative to the fixed portion 1-F may be achieved. In some embodiments, other sensors may be provided to detect the position of the first movable portion 1-400 relative to the fixed portion 1-F, such as may be disposed between the first substrate 1-200 and the first movable portion 1-400.

For example, the sensor may be used for detect the movement of the first movable portion 1-400 or the movement of the third movable portion 1-130 relative to the fixed portion 1-F in different dimensions, such as the lateral movement in the X direction (first dimension), the lateral movement in the Y direction (second dimension), the lateral movement in the Z direction (third dimension), or the rotational movement having a rotational axis extending in the Z direction (fourth dimension), but the present disclosure is not limited thereto.

The first substrate 1-200 may be a flexible printed circuit (FPC) that may be attached on the bottom 1-120. In this embodiment, the first substrate 1-200 is electrically connected to other electronic elements disposed in the optical system 1-100 or outside the optical system 1-100. For example, the first substrate 1-200 may provide an electric signal to the second driving assembly 1-D2 to control the movement of the third movable portion 1-130 in the X, Y or Z directions. Therefore, auto focus or optical image stabilization may be achieved.

In some embodiments, the circuit assembly 1-210 may be a flexible printed circuit (FPC) that may be attached on the bottom 1-120. In this embodiment, the circuit assembly 1-210 is electrically connected to other electronic elements disposed in the optical system 1-100 or outside the optical system 1-100. For example, in some embodiments, the circuit assembly 1-210 may provide an electric signal to the first driving assembly 1-800 and the first optical assembly 1-105 to control the movement of the first movable portion 1-400 in the X, Y or Z directions. In other words, the first optical assembly 1-105 and the first driving assembly 1-800 are electrically connected to the electronic apparatus through the first movable portion 1-400. Therefore, auto focus or optical image stabilization may be achieved.

The ninth coil element 1-318 and the tenth coil element 1-328 may be respectively disposed on the first movable portion 1-400 and the fixed portion 1-F. The first coil element 1-310 and the first optical element 1-500 may be disposed on the circuit assembly 1-210, and the ninth coil element 1-318 may surround the first optical element 1-500. The tenth coil element 1-328 may provide various signals to the ninth coil element 1-318 by a wireless manner, which will be described later.

The case 1-110 of the fixed portion 1-F has a polygonal structure, and the first movable portion 1-400 may be plate-shaped and may be perpendicular to the main axis 1-O. The material of the first movable portion 1-400 may include plastic to prevent magnetic interference. The first optical element 1-500 and the light filter element 1-510 may be disposed on (e.g. connected to) the first movable portion 1-400, such as may move with the first movable portion 1-400 relative to the fixed portion 1-F. The first optical element 1-500 may include a photoelectric converter, such as an optical sensor used for corresponding and detecting the light passing the second optical element 1-900. Afterwards, the light is converted as an electric signal that is provided to the electronic apparatus. In some embodiments, the first movable portion 1-400 may move relative to the fixed portion 1-F. Therefore, the first optical element 1-500 disposed on the first movable portion 1-400 may move with the first movable portion 1-400 to achieve optical image stabilization. The first optical element 1-500 may be used for receiving an optical signal and providing an image signal.

In some embodiments, a first communication element 1-341 and a second communication element 1-342 may be disposed in the optical system 1-100. The first communication element 1-341 may be affixed on the first movable portion 1-400, and the second communication element 1-342 may be affixed on the fixed portion 1-F. The first communication element 1-341 and the second communication element 1-342 may be called as first communication assembly 1-340A. The image signal is transferred to the external circuit by a first signal (wireless electromagnetic wave) provided by the first communication assembly 1-340A. For example, the optical system 1-100 may be disposed on an electronic apparatus (e.g. a cellphone, a tablet, or a notebook), and the external circuit is the circuit of the electronic apparatus.

In some embodiments, a gap that is greater than zero is between the first communication element 1-341 and the second communication element 1-342. That is, the first communication element 1-341 and the second communication element 1-342 are not connected by wire and are electrically isolated. For example, the first signal may be transferred from the first communication element 1-341 to the second communication element 1-342 or vice versa in a wireless manner. The second communication element 1-342 may be electrically connected to the external circuit of the electronic apparatus. The first communication element 1-341 and the second communication element 1-342 may include a first integrated circuit element and a second integrated circuit element used for transmitting signal, respectively. The first communication assembly 1-340A may include Bluetooth, wireless local area network (WLAN), or wireless wide area network (WWAN), depending on design requirement.

The light filter element 1-510 may only allow light with specific wavelength to pass through, and other light may be filtered. For example, infrared may be filtered by the light filter element 1-510, and visible light may pass through the light filter element 1-510, but it is not limited thereto. The light filter element 1-510 may corresponds to the first optical element 1-500 to let the light detect by the first optical element 1-500 more close to the light detect by eyes.

The second substrate 1-600 may be disposed on the first movable portion 1-400, and the resilient assembly 1-700 may be used for movably connect the second substrate 1-600 and the fixed portion 1-F (e.g. the bottom 1-120). The fixed portion 1-First driving assembly 1-800 may drive the first movable portion 1-400 to move relative to the fixed portion 1-F or the third movable portion 1-130.

In some embodiments, the fixed portion 1-First driving assembly 1-800 may drive the first movable portion 1-400 to move relative to the fixed portion 1-F. In some embodiments, the first driving assembly 1-800 may be formed by shape memory alloy (SMA), which is an alloy that can eliminate the deformation in lower temperature by heating and extend along a direction. When the shape memory alloy performs plastic deformation under its phase transition temperature, it may return to its original shape by heating.

The resilient assembly 1-700 may movably connected to the second substrate 1-600 through the first driving assembly 1-800. When the driving elements in the first driving assembly 1-800 deform, relative movement by occur between the second substrate 1-600 and the resilient assembly 1-700 to allow the first movable portion 1-400 to move relative to the fixed portion 1-F. In some embodiments, the first optical element 1-500 disposed on the first movable portion 1-400 may be moved as well to achieve optical image stabilization.

Figure 5A:
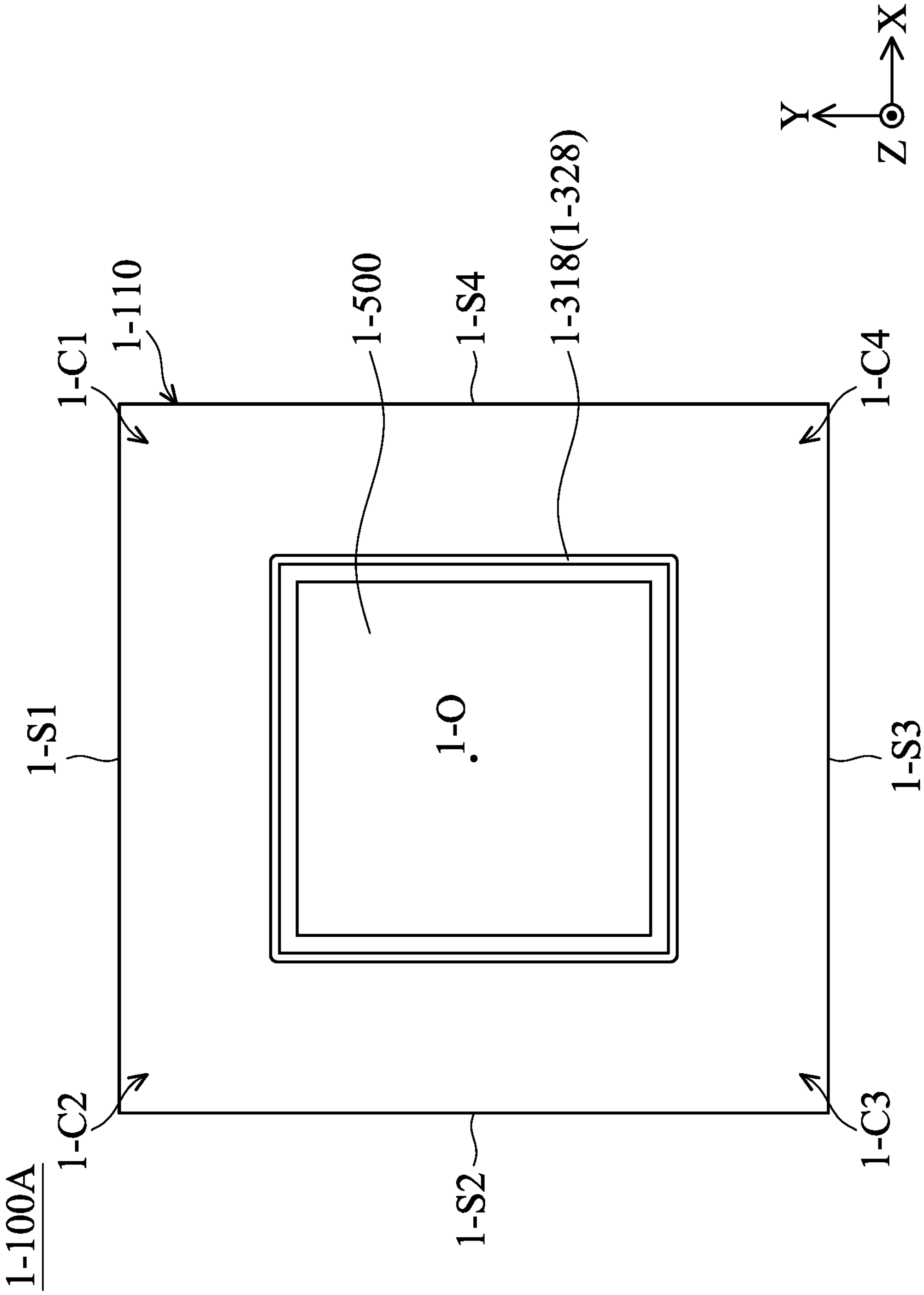
FIG. 5A is a schematic view of some elements of the optical system.

FIG. 5A is a schematic view of some elements of optical system 1-100A. The elements of the optical system 1-100A may be substantially similar to that of the optical system 1-100, and only some elements are shown in FIG. 5A. When viewed along the main axis 1-O (the Z direction), the case 1-110 of the fixed portion 1-F includes a first edge 1-S1, a second edge 1-S2, a third edge 1-S3, and a fourth edge 1-S4. The second edge 1-S2 is not parallel to the first edge 1-S1. The third edge 1-S3 is parallel to the first edge 1-S1. The fourth edge 1-S4 is parallel to the second edge 1-S2. Moreover, the case 1-110 includes a first corner 1-C1, a second corner 1-C2, a third corner 1-C3, and a fourth corner 1-C4. The first corner 1-C1 is between the fourth edge 1-S4 and the first edge 1-S1. The second corner 1-C2 is between the first edge 1-S1 and the second edge 1-S2. The third corner 1-C3 is between the second edge 1-S2 and the third edge 1-S3. The fourth corner 1-C4 is between the third edge 1-S3 and the fourth edge 1-S4.

When viewed along the main axis 1-O, the ninth coil element 1-318 and the tenth coil element 1-328 may surround the first optical element 1-500 but not overlap the first optical element 1-500 to prevent magnetic interference. The main axis 1-O may pass through the ninth coil element 1-318 and the tenth coil element 1-328. Moreover, in some embodiments, the ninth coil element 1-318 may overlap the tenth coil element 1-328 to provide signal from the tenth coil element 1-328 to the ninth coil element 1-318 by electromagnetic induction.

Figure 5B:
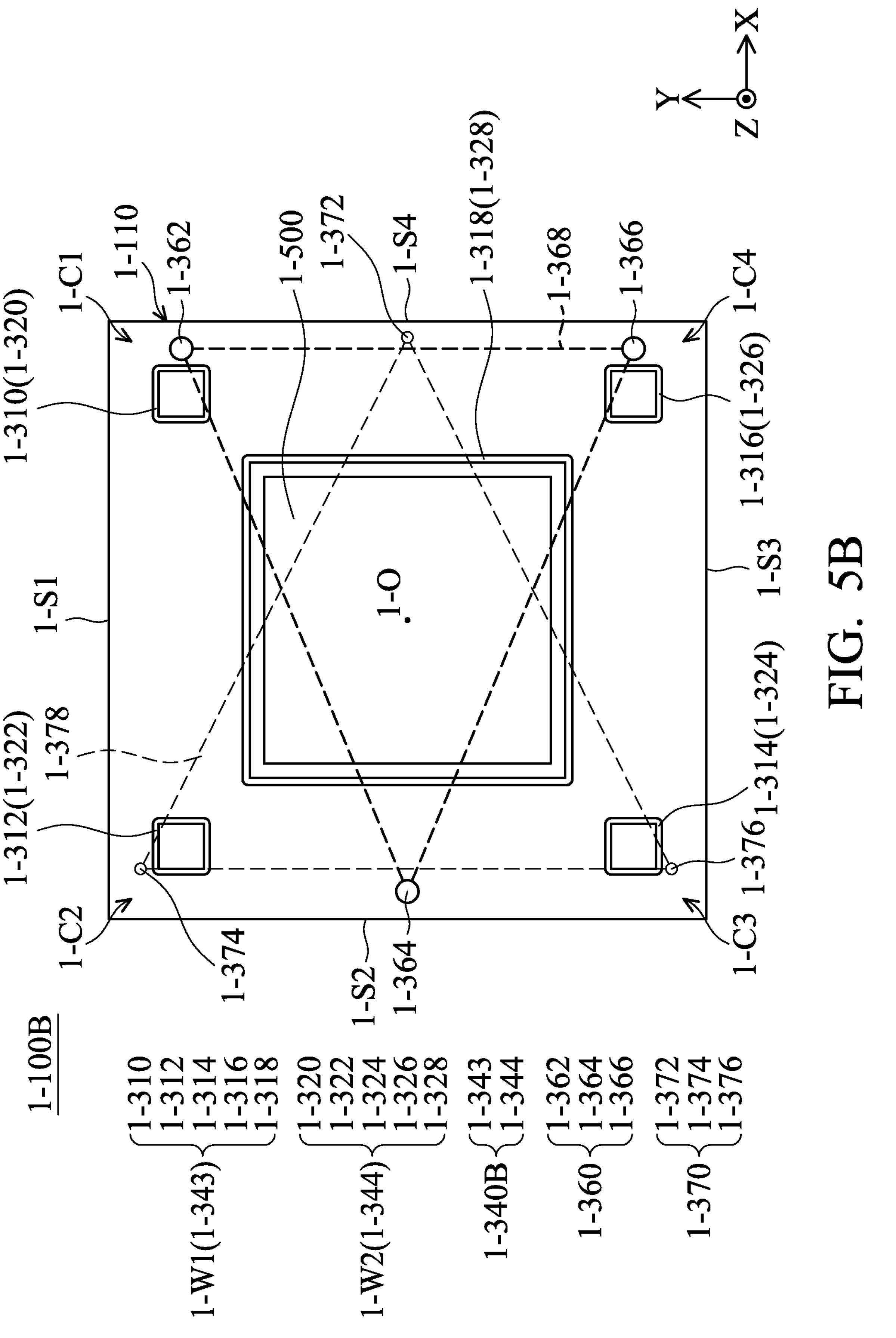
FIG. 5B is a schematic view of some elements of the optical system.

However, the present disclosure is not limited thereto. For example, FIG. 5B is a schematic view of some elements of the optical system 1-100B. The elements of the optical system 1-100B may be substantially similar to that of the optical system 1-100, and only some elements are shown in FIG. 5B. In FIG. 5B, besides the ninth coil element 1-318 and the tenth coil element 1-328, the optical system 1-100B may further include a first coil element 1-310, a second coil element 1-320, a third coil element 1-312, a fourth coil element 1-322, a fifth coil element 1-314, a sixth coil element 1-324, a seventh coil element 1-316, and a eighth coil element 1-326. The first coil element 1-310 corresponds to the second coil element 1-320, the third coil element 1-312 corresponds to the fourth coil element 1-322, the fifth coil element 1-314 corresponds to the sixth coil element 1-324, the seventh coil element 1-316 corresponds to the eighth coil element 1-326, and the ninth coil element 1-318 corresponds to the tenth coil element 1-328.

For example, when viewed along the axes of the coil elements, the first coil element 1-310 and the second coil element 1-320 at least partially overlap each other. The third coil element 1-312 and the fourth coil element 1-322 at least partially overlap each other. The fifth coil element 1-314 and the sixth coil element 1-324 at least partially overlap each other. The seventh coil element 1-316 and the eighth coil element 1-326 at least partially overlap each other. The ninth coil element 1-318 and the tenth coil element 1-328 at least partially overlap each other.

In some embodiments, the first coil element 1-310, the third coil element 1-312, the fifth coil element 1-314, the seventh coil element 1-316, and the ninth coil element 1-318 may be called together as a first coil assembly 1-W1 (or a third communication element 1-343), and the second coil element 1-320, the fourth coil element 1-322, the sixth coil element 1-324, the eighth coil element 1-326, and the tenth coil element 1-328 may be called together as a second coil assembly 1-W2 (or a fourth communication element 1-344). The third communication element 1-343 and the fourth communication element 1-344 may be called as a second communication assembly 1-340B. The first communication assembly 1-340A and the second communication assembly 1-340B may form a communication module 1-340 together for connecting to the external circuit.

Moreover, when viewed along the main axis 1-O (the Z direction), at least a portion of the first optical element 1-500 does not overlap the first coil assembly 1-W1 or the second coil assembly 1-W2 to prevent magnetic interference. At least a portion of the first coil assembly 1-W1 overlaps the second coil assembly 1-W2 to transmit signal by electromagnetic inductance.

When viewed along the main axis 1-O, the first coil element 1-310, the second coil element 1-320, the third coil element 1-312, and the fourth coil element 1-322 are at the first edge 1-S1. The third coil element 1-312, the fourth coil element 1-322, the fifth coil element 1-314, the sixth coil element 1-324 are at the second edge 1-S2. The fifth coil element 1-314, the sixth coil element 1-324, the seventh coil element 1-316, the eighth coil element 1-326 are at the third edge 1-S3. The first coil element 1-310, the second coil element 1-320, the seventh coil element 1-316, and the eighth coil element 1-326 are at the fourth edge 1-S4. Moreover, the first coil element 1-310 and the second coil element 1-320 are at the first corner 1-C1. The third coil element 1-312 and the fourth coil element 1-322 are at the second corner 1-C2. The fifth coil element 1-314 and the sixth coil element 1-324 are at the third corner 1-C3. The seventh coil element 1-316 and the eighth coil element 1-326 are at the fourth corner 1-C4. For example, the first coil element 1-310 and the second coil element 1-320 do not overlap the third coil element 1-312, the fourth coil element 1-322, the fifth coil element 1-314, the sixth coil element 1-324, the seventh coil element 1-316, or the eighth coil element 1-326. i.e. at least a portion of the first coil assembly 1-W1 does not overlap the second coil assembly 1-W2. Therefore, magnetic interference between the coils may be prevented.

The second coil assembly 1-W2 (the fourth communication element 1-344) may be used for transmit a power signal to the first coil assembly 1-W1 (the third communication element 1-343) by wireless transmission. In other words, the external circuit transmit the power signal to the first optical assembly 1-105 through the second communication assembly 1-340B to achieve wireless charging. For example, when alternating current is provided to the second coil assembly 1-W2, an induced electromotive force may be generated at the first coil assembly 1-W1, so the energy may be transferred to the first coil assembly 1-W1 by wireless transmission.

Alternatively, additional magnetic element may be provided on the first movable portion 1-400, such as a magnet or ferromagnetic material (e.g. Fe, Co, Ni). When direct current is provided to the second coil assembly 1-W2, the second coil assembly 1-W2 may act as an electromagnet to generate an electromagnetic driving force with the magnetic element on the first movable portion 1-400 to drive the first movable portion 1-400 moving relative to the fixed portion 1-F. In such situation, the required driving force provided by the first driving assembly 1-800 may be reduced, so the size of the first driving assembly 1-800 may be reduced, or the first driving assembly 1-800 may be omitted to achieve miniaturization.

Moreover, a first support assembly 1-360 and a second support assembly 1-370 may be provided between the first movable portion 1-400 and fixed portion 1-F (e.g. the first substrate 1-200). The first support assembly 1-360 may include a first support element 1-362, a second support element 1-364, and a third support element 1-366 that are spherical. The second support assembly 1-370 may include a fourth support element 1-372, a fifth support element 1-374, and a sixth support element 1-376 that are spherical. The first support element 1-362, the second support element 1-364, the third support element 1-366, the fourth support element 1-372, the fifth support element 1-374, and the sixth support element 1-376 may be disposed at sides or corners of the first movable portion 1-400 or the case 1-110 to limit the position of the first movable portion 1-400 relative to the fixed portion 1-F.

In some embodiments, the diameters of the first support element 1-362, the second support element 1-364, and the third support element 1-366 may be substantially identical. The diameters of the fourth support element 1-372, the fifth support element 1-374, and the sixth support element 1-376 may be substantially identical. The diameters of the first support element 1-362, the second support element 1-364, and the third support element 1-366 may be different from the diameters of the fourth support element 1-372, the fifth support element 1-374, and the sixth support element 1-376.

For example, the diameters of the first support element 1-362, the second support element 1-364, and the third support element 1-366 may be greater than the diameters of the fourth support element 1-372, the fifth support element 1-374, and the sixth support element 1-376. Therefore, when the first movable portion 1-400 is static, the first support element 1-362, the second support element 1-364, and the third support element 1-366 may in direct contact with the first movable portion 1-400 and the fixed portion 1-F, but the fourth support element 1-372, the fifth support element 1-374, and the sixth support element 1-376 may only in direct contact with the fixed portion 1-F and separate from the first movable portion 1-400. In other words, the first movable portion 1-400 may be connected to the fixed portion 1-F through the first support assembly 1-360.

When viewed along the main axis 1-O, the first support element 1-362, the second support element 1-364, and the third support element 1-366 forms a first triangular structure 1-368, as shown by the dashed lines in FIG. 5B. The first triangular structure 1-368 does not overlap the fourth support element 1-372, the fifth support element 1-374, and the sixth support element 1-376. Moreover, the fourth support element 1-372, the fifth support element 1-374, and the sixth support element 1-376 forms a second triangular structure 1-378. The second triangular structure 1-378 does not overlap the first support element 1-362, the second support element 1-364, and the third support element 1-366. When the first movable portion 1-400 receiving excess force, the first movable portion 1-400 may rotate along a rotational axis which is a connection formed by two of the first support element 1-362, the second support element 1-364, and the third support element 1-366. For example, the first movable portion 1-400 may rotate along a rotational axis which is a connection formed by the first support element 1-362 and the second support element 1-364. In such situation, the position relationship (i.e. the first triangular structure 1-368 does not overlap the fifth support element 1-374) allows the fifth support element 1-374 being as a limit structure to limit the maximum rotational range of the first movable portion 1-400, so the first movable portion 1-400 may be prevented from being collided with other elements.

In the following embodiments, the first support assembly 1-360 and the second support assembly 1-370 in this embodiment may be provided as well, and the elements are omitted for clarity in the following description.

Figure 5C:
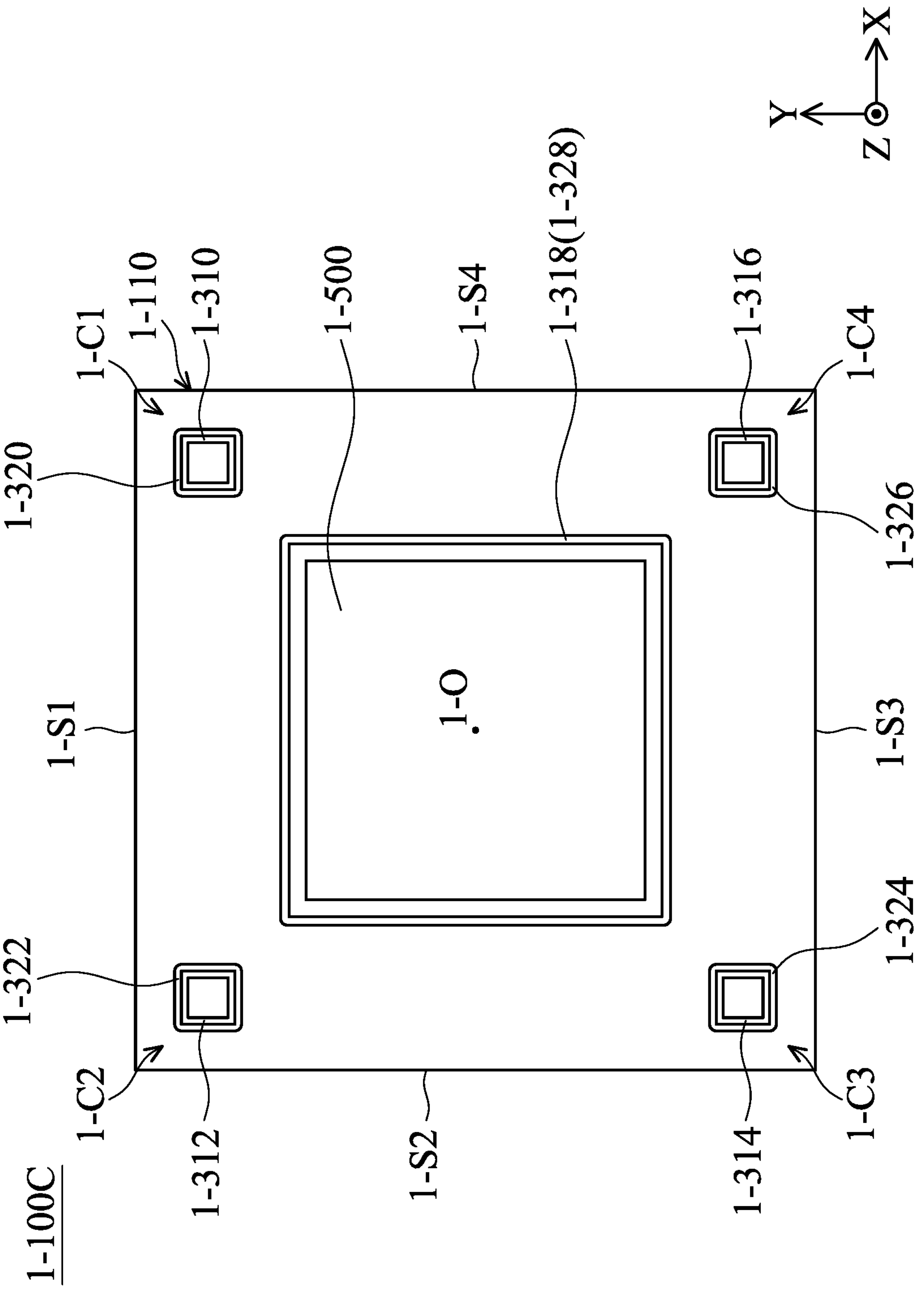
FIG. 5C is a schematic view of some elements of the optical system.

FIG. 5C is a schematic view of some elements of the optical system 1-100C. The elements of the optical system 1-100C may be substantially similar to that of the optical system 1-100, and only some elements are shown in FIG. 5C. In FIG. 5C, the ninth coil element 1-318 and the tenth coil element 1-328 may be omitted. Moreover, the sizes of the first coil element 1-310, the third coil element 1-312, the fifth coil element 1-314, and the seventh coil element 1-316 may be different from the sizes of the second coil element 1-320, the fourth coil element 1-322, the sixth coil element 1-324, and the eighth coil element 1-326.

For example, the sizes of the first coil element 1-310, the third coil element 1-312, the fifth coil element 1-314, and the seventh coil element 1-316 may be smaller than the sizes of the second coil element 1-320, the fourth coil element 1-322, the sixth coil element 1-324, and the eighth coil element 1-326. In other words, at least a portion of the first coil assembly 1-W1 is exposed from the second coil assembly 1-W2 rather than overlap the entire second coil assembly 1-W2. Therefore, the size of the coils on the first movable portion 1-400 may be reduced to achieve miniaturization.

Figure 5D:
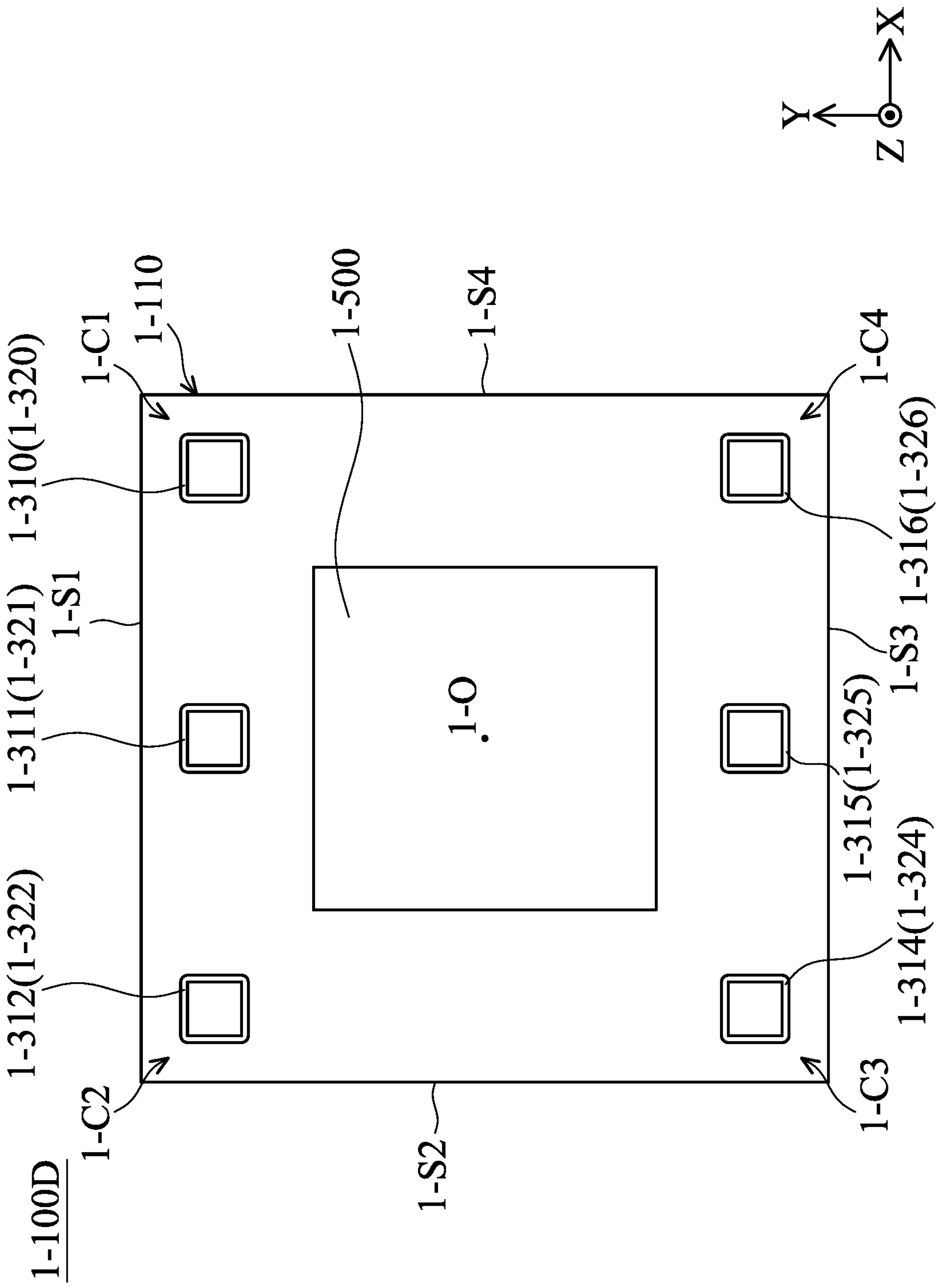
FIG. 5D is a schematic view of some elements of the optical system.

Although the coil elements described above are disposed at corners of the case 1-110, the present disclosure is not limited thereto. For example, FIG. 5D is a schematic view of some elements of the optical system 1-100D. The elements of the optical system 1-100D may be substantially similar to that of the optical system 1-100, and only some elements are shown in FIG. 5D.

In FIG. 5D, a eleventh coil element 1-311 and a twelfth coil element 1-321 disposed on the first edge 1-S1 and a thirteenth coil element 1-315 and a fourteenth coil element 1-325 disposed on the third edge 1-S3 are provided. The eleventh coil element 1-311 and the thirteenth coil element 1-315 may be a portion of the 1-W, and the twelfth coil element 1-321 and the fourteenth coil element 1-325 may be a portion of the second coil assembly 1-W2. The eleventh coil element 1-311 and the thirteenth coil element 1-315 of first coil assembly 1-W1 may be disposed on the first movable portion 1-400, and the twelfth coil element 1-321 and the fourteenth coil element 1-325 of the second coil assembly 1-W2 may be disposed on the fixed portion 1-F.

By providing additional eleventh coil element 1-311, twelfth coil element 1-321, thirteenth coil element 1-315, and fourteenth coil element 1-325 at the sides, the maximum power provided by the second coil assembly 1-W2 to the first coil assembly 1-W1 may be increased. Moreover, the space of the sides may be further utilized to achieve miniaturization.

Figure 6A:
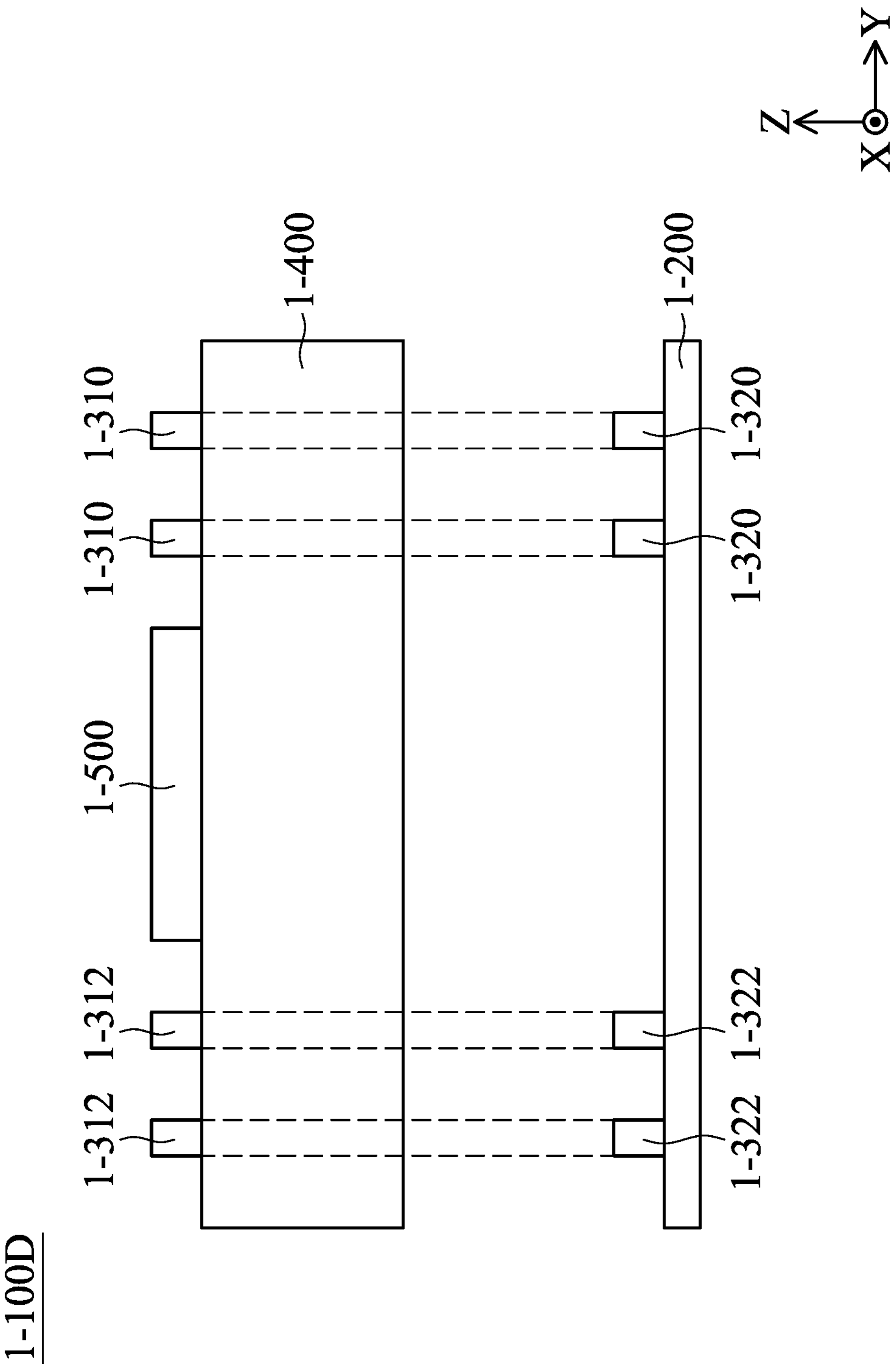
FIG. 6A and FIG. 6B are side views of the optical system when viewed in different directions.
Figure 6B:
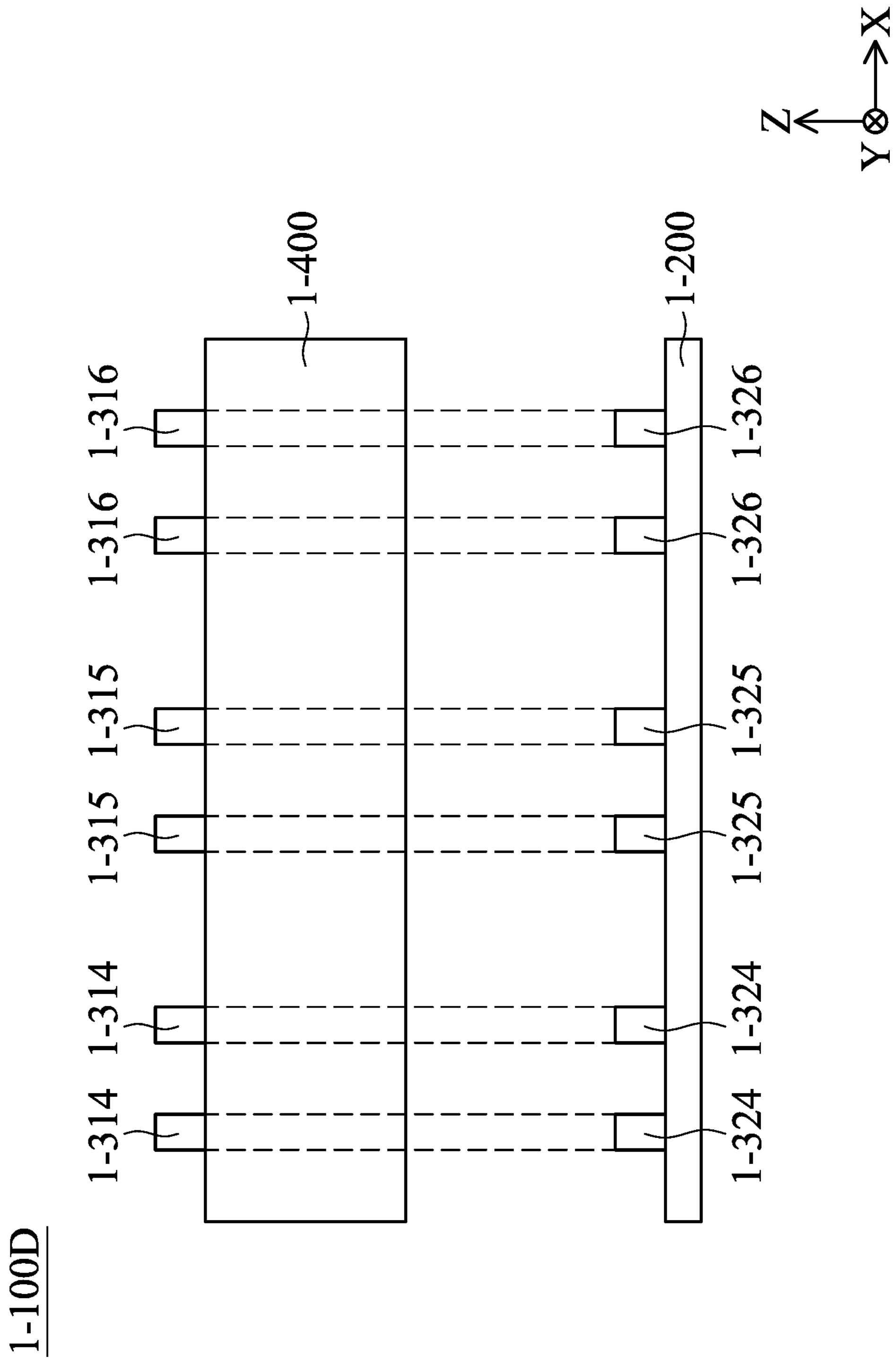

FIG. 6A and FIG. 6B are side views of the optical system 1-100D when viewed in different directions, and only a portion of the elements are shown for clarity. As shown in FIG. 6A and FIG. 6B, in the Z direction, the fifth coil element 1-314 may align with the sixth coil element 1-324, the seventh coil element 1-316 may align with the eighth coil element 1-326, and the thirteenth coil element 1-315 may align with the fourteenth coil element 1-325.

Figure 5E:
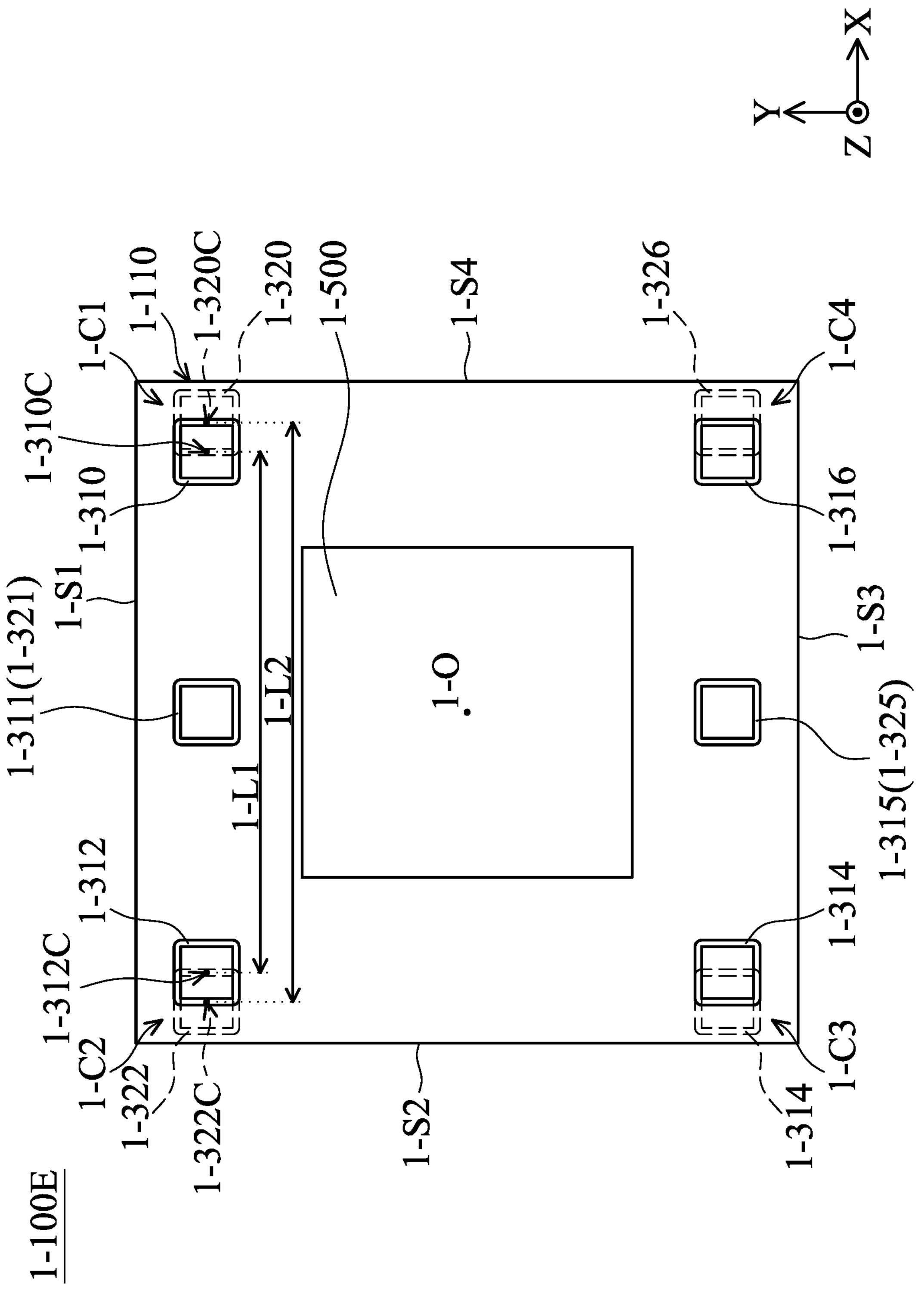
FIG. 5E is a schematic view of some elements of the optical system.

FIG. 5E is a schematic view of some elements of the optical system 1-100E. The elements of the optical system 1-100E may be substantially similar to that of the optical system 1-100, and only some elements are shown in FIG. 5E. In FIG. 5E, the distance between the first coil element 1-310, the eleventh coil element 1-311, and the third coil element 1-312 in the X direction may be different from the distance between the second coil element 1-320, the twelfth coil element 1-321, and the fourth coil element 1-322 in the X direction.

For example, in the X direction, the distance 1-L1 between a center 1-310C of the first coil element 1-310 to a center 1-312C of the third coil element 1-312 may be different from the distance 1-L2 between a center 1-320C of the second coil element 1-320 to a center 1-322C of the fourth coil element 1-322, such as the distance 1-L1 may be less than the distance 1-L2. In some embodiments, the eleventh coil element 1-311 may overlap the twelfth coil element 1-321. The fifth coil element 1-314, the sixth coil element 1-324, the seventh coil element 1-316, the eighth coil element 1-326, the thirteenth coil element 1-315, and the fourteenth coil element 1-325 may have similar position relationship, and it is not repeated.

Moreover, in the Y direction (the second direction), the first coil element 1-310, the eleventh coil element 1-311, the third coil element 1-312, the second coil element 1-320, the twelfth coil element 1-321, the fourth coil element 1-322 may respectively align with the seventh coil element 1-316, the eighth coil element 1-326, the thirteenth coil element 1-315, the fourteenth coil element 1-325, the fifth coil element 1-314, and the sixth coil element 1-324 to make the charging more uniform.

Figure 6C:
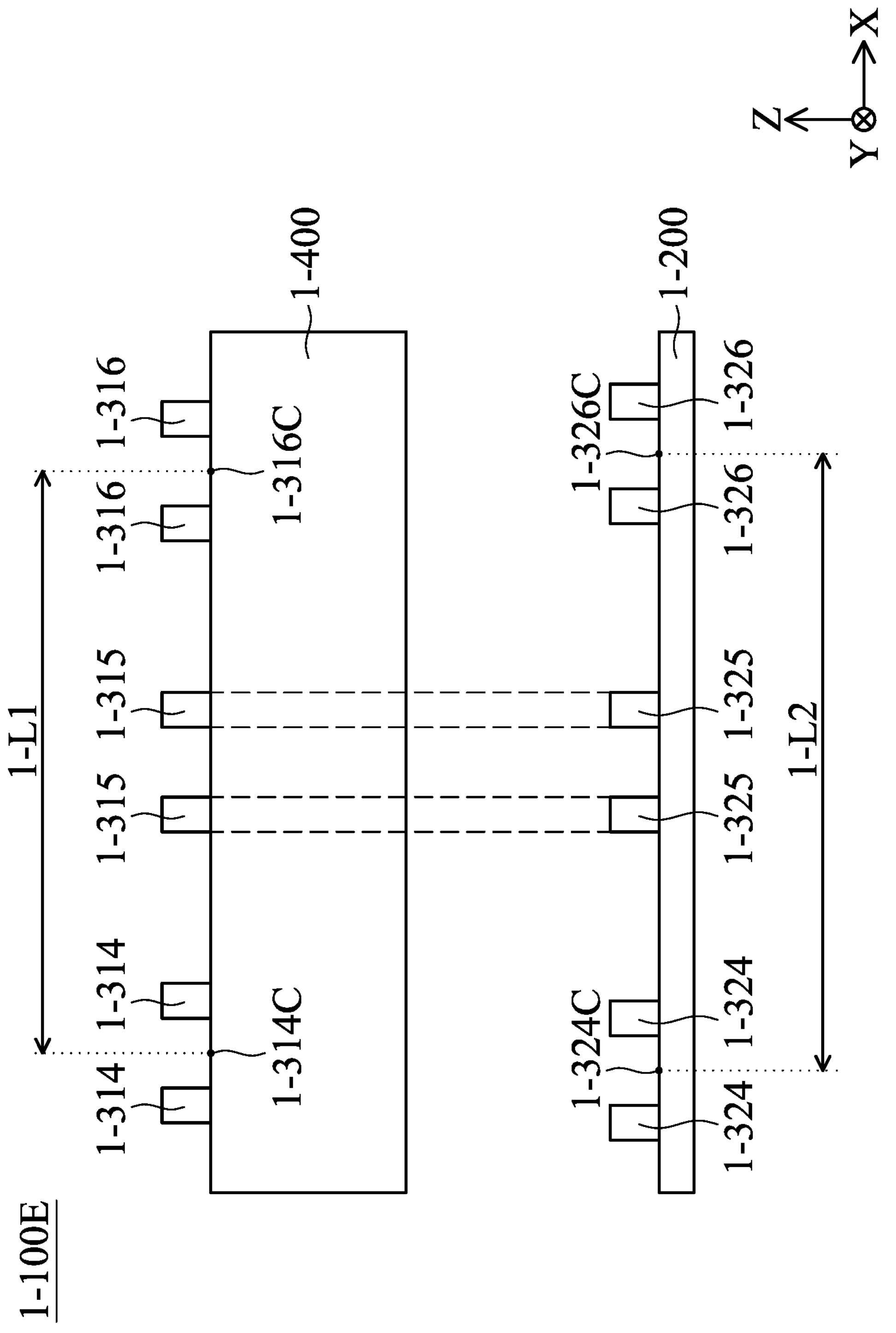
FIG. 6C is a side view of the optical system.

FIG. 6C is a side view of the optical system 1-100E, and some elements are omitted for clarity. As shown in FIG. 6C, in the Z direction, the thirteenth coil element 1-315 may align with the fourteenth coil element 1-325, the fifth coil element 1-314 may not align with the sixth coil element 1-324, and the seventh coil element 1-316 may not align with the eighth coil element 1-326. In the X direction (the first direction), the distance 1-L1 between a center 1-310C of the first coil element 1-310 to a center 1-312C of the third coil element 1-312 may be different from the distance 1-L2 between a center 1-320C of the second coil element 1-320 to a center 1-322C of the fourth coil element 1-322, such as the distance 1-L1 may be less than the distance 1-L2.

Figure 5F:
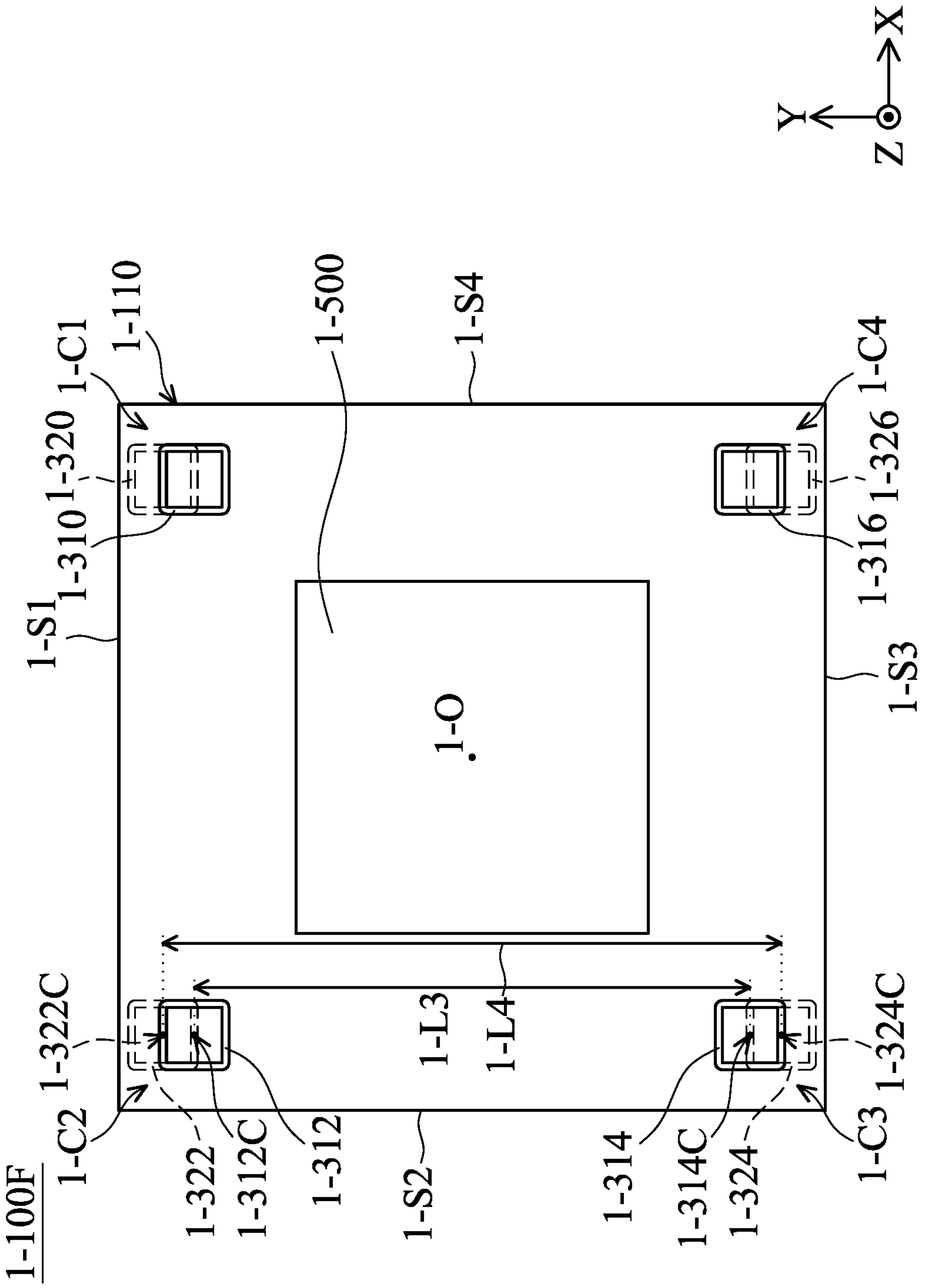
FIG. 5F is a schematic view of some elements of the optical system.

FIG. 5F is a schematic view of some elements of the optical system 1-100F. The elements of the optical system 1-100F may be substantially similar to that of the optical system 1-100, and only some elements are shown in FIG. 5F. In some embodiments, in FIG. 5F, in the Y direction, the distance 1-L3 between a center 1-312C of the third coil element 1-312 to a center 1-314C of the fifth coil element 1-314 may be different from the distance 1-L4 between a center 1-322C of the fourth coil element 1-322 to a center 1-324 of the sixth coil element 1-324, such as the distance 1-L3 may be less than the distance 1-L4. The first coil element 1-310, the second coil element 1-320, the seventh coil element 1-316, and the eighth coil element 1-326 may have similar position relationship, and is not repeated here.

Figure 7A:
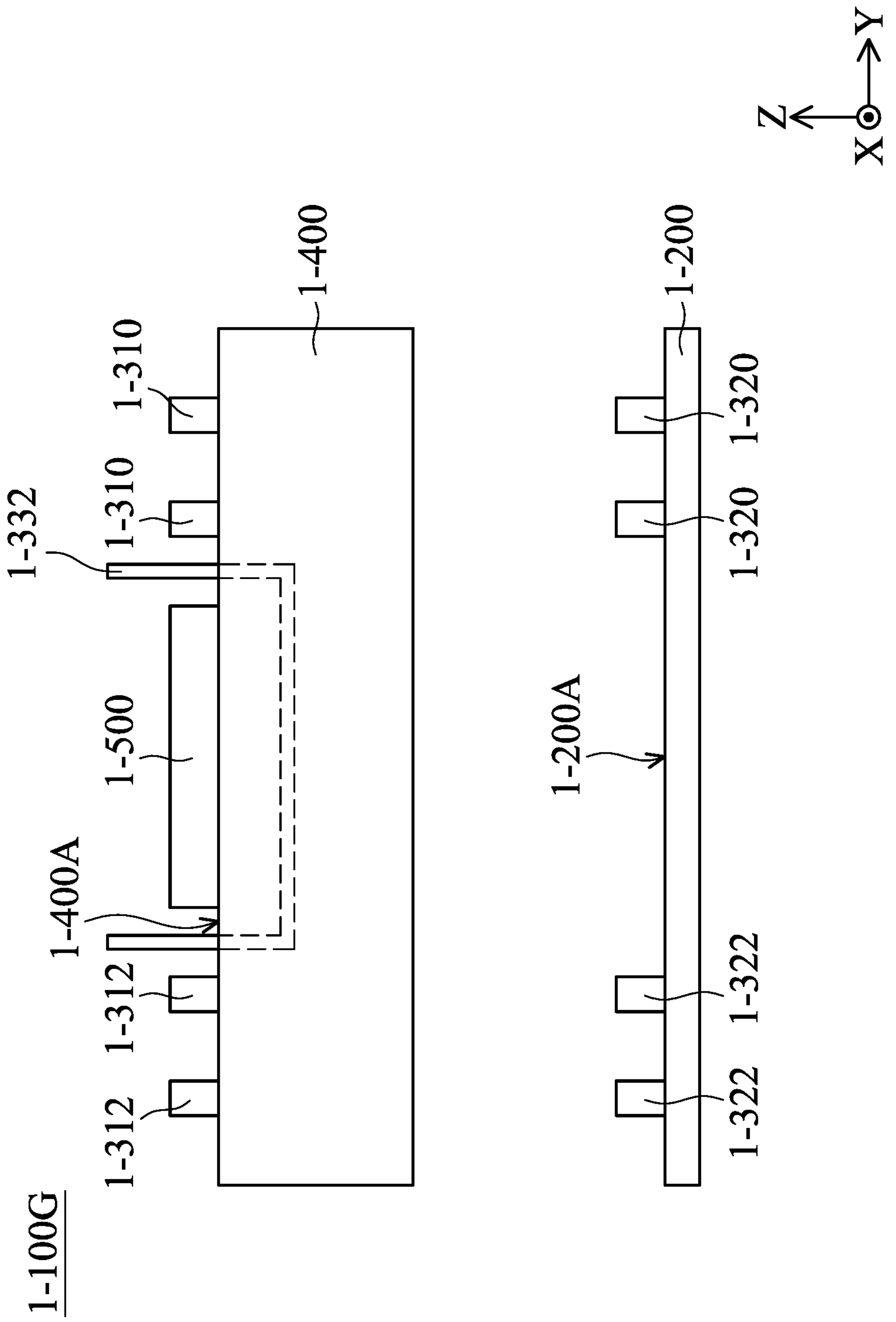
FIG. 7A is a schematic view of some elements of the optical system.

In some embodiments, additional magnetic isolating assembly may provided in the optical system, such as may be provided on the first movable portion 1-400. For example, FIG. 7A is a schematic view of some elements of the optical system 1-100G. The elements of the optical system 1-100G may be substantially similar to that of the optical system 1-100, and only some elements are shown in FIG. 7A. A first magnetic isolating element 1-332 may be provided on the first movable portion 1-400 of the optical system 1-100F. The first coil assembly 1-W1 may be provided on a first side 1-400A of the first movable portion 1-400, and the second coil assembly 1-W2 may be provided on a third side 1-200A of the second coil assembly 1-W2. The first side 1-400A and the third side 1-200A face an identical direction. At least a portion of the first magnetic isolating element 1-332 is disposed between the first optical assembly 1-105 (e.g. the first optical element 1-500) and the first coil assembly 1-W1 or between the first optical assembly 1-105 (e.g. the first optical element 1-500) and the second coil assembly 1-W2. At least a portion of the first magnetic isolating element 1-332 overlaps the first optical assembly 1-105 (e.g. the first optical element 1-500) in the direction that the main axis 1-O extends (the Z direction). Moreover, in the X direction or the Y direction, the first magnetic isolating element 1-332, the first optical element 1-500, and the first coil assembly 1-W1 at least partially overlaps each other.

Moreover, the material of the first magnetic isolating element 1-332 may include magnetic permeable material (e.g. metal). By the position relationship, the electromagnetic signal generated between the first coil assembly 1-W1 and the second coil assembly 1-W2 may be prevented from interfering the first optical element 1-500, so the signal detected by the first optical element 1-500 may be more accurate. Moreover, a portion of the first magnetic isolating element 1-332 may be embedded in the first movable portion 1-400, and another portion of the first magnetic isolating element 1-332 may be exposed from the first movable portion 1-400 to reduce the required space, and miniaturization may be achieved.

Figure 7B:
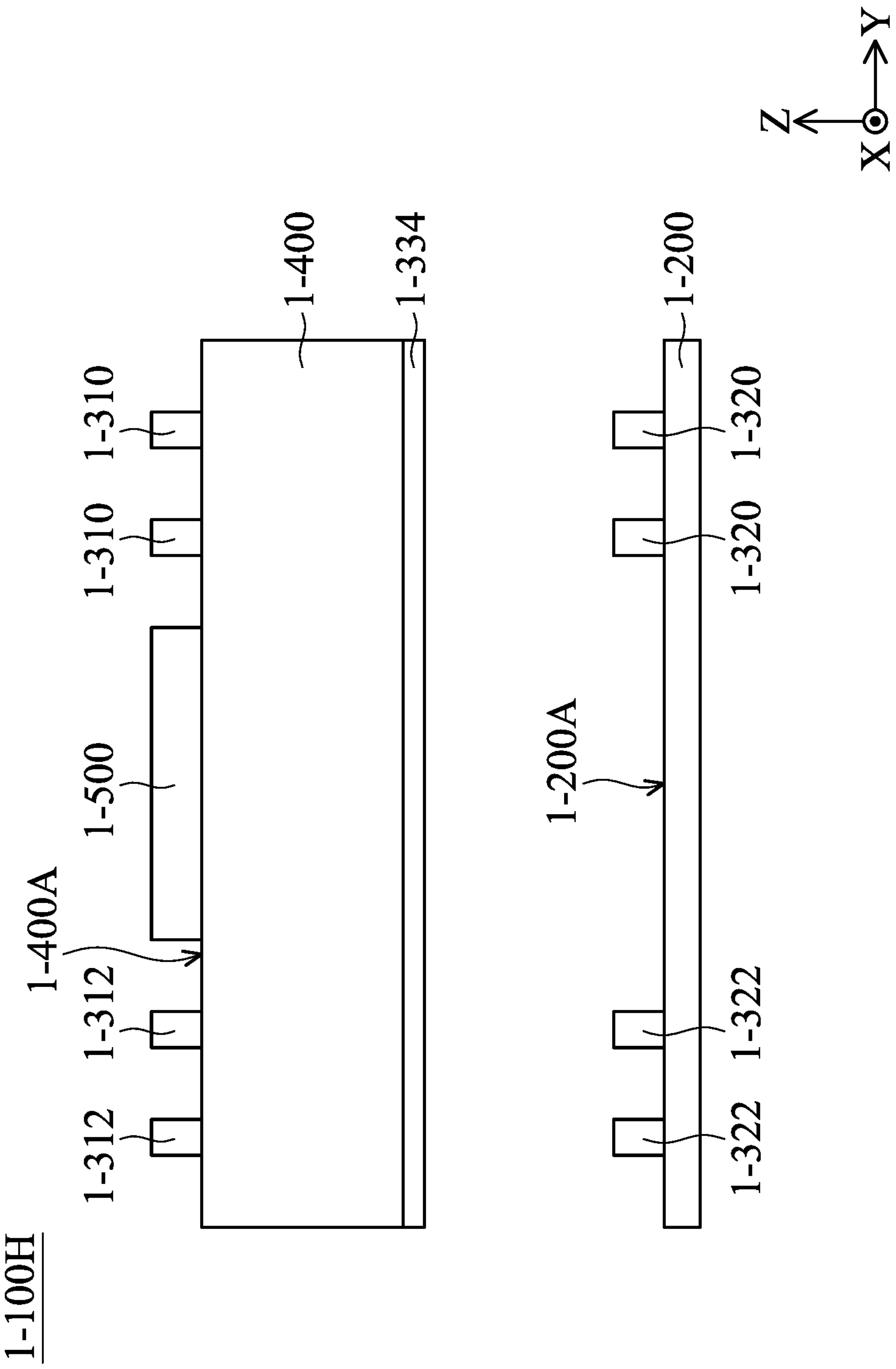
FIG. 7B is a schematic view of some elements of the optical system.

FIG. 7B is a schematic view of some elements of the optical system 1-100H. The elements of the optical system 1-100H may be substantially similar to that of the optical system 1-100, and only some elements are shown in FIG. 7B. A second magnetic isolating element 1-334 may be provided on the first movable portion 1-400 of the optical system 1-100H, such as the second magnetic isolating element 1-334 may be provided on a side that is different from a side that the first coil element 1-310 and the third coil element 1-312 are disposed on. The first coil assembly 1-W1 may be provided on the first side 1-400A of the first movable portion 1-400, the second coil assembly 1-W2 may be provided on the third side 1-200A of the first substrate 1-200, and the first side 1-400A and the third side 1-200A face an identical direction.

The material of the second magnetic isolating element 1-334 may be similar to that of the first magnetic isolating element 1-332. At least a portion of the second magnetic isolating element 1-334 is disposed between the first optical assembly 1-105 (e.g. the first optical element 1-500) and the first coil assembly 1-W1 or the second coil assembly 1-W2. At least a portion of the second magnetic isolating element 1-334 overlaps the first optical assembly 1-105 (e.g. the first optical element 1-500) along the main axis 1-O (in the Z direction). At least a portion of the second magnetic isolating element 1-334 is disposed between the first coil assembly 1-W1 and the second coil assembly 1-W2 in the direction that the main axis 1-O extends. By the position relationship, the electromagnetic signal generated between the first coil assembly 1-W1 and the second coil assembly 1-W2 may be prevented from interfering the first optical element 1-500, so the signal detected by the first optical element 1-500 may be more accurate.

Figure 7C:
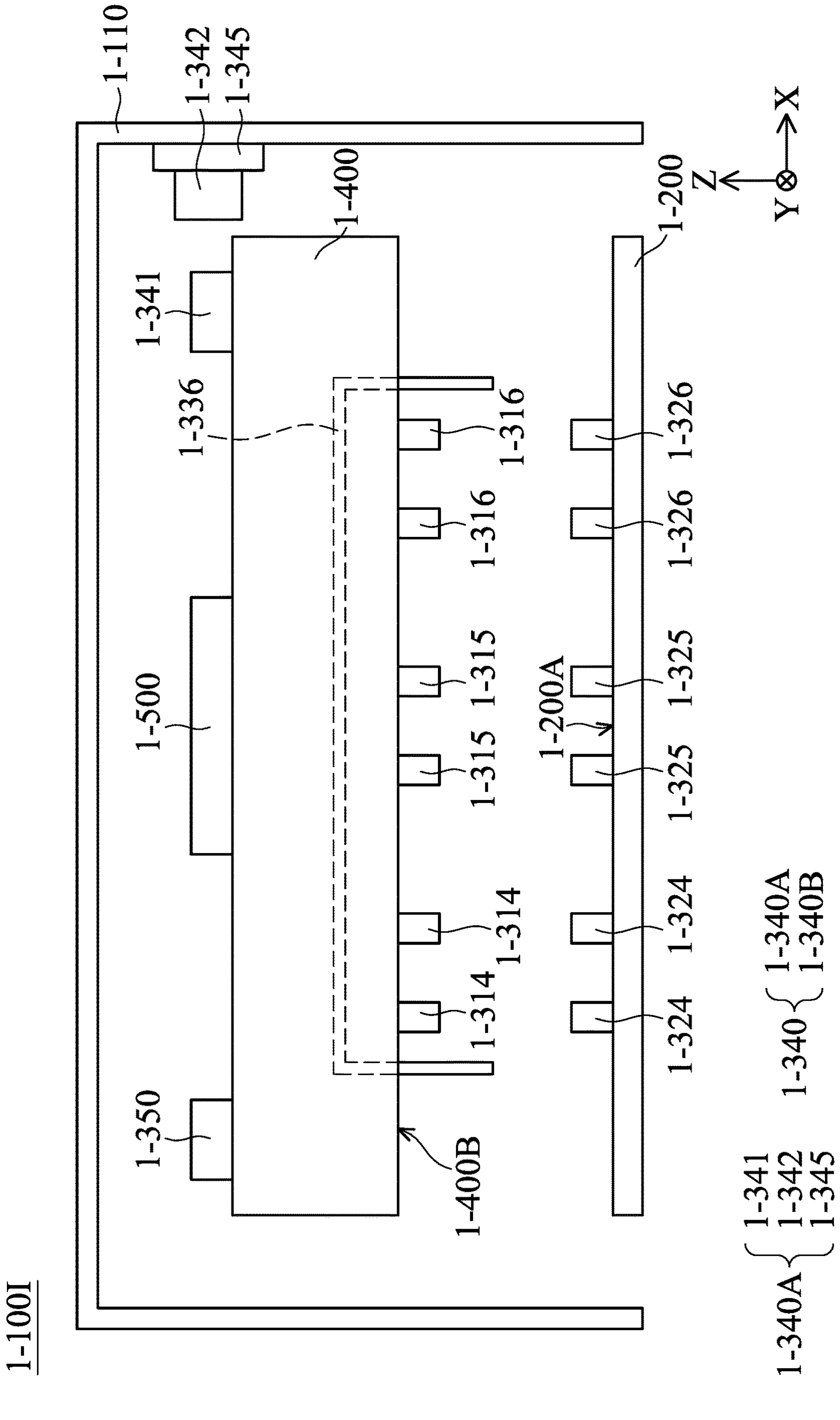
FIG. 7C is a schematic view of some elements of the optical system.

FIG. 7C is a schematic view of some elements of the optical system 1-100I. The elements of the optical system 1-100I may be substantially similar to that of the optical system 1-100, and only some elements are shown in FIG. 7C. A third magnetic isolating element 1-336 may be provided on the first movable portion 1-400 of the optical system 1-100I, such as the third magnetic isolating element 1-336 may be partially embedded in and partially exposed from the first movable portion 1-400. The material of the third magnetic isolating element 1-336 may be similar to that of the first magnetic isolating element 1-332. At least a portion of the third magnetic isolating element 1-336 is disposed between the first optical assembly 1-105 (e.g. the first optical element 1-500) and the first coil assembly 1-W1 or the second coil assembly 1-W2.

Although the first coil assembly 1-W1 are disposed on a side of the first movable portion 1-400 that faces away from the second coil assembly 1-W2, the present disclosure is not limited thereto. For example, in FIG. 7C, the first coil assembly 1-W1 may be disposed on a second side 1-400B of the first movable portion 1-400, and the 4 second coil assembly 1-W2 may be disposed on the third side 1-200A of the first substrate 1-200. The second side 1-400B faces the third side 1-200A. In other words, the second side 1-400B and the third side 1-200A face opposite directions.

Moreover, the first coil assembly 1-W1, the second coil assembly 1-W2 and the first optical element 1-500 are disposed on opposite sides of the third magnetic isolating element 1-336. By the position relationship, the electromagnetic signal generated between the first coil assembly 1-W1 and the second coil assembly 1-W2 may be prevented from interfering the first optical element 1-500, so the signal detected by the first optical element 1-500 may be more accurate.

The first magnetic isolating element 1-332, the second magnetic isolating element 1-334, and the third magnetic isolating element 1-336 may be called as a magnetic isolating assembly. Although the embodiments above only shows one magnetic isolating element in one optical system, the first magnetic isolating element 1-332, the second magnetic isolating element 1-334, and the third magnetic isolating element 1-336 may be provided in one optical system to enhance the magnetic isolation.

Moreover, as shown in FIG. 7C, an additional energy storage element 1-350 may be provided on the first movable portion 1-400 of the optical system 1-100I, and the first communication element 1-341 and the second communication element 1-342 are shown in FIG. 7C. It should be noted that the first communication element 1-341, the second communication element 1-342, and the energy storage element 1-350 are also applicable for the above embodiments, and only shown in FIG. 7C for clarity. The energy storage element 1-350 may be a battery, which is electrically connected to the third communication element 1-343 (the first coil assembly 1-W1) to serve as a backup power surface. When the current provided from the second coil assembly 1-W2 to the first coil assembly 1-W1 is not enough, the energy storage element 1-350 may provided energy to the first coil assembly 1-W1 as compensation.

Furthermore, the first communication assembly 1-340A may further includes a blodking element 1-345, such as a copper foil. The blodking element 1-345 may be affixed on the case 1-110 of the fixed portion 1-F. The blodking element 1-345 and the first communication element 1-341 are disposed on different sides of the second communication element 1-342 to prevent external signal from interfering the second communication element 1-342. Instead, the second communication element 1-342 may only receive the signal provided from the first communication element 1-341 to increase the quality of signal transmission.

In summary, an optical system is provided. The optical system includes a first movable portion, a fixed portion, a first driving assembly, and a communication module. The first movable portion is movable relative to the fixed portion. The first driving assembly is used for driving the first movable portion to move relative to the fixed portion. The communication module is used for electrically connected to an external circuit. The design of present disclosure may allow the optical element to move in different directions to enhance the performance of the optical module, and may achieve miniaturization.

The Second Group of Embodiments

Figure 8:
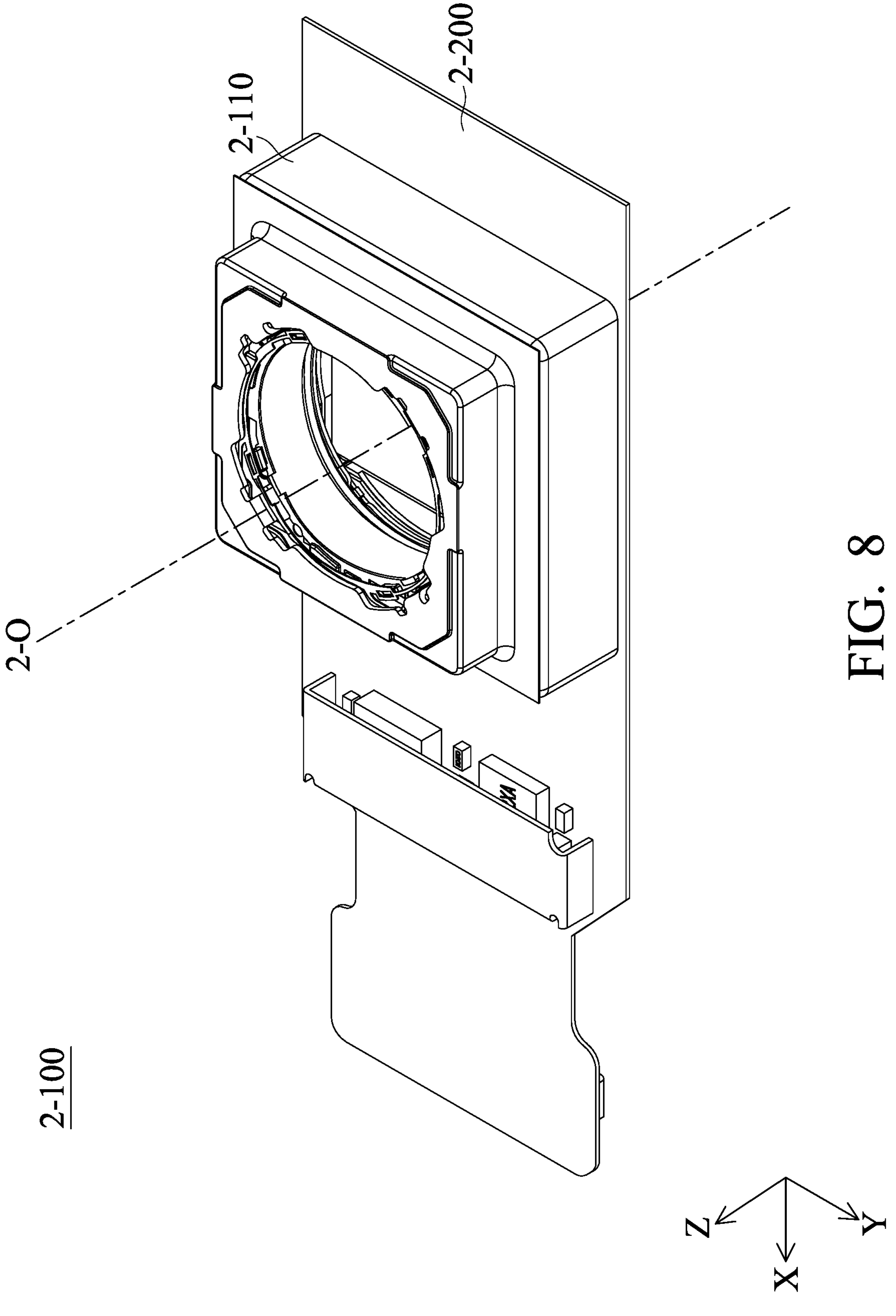
FIG. 8 is a perspective view of an optical system in some embodiments of the present disclosure.
Figure 9:
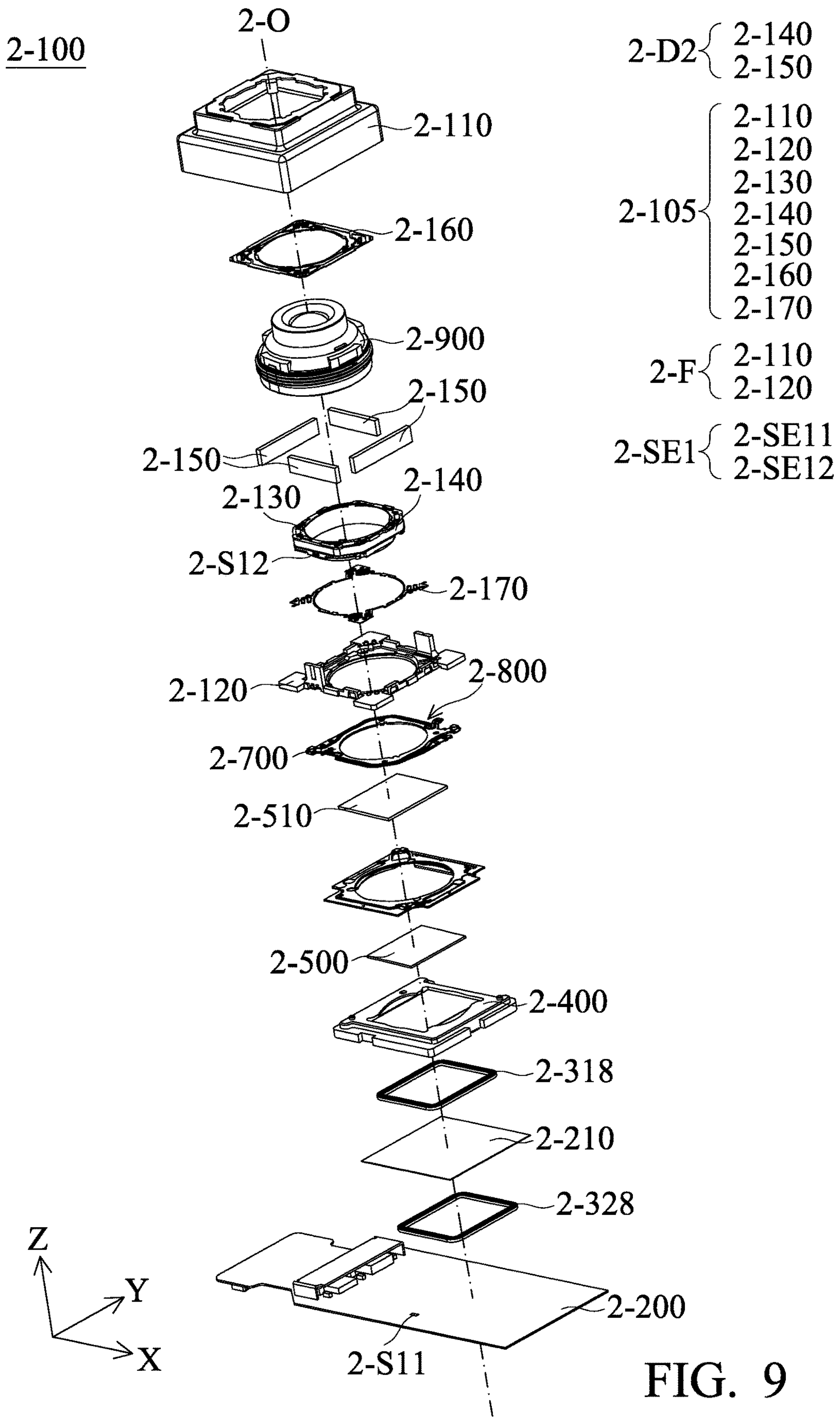
FIG. 9 is an exploded view of the optical system.
Figure 10:
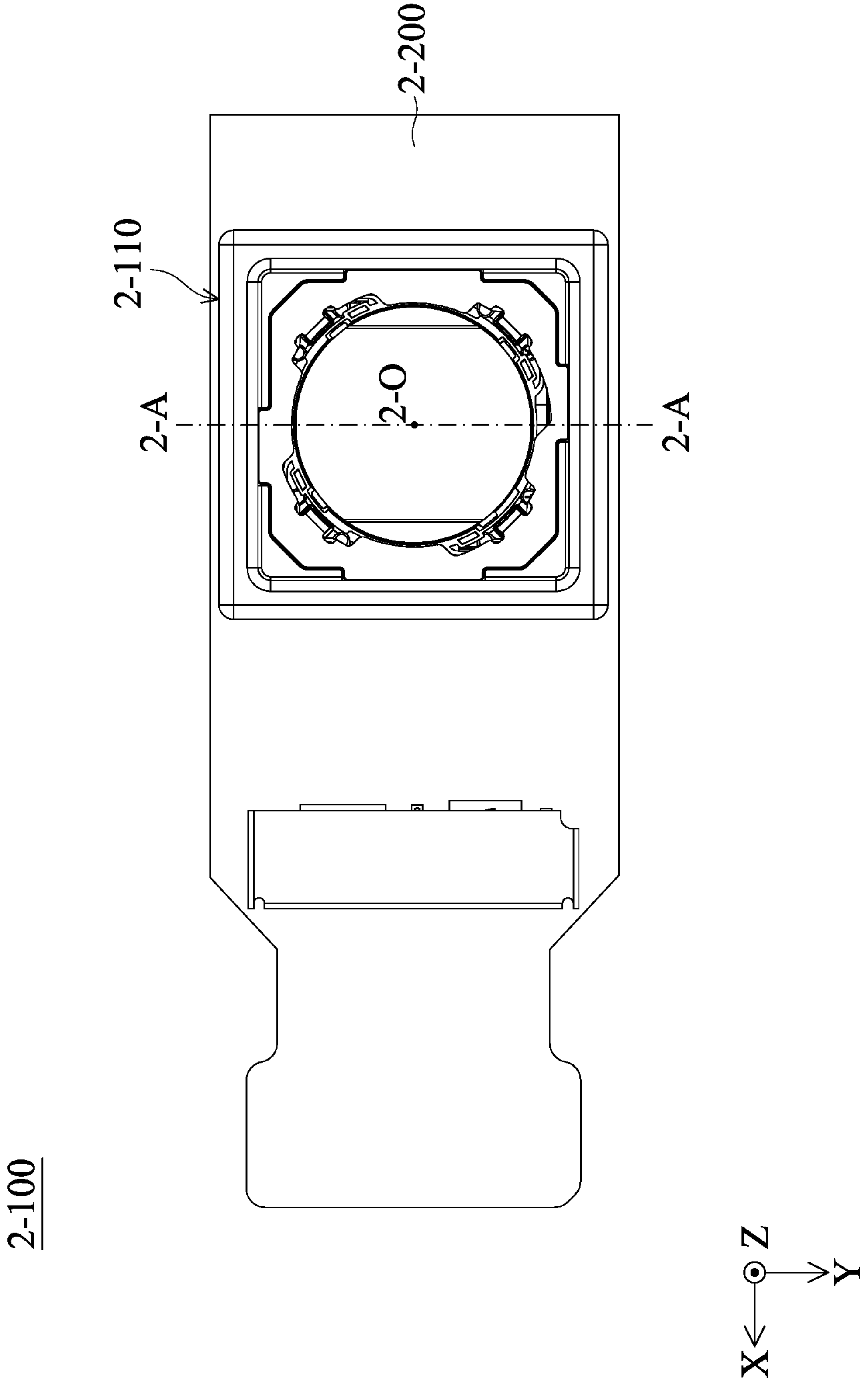
FIG. 10 is a top view of the optical system.
Figure 11:
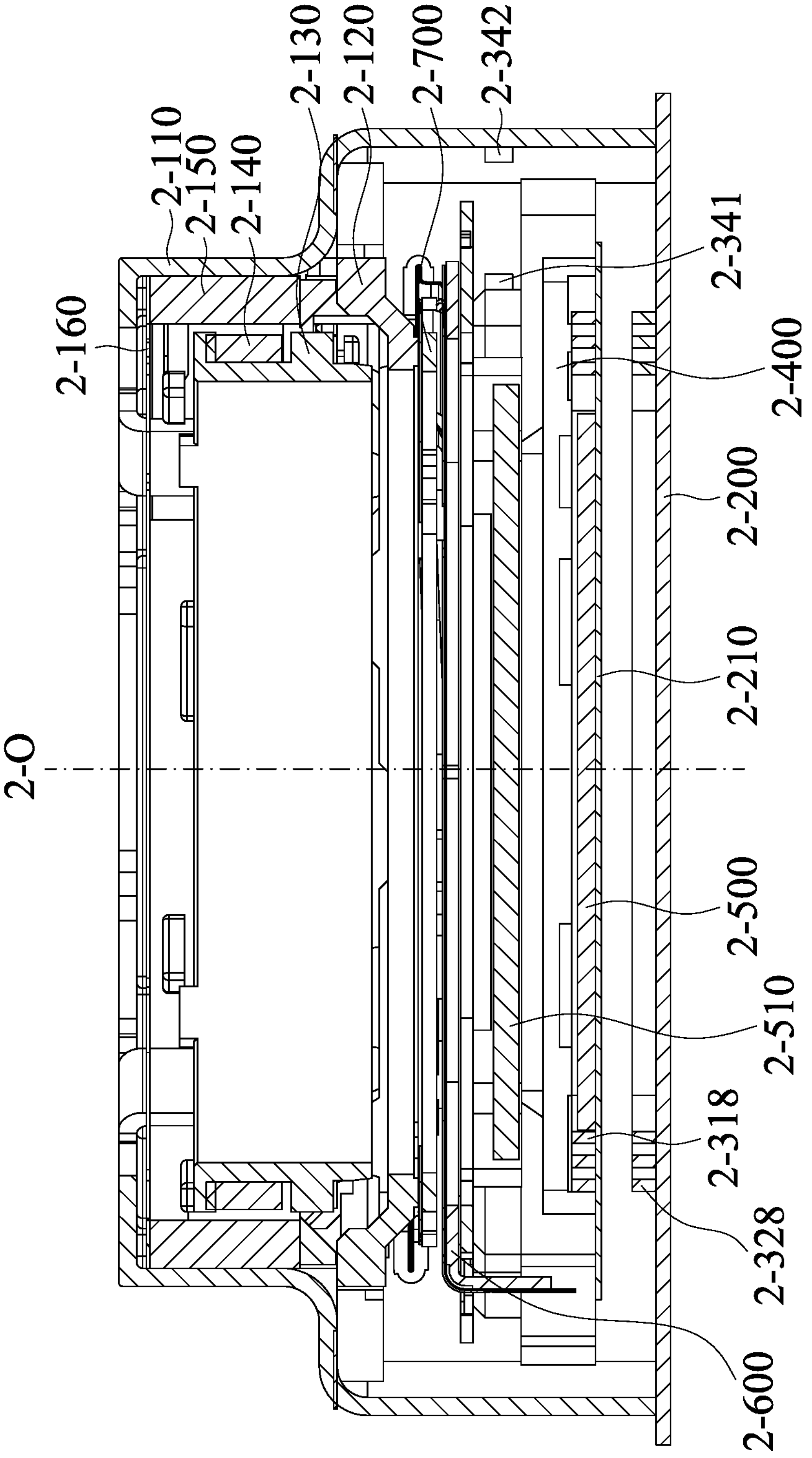
FIG. 11 is a cross-sectional view illustrated along the line 2-A-2-A in FIG. 10.

FIG. 8 is a perspective view of an optical system 2-100 in some embodiments of the present disclosure. FIG. 9 is an exploded view of the optical system 2-100. FIG. 10 is a top view of the optical system. FIG. 11 is a cross-sectional view illustrated along a line 2-A-2-A in FIG. 10.

In some embodiments, the optical system 2-100 may mainly include a case 2-110, a bottom 2-120, a third movable portion 2-130, a first coil 2-140, a first magnetic element 2-150, a first resilient element 2-160, a second resilient element 2-170, a first substrate 2-200, a circuit assembly 2-210, a ninth coil element 2-318, a tenth coil element 2-328, a first movable portion 2-400, a first optical element 2-500, a light filter element 2-510, a second substrate 2-600, a resilient assembly 2-700, and a first driving assembly 2-800 arranged along a main axis 2-O. The optical system 2-100 may be disposed on an electronic apparatus, such as a cell phone, a tablet, or a notebook, but it is not limited thereto.

The optical system 2-100 may be used for driving a second optical element 2-900, or may be used for driving various optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

In some embodiments, the case 2-110, the bottom 2-120, the third movable portion 2-130, the first coil 2-140, the first magnetic element 2-150, the first resilient element 2-160, and the second resilient element 2-170 may be called together as a first optical assembly 2-105 used for driving the second optical element 2-900 to move in X, Y, and Z direction. Moreover, the case 2-110 and the bottom 2-120 may be affixed on the first substrate 2-200, so the case 2-110, the bottom 2-120, and the first substrate 2-200 may be called as a fixed portion 2-F. The first movable portion 2-400 and the third movable portion 2-130 may move relative to the fixed portion 2-F. In some embodiments, the third movable portion 2-130 may move relative to the first movable portion 2-400.

It should be noted that a case opening is formed on the case 2-110, and a bottom opening is formed on the bottom 2-120. The center of the case opening corresponds to the main axis 2-O (e.g. the main axis 2-O included in the fixed portion 2-F, and the case 2-110 and the bottom 2-120 may arranged along the main axis 2-O). The bottom opening corresponds to the first optical element 2-500, and the first optical element 2-500 may be disposed on the first substrate 2-200. Therefore, the first optical element 2-500 may corresponds to the second optical element 2-900, such as may arrange along the main axis 2-O (e.g. the Z direction), and the second optical element 2-900 may perform focus with the first optical element 2-500 along the main axis 2-O.

In some embodiments, the third movable portion 2-130 has a through hole, and the second optical element 2-900 may be affixed in the through hole to move with the third movable portion 2-130. In other words, the third movable portion 2-130 may use for holding the second optical element 2-900. In some embodiments, the first magnetic element 2-150 and the first coil 2-140 may be called as second driving assembly 2-D2 used for driving the third movable portion 2-130 to move relative to the fixed portion 2-F.

The first magnetic element 2-150 and the first coil 2-140 may be respectively disposed on the fixed portion 2-F and the third movable portion 2-130, or their positions may be interchanged, depending on design requirement. It should be noted that the interaction between the first magnetic element 2-150 and the first coil 2-140 may generate a magnetic force to move the second optical element 2-900 disposed on the third movable portion 2-130 relative to the fixed portion 2-F, so auto focus (AF) or optical image stabilization (OIS) may be achieved. In some embodiments, the second driving assembly 2-D2 may include piezoelectric element or shape memory alloy elements.

In this embodiment, the third movable portion 2-130 and the second optical element 2-900 disposed therein may movably disposed in the fixed portion 2-F. More specifically, the third movable portion 2-130 may be connected to the fixed portion 2-F and suspended in the fixed portion 2-F by the first resilient element 2-160 and the second resilient element 2-170 that are made by metal. When current is passed to the first coil 2-140, the first coil 2-140 may interact with the magnetic force generated by the first magnetic element 2-150 to generate an electromagnetic force to move the third movable portion 2-130 and the second optical element 2-900 relative to the fixed portion 2-F along the main axis 2-O, so auto focus may be achieved.

In some embodiments, a first sensing assembly 2-SE1 may be disposed in the optical system 2-100 to detect the position of the third movable portion 2-130 relative to the fixed portion 2-F. The first sensing assembly 2-SE1 may include a first sensing element 2-SE11 and a second sensing element 2-SE12. In some embodiments, the first sensing element 2-SE11 may be affixed on the fixed portion 2-F (e.g. the first substrate 2-200 or the bottom 2-120), and the second sensing element 2-SE12 may be disposed on the third movable portion 2-130.

The first sensing element 2-SE11 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

The second sensing element 2-SE12 may include magnetic elements, and the first sensing element 2-SE11 may detect the magnetic field variation of the second sensing element 2-SE12 generated by the movement of the third movable portion 2-130, so the position of the third movable portion 2-130 relative to the fixed portion 2-F may be achieved. In some embodiments, other sensors may be provided to detect the position of the first movable portion 2-400 relative to the fixed portion 2-F, such as may be disposed between the first substrate 2-200 and the first movable portion 2-400.

For example, the sensor may be used for detect the movement of the first movable portion 2-400 or the movement of the third movable portion 2-130 relative to the fixed portion 2-F in different dimensions, such as the lateral movement in the X direction (first dimension), the lateral movement in the Y direction (second dimension), the lateral movement in the Z direction (third dimension), or the rotational movement having a rotational axis extending in the Z direction (fourth dimension), but the present disclosure is not limited thereto.

The first substrate 2-200 may be a flexible printed circuit (FPC) that may be attached on the bottom 2-120. In this embodiment, the first substrate 2-200 is electrically connected to other electronic elements disposed in the optical system 2-100 or outside the optical system 2-100. For example, the first substrate 2-200 may provide an electric signal to the second driving assembly 2-D2 to control the movement of the third movable portion 2-130 in the X, Y or Z directions. Therefore, auto focus or optical image stabilization may be achieved.

In some embodiments, the circuit assembly 2-210 may be a flexible printed circuit (FPC) that may be attached on the bottom 2-120. In this embodiment, the circuit assembly 2-210 is electrically connected to other electronic elements disposed in the optical system 2-100 or outside the optical system 2-100. For example, in some embodiments, the circuit assembly 2-210 may provide an electric signal to the first driving assembly 2-800 and the first optical assembly 2-105 to control the movement of the first movable portion 2-400 in the X, Y or Z directions. In other words, the first optical assembly 2-105 and the first driving assembly 2-800 are electrically connected to the electronic apparatus through the first movable portion 2-400. Therefore, auto focus or optical image stabilization may be achieved.

The ninth coil element 2-318 and the tenth coil element 2-328 may be respectively disposed on the first movable portion 2-400 and the fixed portion 2-F. The first coil element 2-310 and the first optical element 2-500 may be disposed on the circuit assembly 2-210, and the ninth coil element 2-318 may surround the first optical element 2-500. The tenth coil element 2-328 may provide various signals to the ninth coil element 2-318 by a wireless manner, which will be described later.

The case 2-110 of the fixed portion 2-F has a polygonal structure, and the first movable portion 2-400 may be plate-shaped and may be perpendicular to the main axis 2-O. The material of the first movable portion 2-400 may include plastic to prevent magnetic interference. The first optical element 2-500 and the light filter element 2-510 may be disposed on (e.g. connected to) the first movable portion 2-400, such as may move with the first movable portion 2-400 relative to the fixed portion 2-F. The first optical element 2-500 may include a photoelectric converter, such as an optical sensor used for corresponding and detecting the light passing the second optical element 2-900. Afterwards, the light is converted as an electric signal that is provided to the electronic apparatus. In some embodiments, the first movable portion 2-400 may move relative to the fixed portion 2-F. Therefore, the first optical element 2-500 disposed on the first movable portion 2-400 may move with the first movable portion 2-400 to achieve optical image stabilization. The first optical element 2-500 may be used for receiving an optical signal and providing an image signal.

In some embodiments, a first communication element 2-341 and a second communication element 2-342 may be disposed in the optical system 2-100. The first communication element 2-341 may be affixed on the first movable portion 2-400, and the second communication element 2-342 may be affixed on the fixed portion 2-F. The first communication element 2-341 and the second communication element 2-342 may be called as first communication assembly 2-340A. The image signal is transferred to the external circuit by a first signal (wireless electromagnetic wave) provided by the first communication assembly 2-340A. For example, the optical system 2-100 may be disposed on an electronic apparatus (e.g. a cellphone, a tablet, or a notebook), and the external circuit is the circuit of the electronic apparatus.

In some embodiments, a gap that is greater than zero is between the first communication element 2-341 and the second communication element 2-342. That is, the first communication element 2-341 and the second communication element 2-342 are not connected by wire and are electrically isolated. For example, the first signal may be transferred from the first communication element 2-341 to the second communication element 2-342 or vice versa in a wireless manner. The second communication element 2-342 may be electrically connected to the external circuit of the electronic apparatus. The first communication element 2-341 and the second communication element 2-342 may include a first integrated circuit element and a second integrated circuit element used for transmitting signal, respectively. The first communication assembly 2-340A may include Bluetooth, wireless local area network (WLAN), or wireless wide area network (WWAN), depending on design requirement.

The light filter element 2-510 may only allow light with specific wavelength to pass through, and other light may be filtered. For example, infrared may be filtered by the light filter element 2-510, and visible light may pass through the light filter element 2-510, but it is not limited thereto. The light filter element 2-510 may corresponds to the first optical element 2-500 to let the light detect by the first optical element 2-500 more close to the light detect by eyes.

The second substrate 2-600 may be disposed on the first movable portion 2-400, and the resilient assembly 2-700 may be used for movably connect the second substrate 2-600 and the fixed portion 2-F (e.g. the bottom 2-120). The fixed portion 2-First driving assembly 2-800 may drive the first movable portion 2-400 to move relative to the fixed portion 2-F or the third movable portion 2-130.

In some embodiments, the fixed portion 2-First driving assembly 2-800 may drive the first movable portion 2-400 to move relative to the fixed portion 2-F. In some embodiments, the first driving assembly 2-800 may be formed by shape memory alloy (SMA), which is an alloy that can eliminate the deformation in lower temperature by heating and extend along a direction. When the shape memory alloy performs plastic deformation under its phase transition temperature, it may return to its original shape by heating.

The resilient assembly 2-700 may movably connected to the second substrate 2-600 through the first driving assembly 2-800. When the driving elements in the first driving assembly 2-800 deform, relative movement by occur between the second substrate 2-600 and the resilient assembly 2-700 to allow the first movable portion 2-400 to move relative to the fixed portion 2-F. In some embodiments, the first optical element 2-500 disposed on the first movable portion 2-400 may be moved as well to achieve optical image stabilization.

Figure 12A:
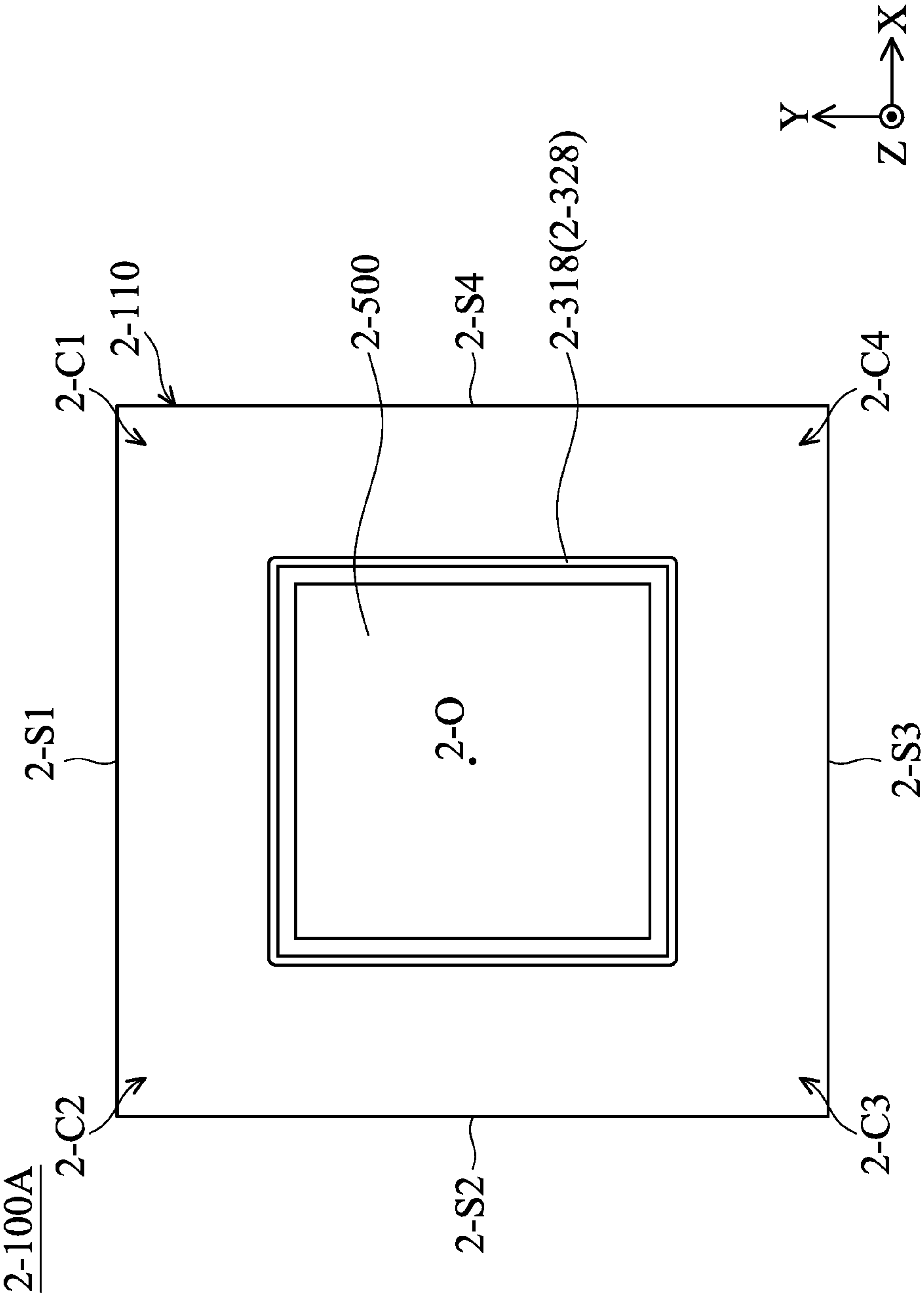
FIG. 12A is a schematic view of some elements of the optical system.

FIG. 12A is a schematic view of some elements of optical system 2-100A. The elements of the optical system 2-100A may be substantially similar to that of the optical system 2-100, and only some elements are shown in FIG. 12A. When viewed along the main axis 2-O (the Z direction), the case 2-110 of the fixed portion 2-F includes a first edge 2-S1, a second edge 2-S2, a third edge 2-S3, and a fourth edge 2-S4. The second edge 2-S2 is not parallel to the first edge 2-S1. The third edge 2-S3 is parallel to the first edge 2-S1. The fourth edge 2-S4 is parallel to the second edge 2-S2. Moreover, the case 2-110 includes a first corner 2-C1, a second corner 2-C2, a third corner 2-C3, and a fourth corner 2-C4. The first corner 2-C1 is between the fourth edge 2-S4 and the first edge 2-S1. The second corner 2-C2 is between the first edge 2-S1 and the second edge 2-S2. The third corner 2-C3 is between the second edge 2-S2 and the third edge 2-S3. The fourth corner 2-C4 is between the third edge 2-S3 and the fourth edge 2-S4.

When viewed along the main axis 2-O, the ninth coil element 2-318 and the tenth coil element 2-328 may surround the first optical element 2-500 but not overlap the first optical element 2-500 to prevent magnetic interference. The main axis 2-O may pass through the ninth coil element 2-318 and the tenth coil element 2-328. Moreover, in some embodiments, the ninth coil element 2-318 may overlap the tenth coil element 2-328 to provide signal from the tenth coil element 2-328 to the ninth coil element 2-318 by electromagnetic induction.

Figure 12B:
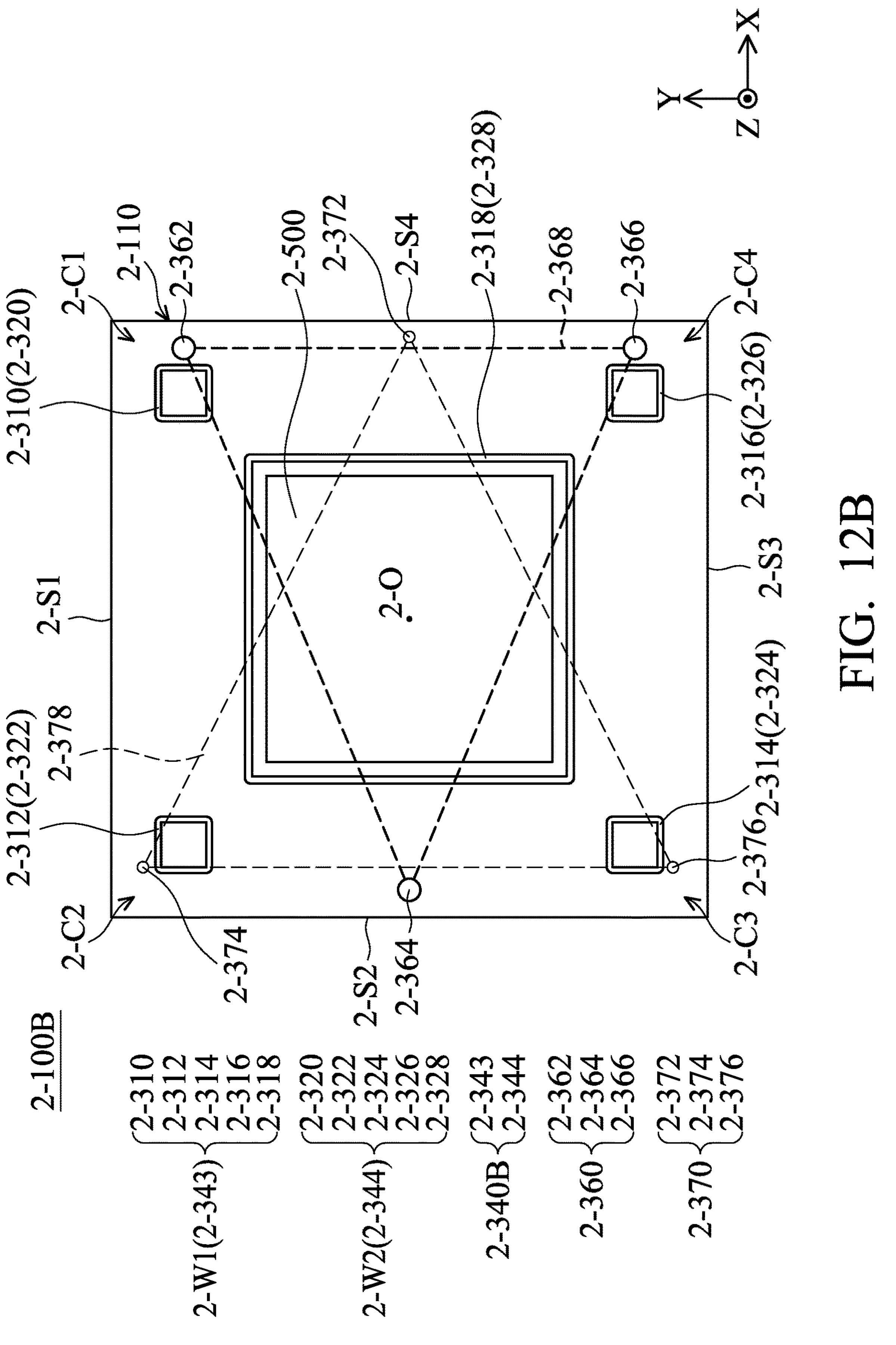
FIG. 12B is a schematic view of some elements of the optical system.

However, the present disclosure is not limited thereto. For example, FIG. 12B is a schematic view of some elements of the optical system 2-100B. The elements of the optical system 2-100B may be substantially similar to that of the optical system 2-100, and only some elements are shown in FIG. 12B. In FIG. 12B, besides the ninth coil element 2-318 and the tenth coil element 2-328, the optical system 2-100B may further include a first coil element 2-310, a second coil element 2-320, a third coil element 2-312, a fourth coil element 2-322, a fifth coil element 2-314, a sixth coil element 2-324, a seventh coil element 2-316, and a eighth coil element 2-326. The first coil element 2-310 corresponds to the second coil element 2-320, the third coil element 2-312 corresponds to the fourth coil element 2-322, the fifth coil element 2-314 corresponds to the sixth coil element 2-324, the seventh coil element 2-316 corresponds to the eighth coil element 2-326, and the ninth coil element 2-318 corresponds to the tenth coil element 2-328.

For example, when viewed along the axes of the coil elements, the first coil element 2-310 and the second coil element 2-320 at least partially overlap each other. The third coil element 2-312 and the fourth coil element 2-322 at least partially overlap each other. The fifth coil element 2-314 and the sixth coil element 2-324 at least partially overlap each other. The seventh coil element 2-316 and the eighth coil element 2-326 at least partially overlap each other. The ninth coil element 2-318 and the tenth coil element 2-328 at least partially overlap each other.

In some embodiments, the first coil element 2-310, the third coil element 2-312, the fifth coil element 2-314, the seventh coil element 2-316, and the ninth coil element 2-318 may be called together as a first coil assembly 2-W1 (or a third communication element 2-343), and the second coil element 2-320, the fourth coil element 2-322, the sixth coil element 2-324, the eighth coil element 2-326, and the tenth coil element 2-328 may be called together as a second coil assembly 2-W2 (or a fourth communication element 2-344). The third communication element 2-343 and the fourth communication element 2-344 may be called as a second communication assembly 2-340B. The first communication assembly 2-340A and the second communication assembly 2-340B may form a communication module 2-340 together for connecting to the external circuit.

Moreover, when viewed along the main axis 2-O (the Z direction), at least a portion of the first optical element 2-500 does not overlap the first coil assembly 2-W1 or the second coil assembly 2-W2 to prevent magnetic interference. At least a portion of the first coil assembly 2-W1 overlaps the second coil assembly 2-W2 to transmit signal by electromagnetic inductance.

When viewed along the main axis 2-O, the first coil element 2-310, the second coil element 2-320, the third coil element 2-312, and the fourth coil element 2-322 are at the first edge 2-S1. The third coil element 2-312, the fourth coil element 2-322, the fifth coil element 2-314, the sixth coil element 2-324 are at the second edge 2-S2. The fifth coil element 2-314, the sixth coil element 2-324, the seventh coil element 2-316, the eighth coil element 2-326 are at the third edge 2-S3. The first coil element 2-310, the second coil element 2-320, the seventh coil element 2-316, and the eighth coil element 2-326 are at the fourth edge 2-S4. Moreover, the first coil element 2-310 and the second coil element 2-320 are at the first corner 2-C1. The third coil element 2-312 and the fourth coil element 2-322 are at the second corner 2-C2. The fifth coil element 2-314 and the sixth coil element 2-324 are at the third corner 2-C3. The seventh coil element 2-316 and the eighth coil element 2-326 are at the fourth corner 2-C4. For example, the first coil element 2-310 and the second coil element 2-320 do not overlap the third coil element 2-312, the fourth coil element 2-322, the fifth coil element 2-314, the sixth coil element 2-324, the seventh coil element 2-316, or the eighth coil element 2-326. i.e. at least a portion of the first coil assembly 2-W1 does not overlap the second coil assembly 2-W2. Therefore, magnetic interference between the coils may be prevented.

The second coil assembly 2-W2 (the fourth communication element 2-344) may be used for transmit a power signal to the first coil assembly 2-W1 (the third communication element 2-343) by wireless transmission. In other words, the external circuit transmit the power signal to the first optical assembly 2-105 through the second communication assembly 2-340B to achieve wireless charging. For example, when alternating current is provided to the second coil assembly 2-W2, an induced electromotive force may be generated at the first coil assembly 2-W1, so the energy may be transferred to the first coil assembly 2-W1 by wireless transmission.

Alternatively, additional magnetic element may be provided on the first movable portion 2-400, such as a magnet or ferromagnetic material (e.g. Fe, Co, Ni). When direct current is provided to the second coil assembly 2-W2, the second coil assembly 2-W2 may act as an electromagnet to generate an electromagnetic driving force with the magnetic element on the first movable portion 2-400 to drive the first movable portion 2-400 moving relative to the fixed portion 2-F. In such situation, the required driving force provided by the first driving assembly 2-800 may be reduced, so the size of the first driving assembly 2-800 may be reduced, or the first driving assembly 2-800 may be omitted to achieve miniaturization.

Moreover, a first support assembly 2-360 and a second support assembly 2-370 may be provided between the first movable portion 2-400 and fixed portion 2-F (e.g. the first substrate 2-200). The first support assembly 2-360 may include a first support element 2-362, a second support element 2-364, and a third support element 2-366 that are spherical. The second support assembly 2-370 may include a fourth support element 2-372, a fifth support element 2-374, and a sixth support element 2-376 that are spherical. The first support element 2-362, the second support element 2-364, the third support element 2-366, the fourth support element 2-372, the fifth support element 2-374, and the sixth support element 2-376 may be disposed at sides or corners of the first movable portion 2-400 or the case 2-110 to limit the position of the first movable portion 2-400 relative to the fixed portion 2-F.

In some embodiments, the diameters of the first support element 2-362, the second support element 2-364, and the third support element 2-366 may be substantially identical. The diameters of the fourth support element 2-372, the fifth support element 2-374, and the sixth support element 2-376 may be substantially identical. The diameters of the first support element 2-362, the second support element 2-364, and the third support element 2-366 may be different from the diameters of the fourth support element 2-372, the fifth support element 2-374, and the sixth support element 2-376.

For example, the diameters of the first support element 2-362, the second support element 2-364, and the third support element 2-366 may be greater than the diameters of the fourth support element 2-372, the fifth support element 2-374, and the sixth support element 2-376. Therefore, when the first movable portion 2-400 is static, the first support element 2-362, the second support element 2-364, and the third support element 2-366 may in direct contact with the first movable portion 2-400 and the fixed portion 2-F, but the fourth support element 2-372, the fifth support element 2-374, and the sixth support element 2-376 may only in direct contact with the fixed portion 2-F and separate from the first movable portion 2-400. In other words, the first movable portion 2-400 may be connected to the fixed portion 2-F through the first support assembly 2-360.

When viewed along the main axis 2-O, the first support element 2-362, the second support element 2-364, and the third support element 2-366 forms a first triangular structure 2-368, as shown by the dashed lines in FIG. 12B. The first triangular structure 2-368 does not overlap the fourth support element 2-372, the fifth support element 2-374, and the sixth support element 2-376. Moreover, the fourth support element 2-372, the fifth support element 2-374, and the sixth support element 2-376 forms a second triangular structure 2-378. The second triangular structure 2-378 does not overlap the first support element 2-362, the second support element 2-364, and the third support element 2-366. When the first movable portion 2-400 receiving excess force, the first movable portion 2-400 may rotate along a rotational axis which is a connection formed by two of the first support element 2-362, the second support element 2-364, and the third support element 2-366. For example, the first movable portion 2-400 may rotate along a rotational axis which is a connection formed by the first support element 2-362 and the second support element 2-364. In such situation, the position relationship (i.e. the first triangular structure 2-368 does not overlap the fifth support element 2-374) allows the fifth support element 2-374 being as a limit structure to limit the maximum rotational range of the first movable portion 2-400, so the first movable portion 2-400 may be prevented from being collided with other elements.

In the following embodiments, the first support assembly 2-360 and the second support assembly 2-370 in this embodiment may be provided as well, and the elements are omitted for clarity in the following description.

Figure 12C:
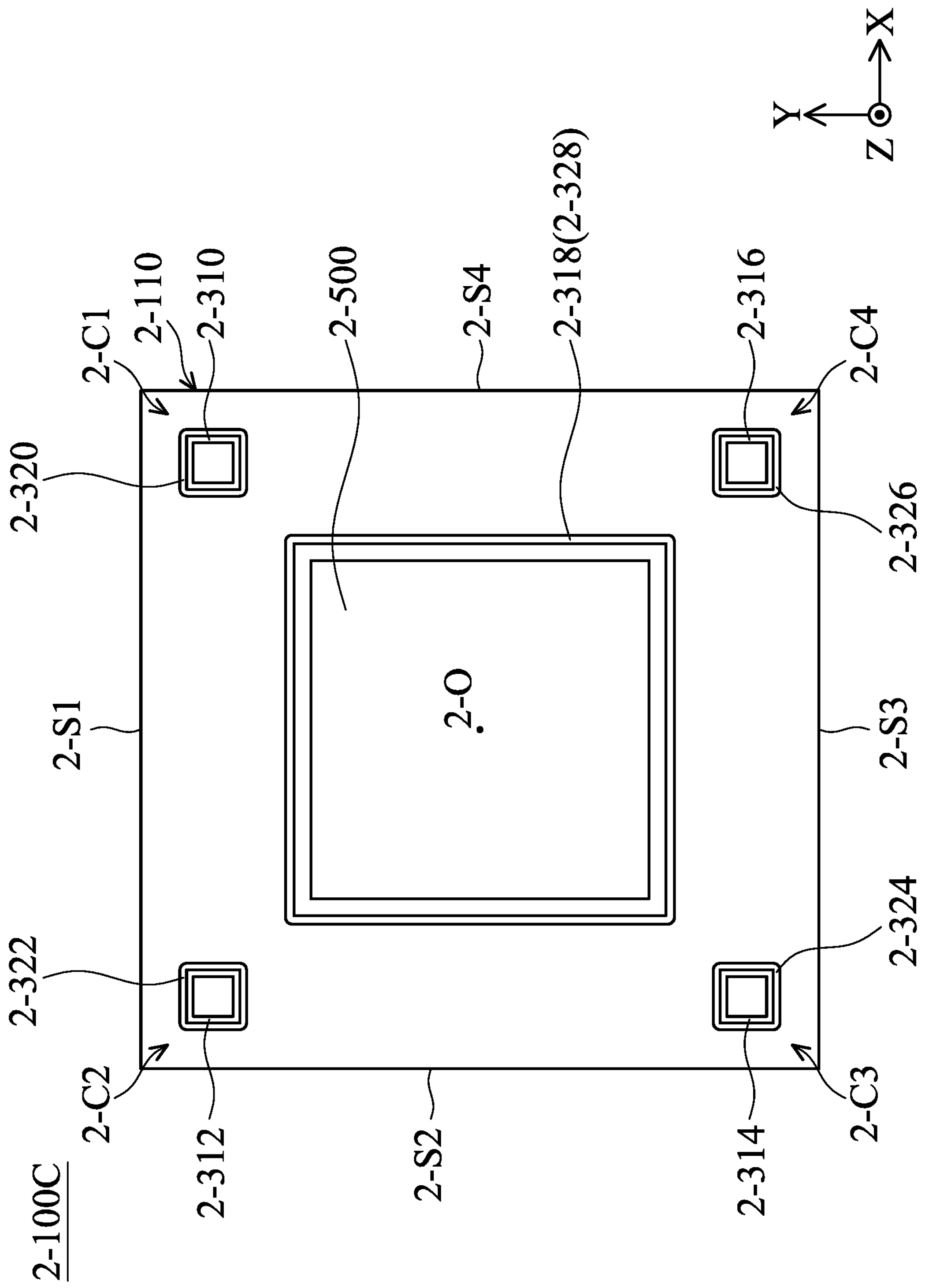
FIG. 12C is a schematic view of some elements of the optical system.

FIG. 12C is a schematic view of some elements of the optical system 2-100C. The elements of the optical system 2-100C may be substantially similar to that of the optical system 2-100, and only some elements are shown in FIG. 12C. In FIG. 12C, the ninth coil element 2-318 and the tenth coil element 2-328 may be omitted. Moreover, the sizes of the first coil element 2-310, the third coil element 2-312, the fifth coil element 2-314, and the seventh coil element 2-316 may be different from the sizes of the second coil element 2-320, the fourth coil element 2-322, the sixth coil element 2-324, and the eighth coil element 2-326.

For example, the sizes of the first coil element 2-310, the third coil element 2-312, the fifth coil element 2-314, and the seventh coil element 2-316 may be smaller than the sizes of the second coil element 2-320, the fourth coil element 2-322, the sixth coil element 2-324, and the eighth coil element 2-326. In other words, at least a portion of the first coil assembly 2-W1 is exposed from the second coil assembly 2-W2 rather than overlap the entire second coil assembly 2-W2. Therefore, the size of the coils on the first movable portion 2-400 may be reduced to achieve miniaturization.

Figure 12D:
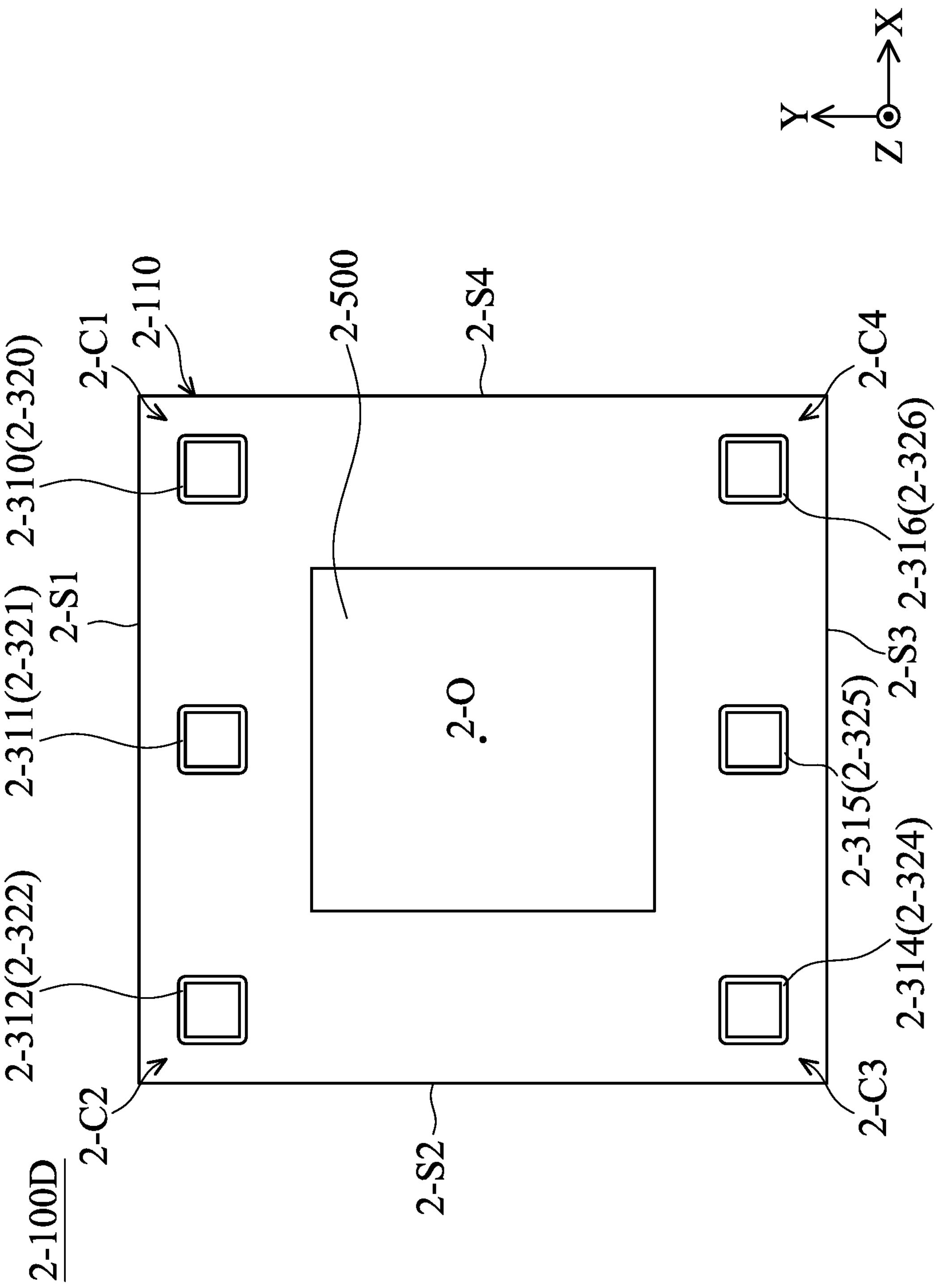
FIG. 12D is a schematic view of some elements of the optical system.

Although the coil elements described above are disposed at corners of the case 2-110, the present disclosure is not limited thereto. For example, FIG. 12D is a schematic view of some elements of the optical system 2-100D. The elements of the optical system 2-100D may be substantially similar to that of the optical system 2-100, and only some elements are shown in FIG. 12D.

In FIG. 12D, a eleventh coil element 2-311 and a twelfth coil element 2-321 disposed on the first edge 2-S1 and a thirteenth coil element 2-315 and a fourteenth coil element 2-325 disposed on the third edge 2-S3 are provided. The eleventh coil element 2-311 and the thirteenth coil element 2-315 may be a portion of the 2-W, and the twelfth coil element 2-321 and the fourteenth coil element 2-325 may be a portion of the second coil assembly 2-W2. The eleventh coil element 2-311 and the thirteenth coil element 2-315 of first coil assembly 2-W1 may be disposed on the first movable portion 2-400, and the twelfth coil element 2-321 and the fourteenth coil element 2-325 of the second coil assembly 2-W2 may be disposed on the fixed portion 2-F.

By providing additional eleventh coil element 2-311, twelfth coil element 2-321, thirteenth coil element 2-315, and fourteenth coil element 2-325 at the sides, the maximum power provided by the second coil assembly 2-W2 to the first coil assembly 2-W1 may be increased. Moreover, the space of the sides may be further utilized to achieve miniaturization.

Figure 13A:
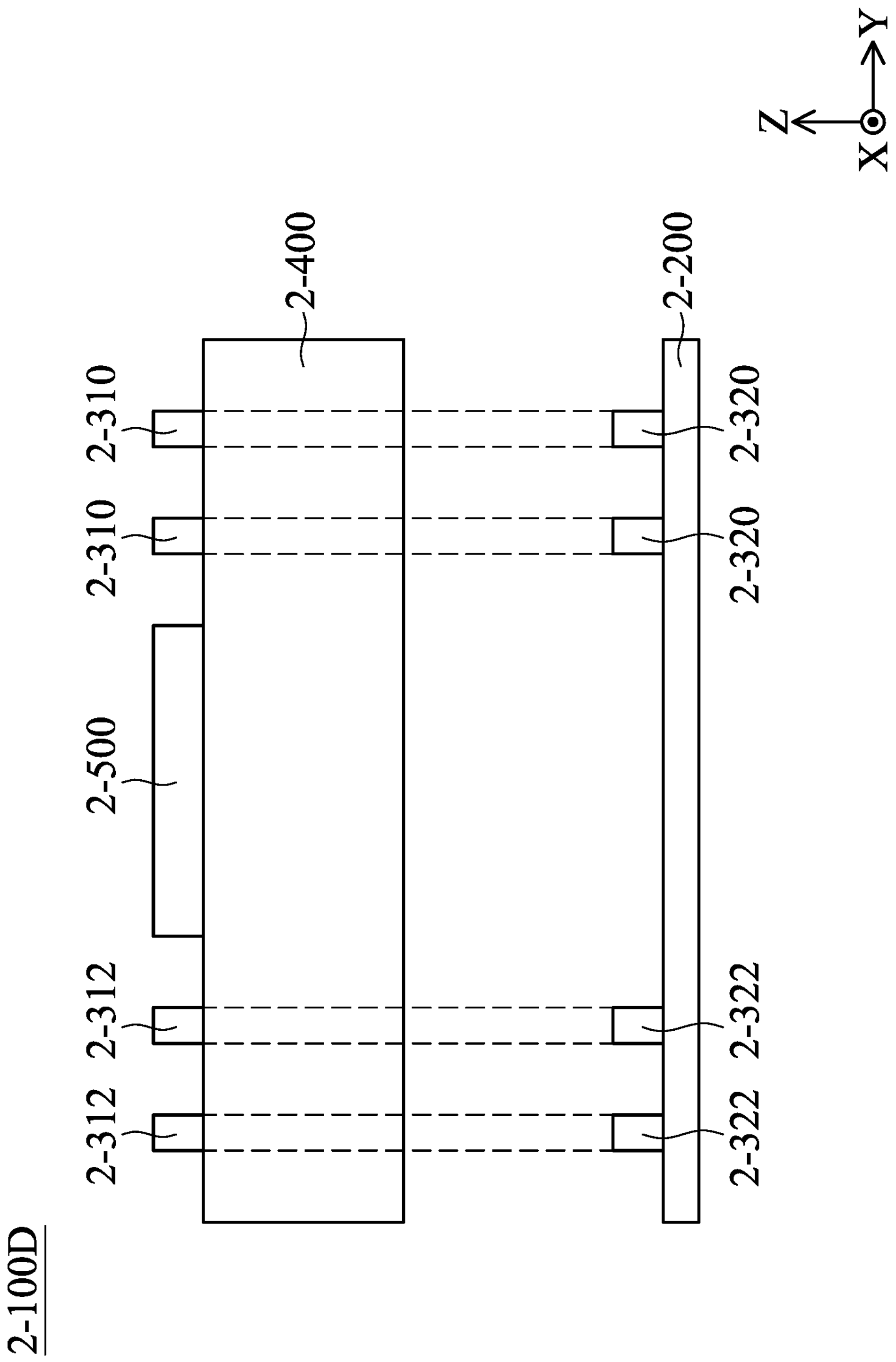
FIG. 13A and FIG. 13B are side views of the optical system when viewed in different directions.
Figure 13B:
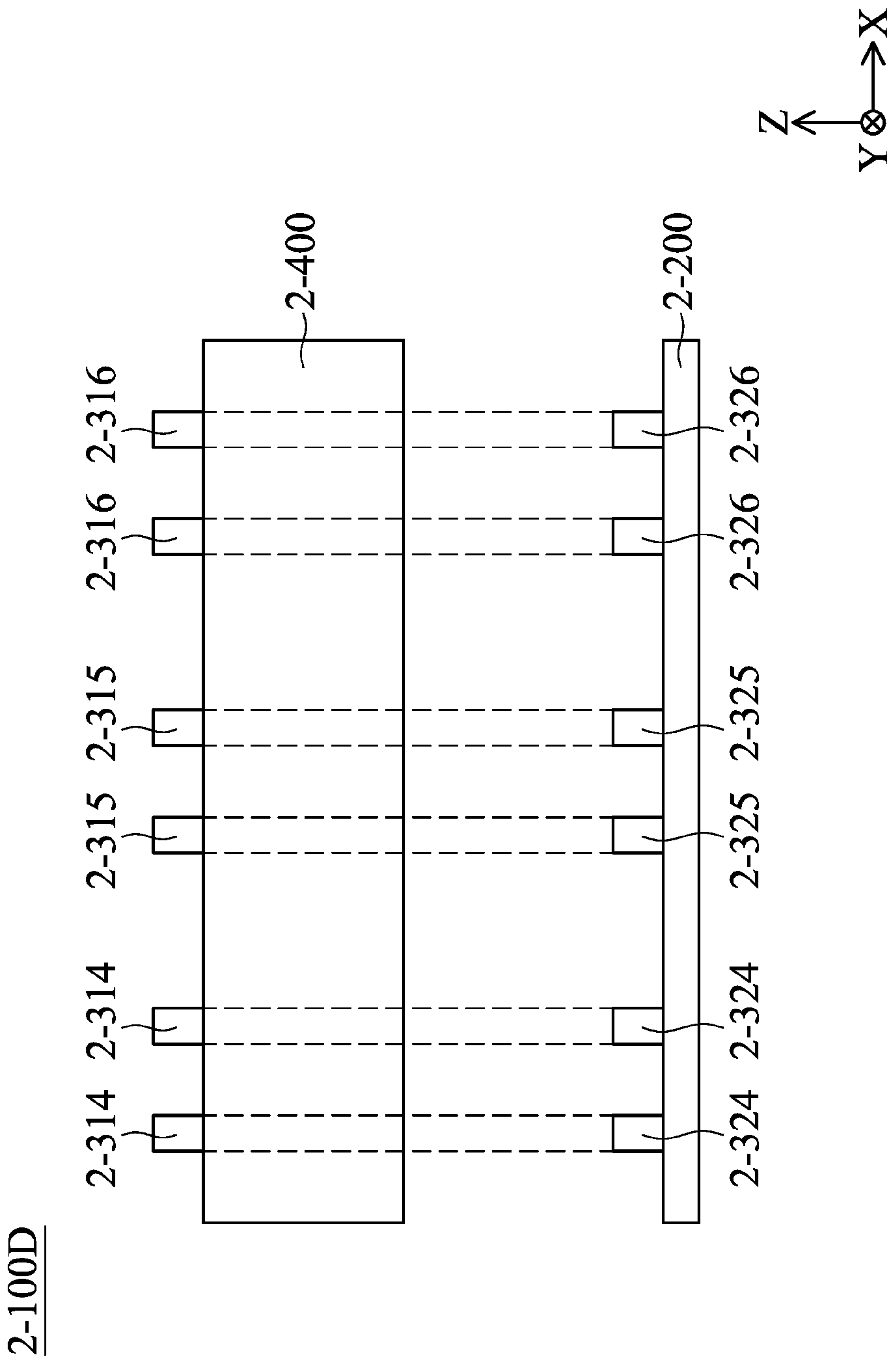

FIG. 13A and FIG. 13B are side views of the optical system 2-100D when viewed in different directions, and only a portion of the elements are shown for clarity. As shown in FIG. 13A and FIG. 13B, in the Z direction, the fifth coil element 2-314 may align with the sixth coil element 2-324, the seventh coil element 2-316 may align with the eighth coil element 2-326, and the thirteenth coil element 2-315 may align with the fourteenth coil element 2-325.

Figure 12E:
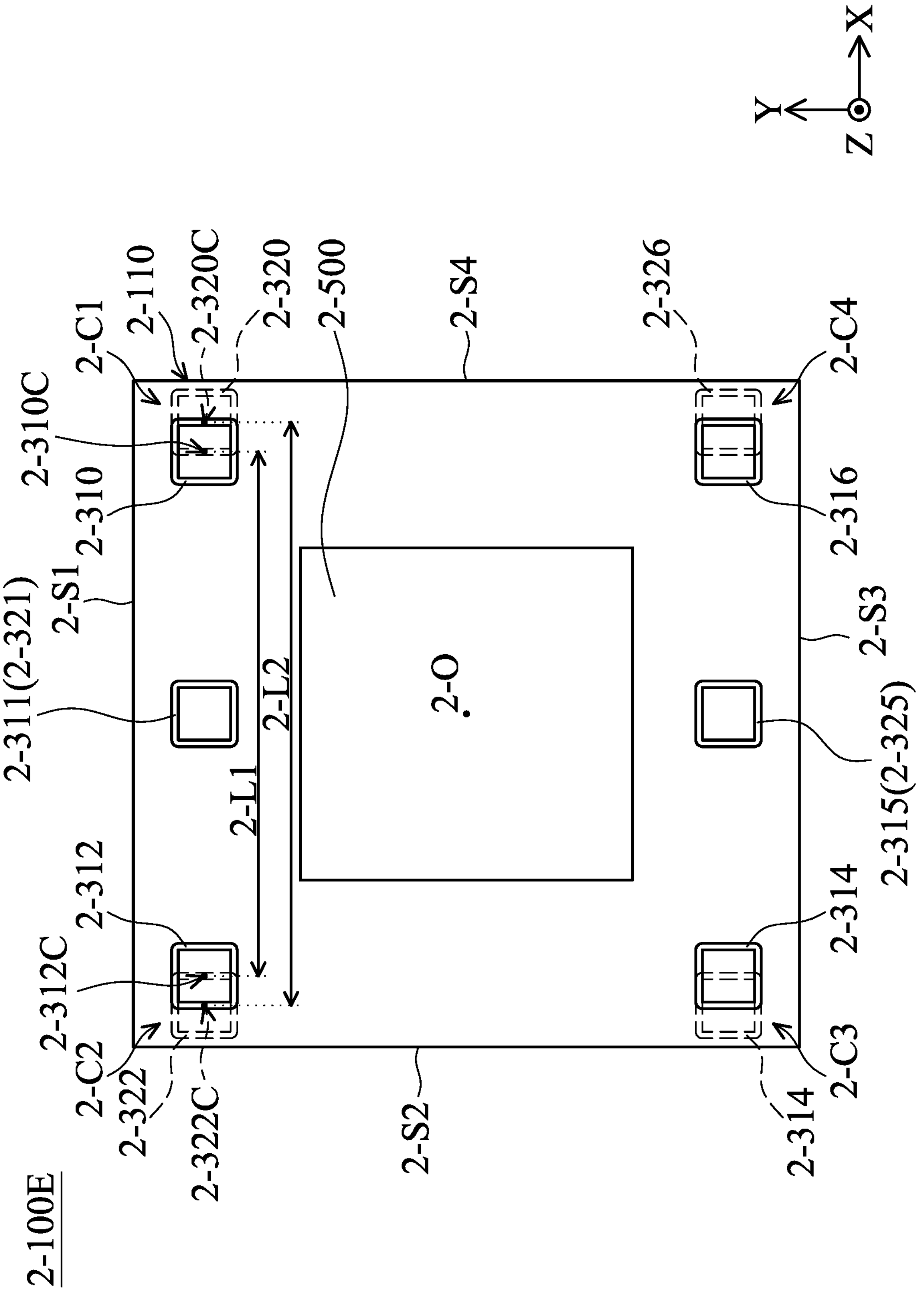
FIG. 12E is a schematic view of some elements of the optical system.

FIG. 12E is a schematic view of some elements of the optical system 2-100E. The elements of the optical system 2-100E may be substantially similar to that of the optical system 2-100, and only some elements are shown in FIG. 12E. In FIG. 12E, the distance between the first coil element 2-310, the eleventh coil element 2-311, and the third coil element 2-312 in the X direction may be different from the distance between the second coil element 2-320, the twelfth coil element 2-321, and the fourth coil element 2-322 in the X direction.

For example, in the X direction, the distance 2-L1 between a center 2-310C of the first coil element 2-310 to a center 2-312C of the third coil element 2-312 may be different from the distance 2-L2 between a center 2-320C of the second coil element 2-320 to a center 2-322C of the fourth coil element 2-322, such as the distance 2-L1 may be less than the distance 2-L2. In some embodiments, the eleventh coil element 2-311 may overlap the twelfth coil element 2-321. The fifth coil element 2-314, the sixth coil element 2-324, the seventh coil element 2-316, the eighth coil element 2-326, the thirteenth coil element 2-315, and the fourteenth coil element 2-325 may have similar position relationship, and it is not repeated.

Moreover, in the Y direction (the second direction), the first coil element 2-310, the eleventh coil element 2-311, the third coil element 2-312, the second coil element 2-320, the twelfth coil element 2-321, the fourth coil element 2-322 may respectively align with the seventh coil element 2-316, the eighth coil element 2-326, the thirteenth coil element 2-315, the fourteenth coil element 2-325, the fifth coil element 2-314, and the sixth coil element 2-324 to make the charging more uniform.

Figure 13C:
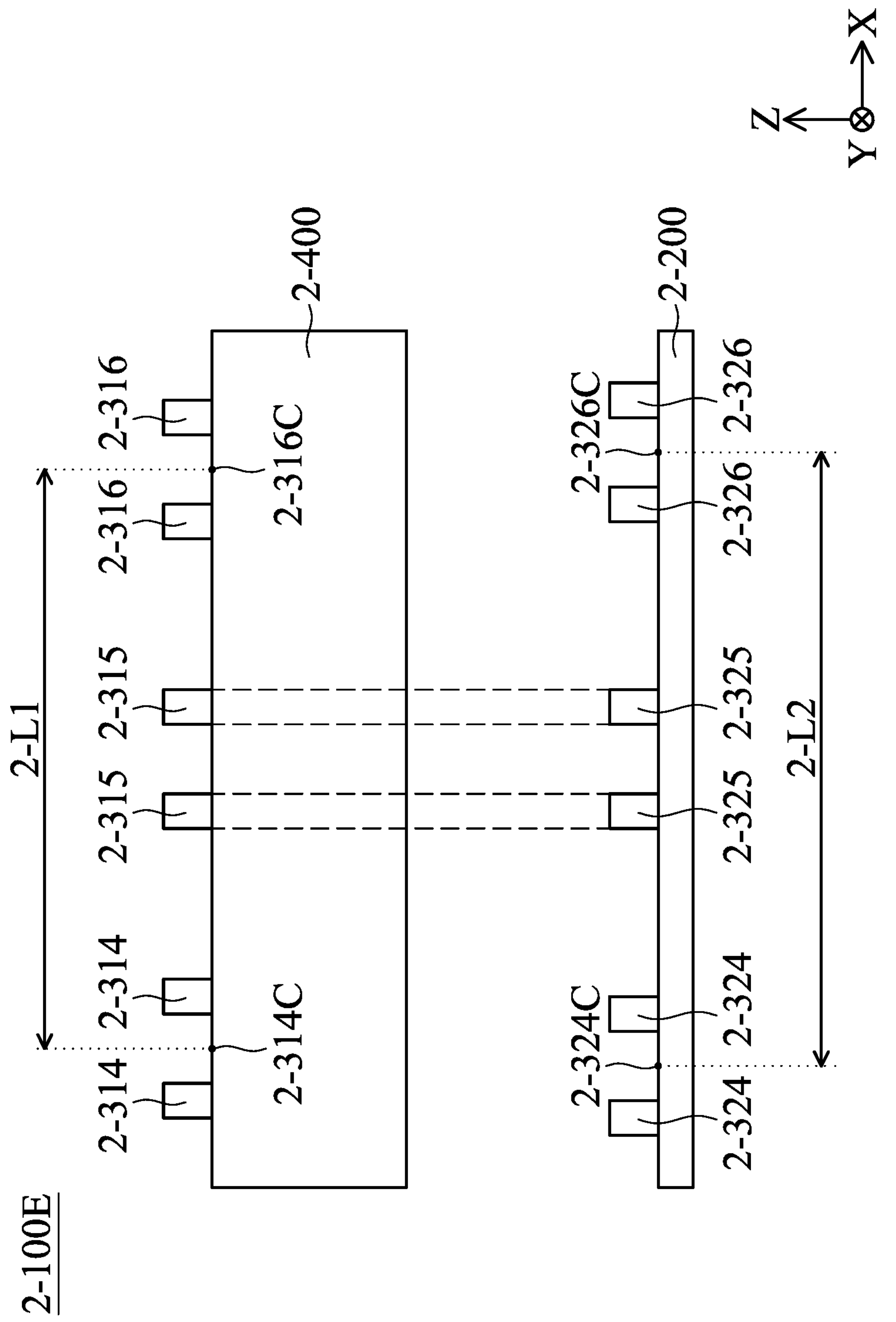
FIG. 13C is a side view of the optical system.

FIG. 13C is a side view of the optical system 2-100E, and some elements are omitted for clarity. As shown in FIG. 13C, in the Z direction, the thirteenth coil element 2-315 may align with the fourteenth coil element 2-325, the fifth coil element 2-314 may not align with the sixth coil element 2-324, and the seventh coil element 2-316 may not align with the eighth coil element 2-326. In the X direction (the first direction), the distance 2-L1 between a center 2-310C of the first coil element 2-310 to a center 2-312C of the third coil element 2-312 may be different from the distance 2-L2 between a center 2-320C of the second coil element 2-320 to a center 2-322C of the fourth coil element 2-322, such as the distance 2-L1 may be less than the distance 2-L2.

Figure 12F:
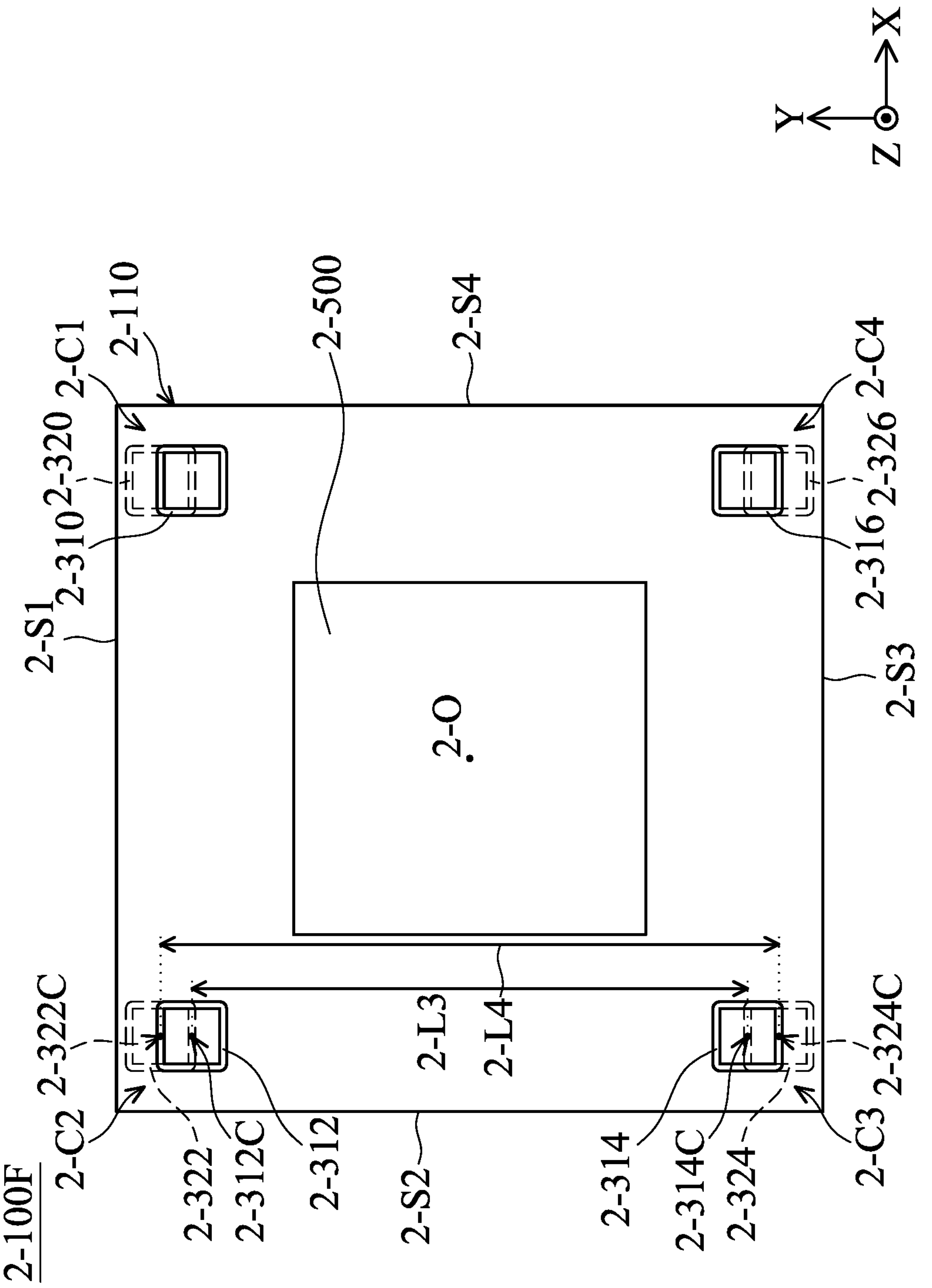
FIG. 12F is a schematic view of some elements of the optical system.

FIG. 12F is a schematic view of some elements of the optical system 2-100F. The elements of the optical system 2-100F may be substantially similar to that of the optical system 2-100, and only some elements are shown in FIG. 12F. In some embodiments, in FIG. 12F, in the Y direction, the distance 2-L3 between a center 2-312C of the third coil element 2-312 to a center 2-314C of the fifth coil element 2-314 may be different from the distance 2-L4 between a center 2-322C of the fourth coil element 2-322 to a center 2-324 of the sixth coil element 2-324, such as the distance 2-L3 may be less than the distance 2-L4. The first coil element 2-310, the second coil element 2-320, the seventh coil element 2-316, and the eighth coil element 2-326 may have similar position relationship, and is not repeated here.

Figure 14A:
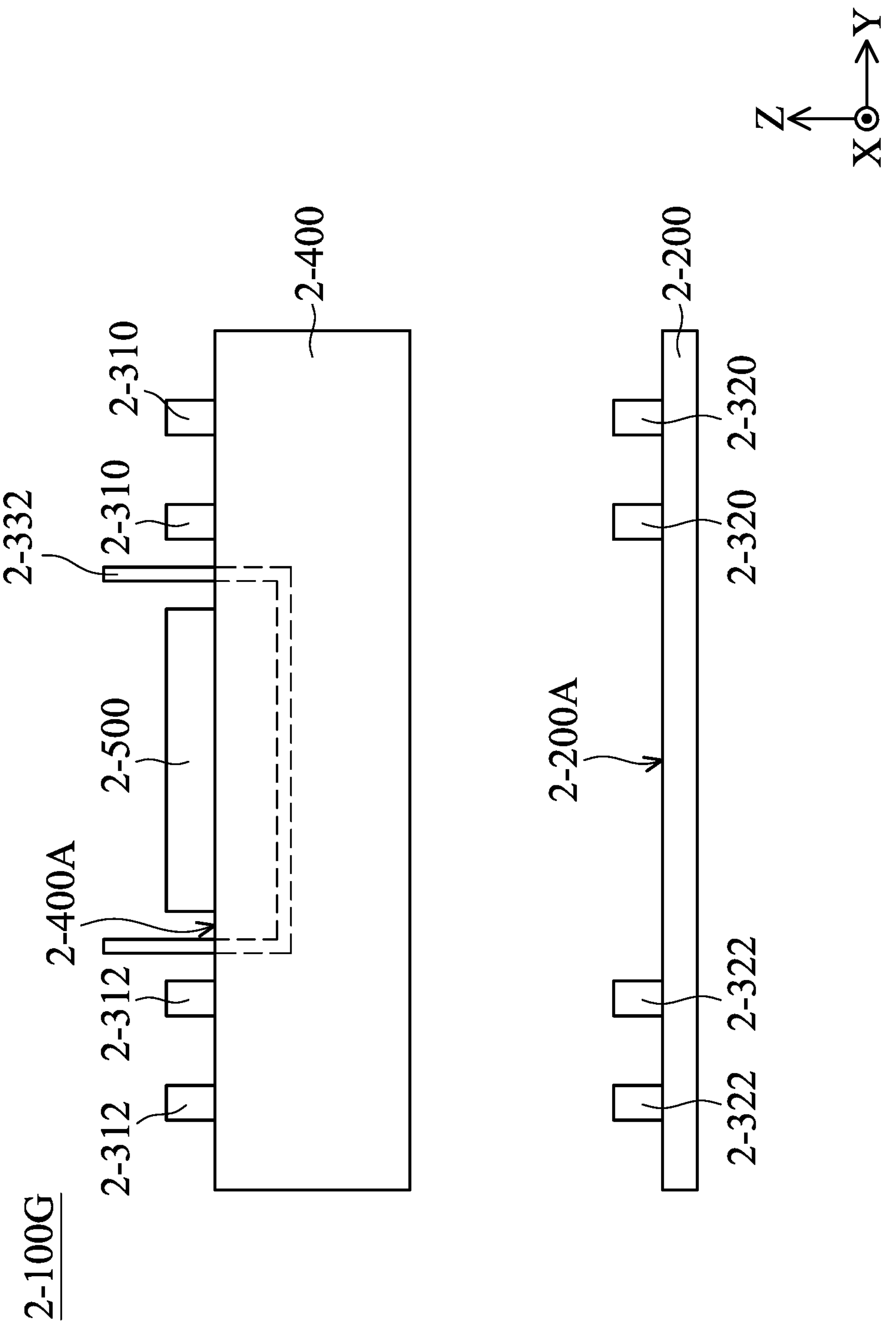
FIG. 14A is a schematic view of some elements of the optical system.

In some embodiments, additional magnetic isolating assembly may provided in the optical system, such as may be provided on the first movable portion 2-400. For example, FIG. 14A is a schematic view of some elements of the optical system 2-100G. The elements of the optical system 2-100G may be substantially similar to that of the optical system 2-100, and only some elements are shown in FIG. 14A. A first magnetic isolating element 2-332 may be provided on the first movable portion 2-400 of the optical system 2-100F. The first coil assembly 2-W1 may be provided on a first side 2-400A of the first movable portion 2-400, and the second coil assembly 2-W2 may be provided on a third side 2-200A of the second coil assembly 2-W2. The first side 2-400A and the third side 2-200A face an identical direction. At least a portion of the first magnetic isolating element 2-332 is disposed between the first optical assembly 2-105 (e.g. the first optical element 2-500) and the first coil assembly 2-W1 or between the first optical assembly 2-105 (e.g. the first optical element 2-500) and the second coil assembly 2-W2. At least a portion of the first magnetic isolating element 2-332 overlaps the first optical assembly 2-105 (e.g. the first optical element 2-500) in the direction that the main axis 2-O extends (the Z direction). Moreover, in the X direction or the Y direction, the first magnetic isolating element 2-332, the first optical element 2-500, and the first coil assembly 2-W1 at least partially overlaps each other.

Moreover, the material of the first magnetic isolating element 2-332 may include magnetic permeable material (e.g. metal). By the position relationship, the electromagnetic signal generated between the first coil assembly 2-W1 and the second coil assembly 2-W2 may be prevented from interfering the first optical element 2-500, so the signal detected by the first optical element 2-500 may be more accurate. Moreover, a portion of the first magnetic isolating element 2-332 may be embedded in the first movable portion 2-400, and another portion of the first magnetic isolating element 2-332 may be exposed from the first movable portion 2-400 to reduce the required space, and miniaturization may be achieved.

Figure 14B:
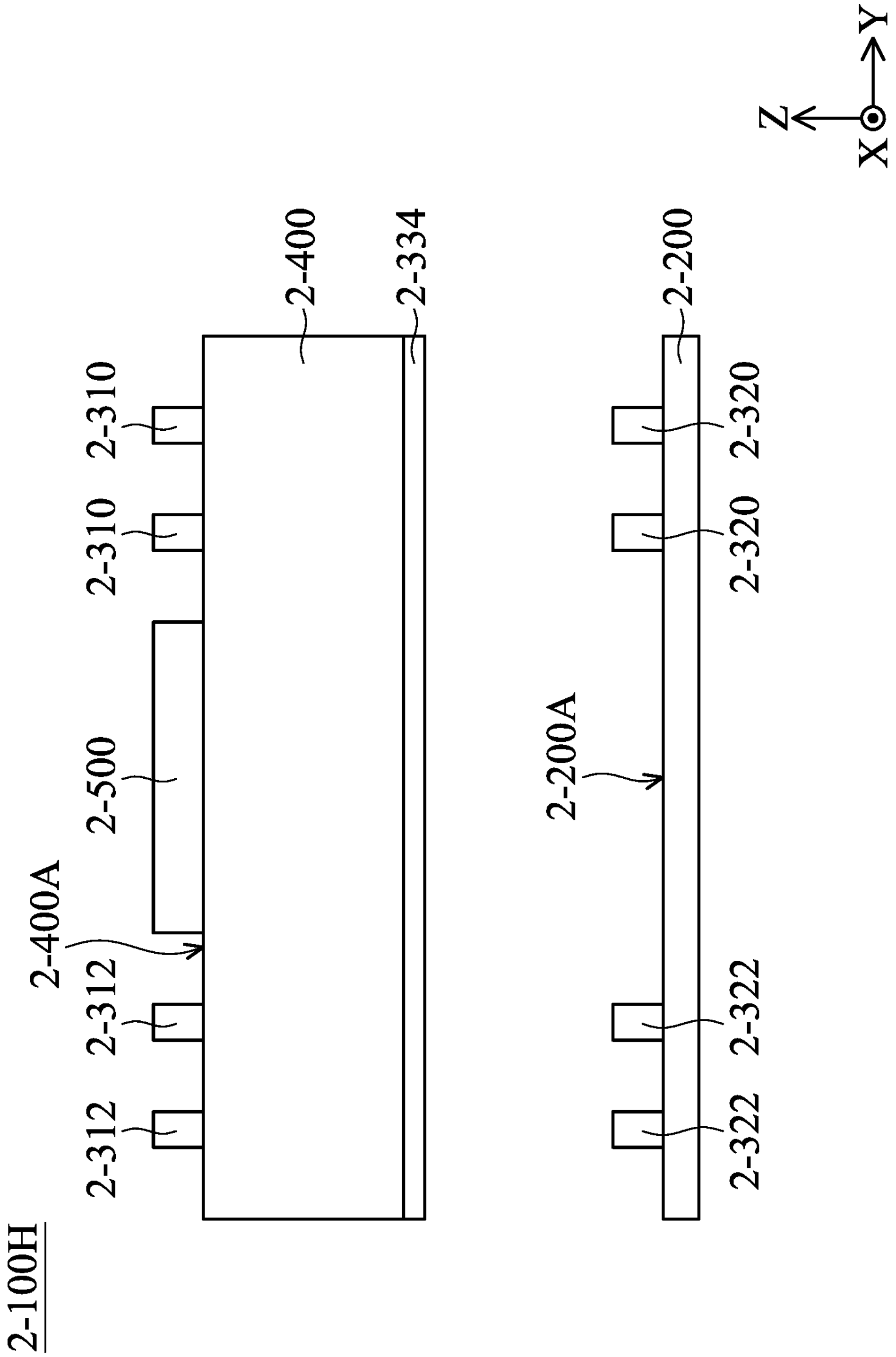
FIG. 14B is a schematic view of some elements of the optical system.

FIG. 14B is a schematic view of some elements of the optical system 2-100H. The elements of the optical system 2-100H may be substantially similar to that of the optical system 2-100, and only some elements are shown in FIG. 14B. A second magnetic isolating element 2-334 may be provided on the first movable portion 2-400 of the optical system 2-100H, such as the second magnetic isolating element 2-334 may be provided on a side that is different from a side that the first coil element 2-310 and the third coil element 2-312 are disposed on. The first coil assembly 2-W1 may be provided on the first side 2-400A of the first movable portion 2-400, the second coil assembly 2-W2 may be provided on the third side 2-200A of the first substrate 2-200, and the first side 2-400A and the third side 2-200A face an identical direction.

The material of the second magnetic isolating element 2-334 may be similar to that of the first magnetic isolating element 2-332. At least a portion of the second magnetic isolating element 2-334 is disposed between the first optical assembly 2-105 (e.g. the first optical element 2-500) and the first coil assembly 2-W1 or the second coil assembly 2-W2. At least a portion of the second magnetic isolating element 2-334 overlaps the first optical assembly 2-105 (e.g. the first optical element 2-500) along the main axis 2-O (in the Z direction). At least a portion of the second magnetic isolating element 2-334 is disposed between the first coil assembly 2-W1 and the second coil assembly 2-W2 in the direction that the main axis 2-O extends. By the position relationship, the electromagnetic signal generated between the first coil assembly 2-W1 and the second coil assembly 2-W2 may be prevented from interfering the first optical element 2-500, so the signal detected by the first optical element 2-500 may be more accurate.

Figure 14C:
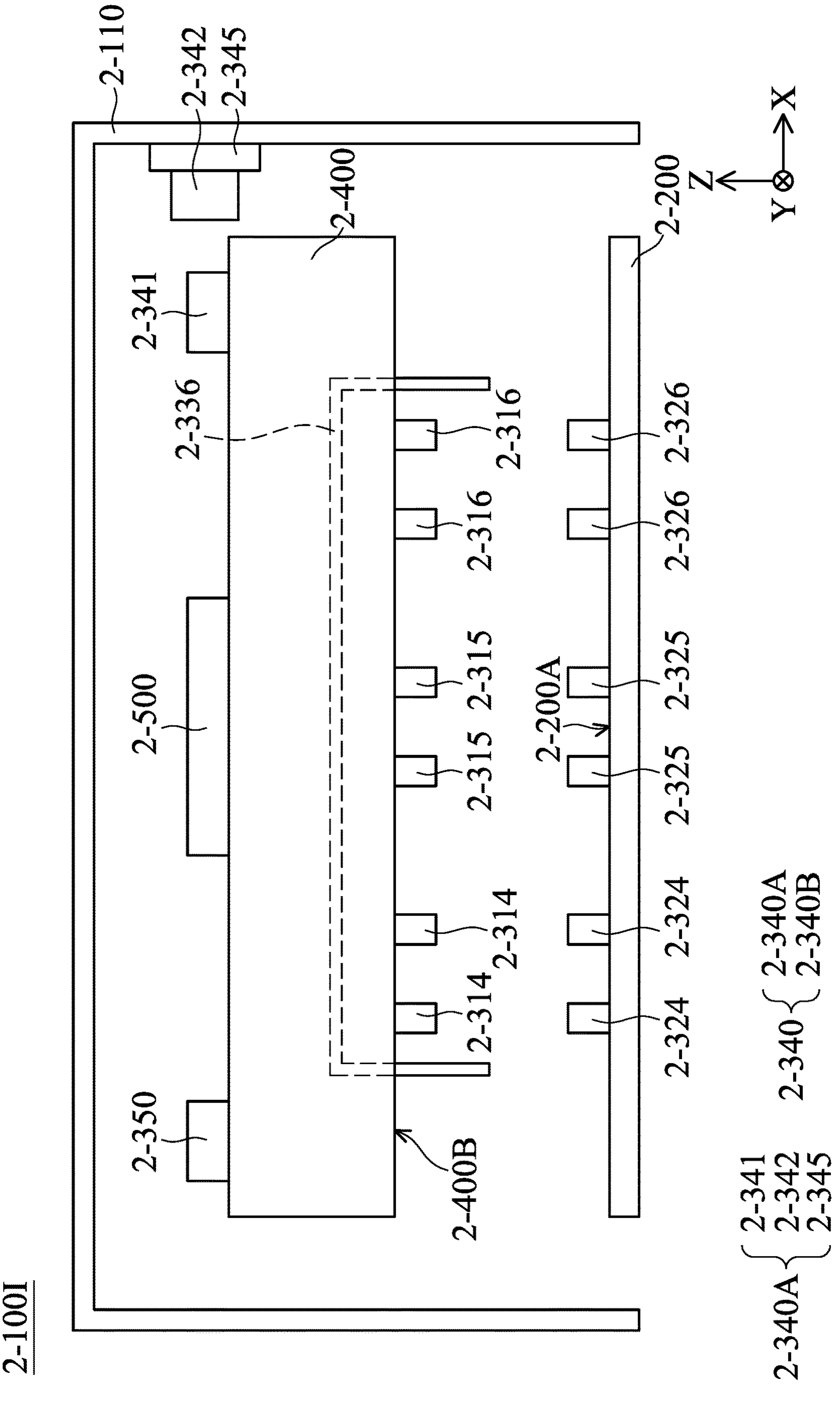
FIG. 14C is a schematic view of some elements of the optical system.

FIG. 14C is a schematic view of some elements of the optical system 2-100I. The elements of the optical system 2-100I may be substantially similar to that of the optical system 2-100, and only some elements are shown in FIG. 14C. A third magnetic isolating element 2-336 may be provided on the first movable portion 2-400 of the optical system 2-100I, such as the third magnetic isolating element 2-336 may be partially embedded in and partially exposed from the first movable portion 2-400. The material of the third magnetic isolating element 2-336 may be similar to that of the first magnetic isolating element 2-332. At least a portion of the third magnetic isolating element 2-336 is disposed between the first optical assembly 2-105 (e.g. the first optical element 2-500) and the first coil assembly 2-W1 or the second coil assembly 2-W2.

Although the first coil assembly 2-W1 are disposed on a side of the first movable portion 2-400 that faces away from the second coil assembly 2-W2, the present disclosure is not limited thereto. For example, in FIG. 14C, the first coil assembly 2-W1 may be disposed on a second side 2-400B of the first movable portion 2-400, and the 4 second coil assembly 2-W2 may be disposed on the third side 2-200A of the first substrate 2-200. The second side 2-400B faces the third side 2-200A. In other words, the second side 2-400B and the third side 2-200A face opposite directions.

Moreover, the first coil assembly 2-W1, the second coil assembly 2-W2 and the first optical element 2-500 are disposed on opposite sides of the third magnetic isolating element 2-336. By the position relationship, the electromagnetic signal generated between the first coil assembly 2-W1 and the second coil assembly 2-W2 may be prevented from interfering the first optical element 2-500, so the signal detected by the first optical element 2-500 may be more accurate.

The first magnetic isolating element 2-332, the second magnetic isolating element 2-334, and the third magnetic isolating element 2-336 may be called as a magnetic isolating assembly. Although the embodiments above only shows one magnetic isolating element in one optical system, the first magnetic isolating element 2-332, the second magnetic isolating element 2-334, and the third magnetic isolating element 2-336 may be provided in one optical system to enhance the magnetic isolation.

Moreover, as shown in FIG. 14C, an additional energy storage element 2-350 may be provided on the first movable portion 2-400 of the optical system 2-100I, and the first communication element 2-341 and the second communication element 2-342 are shown in FIG. 14C. It should be noted that the first communication element 2-341, the second communication element 2-342, and the energy storage element 2-350 are also applicable for the above embodiments, and only shown in FIG. 14C for clarity. The energy storage element 2-350 may be a battery, which is electrically connected to the third communication element 2-343 (the first coil assembly 2-W1) to serve as a backup power surface. When the current provided from the second coil assembly 2-W2 to the first coil assembly 2-W1 is not enough, the energy storage element 2-350 may provided energy to the first coil assembly 2-W1 as compensation.

Furthermore, the first communication assembly 2-340A may further includes a blodking element 2-345, such as a copper foil. The blodking element 2-345 may be affixed on the case 2-110 of the fixed portion 2-F. The blodking element 2-345 and the first communication element 2-341 are disposed on different sides of the second communication element 2-342 to prevent external signal from interfering the second communication element 2-342. Instead, the second communication element 2-342 may only receive the signal provided from the first communication element 2-341 to increase the quality of signal transmission.

Figure 15A:
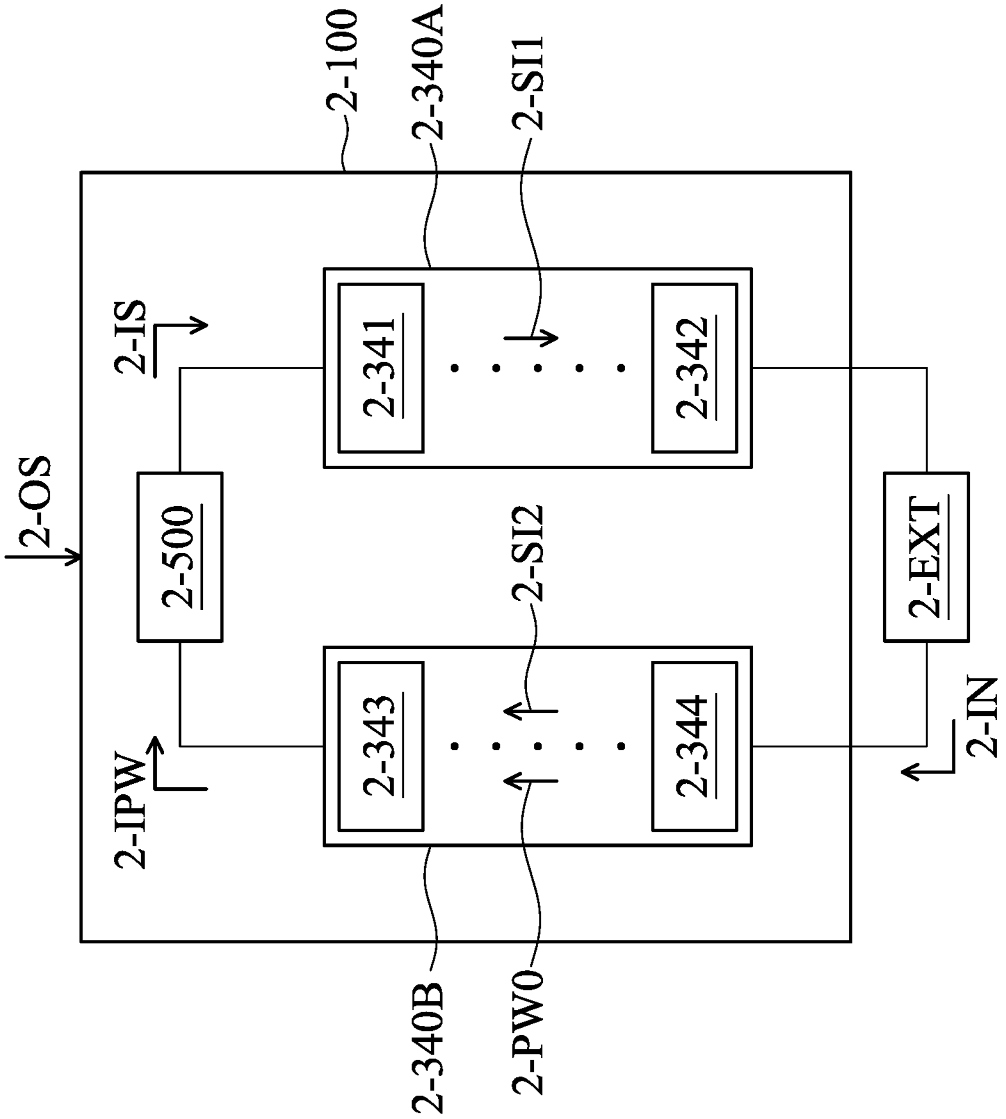
FIG. 15A is a connection between the optical system and the external circuit.

FIG. 15A is a relationship between the optical system 2-100 and the external circuit 2-EXT. The external circuit 2-EXT may be used for providing an input signal 2-IN to the optical system 2-100. The first optical element 2-500 of the first optical assembly 2-105 may receive an optical signal 2-OS from external, and transfers the optical signal 2-OS into image signal 2-IS. The image signal 2-IS is then provided to the external circuit 2-EXT. In particular, the image signal 2-IS may be provided to the first communication assembly 2-340A, and the image signal 2-IS may be transferred to the first signal 2-SI1 at the first communication element 2-341 of the first communication assembly 2-340A. Afterwards, the first signal 2-SI1 may be provided from the first communication element 2-341 of the first communication assembly 2-340A to the second communication element 2-342 by wireless transmission. Therefore, the wire for connecting the elements may be omitted to achieve miniaturization.

Figure 15B:
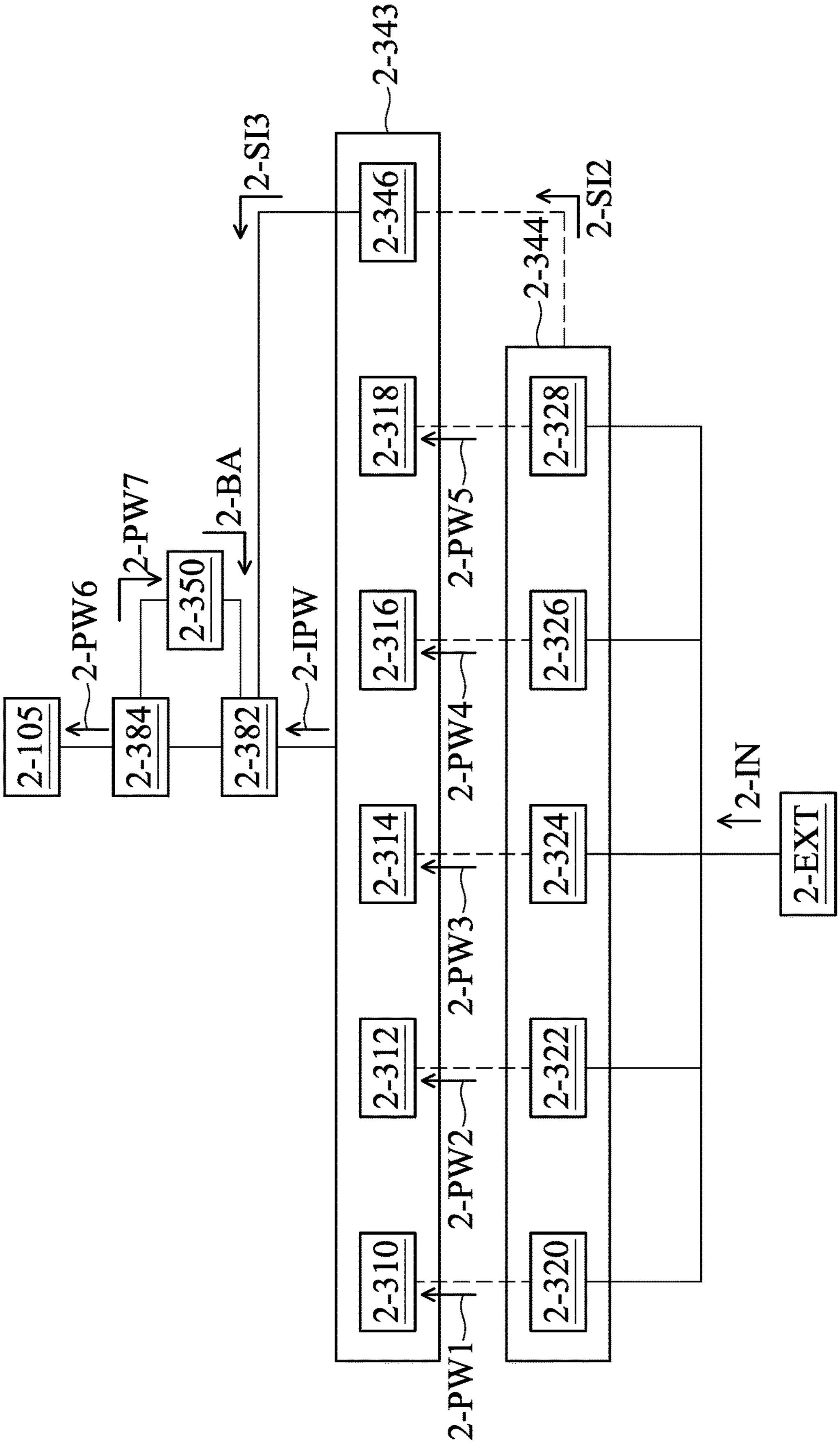
FIG. 15B is a detailed view of some elements in FIG. 15A.

FIG. 15B is a detail view of some elements of FIG. 15A. In particular, when the input signal 2-IN provided by the external circuit 2-EXT is received by the second communication assembly 2-340B of the optical system 2-100, the fourth communication element 2-344 of the second communication assembly 2-340B may transfer the input signal 2-IN to a second signal 2-SI2 and a power signal 2-PW0. Afterwards, the second signal 2-SI2 and the power signal 2-PW0 may be provided from the fourth communication element 2-344 to the third communication element 2-343 by wireless transmission. The second signal 2-SI2 and the power signal 2-PW0 may then be respectively transferred by the third communication element 2-343 to a third signal 2-SI3 and an induced power signal 2-IPW. The third signal 2-SI3 and the induced power signal 2-IPW are then provided to the fixed portion 2-First optical assembly 2-105. Therefore, the wire for connecting the elements may be omitted to achieve miniaturization.

It should be noted that the frequency and the portion of the power signal 2-PW0 and the second signal 2-SI2 are different, so the power signal 2-PW0 and the second signal 2-SI2 may be used for transferring different information. For example, the power of the power signal 2-PW0 may be higher than that of the second signal 2-SI2, so energy may be transferred from the external circuit 2-EXT to the first optical assembly 2-105 through the power signal 2-PW0, and wireless charging may be achieved. Moreover, the signal used for controlling the first optical assembly 2-105 may be transferred by the second signal 2-SI2, so no additional wire is required.

It should be noted that when the power signal 2-PW0 is provided to the second coil element 2-320, the fourth coil element 2-322, the sixth coil element 2-324, the eighth coil element 2-326, and the tenth coil element 2-328 of the fourth coil element 2-322, the power signal 2-PW0 may be divided into a first power signal 2-PW1, a second power signal 2-PW2, a third power signal 2-PW3, a fourth power signal 2-PW4, and a fifth power signal 2-PW5, which are respectively provided to the second coil element 2-320, the fourth coil element 2-322, the sixth coil element 2-324, the eighth coil element 2-326, or the tenth coil element 2-328. Afterwards, the first power signal 2-PW1, the second power signal 2-PW2, the third power signal 2-PW3, the fourth power signal 2-PW4, and the fifth power signal 2-PW5 may be respectively provided to the first coil element 2-310, the third coil element 2-312, the fifth coil element 2-314, the seventh coil element 2-316, and the ninth coil element 2-318 by the second coil element 2-320, the fourth coil element 2-322, the sixth coil element 2-324, the eighth coil element 2-326, and the tenth coil element 2-328, respectively.

It should be noted that when in a normal situation (e.g. the first movable portion 2-400 does not move to much relative to the fixed portion 2-F), the induced power signal 2-IPW generated by the sum of the first power signal 2-PW1, the second power signal 2-PW2, the third power signal 2-PW3, the fourth power signal 2-PW4, and the fifth power signal 2-PW5 will be greater than the energy 2-EN (not shown) of the first optical assembly 2-105 required for operation. In other words, (2-IPW)>(2-EN). Therefore, it can make sure that enough energy is provided to the first optical assembly 2-105.

In this normal situation, excess energy of the induced power signal 2-IPW may be stored in the energy storage element 2-350. For example, the induced power signal 2-IPW may be converted to a sixth power signal 2-PW6 and a seventh power signal 2-PW7 by the first control unit 2-382 and the second control unit 2-384 of the optical system 2-100. The sixth power signal 2-PW6 may be provided to the first optical assembly 2-105, and the seventh power signal 2-PW7 may be provided to the energy storage element 2-350 by the first control unit 2-382 and the second control unit 2-384.

However, if the first movable portion 2-400 moves too much relative to the fixed portion 2-F (i.e. in an abnormal situation), the coil elements in the third communication element 2-343 may not align with the coil elements of the fourth communication element 2-344, so the sum of the first power signal 2-PW1, the second power signal 2-PW2, the third power signal 2-PW3, the fourth power signal 2-PW4, and the fifth power signal 2-PW5 may be less than the energy 2-EN required by the first optical assembly 2-105. In such situation, a backup signal 2-BA may be provided by the energy storage element 2-350 to the first control unit 2-382. The backup signal 2-BA may be a backup current for compensation. In such situation, the sum of the induced power signal 2-IPW and the backup signal 2-BA may be greater than the energy 2-EN that is required by the first optical assembly 2-105. i.e. (2-IPW)+(2-BA)>(2-EN). Therefore, it may be ensured that the first optical assembly 2-105 operates without problem.

Moreover, the third communication element 2-343 may include an activating coil element 2-346, and the second signal 2-SI2 may be provided by the fourth communication element 2-344 to the activating coil element 2-346 by wireless transmission. The second signal 2-SI2 is then transferred to a third signal 2-SI3 by the activating coil element 2-346 and provided to the first control unit 2-382. The activating coil element 2-346 may be used for turning up the first optical assembly 2-105 through the first control unit 2-382 when the first optical assembly 2-105 is closed.

Figure 15C:
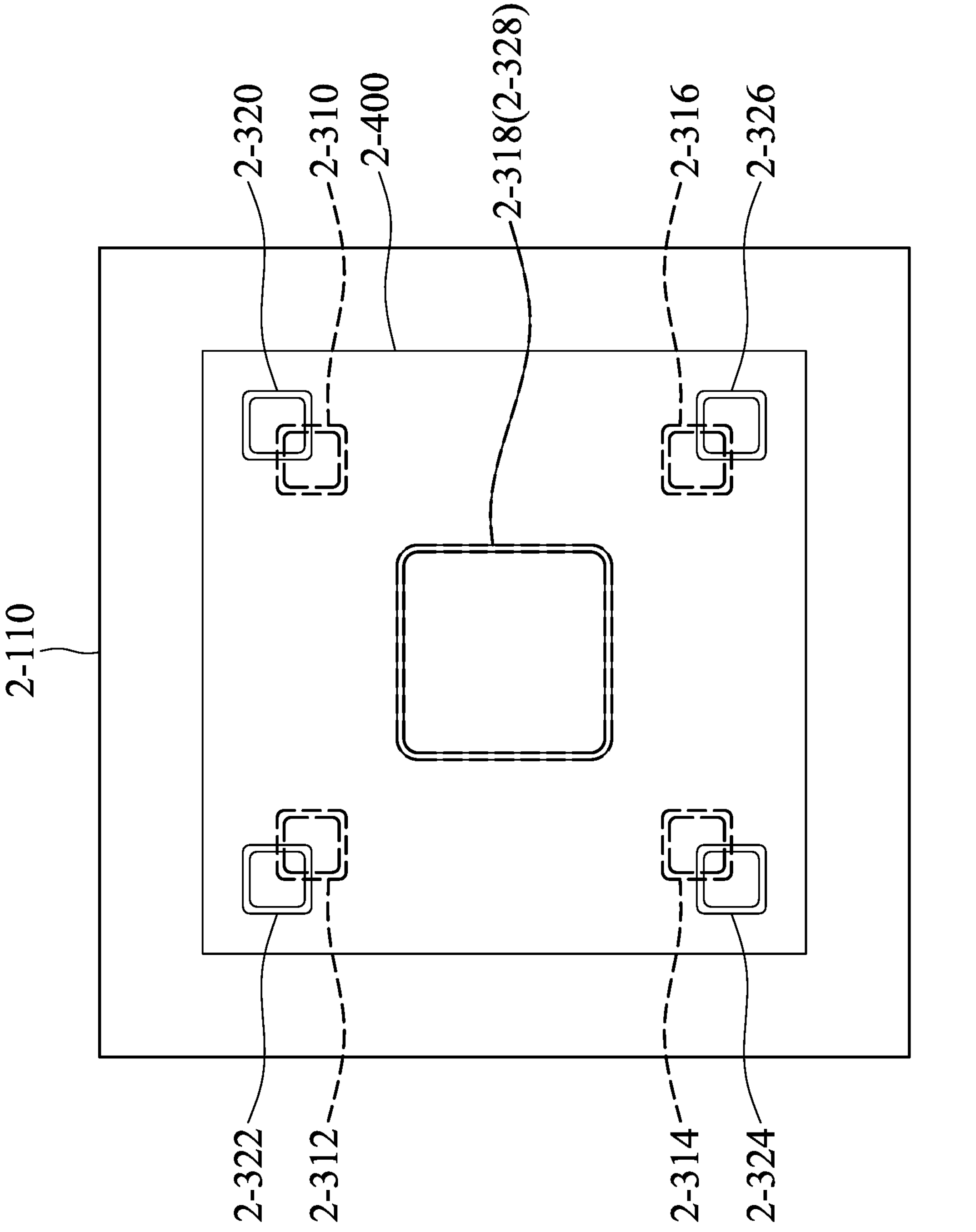
FIG. 15C to FIG. 15E shows position relationship between the first movable portion and the case of the fixed portion of the optical system.
Figure 15D:
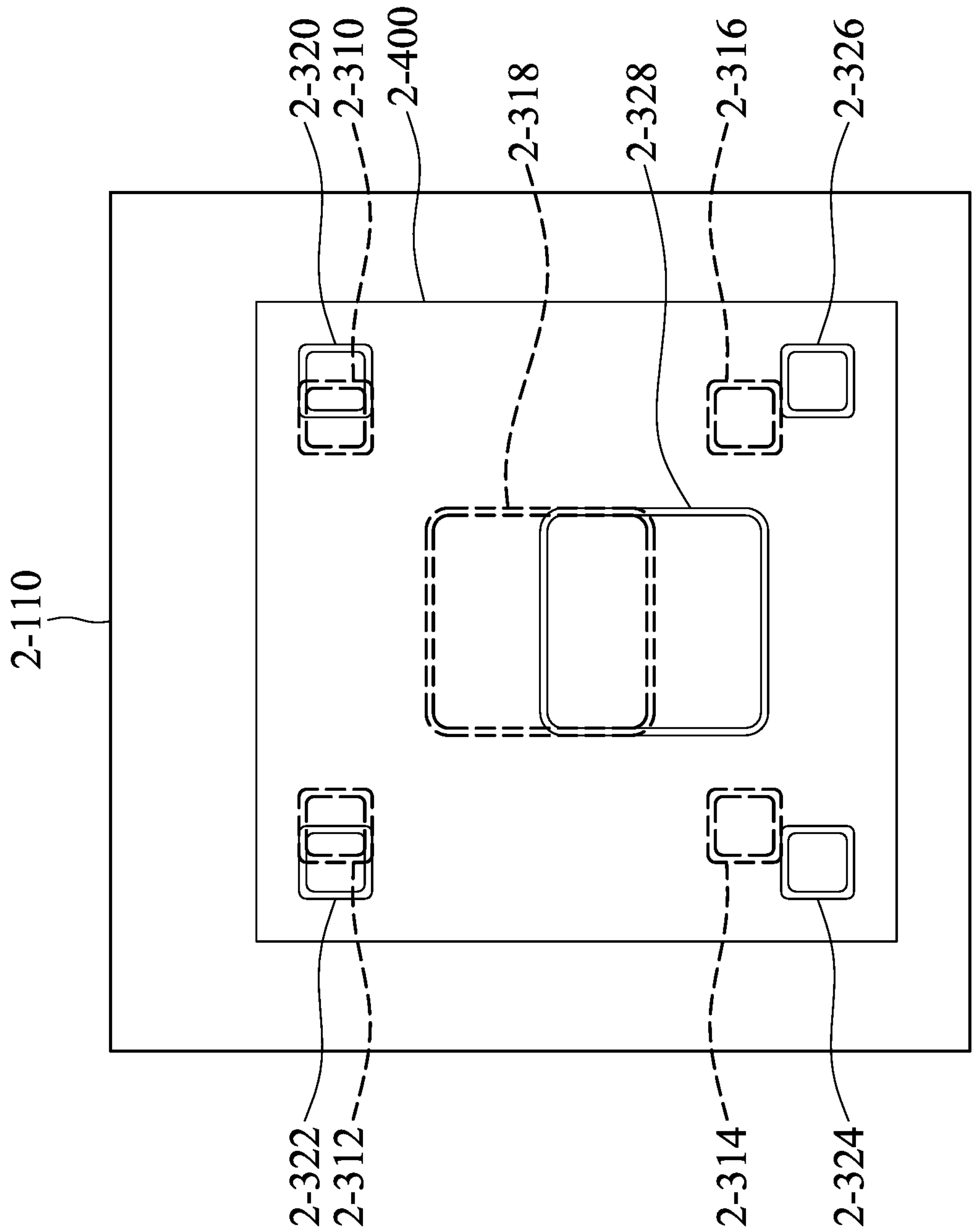
Figure 15E:
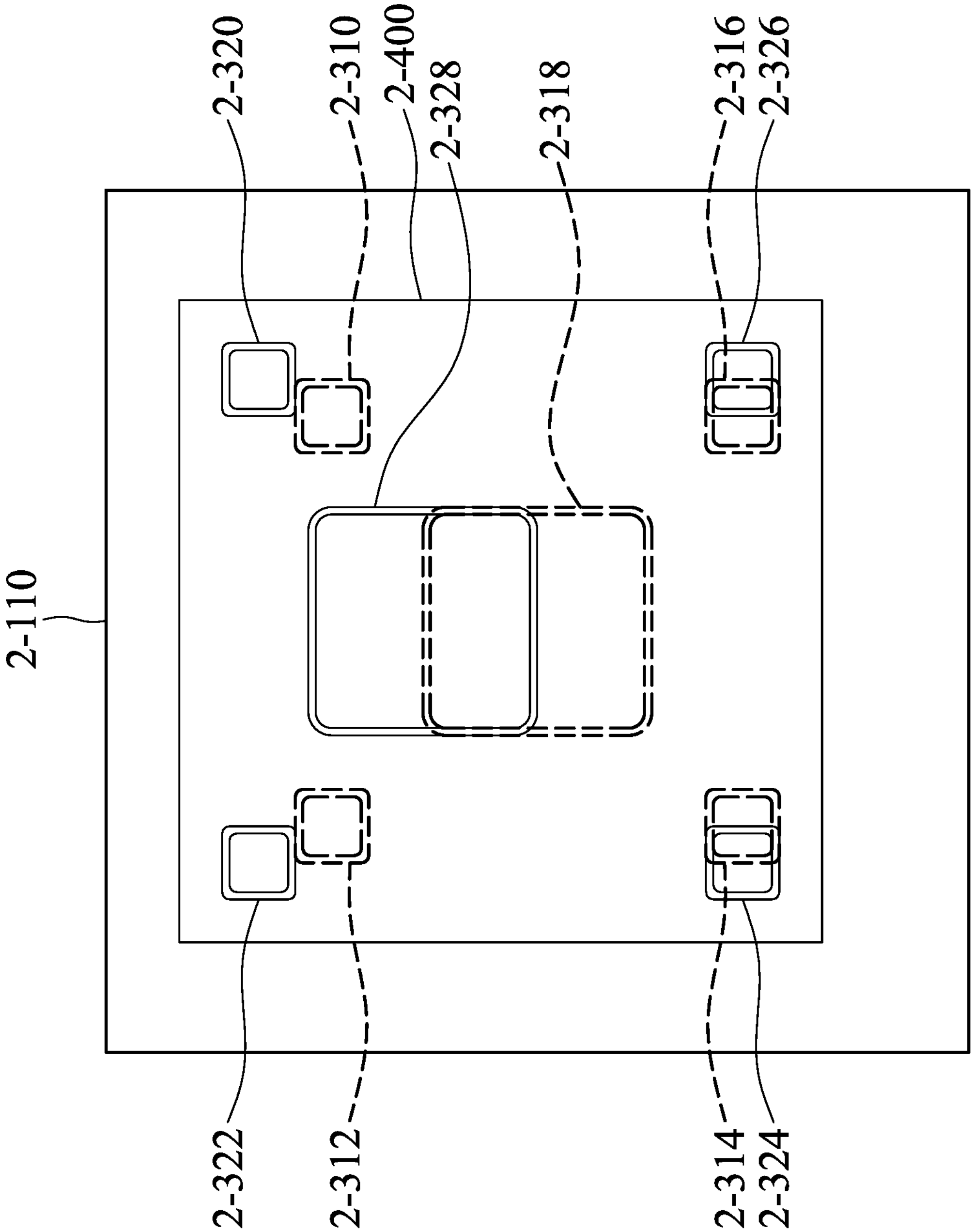

FIG. 15C to FIG. 15E are schematic views showing the positions of the first movable portion 2-400 and the case 2-110 of the fixed portion 2-F. In FIG. 15C, in the Z direction, the first coil element 2-310, the third coil element 2-312, the fifth coil element 2-314, the seventh coil element 2-316 are not align with the second coil element 2-320, the fourth coil element 2-322, the sixth coil element 2-324, and the eighth coil element 2-326. The ninth coil element 2-318 is align with the tenth coil element 2-328. The first movable portion 2-400 is at a predetermined position relative to the fixed portion 2-F. If the overlapped area of the coils is greater, the power of the power signal will be higher. In other words, the fifth power signal 2-PW5 is higher than the first power signal 2-PW1 and the third power signal 2-PW3 in this situation.

In FIG. 15D, the first movable portion 2-400 moves relative to the optical system 2-100 in the −Y direction, so the first movable portion 2-400 is at a first limit position. When compared with the situation in FIG. 15C, the overlapped area between the first coil element 2-310 and the third coil element 2-312 and between the second coil element 2-320 and the fourth coil element 2-322 are increased, and the overlapped area between the fifth coil element 2-314, the seventh coil element 2-316, and the ninth coil element 2-318 to the sixth coil element 2-324, the eighth coil element 2-326, and the tenth coil element 2-328 may be reduced. Therefore, the first power signal 2-PW1 may be higher than the third power signal 2-PW3 and the fifth power signal 2-PW5. Moreover, the overlapped area between the fifth coil element 2-314 and the sixth coil element 2-324 is less than that between the ninth coil element 2-318 and the tenth coil element 2-328, so the third power signal 2-PW3 is less than the fifth power signal 2-PW5.

On the contrary, as shown in FIG. 15E, the first movable portion 2-400 moves relative to the optical system 2-100 in the Y direction, so the first movable portion 2-400 is at a second limit position. The first limit position and the second limit position are different, and the predetermined position is between the first limit position and the second limit position. When compared with the situation in FIG. 15C, the overlapped area between the fifth coil element 2-314 and the seventh coil element 2-316 and between the sixth coil element 2-324 and the eighth coil element 2-326 are increased, and the overlapped area between the first coil element 2-310, the third coil element 2-312, and the ninth coil element 2-318 to the second coil element 2-320, the fourth coil element 2-322, and the tenth coil element 2-328 may be reduced. Therefore, the third power signal 2-PW3 may be higher than the first power signal 2-PW1 and the fifth power signal 2-PW5. Moreover, the overlapped area between the first coil element 2-310 and the second coil element 2-320 is less than that between the ninth coil element 2-318 and the tenth coil element 2-328, so the first power signal 2-PW1 is less than the fifth power signal 2-PW5.

Furthermore, the energy may be provided by the fourth communication element 2-344 to the third communication element 2-343 by alternating current, and direct current may be provided to other coil elements of the fourth communication element 2-344 to allow the coil elements of the fourth communication element 2-344 being as electromagnets at a same time. The coil elements that receive direct current may interact with other magnetic elements on the first movable portion 2-400 to generate an electromagnetic driving force to drive the first movable portion 2-400 to move relative to the fixed portion 2-F. Therefore, the size of the first driving assembly 2-800 may be reduced, or the first driving assembly 2-800 may be omitted to achieve miniaturization.

For example, when the first movable portion 2-400 is at the predetermined position relative to the 2-F, as shown in FIG. 15C, direct current is passed to the second coil element 2-320, the fourth coil element 2-322, the sixth coil element 2-324, the eighth coil element 2-326, and alternating current is passed to the tenth coil element 2-328 to allow the current is mainly transferred by the ninth coil element 2-318 and the tenth coil element 2-328 that has the greatest overlapped area, and other coil elements that have smaller overlapped area may be used for driving the first movable portion 2-400.

Similarly, as shown in FIG. 15D, when the first movable portion 2-400 is at the first limit position relative to the 2-F, alternating current is provided to the second coil element 2-320 and the fourth coil element 2-322, and direct current is provided to the sixth coil element 2-324, the eighth coil element 2-326, and the tenth coil element 2-328 to allow the current is mainly transferred by the first coil element 2-310, the second coil element 2-320, the third coil element 2-312, and the fourth coil element 2-322 that have a greater overlapped area, and other coil elements that have smaller overlapped area may be used for driving the first movable portion 2-400.

Similarly, as shown in FIG. 15E, when the first movable portion 2-400 is at the second limit position relative to the 2-F, alternating current is provided to the sixth coil element 2-324 and the eighth coil element 2-326, and direct current is provided to the second coil element 2-320, the fourth coil element 2-322, and the tenth coil element 2-328 to allow the current is mainly transferred by the fifth coil element 2-314, the sixth coil element 2-324, the seventh coil element 2-316, and the eighth coil element 2-326 that have a greater overlapped area, and other coil elements that have smaller overlapped area may be used for driving the first movable portion 2-400.

Figure 16:
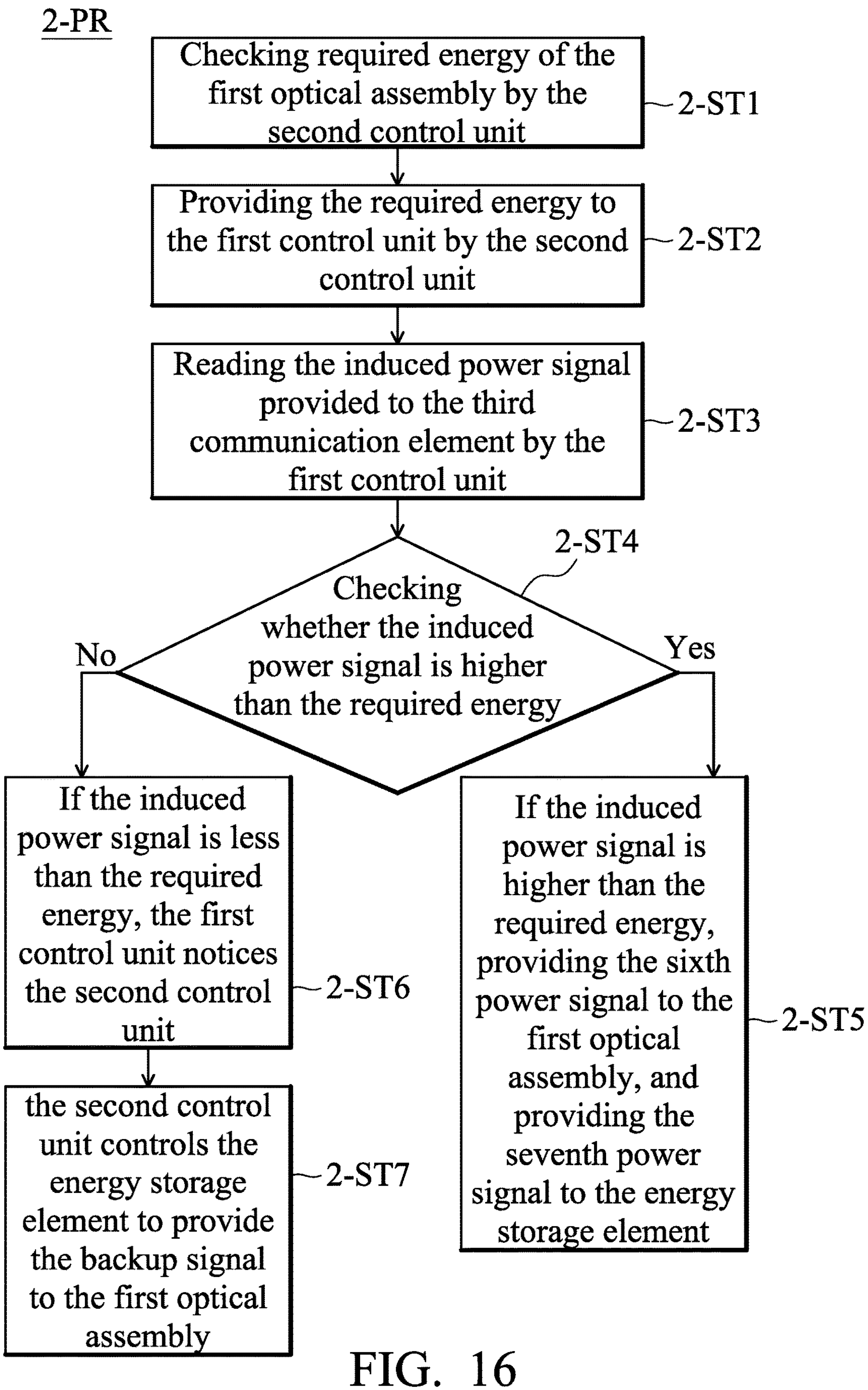
FIG. 16 is a process flow of a processing procedure of the optical system.

FIG. 16 is a process flow of a processing procedure 2-PR of the operation of the optical system 2-100. The processing procedure 2-PR starts from a step 2-ST1, wherein the required energy of first optical assembly 2-105 is determined by the second control unit 2-384. Afterwards, the processing procedure 2-PR goes to a step 2-ST2, wherein the required energy of the first optical assembly 2-105 is told by the second control unit 2-384 to the first control unit 2-382. Then processing procedure 2-PR goes to a step 2-ST3, wherein the induced power signal 2-IPW provided by the third communication element 2-343 is read by the first control unit 2-382.

Afterwards, the processing procedure 2-PR goes to a step 2-ST4, wherein the induced power signal 2-IPW or the required energy of the first optical assembly 2-105 is determined by the first control unit 2-382. If the induced power signal 2-IPW is higher than the required energy of the first optical assembly 2-105, the processing procedure 2-PR goes to the step 2-ST5. The sixth power signal 2-PW6 is provided to the first optical assembly 2-105, and the seventh power signal 2-PW7 is provided to the energy storage element 2-350. If the induced power signal 2-IPW is less than the required energy of the first optical assembly 2-105, the processing procedure 2-PR goes to the step 2-ST6. This information is told to the second control unit 2-384 by the first control unit 2-382. Afterwards, the processing procedure 2-PR goes to 2-ST7, wherein the energy storage element 2-350 is controlled by the second control unit 2-384 to provide the backup signal 2-BA to the first optical assembly 2-105.

Figure 17:
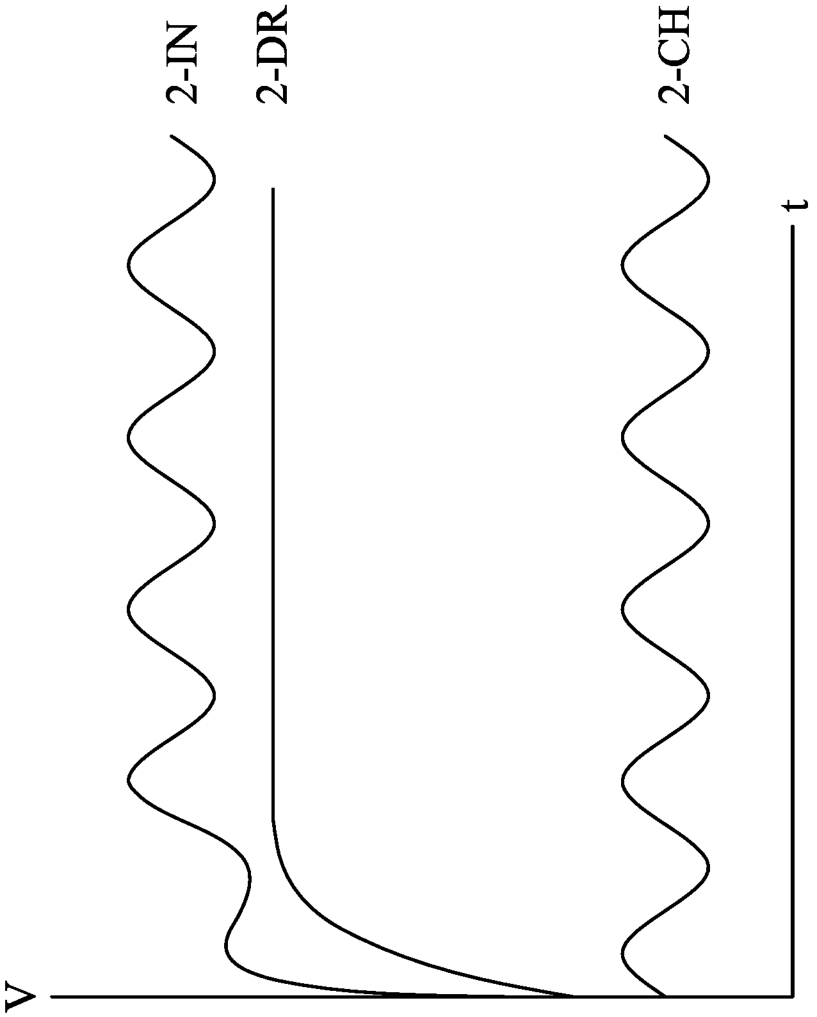
FIG. 17 is a schematic view of the input signal.

Although only one of the alternating current or the direct current is provided to a signal coil, the present disclosure is not limited thereto. For example, FIG. 17 is a schematic view of the input signal 2-IN. In some embodiments, input signal 2-IN may be a sum of a driving signal driving signal 2-DR and a charging signal 2-CH. The driving signal 2-DR may be a direct current after a certain time. The charging signal 2-CH may be an alternating current. Therefore, the input signal 2-IN may include direct current and alternating current at a same time. The signal provided by the fourth communication element 2-344 to the third communication element 2-343 may also include direct current and alternating current as well.

In summary, a method for controlling an optical system is provided. The method includes providing an input signal to an optical system from an external circuit, using an optical assembly to receive an optical signal, and transferring the optical signal to an image signal to the external circuit. The optical system includes a first movable portion, a fixed portion, a first driving assembly, and a communication module. The first movable portion is movable relative to the fixed portion. The first driving assembly is used for driving the first movable portion to move relative to the fixed portion. The communication module is used for electrically connected to an external circuit. The design of present disclosure may allow the optical element to move in different directions to enhance the performance of the optical module, and may achieve miniaturization.

The Third Group of Embodiments

Figure 18:
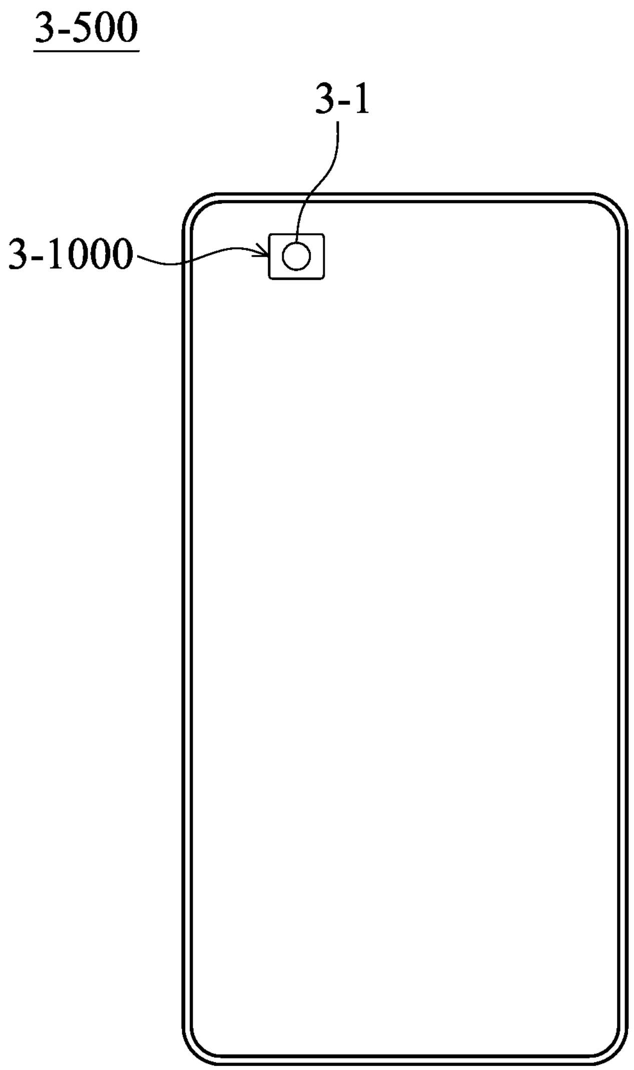
FIG. 18 is a schematic view of the electronic device and the optical system.

FIG. 18 is a schematic view of an electronic device 3-500 and an optical system 3-1000. The electronic device 3-500 may be a tablet computer, a smart phone, etc. The optical system 3-1000 is typically placed in the top region of the electronic device 3-500.

Figure 19:
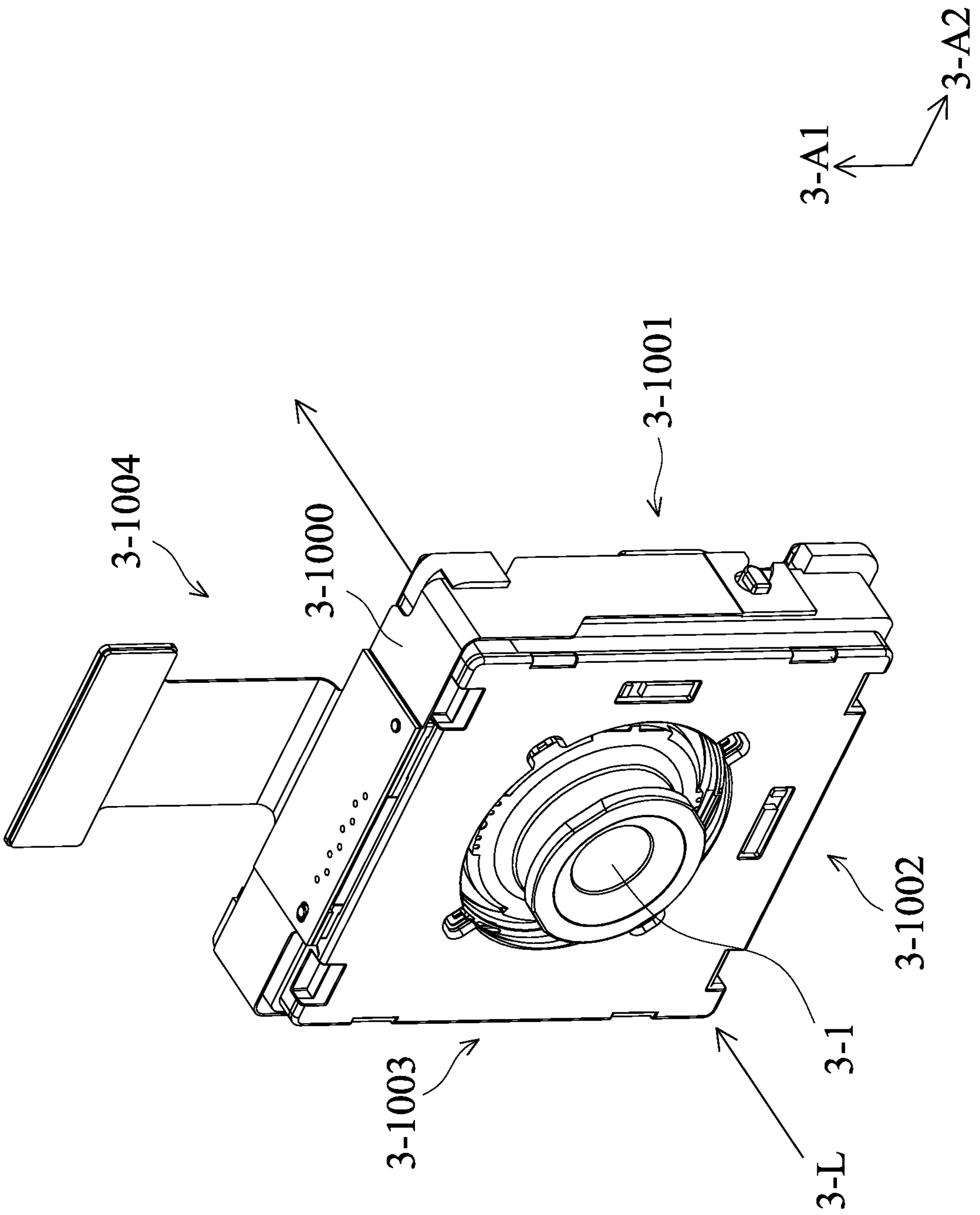
FIG. 19 is a schematic view of the optical system and the first optical element.

FIG. 19 is a schematic view of the optical system 3-1000 and a first optical element 3-1. The optical system 3-1000 may hold the first optical element 3-1 and drive the first optical element 3-1 to move, so as to adjust the position of the first optical element 3-1 to capture a clear image. In the technical field, the optical system 3-1000 may be referred to as a Voice Coil Motor (VCM). In FIG. 19, an arrow is illustrated to show the travel direction of a light 3-L that enters the optical system 3-1000.

The first optical element 3-1 may be a lens. The first optical element 3-1 is only illustrated in FIG. 19. The first optical element 3-1 may be made of plastic or glass. The first optical element 3-1 may be circular. In some embodiments, to reduce production costs, to reduce the weight of the first optical element 3-1, to be placed in the optical system 3-1000, or other reasons, the first optical element 3-1 may include two straight cutting portions formed on the opposite sides. The straight cutting portions may be formed by cutting process or the like.

Figure 20:
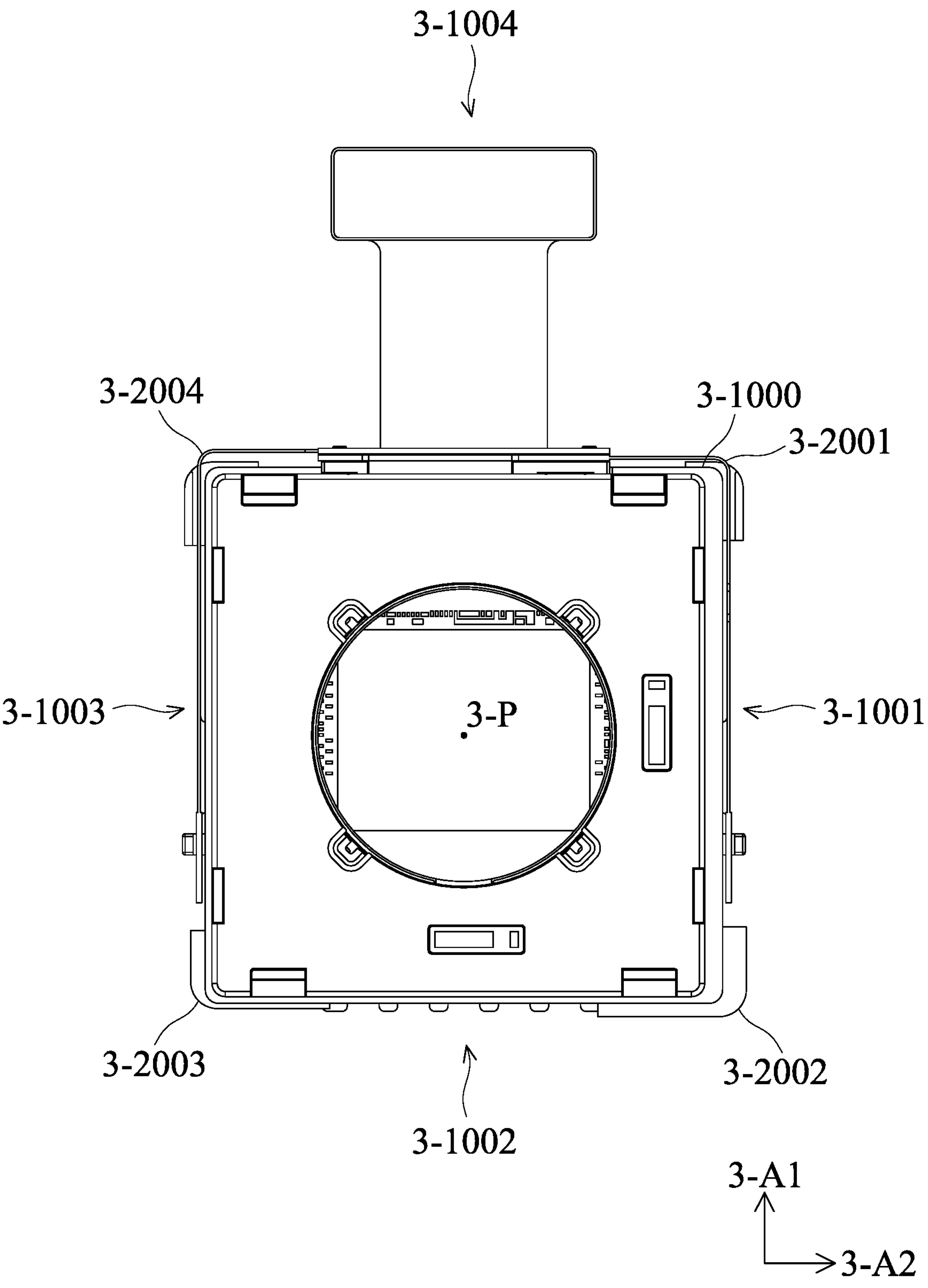
FIG. 20 is a top view of the optical system.

FIG. 20 is a top view of the optical system 3-1000. The optical system 3-1000 has a primary axis 3-P. The primary axis 3-P is an imaginary axis that passes through the entire optical system 3-1000 and is perpendicular to the optical system 3-1000. The primary axis 3-P is illustrated and described in the drawings and the following to explain the related features of the optical system 3-1000. When viewed from the primary axis 3-P, the optical system 3-1000 is polygonal, such as quadrilateral. For the convenience of explanation, the four sides of the optical system 3-1000 are defined as a first side 3-100I, a second side 3-1002, a third side 3-1003, and a fourth side 3-1004. The first side 3-100I is opposite to the third side 3-1003, and the second side 3-1002 is opposite to the fourth side 3-1004. That, the second side 3-1002 and the fourth side 3-1004 are located between the first side 3-100I and the third side 3-1003. The first side 3-100I and the third side 3-1003 extend along a first direction 3-A1, and the second side 3-1002 and the fourth side 3-1004 extend along a second direction 3-A2. The second direction 3-A2 is not parallel with but perpendicular to the first direction 3-A1.

Also, the four corners of the optical system 3-1000 are defined as a first corner 3-2001, a second corner 3-2002, a third corner 3-2003, and a fourth corner 3-2004, respectively. The first corner 3-2001 is located between the first side 3-100I and the fourth side 3-1004. The second corner 3-2002 is located between the first side 3-100I and the second side 3-1002. The third corner 3-2003 is located between the second side 3-1002 and the third side 3-1003. The fourth corner 3-2004 is located between the third side 3-1003 and the fourth side 3-1004.

Figure 21:
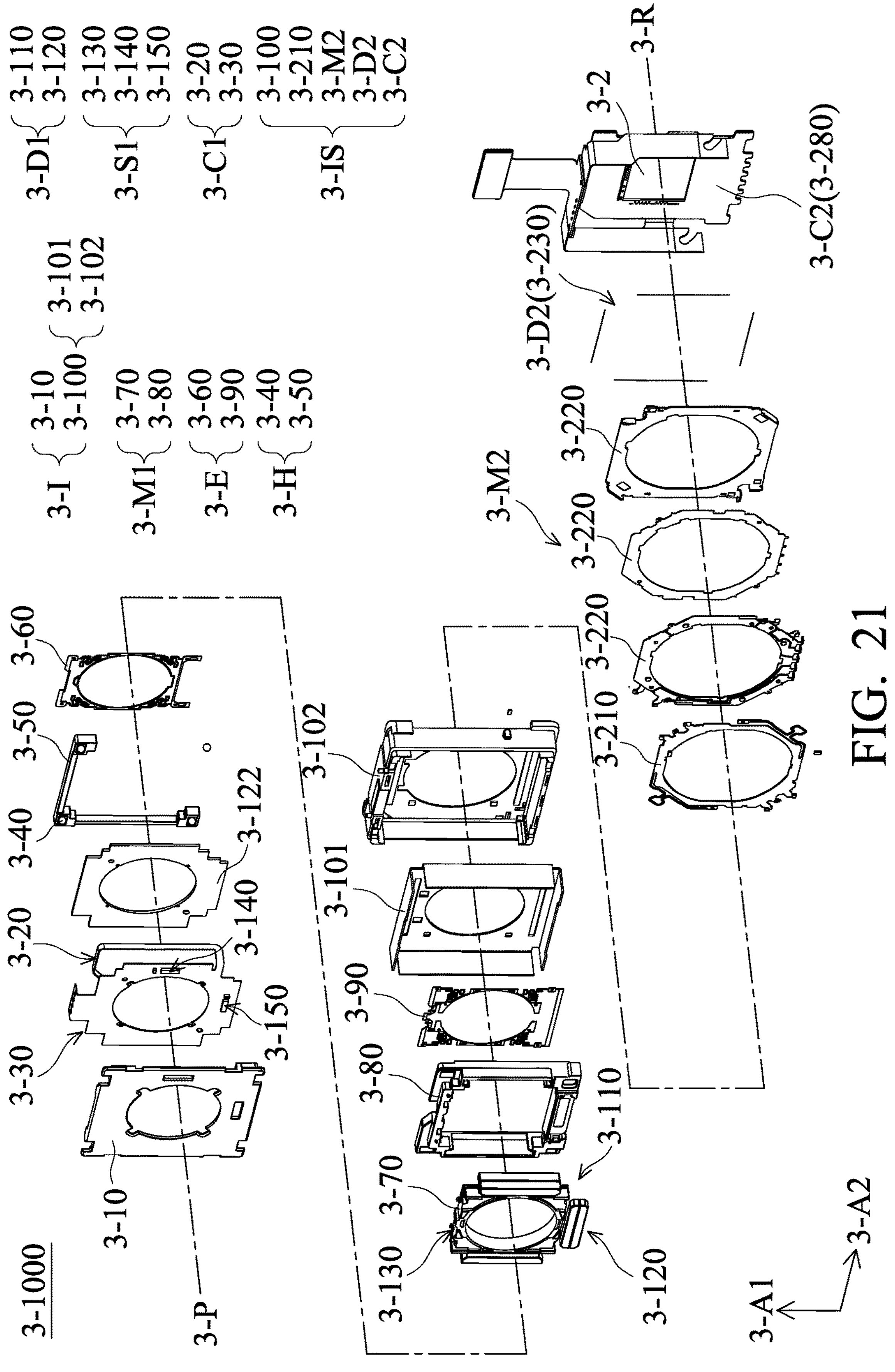
FIG. 21 is an exploded view of the optical system.

FIG. 21 is an exploded view of the optical system 3-1000. In this embodiment, the optical system 3-1000 includes an immovable part 3-I, a first movable part 3-M1, an elastic element 3-E, a supporting assembly 3-H, a first drive mechanism 3-D1, The first position sensing mechanism 3-S1, a first circuit mechanism 3-C1, and a second optical element module 3-IS. The first movable part 3-M1 is used for connected to a first optical element 3-1. The elastic assembly 3-E is elastically connected to the first movable part 3-M1. The first movable part 3-M1 is movable relative to the immovable part 3-I via the supporting assembly 3-H and the first drive mechanism 3-D1. The first position sensing mechanism 3-S1 may sense the movement of the first movable part 3-M1 relative to the immovable part 3-I. The first circuit mechanism 3-C1 is electrically connected to the first drive mechanism 3-D1. After the light 3-L enters the optical system 3-1000, the light 3-L is converted to an image on the second optical element module 3-IS.

In this embodiment, the immovable part 3-I includes a case 3-10 and a base 3-100. The first movable part 3-M1 includes a holder 3-70 and a frame 3-80. The case 3-10, the holder 3-70, the frame 3-80, and the base 3-100 are sequentially arranged along the primary axis 3-P. The elastic assembly 3-E includes a first elastic element 3-60 and a second elastic element 3-90. The supporting assembly 3-H includes an intermediate assembly 3-40 (details can be seen in FIG. 0.8, the intermediate assembly 3-40 includes a first intermediate element 3-41, a second intermediate element 3-42, a third intermediate element 3-43, a fourth intermediate element 3-44, a fifth intermediate element 3-45, a sixth intermediate element 3-46, and a seventh intermediate element 3-47) and a supporting element 3-50. The first drive mechanism 3-D1 includes a first drive assembly 3-110 and a second drive assembly 3-120. The first drive assembly 3-110 includes at least a first magnetic element 3-111 and at least a first coil 3-112, and the second drive assembly 3-120 includes at least a second magnetic element 3-121 and at least a second coil 3-122 (details can be seen in FIG. 30). The first position sensing mechanism 3-S1 includes a first position sensing assembly 3-130, a second position sensing assembly 3-140, and a third position sensing assembly 3-150. The first position sensing assembly 3-130 includes a first reference element 3-131 and a first sensing element 3-132. The second position sensing assembly 3-140 includes a second reference element 3-141 and a second sensing element 3-142. The third position sensing assembly 3-150 includes a third reference element 3-151 and a third sensing element 3-152. The first circuit mechanism 3-C1 includes a first circuit assembly 3-20 and a second circuit assembly 3-30. It should be understood that elements may added or removed according to actual needs.

It should be noted that, the magnetic element disposed on the first side 3-100I is the first magnetic element 3-111 of the first drive assembly 3-110, the second magnetic element 3-121 of the second drive assembly 3-120, and the second reference element 3-141 of the second sensing assembly 3-140 at the same time. The magnetic element disposed on the second side 3-1002 is the second magnetic element 3-121 of the second drive assembly 3-120 and the third reference element 3-151 of the third position sensing assembly 3-150 at the same time. The magnetic element disposed on the third side 3-1003 is the first magnetic element 3-111 of the first drive assembly 3-110 and the second magnetic element 3-121 of the second drive assembly 3-120 at the same time. As a result, since the first drive assembly 3-110, the second drive assembly 3-120, the second position sensing assembly 3-140, and the third position sensing assembly 3-150 share the same magnetic element(s), (the magnetic element may be used for both drive and sensing at the same time), the volume of the optical system 3-1000 may be reduced to achieve miniaturization.

The second optical element module 3-IS includes part of the immovable part 3-I, a second movable part 3-M2, a second drive mechanism 3-D2, and a second circuit mechanism 3-C2. The immovable part 3-I and the second movable part 3-M2 are arranged along the primary axis 3-P. The second movable part 3-M2 is used for connected to a second optical element 3-2. The second optical element 3-2 may be an image sensor. The second movable part 3-M2 is located between the first side 3-100I and the third side 3-1003. The second drive mechanism 3-D2 may drive the second movable part 3-M2 to move relative to the immovable part 3-I. For example, the second drive mechanism 3-D2 may be used for driving the second movable part 3-M2 to rotate relative to the immovable part 3-I around a rotation axis 3-R, and the rotation axis 3-R is parallel with the primary axis 3-P. In some embodiments, the rotation axis 3-R coincides with the primary axis 3-P. The second circuit mechanism 3-C2 is electrically connected to the second drive mechanism 3-D2.

In the second optical element module 3-IS, the immovable part 3-I includes an immovable board 3-210. The immovable board 3-210 is fixedly connected to the base 3-100. The second movable part 3-M2 includes a movable board 3-220. The movable board 3-220 may be a multilayer board. The second drive mechanism 3-D2 includes a plurality of bias elements 3-230. The movable board 3-220 is connected to the immovable board 3-210 via bias elements 3-230.

The bias elements 3-230 may include a shape memory alloy (SMA) material, such as a titanium-nickel (TiNi) alloy, a titanium-palladium (TiPd) alloy, a titanium-nickel (TiNiCu) alloy, a titanium-nickel-palladium (TiNiPd) alloy, or a combination thereof. Furthermore, a drive signal (e.g., current) may be applied to the bias elements 3-230 by a power source to change the lengths of the bias elements 3-230. Moreover, different drive signals may be applied to the bias elements 3-230 to independently control the lengths of each of the bias elements 3-230. For example, when the drive signal is applied to the bias elements 3-230, different bias elements 3-230 may produce the same or different change in length, and drive the movable board 3-220 to move relative to the base 3-100 and the immovable board 3-210 of the immovable part 3-I, thereby drive the second optical element 3-2 to move, including linear motion, rotation, etc., in order to achieve autofocus (AF), optical image stabilization (OIS), tilt correction, and the like.

Figure 22:
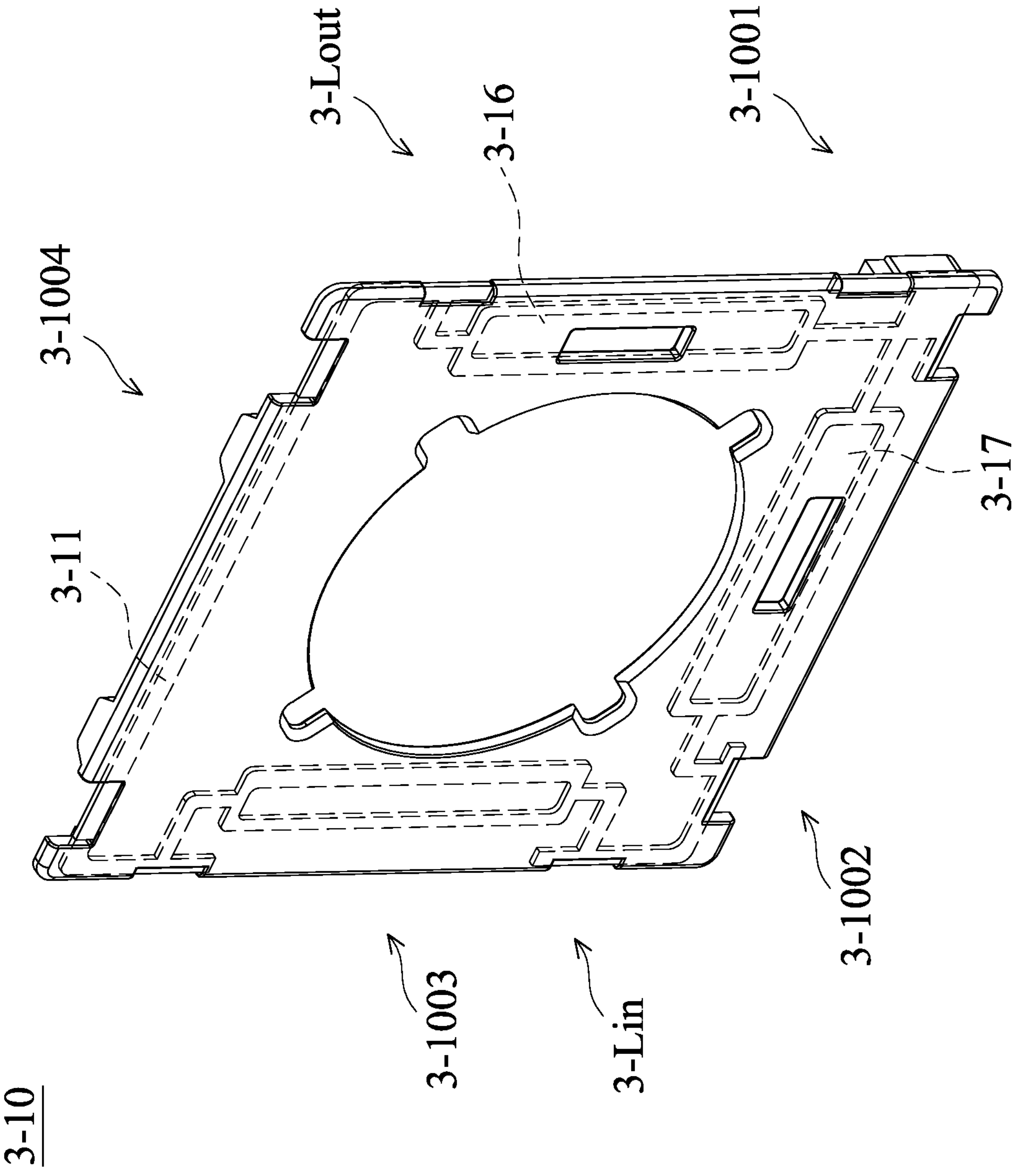
FIG. 22 is a perspective view of the case.
Figure 23:
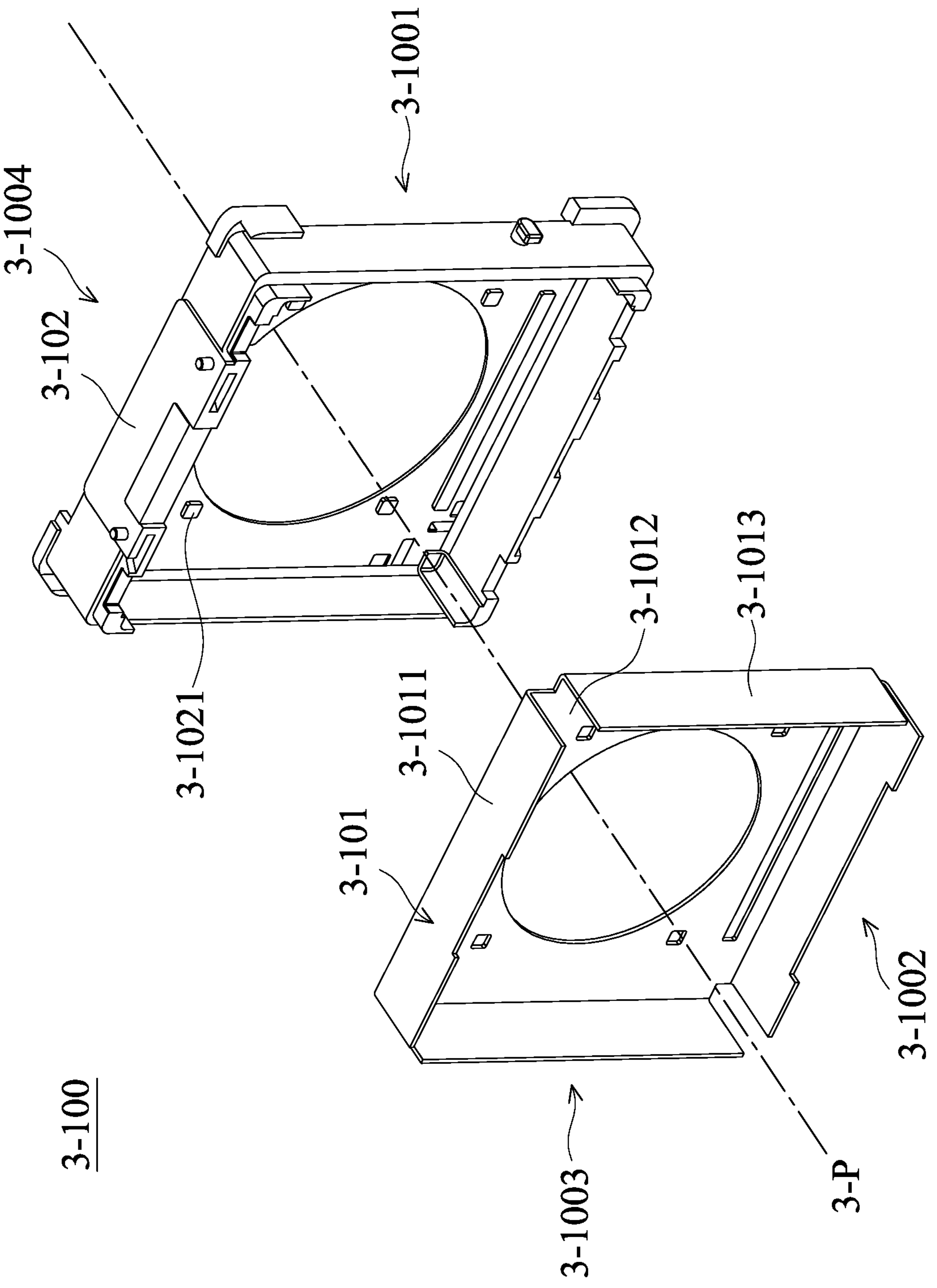
FIG. 23 is a perspective view of the base.

Please refer to FIG. 22 and FIG. 23 to understand the immovable part 3-I. FIG. 22 is a perspective view of the case 3-10. FIG. 23 is a perspective view of the base 3-100. The case 3-10 is connected to the base 3-100 by gluing, welding, etc. The light 3-L passes through the case 3-10 and the base 3-100 in sequence. Thus, the side close to the case 3-10 may be defined as a light entrance 3-Lin, and the side close to the base 3-100 may be defined as a light exit 3-Lout.

The accommodating space formed by the connection of the case 3-10 to the base 3-100 may accommodate the first movable part 3-M1, the elastic assembly 3-E, the first drive mechanism 3-D1, the first position sensing mechanism 3-S1, the first circuit mechanism 3-C1, etc.

The case 3-10 has a plate-shaped structure. When viewed from the primary axis 3-P, the profile of the case 3-10 is substantially rectangular or square. In some embodiments, the optical system 3-1000 may include a case structural strengthening element 3-11. The case structural strengthening element 3-11 is placed inside the case 3-10 to strengthen the structural strength of the case 3-10. For example, the case structural strengthening element 3-11 is formed inside the case 3-10 by insert molding. In FIG. 22, the case structural strengthening element 3-11 is shown in dashed lines. At least part of the case structural strengthening element 3-11 is embedded in and not revealed from the case 3-10, and the rest of the case structural strengthening element 3-11 is revealed from the case 3-10.

The case structural strengthening element 3-11 and the case 3-10 have different materials. For example, the case 3-10 is made of a plastic material, and the case structural strengthening element 3-11 is made of a magnetically-permeable material and/or a metal material. A magnetically-permeable material means the material has a magnetic permeability, such as ferromagnetic materials, including iron (Fe), nickel (Ni), cobalt (Co) or alloys thereof. In some embodiments, the width of the case structural strengthening element 3-11 on the side close to the holder 3-70 is greater than the width of the case structural strengthening element 3-11 on the side away from the holder 3-70.

The case 3-10 made of a plastic material may isolate electromagnetic wave. In this way, the electromagnetic wave interference generated by an electromagnetic device (not shown) (such as a receiver or an antenna) close to the optical system 3-1000 may be reduced. The case 3-10 made of plastics is usually manufactured by injection molding. Corresponding molds are designed according to the actual requirements, such as the structure of the case 3-10. The case 3-10 is manufactured by operations including assembling the molds to generate high pressure (closing the molds), injecting high-temperature melting plastic (injection), maintaining pressure (pressure-maintenance), decreasing the temperature to make the product shaped (cooling), opening the molds, and ejecting the product (ejection). During the process of injection molding, the parameters including the flow properties of the material, the amount of material, the melting temperature, etc. should be taken into account.

The case structural strengthening elements 3-11 corresponds to the first drive mechanism 3-D1. In detail, the case structural strengthening element 3-11 includes a first opening 3-16 corresponding to the first magnetic element 3-111 and a second opening 3-17 corresponding to the second magnetic element 3-121. When viewed from the primary axis 3-P, the case structural strengthening element 3-11 at least partially overlaps the first magnetic element 3-111. When viewed from the primary axis 3-P, the case structural strengthening element 3-11 at least partially overlaps the second magnetic element 3-121.

In addition, when viewed from the primary axis 3-P, at least part of the second position sensing assembly 3-140 is located in the first opening 3-16 of the case structural strengthening element 3-11. When viewed from the primary axis 3-P, at least part of the third position sensing assembly 3-150 is located in the second opening 3-17 of the case structural strengthening element 3-11.

The base 3-100 includes a shelter 3-101 and a cover 3-102. The shelter 3-101 has at least three side walls 3-1011, 3-1012, 3-1013 that are not parallel with each other. The shelter 3-101 and the cover 3-102 having different materials. For example, the shelter 3-101 is made of a metal material, and the cover 3-102 is made of a plastic material. The cover 3-102 includes a dodge portion 3-1021. The dodge portion 3-1021 has an opening structure. When viewed from the primary axis 3-P, the dodge portion 3-1021 is located on the fourth side 3-1004.

Since the case structural strengthening element 3-11 and the shelter 3-101 may be made of a magnetically-permeable material and/or a metal material, the case structural strengthening element 3-11 may be fixedly connected to the case 3-101 by welding (metal connection methods including Tin soldering, welding, etc.). However, the magnetic permeability of the case structural strengthening element 3-11 is greater than the magnetic permeability of the shelter 3-101.

Figure 24:
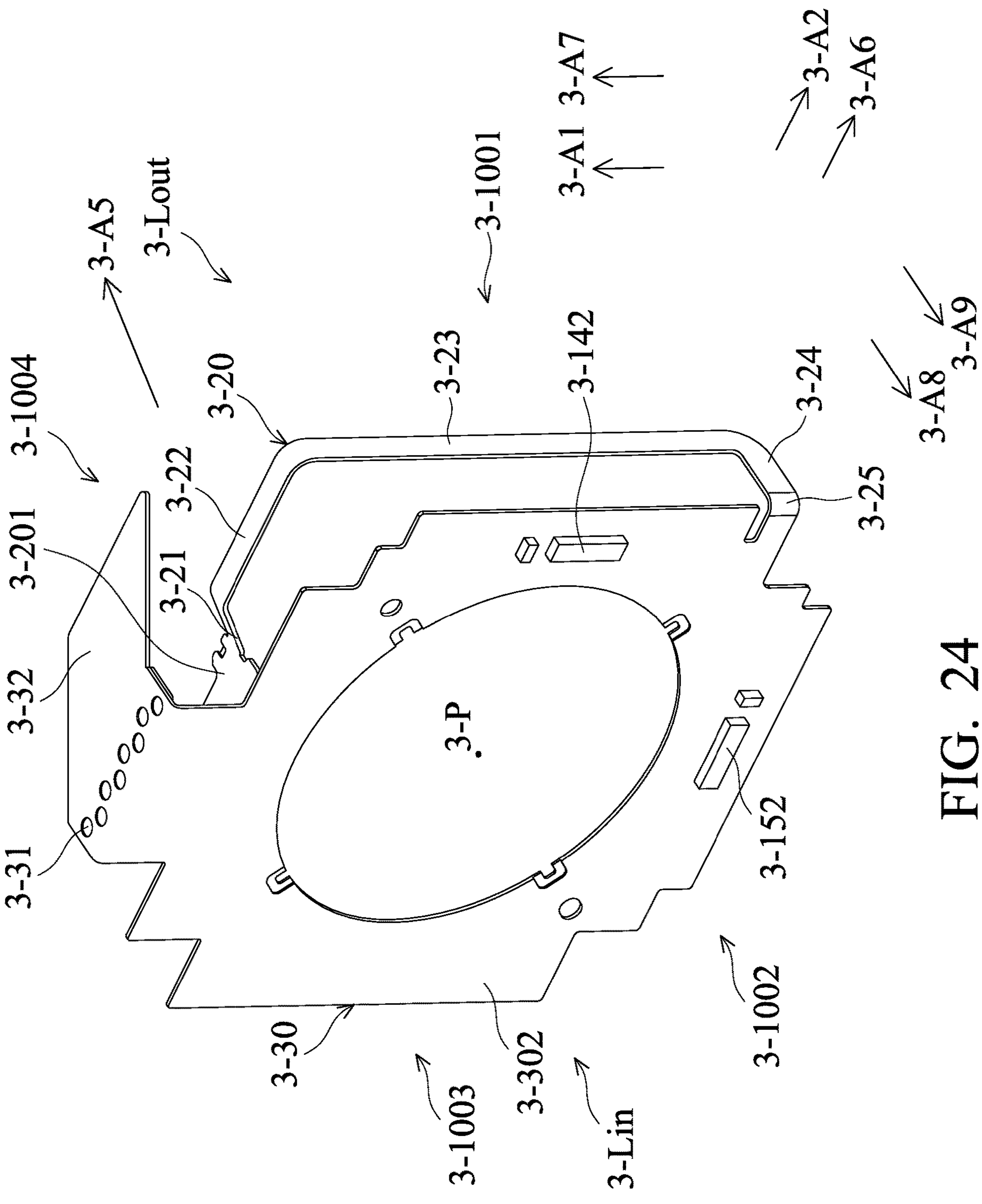
FIG. 24 is a perspective view of the first circuit assembly and the second circuit assembly.

Next, please also refer to FIG. 24 to understand the first circuit mechanism 3-C1. FIG. 24 is a perspective view of the first circuit assembly 3-20 and the second circuit assembly 3-30. The first circuit assembly 3-20 includes a first body 3-201, a first section 3-21, a second section 3-22, a third section 3-23 is a fourth section 3-24, a fifth section 3-25. The second circuit assembly 3-30 includes a second body 3-302, a first external circuit 3-31, and a fixing end 3-32. The second body 3-302 of the second circuit assembly 3-30 is closer to the light entrance 3-Lin than the first body 3-201 of the first circuit assembly 3-20.

The first body 3-201 is electrically connected to the first drive assembly 3-110, and the first sensing element 3-132. The first drive assembly 3-110 is electrically connected to the first body 3-201 via the second elastic element 3-90. The second elastic element 3-90 and the first body 3-201 are not parallel.

The first body 3-201 has a plate-shaped structure, and the first body and 3-201 and the primary axis 3-P are parallel. When viewed from the primary axis 3-P, at least part of the first body 3-201 is located between the supporting element 3-50 and the frame 3-80. The first sensing element 3-132 is fixedly disposed on the first body 3-201. When viewed from a direction that is perpendicular to the primary axis 3-P, the first body 3-201 at least partially overlaps the supporting element 3-50.

The first section 3-21 is a plate-shaped structure. The first section 3-21 is electrically connected to the first body 3-201. At least part of the first section 3-21 is fixedly disposed on the holder 3-70 or the frame 3-80. At least part of the first section 3-21 is movable relative to the holder 3-70 and the frame 3-80. The first section 3-21 extends along a fifth direction 3-A5. When viewed from the primary axis 3-P, the first section 3-21 is located on the fourth side 3-1004.

The second section 3-22 is a plate-shaped structure. The second section 3-22 is electrically connected to the first body 3-201 via the first section 3-21. The thickness direction of the second section 3-22 is different from the thickness direction of the first section 3-21. The thickness direction of the second section 3-22 may be not perpendicular to the thickness direction of the first section 3-21. The second section 3-22 is movable relative to the holder 3-70 and the frame 3-80. The second section 3-22 extends along a sixth direction 3-A6. The sixth direction 3-A6 and the fifth direction 3-A5 are neither parallel nor perpendicular. When viewed from the primary axis 3-P, the second section 3-22 is located on the fourth side 3-1004.

The third section 3-23 is a plate-shaped structure. The third section 3-23 is electrically connected to the first body 3-201 via the second section 3-22. The thickness direction of the third section 3-23 is different from the thickness direction of the first section 3-21. The thickness direction of the third section 3-23 may be perpendicular to the thickness direction of the first section 3-21. The third section 3-23 is movable relative to the holder 3-70 and the frame 3-80. The third section 3-23 extends along a seventh direction 3-A7. The seventh direction 3-A7 and the fifth direction 3-A5 are neither parallel nor perpendicular. The seventh direction 3-A7 and the sixth direction 3-A6 are not parallel but perpendicular. When viewed from the primary axis 3-P, the third section 3-23 is located on the first side 3-100I.

The fourth section 3-24 has a plate-shaped structure. The fourth section 3-24 is electrically connected to the first body 3-201 via the third section 3-23. The thickness direction of the fourth section 3-24 is the same as the thickness direction of the third section 3-23. The fourth section 3-24 is movable relative to the holder 3-70 and the frame 3-80. The fourth section 3-24 extends along an eighth direction 3-A8. The eighth direction 3-A8 and the fifth direction 3-A5 are not parallel but perpendicular. The eighth direction 3-A8 and the sixth direction 3-A6 are not parallel but perpendicular. The eighth direction 3-A8 and the seventh direction 3-A7 are not parallel but perpendicular. When viewed from the primary axis 3-P, the fourth section 3-24 is located on the first side 3-100I.

The fifth section 3-25 has a plate-shaped structure. The fifth section 3-25 is electrically connected to the first body 3-201 via the fourth section 3-24. The thickness direction of the fifth section 3-25 is different from the thickness direction of the first section 3-21. The thickness direction of the fifth section 3-25 is different from the thickness direction of the second section 3-22. For example, the thickness direction of the fifth section 3-25 may be perpendicular to the thickness direction of the second section 3-22. The thickness direction of the fifth section 3-25 is different from the thickness direction of the third section 3-23. For example, the thickness direction of the fifth section 3-25 may be perpendicular to the thickness direction of the third section 3-23. The thickness direction of the fifth section 3-25 is different from the thickness direction of the fourth section 3-24. For example, the thickness direction of the fifth section 3-25 may be perpendicular to the thickness direction of the fourth section 3-24. The fifth section 3-25 is movable relative to the holder 3-70 and the frame 3-80. The fifth section 3-25 extends along a ninth direction 3-A9. The ninth direction 3-A9 and the fifth direction 3-A5 are neither parallel nor perpendicular. The ninth direction 3-A9 and the sixth direction 3-A6 are not parallel but perpendicular. The ninth direction 3-A9 and the seventh direction 3-A7 are not parallel but perpendicular. When viewed from the primary axis 3-P, the fifth section 3-25 is located on the first side 3-100I.

The second body 3-302 has a plate-shaped structure, and the second body 3-302 is perpendicular to the primary axis 3-P. The second body 3-302 is closer to the light entrance 3-Lin than the first movable part 3-M1. The second sensing element 3-142 is disposed on the second body 3-302. When viewed from a direction that is perpendicular to the primary axis 3-P, the second body 3-302 is located between the second drive assembly 3-120 and the second sensing element 3-142.

The first external circuit 3-31 is electrically connected to the first body 3-201. The first external circuit 3-31 and the fixing end 3-32 are not parallel. The fixing end 3-32 has a plate-shaped structure. The fixing end 3-32 is fixedly provided on the immovable part 3-I. The fixing end 3-32 may be in direct contact with the immovable part 3-I. The surface of the fixing end 3-32 and the primary axis 3-P are neither perpendicular nor parallel. For example, the fixing end 3-32 may be fixedly connected to the immovable part 3-I by hot pressing. When viewed from a direction that is perpendicular to the primary axis 3-P, the fixing end 3-32 is inclined. The first circuit assembly 3-20 may be fixed to the immovable part 3-I by the fixing end 3-32.

The first circuit assembly 3-20 is electrically connected to the second circuit assembly 3-30. In detail, the first external circuit 3-31 is electrically connected to the second body 3-302. The first external circuit 3-31 is electrically connected to the fifth section 3-25 via the second body 3-302, and the second body 3-302 is electrically connected to the first body 3-201 via the fifth section 3-25.

The second body 3-302 and the first body 3-201 are not parallel but perpendicular. When viewed from the primary axis 3-P, the second body 3-302 at least partially overlaps the first body 3-201. The fixing end 3-32 and the second body 3-302 are not parallel. The fixing end 3-32 is connected to the second body 3-302 via the first external circuit 3-31.

Figure 25:
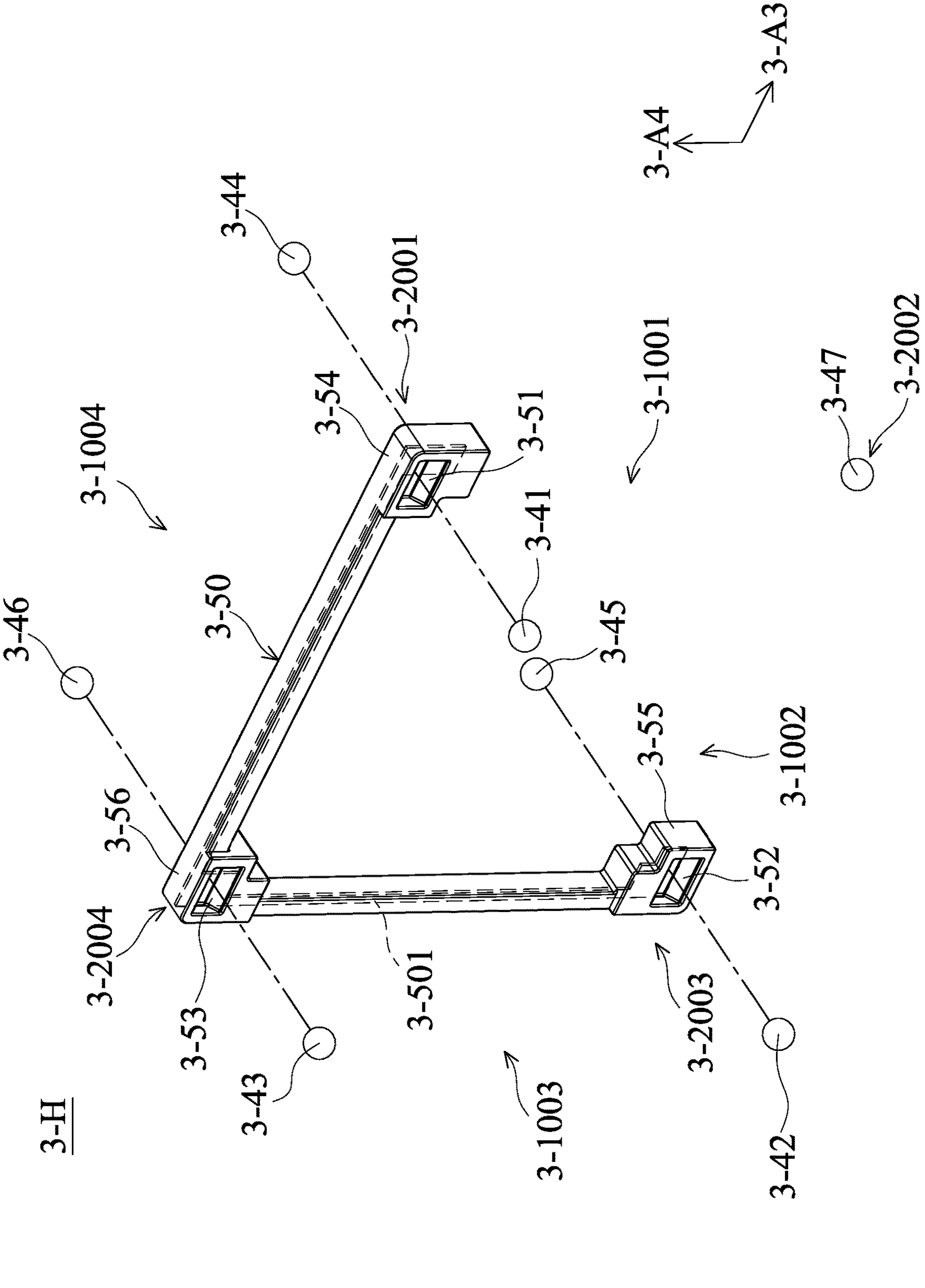
FIG. 25 is a schematic view of the supporting assembly.
Figure 26:
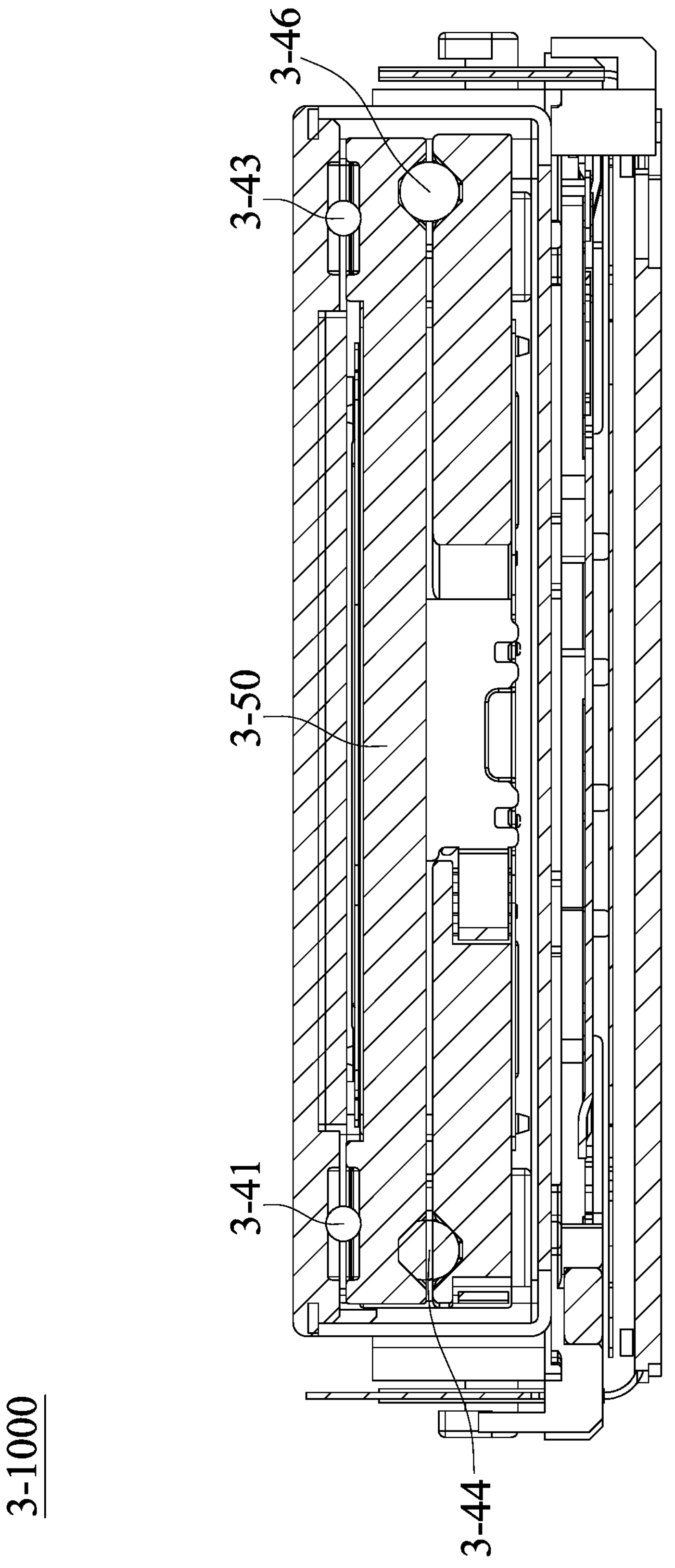
FIG. 26 is a cross-sectional view of the optical system.

Next, please also refer to FIG. 25 and FIG. 26 to understand the supporting assembly 3-H. FIG. 25 is a schematic view of the supporting assembly. FIG. 26 is a cross-sectional view of the optical system 3-1000. In this embodiment, the optical system 3-1000 includes seven intermediate elements 3-41 to 3-47. Intermediate elements 3-41 to 3-47 may be a ball, a sphere, etc. The supporting element 3-50 is disposed between the case 3-10 and the frame 3-80. The first intermediate element 3-41, the second intermediate element 3-42, and the third intermediate element 3-43 are disposed between the supporting element 3-50 and the case 3-10. The fourth intermediate element 3-44, the fifth intermediate element 3-45, and the sixth intermediate element 3-46 are disposed between the supporting element 3-50 and the frame 3-80. The seventh intermediate element 3-47 is disposed between the case 3-10 and the frame 3-80.

When viewed from the primary axis 3-P, the first intermediate element 3-41 and the fourth intermediate element 3-44 are located on the first corner 3-2001. When viewed from the primary axis 3-P, the second intermediate element 3-42 and the fifth intermediate element 3-45 are located on the third corner 3-2003. When viewed from the primary axis 3-P, the third intermediate element 3-43 and the sixth intermediate element 3-46 are located on the fourth corner 3-2004. When viewed from the primary axis 3-P, the seventh intermediate element 3-47 is located on the second corner 3-2002. When viewed from the primary axis 3-P, the first intermediate element 3-41 at least partially overlaps the fourth intermediate element 3-44, the second intermediate element 3-42 at least partially overlaps the fifth intermediate element 3-45, and the third intermediate element 3-43 at least partially overlaps the sixth intermediate element 3-46.

The supporting element 3-50 is L-shaped arranged on the third side 3-1003 and the fourth side 3-1004. The supporting element 3-50 is movable relative to the holder 3-70, the frame 3-80, and the immovable part 3-I. The first rail 3-51, a second rail 3-52, a third rail 3-53, a fourth rail 3-54, a fifth rail 3-55, and a sixth rail 3-56 are formed on the supporting element 3-50. A seventh rail 3-57 is formed on the frame 3-80 (shown in FIG. 28). The first rail 3-51 corresponds to the first intermediate element 3-41 and extends along a third direction 3-A3 that is parallel with the second direction 3-A2. The second rail 3-52 corresponds to the second intermediate element 3-42 and extends along the third direction 3-A3 extends. The third rail 3-53 corresponds to the third intermediate element 3-43 and extends along the third direction 3-A3. The fourth rail 3-54 corresponds to the fourth intermediate element 3-44 and extends along a fourth direction 3-A4 that is not parallel with but perpendicular to the third direction 3-A3. The fifth rail 3-55 corresponds to the fifth intermediate element 3-45 and extends along the fourth direction 3-A4. The sixth rail 3-56 corresponds to the sixth intermediate element 3-46 and extends along the fourth direction 3-A4. The seventh rail 3-57 corresponds to the seventh intermediate element 3-47. When viewed from the primary axis 3-P, the first rail 3-51 at least partially overlaps the fourth rail 3-54, the second rail 3-52 at least partially overlaps the fifth rail 3-55, and the third rail 3-53 at least partially overlaps the sixth rail 3-56.

As shown in FIG. 25 and FIG. 26, the first intermediate element 3-41 is movable relative to the first rail 3-51 only in the third direction 3-A3, the second intermediate element 3-42 is movable relative to the second rail 3-52 only in the third direction 3-A3, and the third intermediate element 3-43 is movable relative to the third rail 3-53 only in the third direction 3-A3. Thus, the first intermediate element 3-41, the second intermediate element 3-42, and the third intermediate element 3-43 located between the case 3-10 and the supporting element 3-50 make the supporting element 3-50 movable relative to the immovable part 3-I in the third direction 3-A3.

The fourth intermediate element 3-44 is movable relative to the fourth rail 3-54 only in the fourth direction 3-A4, the fifth intermediate element 3-45 is movable relative to the fifth rail 3-55 only in the fourth direction 3-A4, and the sixth intermediate element 3-46 is movable relative to the sixth rail 3-56 only in the fourth direction 3-A4. Thus, the fourth intermediate element 3-44, the fifth intermediate element 3-45, and the sixth intermediate element 3-46 located between the supporting element 3-50 and the frame 3-80 make the frame 3-80 movable relative to the supporting element 3-50 in the fourth direction 3-A4.

The seventh intermediate element 3-47 is movable relative to the seventh rail 3-57 in the third direction 3-A3 and the fourth direction 3-A4.

To sum up, the supporting element 3-50 is movable relative to the immovable part 3-I in the third direction 3-A3 by the first intermediate element 3-41, the second intermediate element 3-42, the third intermediate element 3-43, and the seventh intermediate element 3-47. The frame 3-80 is movable relative to the supporting element 3-50 in the fourth direction 3-A4 by the fourth intermediate element 3-44, the fifth intermediate element 3-45, the sixth intermediate element 3-46, and the seventh intermediate element 3-47. Also, the movement of the seventh intermediate element 3-47 may help the supporting element 3-50 to move relative to the immovable part 3-I in the third direction 3-A3 and the holder 3-80 to move relative to supporting element 3-50 in the fourth direction 3-A4.

In some embodiments, the optical system 3-1000 may include a supporting element structural strengthening element 3-501. The supporting element structural strengthening element 3-501 is placed inside the supporting element 3-50 to strengthen the structural strength of the supporting element 3-50. For example, the supporting element structural strengthening element 3-501 is formed inside the case 3-10 supporting element 3-50 by insert molding. In FIG. 25, the supporting element structural strengthening element 3-501 is shown in dashed lines. The supporting element structural strengthening element 3-501 and the supporting element 3-50 have different materials. For example, the supporting element 3-50 is made of a plastic material, and the supporting element structural strengthening element 3-501 is made of a metal material. At least part of the supporting element structural strengthening element 3-501 is embedded in and not revealed from the supporting element 3-50. When viewed from a direction that is perpendicular to the primary axis 3-P, at least part of the supporting element structural strengthening element 3-501 is located between the first rail 3-51 and the fourth rail, and at least part of the supporting element structural strengthening element 3-501 is located between the first intermediate element 3-41 and the fourth intermediate element 3-44.

When viewed from the primary axis 3-P, the supporting element structural strengthening element 3-501 at least partially overlaps the case structural strengthening element 3-11. The supporting element structural strengthening element 3-501 and the case structural strengthening elements 3-11 have different materials. The magnetic permeability of the case structural strengthening element 3-11 is greater than the magnetic permeability of the supporting element structural strengthening element 3-501. Thus, the magnetic attraction force generated between the case structural strengthening element 3-11 and a magnetic element is greater than the magnetic attraction force generated between the supporting element structural strengthening element 3-501 and a magnetic element. Thus, the magnetic attraction force generated between the case structural strengthening element 3-11 and the first magnetic element 3-111 and/or the second magnetic element 3-121 may be used for positioning the relative positions of the case 3-10 and frame 3-80. When viewed from a direction that is perpendicular to the primary axis 3-P, the second position sensing assembly 3-140 at least partially overlaps the supporting element structural strengthening element 3-501. Furthermore, when viewed from a direction that is perpendicular to the primary axis 3-P, the third position sensing assembly 3-150 at least partially overlaps the supporting element structural strengthening element 3-501.

Figure 27:
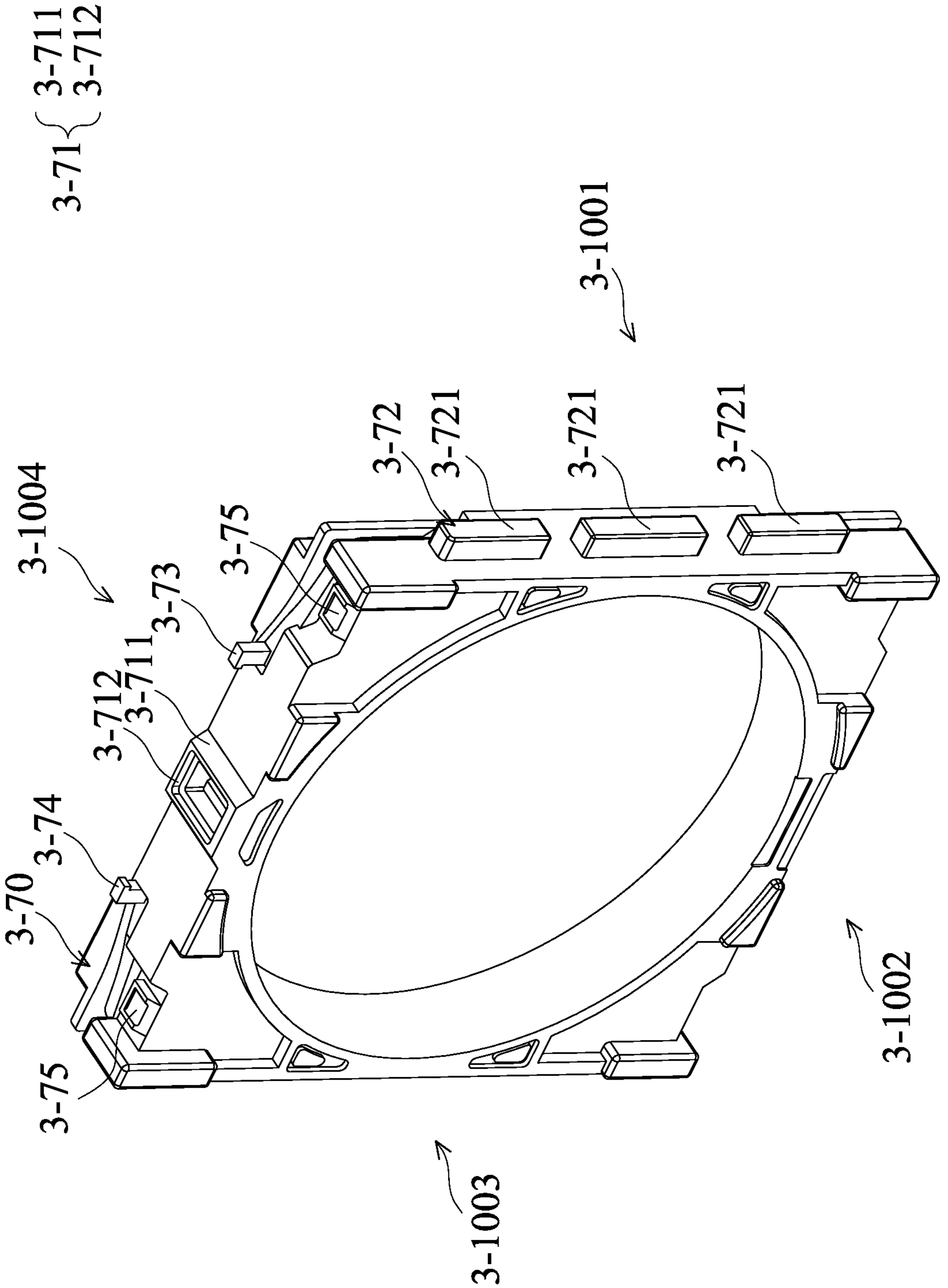
FIG. 27 is a perspective view of the holder.
Figure 28:
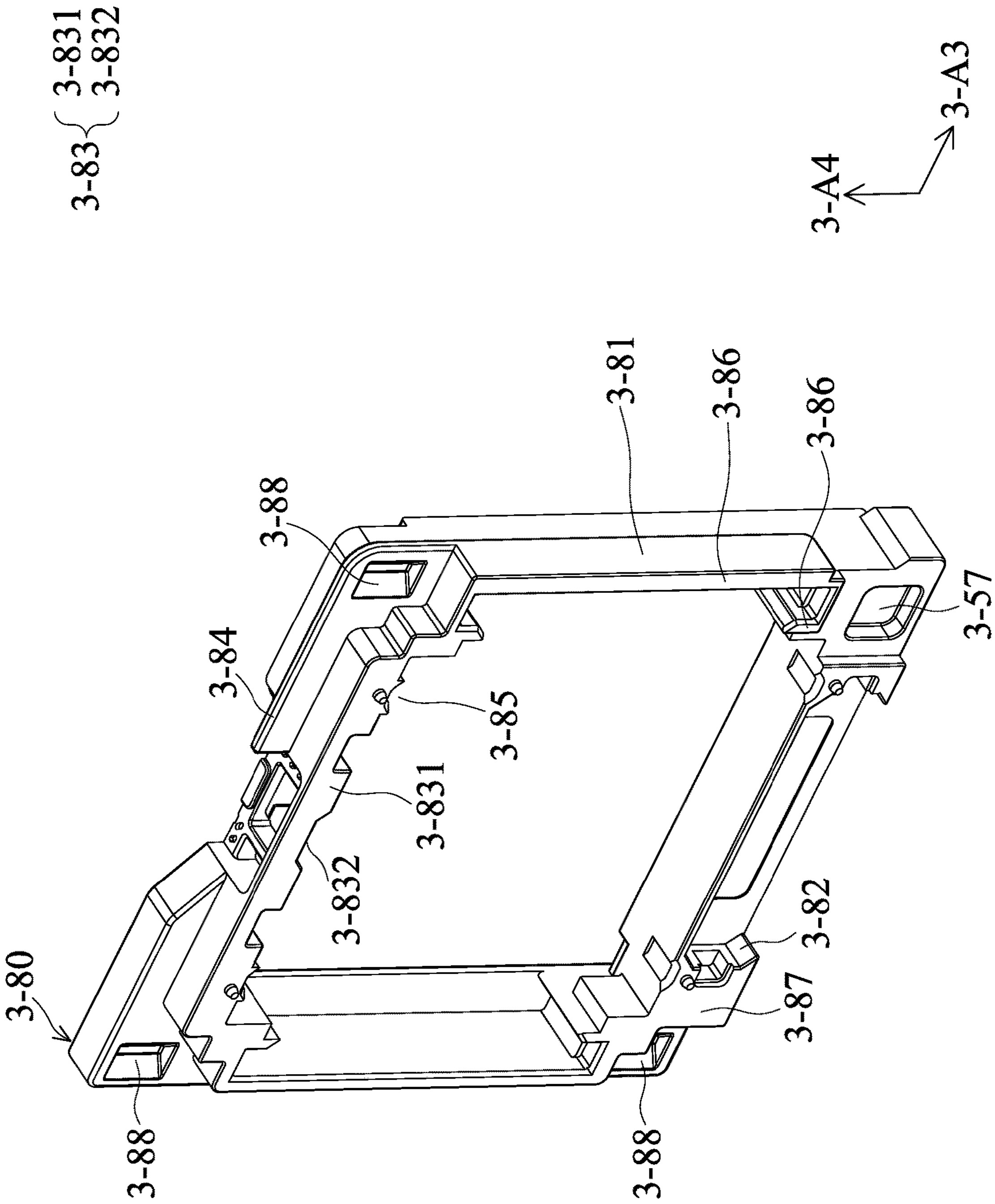
FIG. 28 is a perspective view of the frame.
Figure 29:
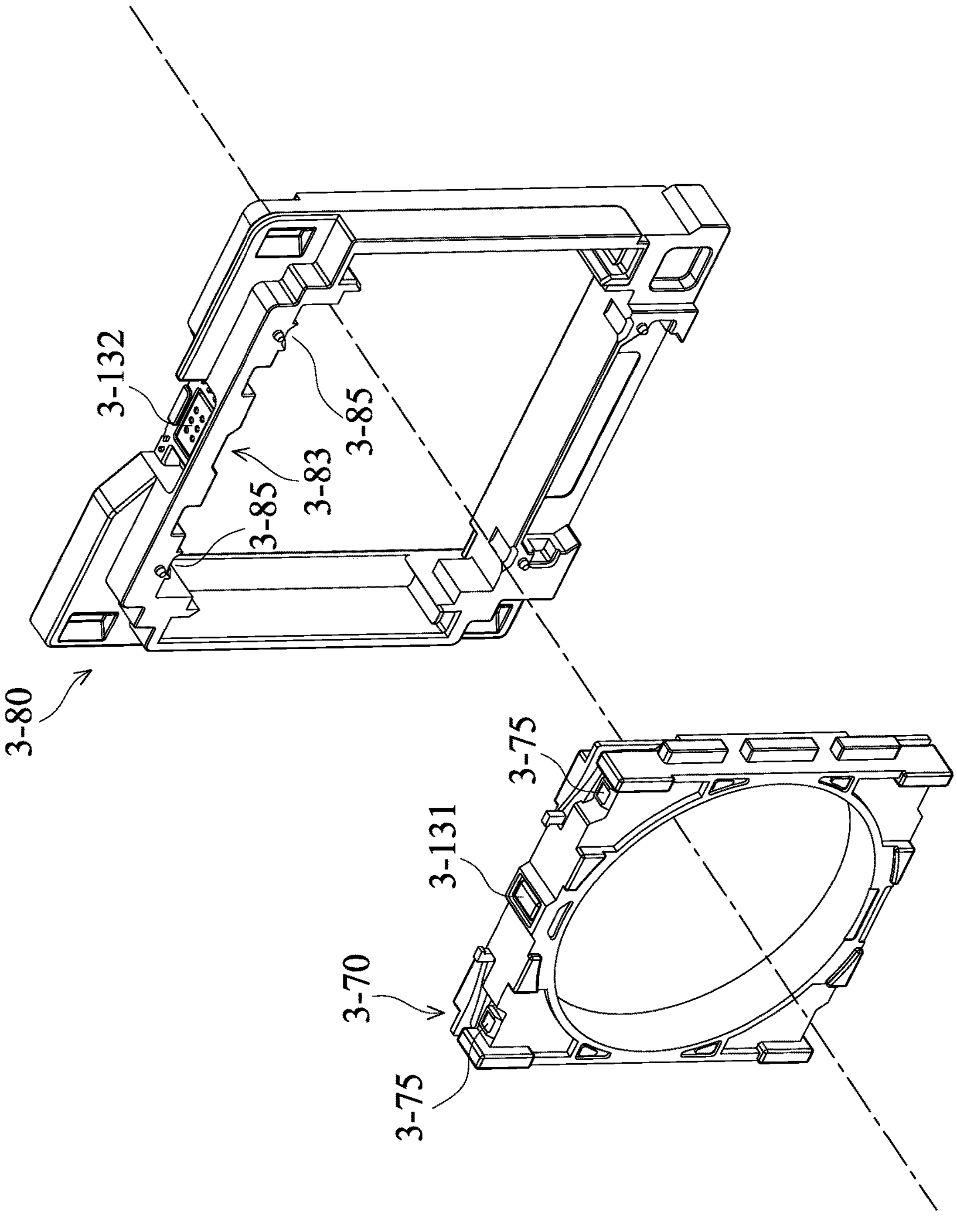
FIG. 29 is a schematic view of the holder, the frame, the first reference element, and the first sensing element.

Next, please also refer to FIG. 27 to FIG. 29 to understand the first movable part 3-M1. The first movable part 3-M1 is located between the first side 3-1001 and the third side 3-1003. FIG. 27 is a perspective view of the holder 3-70. FIG. 28 is a perspective view of the frame 3-80. FIG. 29 is a schematic view of the holder 3-70, the frame 3-80, the first reference element 3-131, and the first sensing element 3-132 for illustrating the relative positions and relative sizes of the holder 3-70 and the frame 3-80 and the relative positions and relative sizes of the first reference element 3-131 and the first sensing element 3-132.

The holder 3-70 may have a through hole for holding the first optical element 3-1. Threaded structure may be configured between the through hole and the first optical element 3-1, so that the first optical element 3-1 may be affixed in the holder 3-70. When viewed from the primary axis 3-P, the distance between the center of the through hole of the holder 3-70 and the first side 3-1001 is different from the distance between the center of the through hole of the holder 3-70 and the third side 3-1003. The holder 3-70 is closer to the first side 3-1001. Also, when viewed from the primary axis 3-P, the distance between the center of the through hole of the holder 3-70 and the second side 3-1002 is different from the distance between the center of the through hole of the holder 3-70 and the fourth side 3-1004. The holder 3-70 is closer to the second side 3-1002. In detail, the holder 3-70 in the optical system 3-1000 is an eccentric structure.

The holder 3-70 includes a first sensing assembly accommodating portion 3-71, a first fixing structure 3-72, a first electrical connection portion 3-73, a second electrical connection portion 3-74, and a first accommodating portion 3-75.

The first sensing assembly accommodating portion 3-71 is used for receiving at least part of the first position sensing assembly 3-130. For example, the first reference element 3-131 is accommodated in the first sensing assembly accommodating portion 3-71. The first sensing assembly accommodating portion 3-71 includes a first protruding structure 3-711 and a first recessed structure 3-712 located in the first protruding structure 3-711. The first recessed structure 3-712 may protect the first reference element 3-131. The first fixing structure 3-72 is used for fixing the first coil 3-112. The first fixing structure 3-72 may have at least one protrusion 3-721, e.g., a plurality of protrusions 3-721, so that the first coil 3-112 may be affixed to the first fixing structure 3-72.

The first electrical connection portion 3-73 and the second electrical connection portion 3-74 are used for the placement of a first lead 1121 and a second lead 1122 (shown in FIG. 32) of the first coil 3-112. The first electrical connection portion 3-73 and the second electrical connection portion 3-74 are disposed on the fourth side 3-1004. The first coil 3-112 may be electrically connected to other elements by methods such as Tin welding on the first electrical connection portion 3-73 and the second electrical connection portion 3-74. When viewed from the primary axis 3-P, the first electrical connection portion 3-73 and the second electrical connection portion 3-74 at least partially overlap the dodge portion 3-1021 of the base 3-100. Since the dodge portion 3-1021 has an opening structure, it may prevent the first electrical connection portion 3-73 and the second electrical connection portion 3-74 from being damaged because of collision with the holder 3-100.

In this technical field, the coils are typically arranged on the opposite sides of the holder, so the electrical connection portions are typically also arranged on the opposite sides of the holder. However, in the present disclosure, since there is no magnetic element or coil disposed on the fourth side 3-1004, both the first electrical connection portion 3-73 and the second electrical connection portion 3-74 are disposed on the fourth side 3-1004 to effectively make use of the space.

The frame 3-80 includes a first stopper 3-81, a second stopper 3-82, a third stopper 3-83, a fourth stopper 3-84, a second accommodating portion 3-85, a first positioning structure 3-86, a second positioning structure 3-87, and at least a frame rail 3-88.

The third stopper 3-83 of the frame 3-80 corresponds to the first sensing assembly accommodating portion 3-71 of the holder 3-70. The third stopper 3-83 is used for restricting the range of motion of the holder 3-70. The third stopper 3-83 may have a second protruding structure 3-831 and a second recessed structure 3-832 located in the second protruding structure 3-831.

The frame rail 3-88 extends along the fourth direction 3-A4 for corresponding to the fourth rail 3-54, the fifth rail 3-55, and the sixth rail 3-56 of the supporting element 3-50.

The first accommodating portion 3-75 of the holder 3-70, the first stopper 3-81, the second stopper 3-82, the fourth stopper 3-84, the second accommodating portion 3-85, the first positioning structure 3-86, and the second positioning structure 3-87 of the frame 3-80 will be described in detail in the following.

The holder 3-70 is movably connected to the frame 3-80 via the elastic assembly 3-E. The first elastic element 3-60 and the second elastic element 3-90 of the elastic assembly 3-E have a plate-shaped structure and are made of an elastic material or a ductile material, e.g., metal. In this technical field, the first elastic element 3-60 and the second elastic element 3-90 may be known as "spring", "leaf spring", "plate spring", etc.

The first elastic element 3-60 connects the top surface of the frame 3-80 and the top surface of the holder 3-70, and the second elastic element 3-90 connects the bottom surface of the frame 3-80 and the bottom surface of the holder 3-70. That is, the holder 3-70 is movably connected to the frame 3-80 via the first elastic element 3-60 and the second elastic element 3-90. The holder 3-70 is held elastically by the first elastic element 3-60 and the second elastic element 3-90. When the first movable part 3-M1 moves relative to the immovable part 3-I, the range of motion of the holder 3-70 may be restricted by the first elastic element 3-60 and the second elastic element 3-90. Thus, the holder 3-70 and the first optical element 3-1 therein do not get damaged because of collision with other element when the optical system 3-1000 moves or is impacted.

In detail, the holder 3-70 is movable relative to the frame 3-80 via the elastic assembly 3-E. Also, the frame 3-80 is movable relative to the immovable part 3-I (e.g., the base 3-100) via the supporting assembly 3-H. The movement of the holder 3-70 relative to the frame 3-80 in the primary axis 3-P may achieve autofocus, and the movement of the frame 3-80 relative to the immovable part 3-I (e.g., the base 3-100) in directions that are perpendicular to the primary axis 3-P may achieve optical image stabilization.

Figure 30:
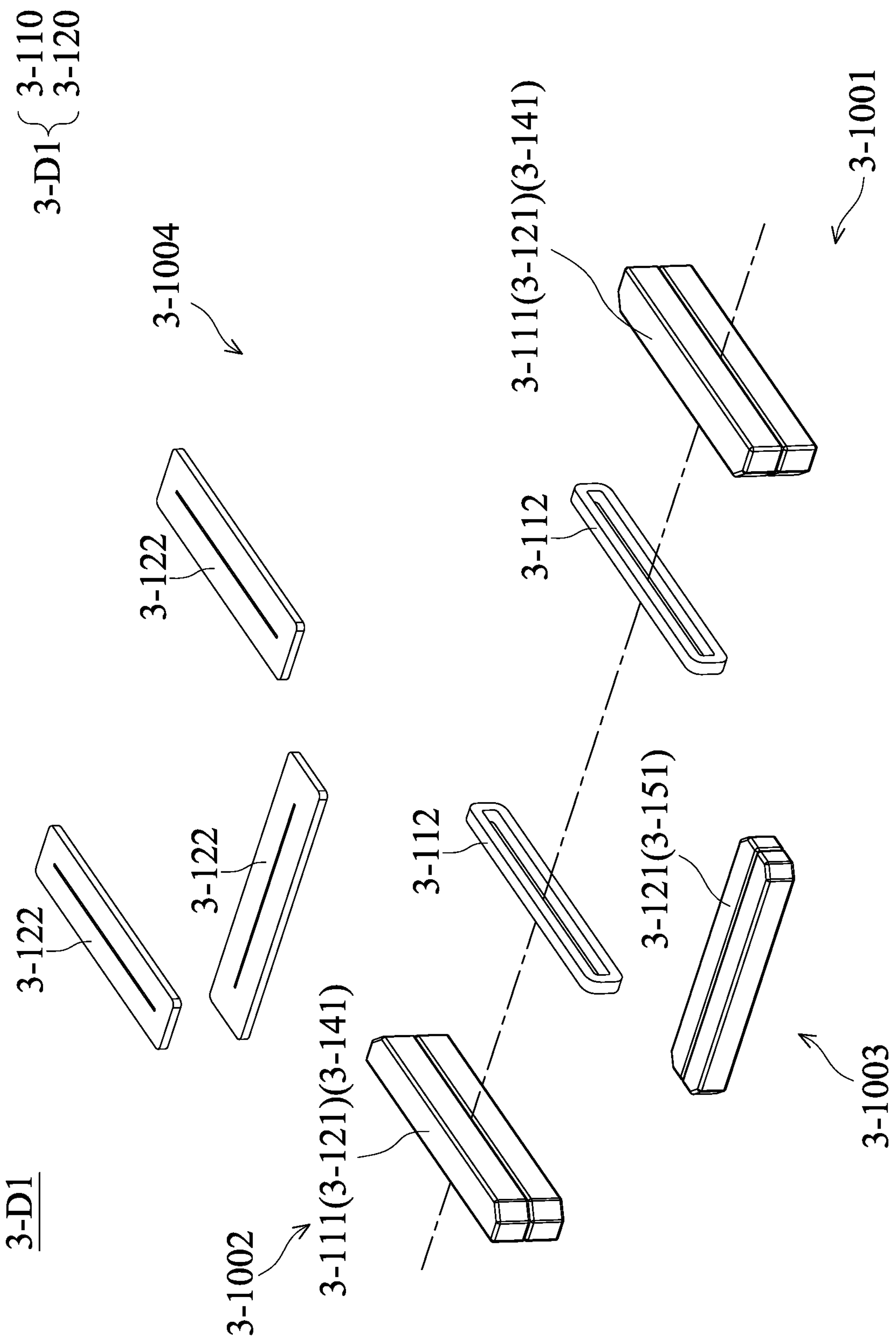
FIG. 30 is an exploded view of the first drive assembly and the second drive assembly.
Figure 31:
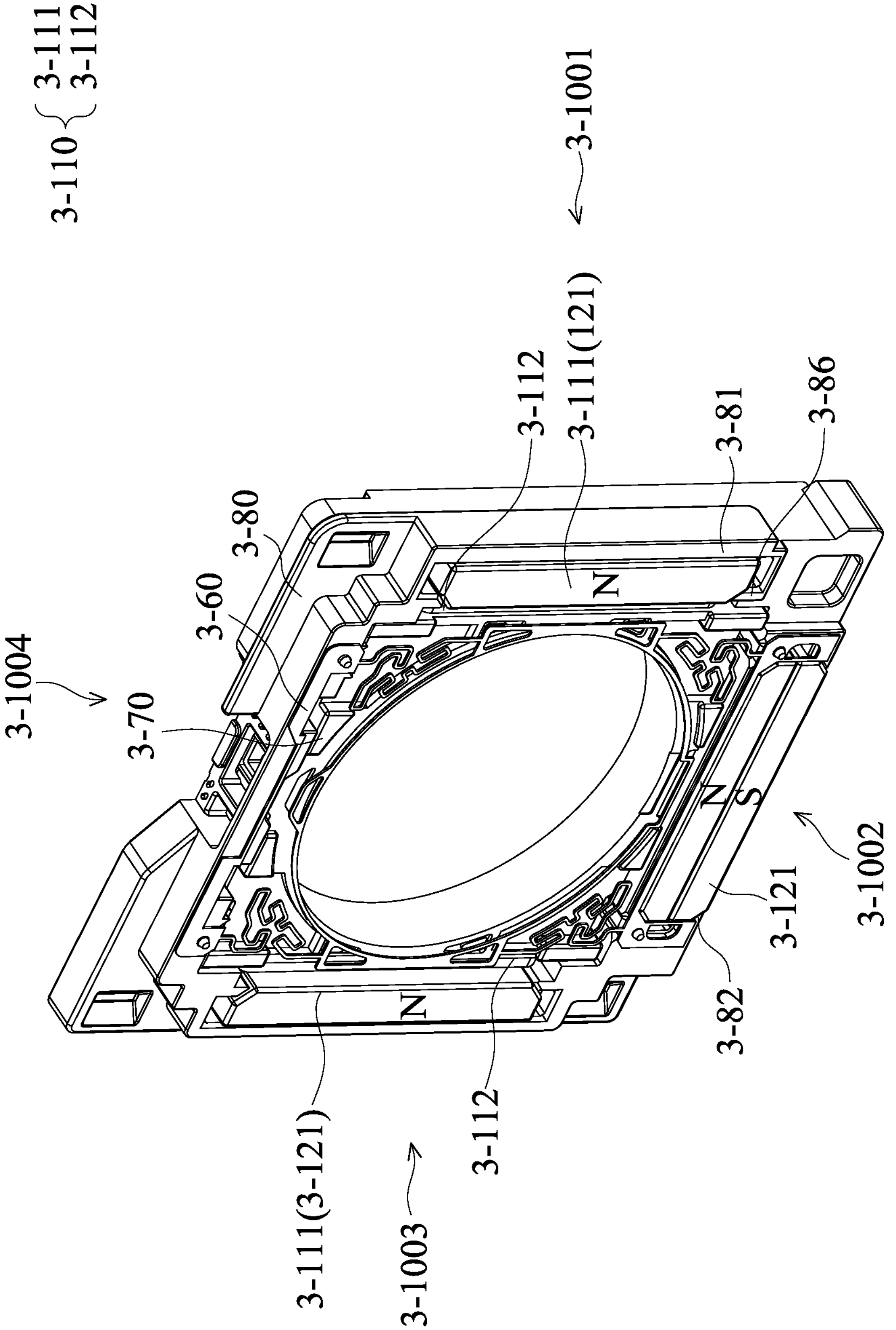
FIG. 31 is a perspective view of the first elastic element, the holder, the frame, the first drive assembly, and the second magnetic element.
Figure 32:
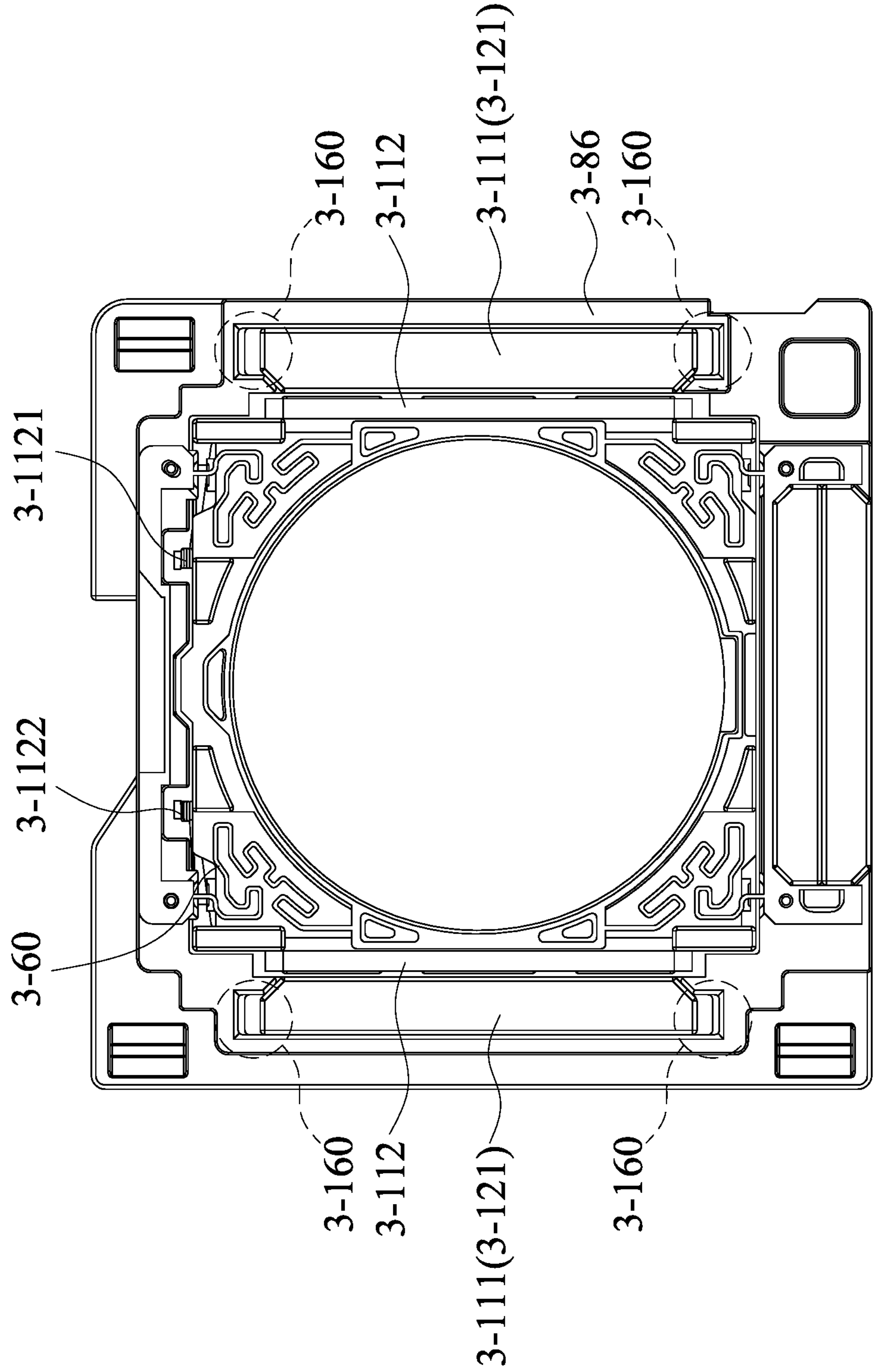
FIG. 32 is a top view of the first elastic element, the holder, the frame, the first drive assembly, and the second magnetic element.

Next, please also refer to FIG. 30 to FIG. 32 to understand the first drive mechanism 3-D1 (including the first drive assembly 3-110 and the second drive assembly 3-120). FIG. 30 is an exploded view of the first drive assembly 3-110 and the second drive assembly 3-120. FIG. 31 is a perspective view of the first elastic element 3-60, the holder 3-70, the frame 3-80, the first drive assembly 3-110, and the second magnetic element 3-121. FIG. 32 is a top view of the first elastic element 3-60, the holder 3-70, the frame 3-80, the first drive assembly 3-110, and the second magnetic element 3-121.

The first drive assembly 3-110 may drive the holder 3-70 to move relative to the frame 3-80 to achieve autofocus. The second drive assembly 3-120 may drive the first movable part 3-M1 to move relative to the immovable part 3-I to achieve optical image stabilization.

The first magnetic element 3-111 may be a permanent magnet. The first magnetic element 3-111 may be elongated. The first magnetic element 3-111 may have a bevel. The first magnetic elements 3-111 are disposed on the first side 3-1001 and the third side 3-1003. The first coils 3-112 correspond to the first magnetic elements 3-111, so that the first coils 3-112 are also disposed on the first side 3-1001 and the third side 3-1003. The first coil 3-112 may be polygonal, elliptical, etc.

The first positioning structure 3-86 of the frame 3-80 is used for positioning the first magnetic element 3-111. The first stopper 3-81 of the frame 3-80 is used for limiting the range of motion of the first movable part 3-M1. The first magnetic element 3-111 includes a first surface 3-1111 facing the holder 3-70, a second surface 3-1112 facing away from the holder 3-70, a third surface 3-1113 of the bevel. The first surface 3-1111 has a planar structure and faces the first coil 3-112. The second surface 3-1112 and the first surface 3-1111 face opposite directions. The third surface 3-1113 has a planar structure, and the third surface 3-1113 is adjacent to the first surface 3-1111. The second surface 3-1112 and the third surface 3-1113 face the first positioning structure 3-86. The third surface 3-1113 and the first surface 3-1111 are neither parallel nor perpendicular. The minimum distance between the third surface 3-1113 and the first surface 3-1111 is less than the minimum distance between the third surface 3-1113 and the second surface 3-1112.

In detail, the portion of the frame 3-80 that covers the first magnetic element covering 3-111 may be defined as the first positioning structure 3-86, but only the portion of the frame 3-80 corresponding to the third surface 3-1113 of the first magnetic element 3-111 may be defined as the first stopper 3-81. Thus, the first positioning structure 3-86 and the first stopper 3-81 are integrally formed. The first stopper 3-81 is located between the first magnetic element 3-111 and the first side 3-1001 of the base 3-100. When viewed from a direction that is perpendicular to the second surface 3-1112, the first magnetic element 3-111 at least partially overlaps the first stopper 3-81.

The first fixing structure 3-72 of the holder 3-70 may be used for affixing the first coil 3-112. When viewed from the primary axis 3-P, the first coil 3-112 at least partially overlaps the first fixing structure 3-72. In some embodiments, as shown in FIG. 31 and FIG. 32, in the first direction 3-A1, the maximum size of the first coil 3-112 is less than the maximum size of the first magnetic element 3-111, and the maximum size of the first surface 3-1111 is less than the maximum size of the first coil 3-112 and greater than the maximum size of the first fixing structure 3-72.

Thus, the design of the size of the first magnetic element 3-111 in the first direction 3-A1 (e.g., the first surface 3-1111) and the bevel structure (e.g., the third surface 3-1113) of the first magnetic element 3-111 may prevent the first magnetic element 3-111 from colliding with the first coil 3-112 and/or the first fixing structure 3-72 and further prevent the first coil 3-112 from being damaged.

The second magnetic element 3-121 may be a permanent magnet. The second magnetic element 3-121 may be elongated. The second magnetic element 3-121 may have a bevel. The second magnetic elements 3-121 are disposed on the first side 3-1001, the second side 3-1002, and the third side 3-1003. The second coils 3-122 correspond to the second magnetic elements 3-121, so that the second coils 3-122 are also disposed on the first side 3-1001, the second side 3-1002, and the third side 3-1003. The second coils 3-122 are disposed in a circuit board. In FIG. 32, such circuit board is not shown.

The second positioning structure 3-87 of the frame 3-80 is used for positioning the second magnetic element 3-121. The second stopper 3-82 of the frame 3-80 is used for limiting the range of motion of the first movable part 3-M1. The second magnetic element 3-121 located on the second side 3-1002 includes a fourth surface 3-1214, a fifth surface 3-1215, a sixth surface 3-1216, and a seventh surface 3-1217. The fourth surface 3-1214 has a planar structure and faces the first movable part 3-M1. The fifth surface 3-1215 and the fourth surface 3-1214 face opposite directions. The sixth surface 3-1216 has a planar structure. The sixth surface 3-1216 and the fourth surface 3-1214 are neither parallel nor perpendicular. The seventh surface 3-1217 has a planar structure. The seventh surface 3-1217 and the fourth surface 3-1214 are neither parallel nor perpendicular. The seventh surface 3-1217 and the sixth surface 3-1216 are not parallel. The sixth surface 3-1216 and the seventh surface 3-1217 face the second positioning structure 3-87.

In detail, the portion of the frame 3-80 that covers the second magnetic element 3-121 may be defined as the second positioning structure 3-87, but only the portion of the frame 3-80 that is adjacent to the fifth surface 3-1215 of the second magnetic element 3-121 may be defined as the second stopper 3-82. Thus, the second positioning structure 3-87 and the second stopper 3-82 are integrally formed. The second stopper 3-82 is located between the second magnetic element 3-121 and the second side 3-1002 of the base 3-100. In the first direction 3-A1, the minimum distance between the second stopper 3-82 and the immovable part 3-I is less than the minimum distance between the second magnetic element 3-121 and the immovable part 3-I. As shown in FIG. 31, the first stopper 3-81 completely covers the third surface 3-1113 of the first magnetic element 3-111, however, the fifth surface 3-1215 of the second magnetic element 3-121 is revealed from the second stopper 3-82. When viewed from a direction that is perpendicular to the fifth surface 3-1215, the fifth surface 3-1215 does not overlap the second stopper 3-82.

In some embodiments, the optical system 3-1000 further includes a plurality of adhesion elements 3-160 (only shown in FIG. 32 in dotted lines). The adhesion element 3-160 may be made of an adhesion material, a conductive material, or an insulation material, such as resin, optical glue, and the like. Different elements may be adhered to each other by the adhesion element 3-160, and thus the connection between different elements is strengthened. Furthermore, the adhesion element 3-160 generally has good elasticity and good covering ability and thus the adhesion element 3-160 may protect the element(s). Additionally, the adhesion element 3-160 may reduce the probability of particles such as dust or mist entering the element(s). If the adhesion element 3-160 is made of an insulation material, insulation may be achieved. The steps for applying the adhesion element 3-160 is generally referred to as "glue dispensing", which may be conducted manually or mechanically.

The adhesion element 3-160 may be applied to the space between the first positioning structure 3-86 of the frame 3-80 and the first magnetic element 3-111. Alternatively, the adhesion element 3-160 may also be applied to the space between the second positioning structure 3-87 of the frame 3-80 and the second magnetic element 3-121. As shown in FIG. 32, the adhesion element 3-160 applied to the space between the second positioning structure 3-87 of the frame 3-80 and the second magnetic element 3-121 may adhere the first elastic element 3-60, the frame 3-80, and the second magnetic element 3-121 at same time. Accordingly, the adhesion element 3-160 only need to be applied to the frame 3-80 (i.e., glue dispensing) at a time, and multiple elements are adhered to each other at the same time. Not only the process is simplified, the production efficiency is enhanced, but also the adhesive strength is increased.

Next, please refer to FIG. 24, FIG. 12, and FIG. 30 to understand the first position sensing mechanism 3-S1 (including the first position sensing assembly 3-130, the second position sensing assembly 3-140, and the third position sensing assembly 3-150). The positions of the first sensing element 3-132, the second sensing element 3-142, and the third sensing element 3-152 correspond to the positions of the first reference element 3-131, the second reference element 3-141, and the third reference element 3-151 position, respectively. As described above, the first reference element 3-131 is disposed on the holder 3-70, and the first sensing element 3-132 is disposed on the frame 3-80. The second reference element 3-141 (it is also the first magnetic element 3-111 and the second magnetic element 3-121) and the third reference element 3-151 (it is also the second magnetic element 3-121) are disposed on the frame 3-80, and the second sensing element 3-142 and the third sensing element 3-152 are disposed on the second body 3-302 of the second circuit assembly 3-30.

The first reference element 3-131, the second reference element 3-141, and the third reference element 3-151 may be a magnet. The first sensing element 3-132, the second sensing element 3-142, and the third sensing element 3-152 may be a Hall element, a Hall sensor, a giant magnetoresistance (GMR) element, a GMR sensor, a tunneling magnetoresistance (TMR) element, a TMR sensor, etc. A Hall sensor, a GMR sensor, or a TMR sensor means that other elements such as an amplifier circuit, a temperature-compensation circuit, and a power voltage-stabilization circuit are integrated into the sensor in addition to the Hall element, the GMR element, and the TMR element. Such a sensor is referred to as an All-in-One integrated circuit (All-in-One IC). After current is supplied to an All-in-One IC, the All-in-One IC may supply the current to the other elements. Additionally, the All-in-One IC has the ability to control other elements. In some embodiments, the first sensing element 3-132 has the ability to control other elements, and the second sensing element 3-142 and the third sensing element 3-152 lack the ability to control other elements, but the present disclosure is not limited thereto. The first sensing element 3-132 is used for sensing a first magnetic field generated by the first reference element 3-131. The second sensing element 3-142 is used for sensing a second magnetic field generated by the second reference element 3-141. The third sensing element 3-152 is used for sensing a third magnetic field generated by the third reference element 3-151.

When the holder 3-70 moves, the first reference element 3-131 disposed on the holder 3-70 also moves, and thus the first magnetic field generated by the first reference element 3-131 changes. When the frame 3-80 moves, the second reference element 3-141 and the third reference element 3-151 disposed on the frame 3-80 also move, and thus the second magnetic field and the third magnetic field generated by the second reference element 3-141 and the third reference element 3-151 change. The first sensing element 3-132, the second sensing element 3-142, and the third sensing element 3-152 may sense the change of the first magnetic field, the second magnetic field, and the third magnetic field, respectively, so as to know the positions of the holder 3-70 and/or the frame 3-80. In some embodiments, the first sensing element 3-132, the second sensing element 3-142, and the third sensing element 3-152 may adjust the positions of the holder 3-70 and/or the frame 3-80 in order to enhance control accuracy.

As shown in FIG. 29, when viewed from the primary axis 3-P, the first position sensing assembly 3-140 is located on the fourth side 3-1004, for sensing the movement of the holder 3-70 relative to the frame 3-80 in the primary axis 3-P. As shown in FIG. 24 and FIG. 30, when viewed from the primary axis 3-P, the second position sensing assembly 3-140 is located on the first side 3-1001, for sensing the movement of the frame 3-80 relative to the immovable part 3-I in the third direction 3-A3. As shown in FIG. 24 and FIG. 30, the third position sensing assembly 3-150 is located on the second side 3-1002, for sensing the movement of the frame 3-80 relative to the immovable part 3-I in the fourth direction 3-A4.

Figure 33:
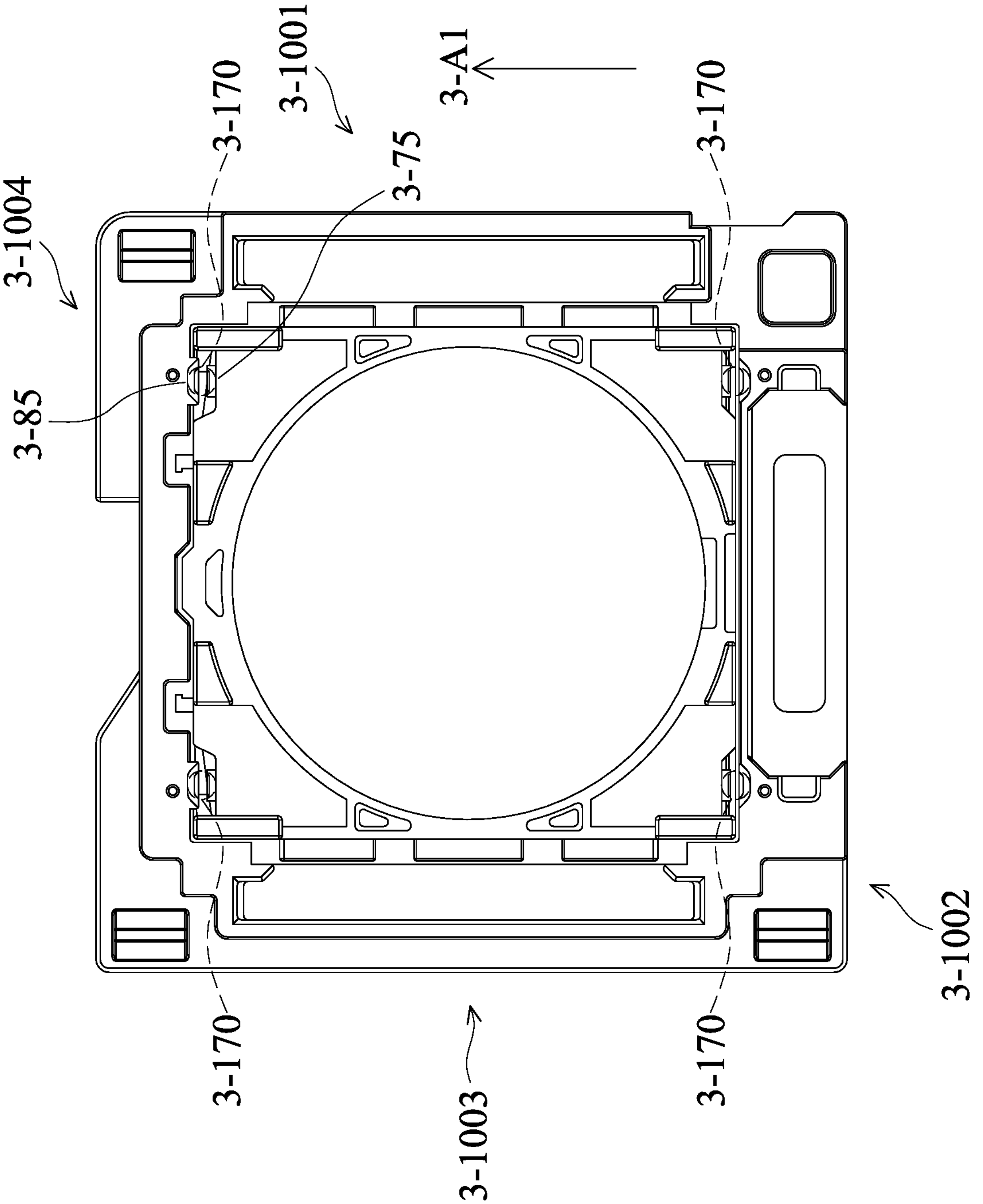
FIG. 33 is a top view of the holder and the frame.

Next, please refer to FIG. 33. FIG. 33 is a top view of the holder 3-70 and the frame 3-80. In some embodiments, the optical system 3-1000 further includes a plurality of damping elements 3-170 (only shown in FIG. 33 in dotted lines). The damping elements 3-170 are made of a material that may absorb shock (e.g. a gel) and may inhibit vibration, so the damping elements 3-170 may restrain the first movable part 3-M1 from generating abnormal vibration. When the optical system 3-1000 is impacted by an external force, the damping elements 3-170 may prevent a severe collision between the holder 3-70 and the frame 3-80. Furthermore, the damping elements 3-170 may help the holder 3-70 and the frame 3-80 to return to their original positions quickly when they are impacted and may prevent the first optical element 3-1 in the holder 3-70 from being unstable. Therefore, the damping elements 3-170 may improve the reaction time and the accuracy of the holder 3-70 and the frame 3-80 during their movement The first accommodating portion 3-75 of the holder 3-70 is used for receiving at least part of the damping elements 3-170. When viewed from the primary axis 3-P, the damping elements 3-170 are located on the second side 3-1002 and the fourth side 3-1004. The second accommodating portion 3-85 of the frame 3-80 is used for receiving at least part of the damping elements 3-170. When viewed from the first direction 3-A1, at least part of the first accommodating portion 3-75 does not overlap the second accommodating portion 3-85, in order to receive the damping elements 3-170. The size of the first accommodating portion 3-75 in the primary axis 3-P is different from the size of the second accommodating portion 3-85 in the primary axis 3-P. For example, the size of the first accommodating portion 3-75 in the primary axis 3-P is less than the size of the second accommodating portion 3-85 in the primary axis 3-P. As a result, when the holder 3-70 moves relative to the frame 3-80, the damping elements 3-170 in the first accommodating portion 3-75 may move smoothly relative to the damping elements 3-170 in the second accommodating portion 3-85 and do not drop off from the first accommodating portion 3-75.

Figure 34:
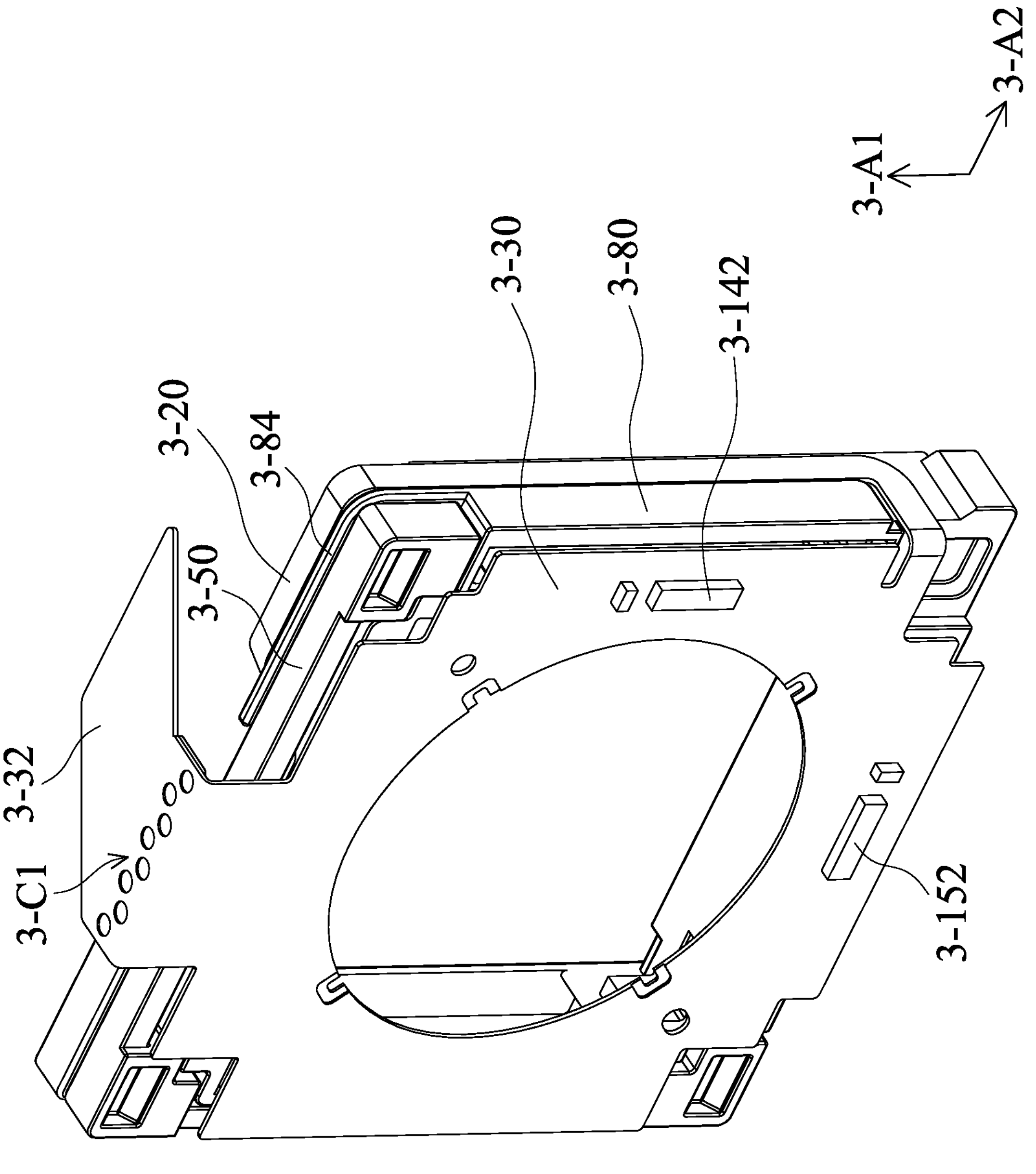
FIG. 34 and FIG. 35 are perspective views of the first circuit mechanism, the supporting element, the frame, the second sensing element, and the third sensing element from different perspectives.
Figure 35:
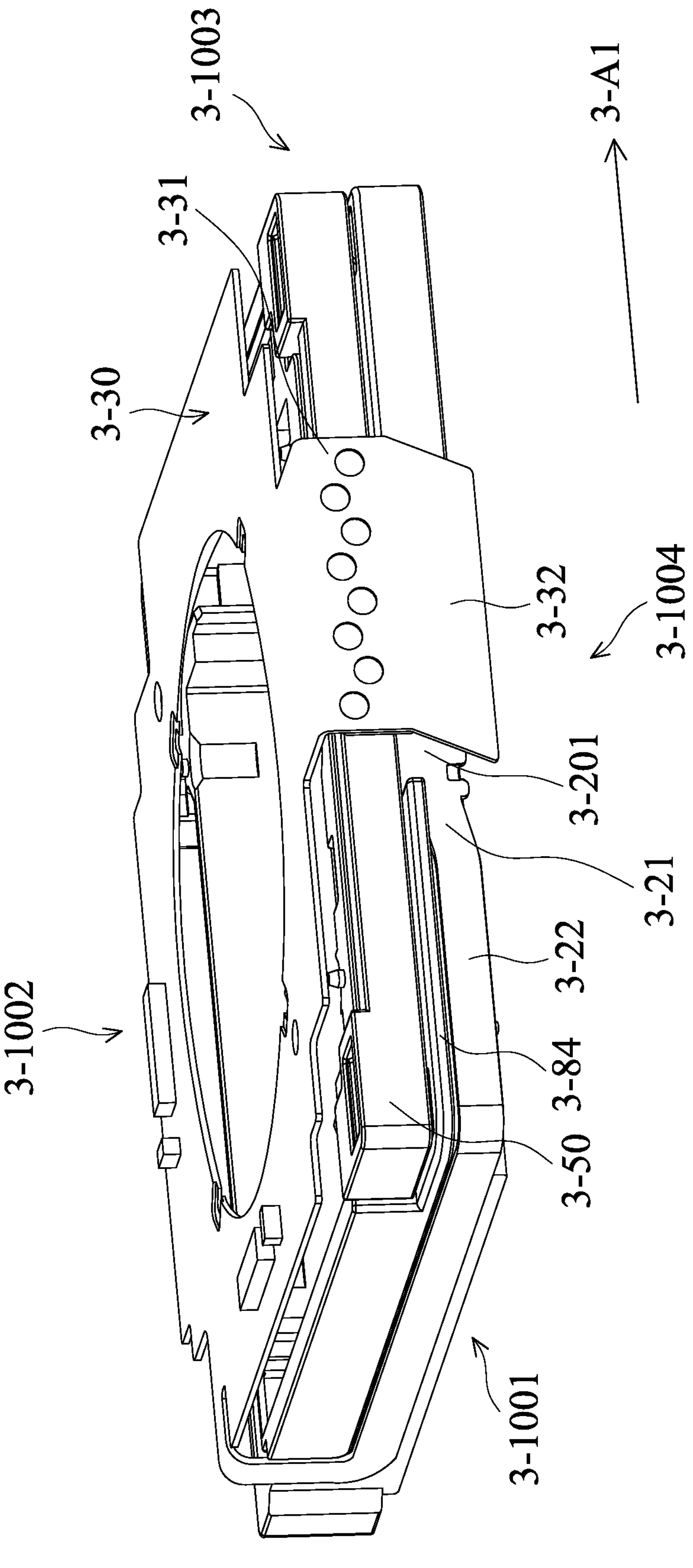

Next, please refer to FIG. 34 and FIG. 35 to understand the fourth stopper 3-84 of the frame 3-80. FIG. 34 and FIG. 35 are perspective views of the first circuit mechanism 3-C1, the supporting element 3-50, the frame 3-80, the second sensing element 3-142, and the third sensing element 3-152 from different perspectives.

As shown in FIG. 34 and FIG. 35, when viewed from the primary axis 3-P, the fourth stopper 3-84 is located on the fourth side 3-1004. The fourth stopper 3-84 is used for limiting the range of motion of the first movable part 3-M1 relative to the immovable part 3-I. Also, when viewed from a direction that is perpendicular to the primary axis 3-P, the fourth stopper 3-84 is located between the first section 3-21 of the first circuit assembly 3-20 and the supporting element 3-50, and the fourth stopper 3-84 is also located between the second section 3-22 of the first circuit assembly 3-20 and the supporting element 3-50, so that the fourth stopper 3-84 is able to limit the range of motion of the supporting element 3-50 relative to the first circuit assembly 3-20. Furthermore, the minimum distance between the fourth stopper 3-84 and the immovable part 3-I in the first direction 3-A1 is less than the minimum distance between the first circuit assembly 3-20 and the immovable part 3-I in the first direction 3-A1, thereby preventing the first circuit assembly 3-20 from colliding with the base 3-100. Similarly, the minimum distance between the fourth stopper 3-84 and the base 3-100 in the first direction 3-A1 is less than the minimum distance between the supporting element 3-50 and the immovable part 3-I in the first direction 3-A1, thereby preventing the supporting element 3-50 from colliding with the base 3-100.

Figure 36:
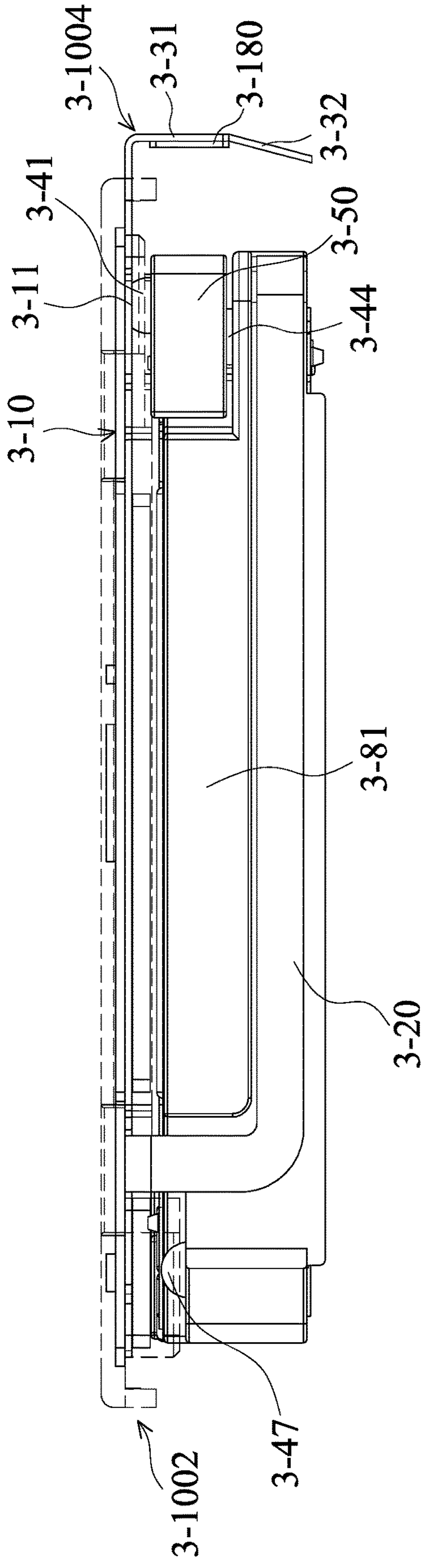
FIG. 36 is a side view of the optical system with some elements omitted.
Figure 37:
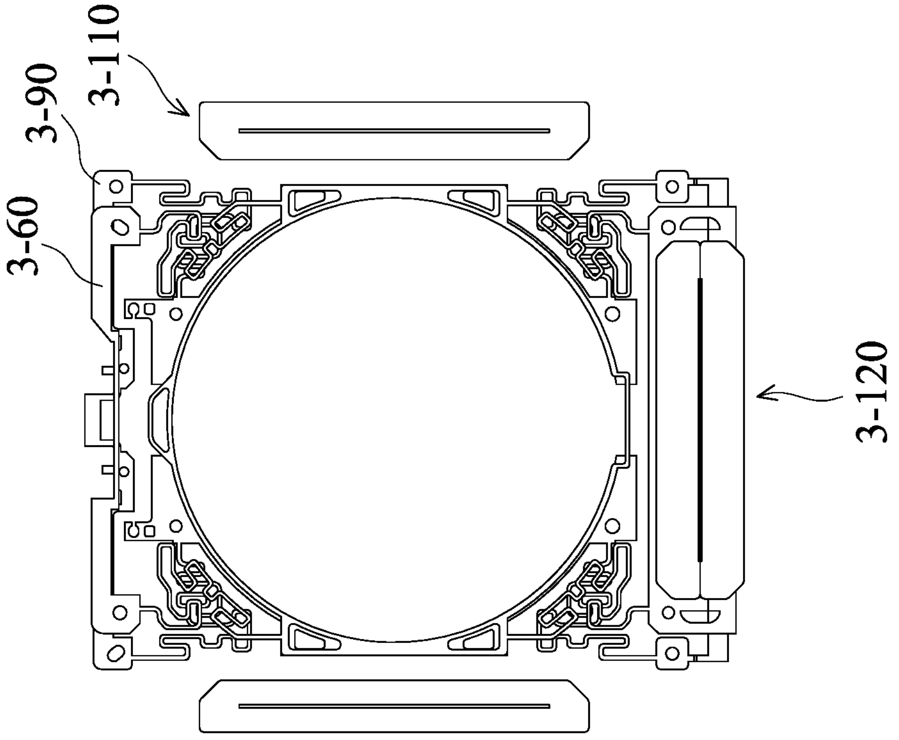
FIG. 37 is a top view of the optical system with some elements omitted.

Next, please refer to FIG. 36 and FIG. 37 to understand some other features of the optical system 3-1000. FIG. 36 is a side view of the optical system 3-1000 with some elements omitted. FIG. 37 is a top view of the optical system 3-1000 with some elements omitted. As shown in FIG. 36, when viewed from a direction that is perpendicular to the primary axis 3-P, the first intermediate element 3-41 at least partially overlaps the case structural strengthening element 3-11. In addition, the optical system 3-1000 may include an attach element 3-180. The attach element 3-180 may be a double-sided tape. The attach element 3-180 may be disposed on the surface of the first external circuit 3-31 of the second circuit assembly 3-30 that faces the first movable part 3-M1 to attach to other elements, such as the third circuit assembly 3-280 as shown in FIG. 21. As shown in FIG. 36, when viewed from the primary axis 3-P, at least part of the first circuit assembly 3-20 overlaps the first stopper 3-81. When viewed from the second direction 3-A2, the first circuit assembly 3-20 does not overlap the first stopper 3-81.

As shown in FIG. 37, when viewed from the primary axis 3-P, the first elastic element 3-60 does not overlap the first drive assembly 3-110, and the first elastic element 3-60 at least partially overlaps the second drive assembly 3-120. When viewed from the primary axis 3-P, the second elastic element 3-90 does not overlap the first drive assembly 3-110, and the second elastic element 3-90 does not overlap the second drive assembly 3-120.

The first drive mechanism 3-D1 and the second drive mechanism 3-D2 of the optical system 3-1000 of the present disclosure generate drive force by different methods. One of the first drive mechanism 3-D1 and the second drive mechanism 3-D2 has a magnetic material, and the other one of the first drive mechanism 3-D1 and the second drive mechanism 3-D2 does not have a magnetic material. For example, the first drive mechanism 3-D1 makes use of magnetic elements and coils to drive the first movable part 3-M1 to move relative to the immovable part 3-I, while the second drive mechanism 3-D2 makes use of bias elements to drive the second movable part 3-M2 to move relative to the immovable part 3-I.

An optical system is provided. There is no any magnetic element and coil disposed on one side of the optical system. The first drive mechanism effectively drives the first movable part to achieve AF and OIS. The first circuit mechanism includes a special shape and structure. The first position sensing mechanism may sense the movement of the holder and/or the frame. The structural strengthening element may strengthen the structural strength of the element and may accomplish positioning. In addition, the second drive mechanism effectively drives the second movable part to achieve AF, OIS, tilt correction, etc. Moreover, at least part of the second optical element may be accommodated in the opening of the second movable part, so the overall height of the optical system of the present disclosure may be reduced to achieve miniaturization.

The Fourth Group of Embodiments

Figure 38:
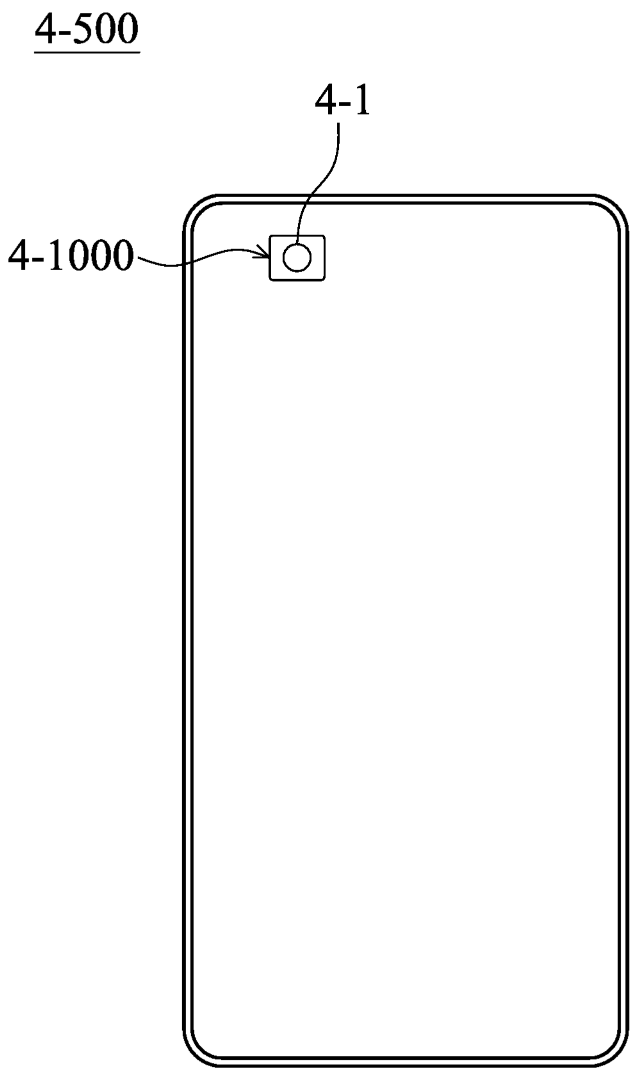
FIG. 38 is a schematic view of the electronic device and the optical system.

FIG. 38 is a schematic view of an electronic device 4-500 and an optical system 4-1000. The electronic device 4-500 may be a tablet computer, a smart phone, etc. The optical system 4-1000 is typically placed in the top region of the electronic device 4-500.

Figure 39:
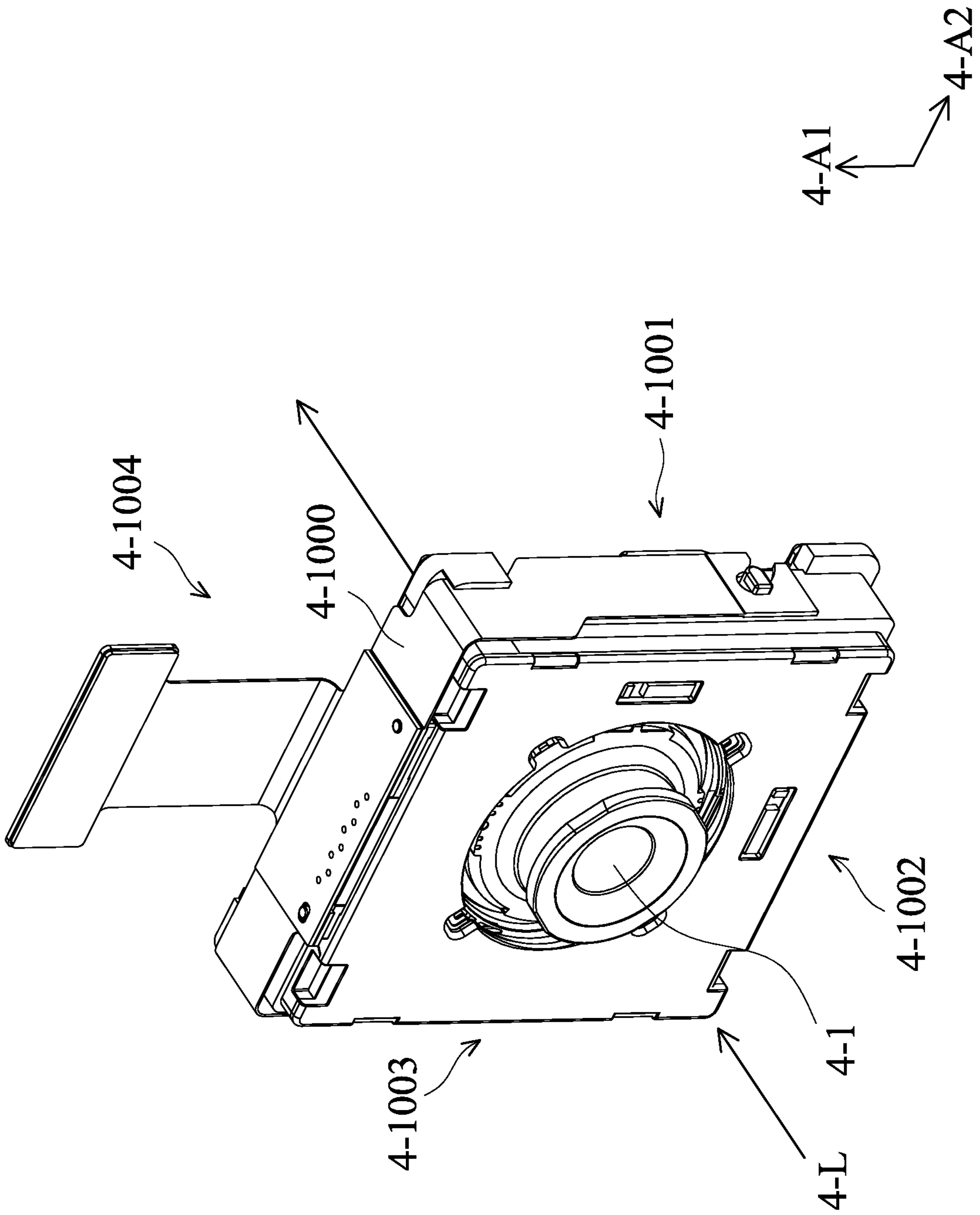
FIG. 39 is a schematic view of the optical system and the first optical element.

FIG. 39 is a schematic view of the optical system 4-1000 and a first optical element 4-1. The optical system 4-1000 may hold the first optical element 4-1 and drive the first optical element 4-1 to move, so as to adjust the position of the first optical element 4-1 to capture a clear image. In the technical field, the optical system 4-1000 may be referred to as a Voice Coil Motor (VCM). In FIG. 39, an arrow is illustrated to show the travel direction of a light 4-L that enters the optical system 4-1000.

The first optical element 4-1 may be a lens. The first optical element 4-1 is only illustrated in FIG. 39. The first optical element 4-1 may be made of plastic or glass. The first optical element 4-1 may be circular. In some embodiments, to reduce production costs, to reduce the weight of the first optical element 4-1, to be placed in the optical system 4-1000, or other reasons, the first optical element 4-1 may include two straight cutting portions formed on the opposite sides. The straight cutting portions may be formed by cutting process or the like.

Figure 40:
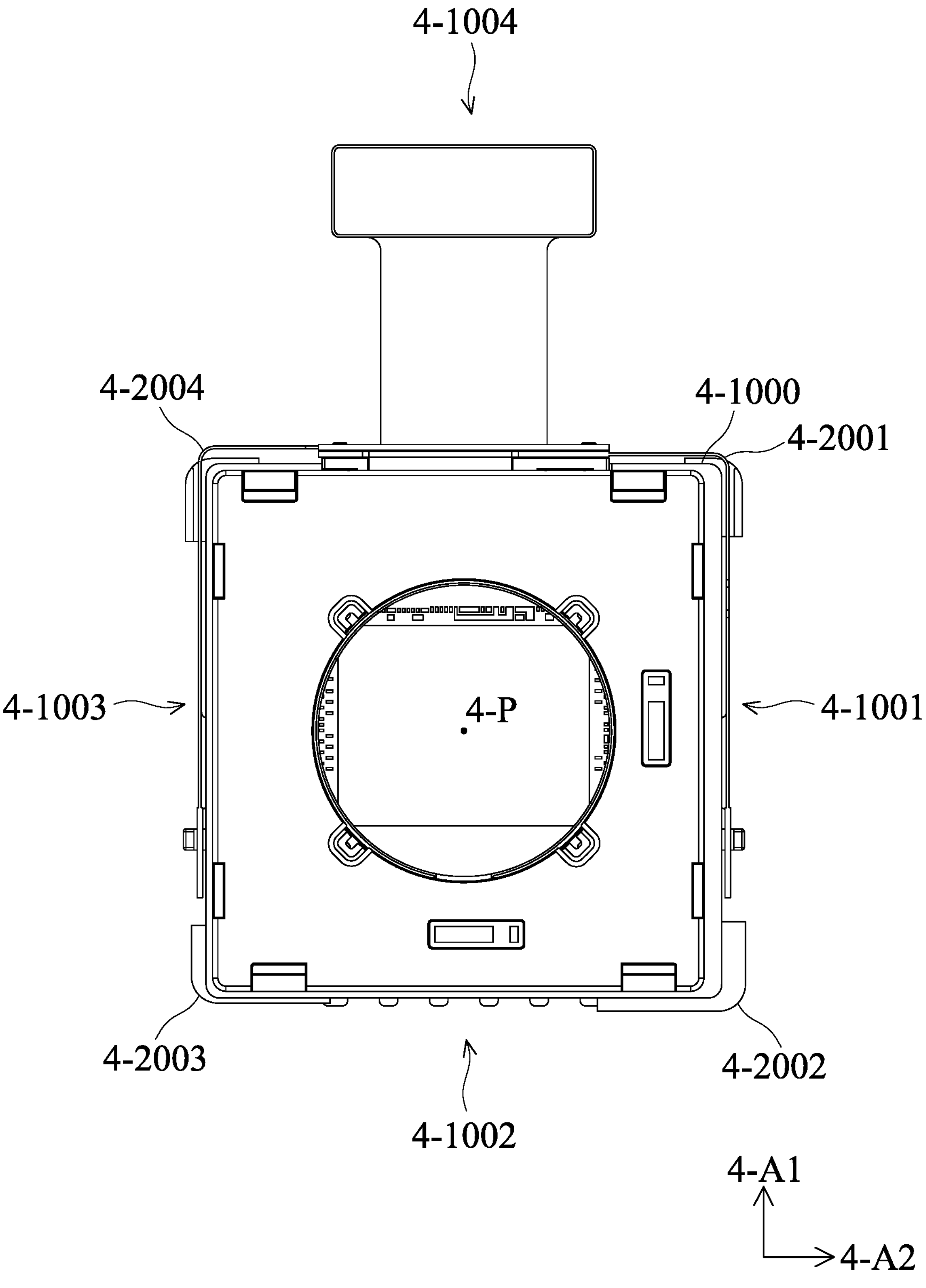
FIG. 40 is a top view of the optical system.

FIG. 40 is a top view of the optical system 4-1000. The optical system 4-1000 has a primary axis 4-P. The primary axis 4-P is an imaginary axis that passes through the entire optical system 4-1000 and is perpendicular to the optical system 4-1000. The primary axis 4-P is illustrated and described in the drawings and the following to explain the related features of the optical system 4-1000. When viewed from the primary axis 4-P, the optical system 4-1000 is polygonal, such as quadrilateral. For the convenience of explanation, the four sides of the optical system 4-1000 are defined as a first side 4-1001, a second side 4-1002, a third side 4-1003, and a fourth side 4-1004. The first side 4-1001 is opposite to the third side 4-1003, and the second side 4-1002 is opposite to the fourth side 4-1004. That, the second side 4-1002 and the fourth side 4-1004 are located between the first side 4-1001 and the third side 4-1003. The first side 4-1001 and the third side 4-1003 extend along a first direction 4-A1, and the second side 4-1002 and the fourth side 4-1004 extend along a second direction 4-A2. The second direction 4-A2 is not parallel with but perpendicular to the first direction 4-A1.

Also, the four corners of the optical system 4-1000 are defined as a first corner 4-2001, a second corner 4-2002, a third corner 4-2003, and a fourth corner 4-2004, respectively. The first corner 4-2001 is located between the first side 4-1001 and the fourth side 4-1004. The second corner 4-2002 is located between the first side 4-1001 and the second side 4-1002. The third corner 4-2003 is located between the second side 4-1002 and the third side 4-1003. The fourth corner 4-2004 is located between the third side 4-1003 and the fourth side 4-1004.

Figure 41:
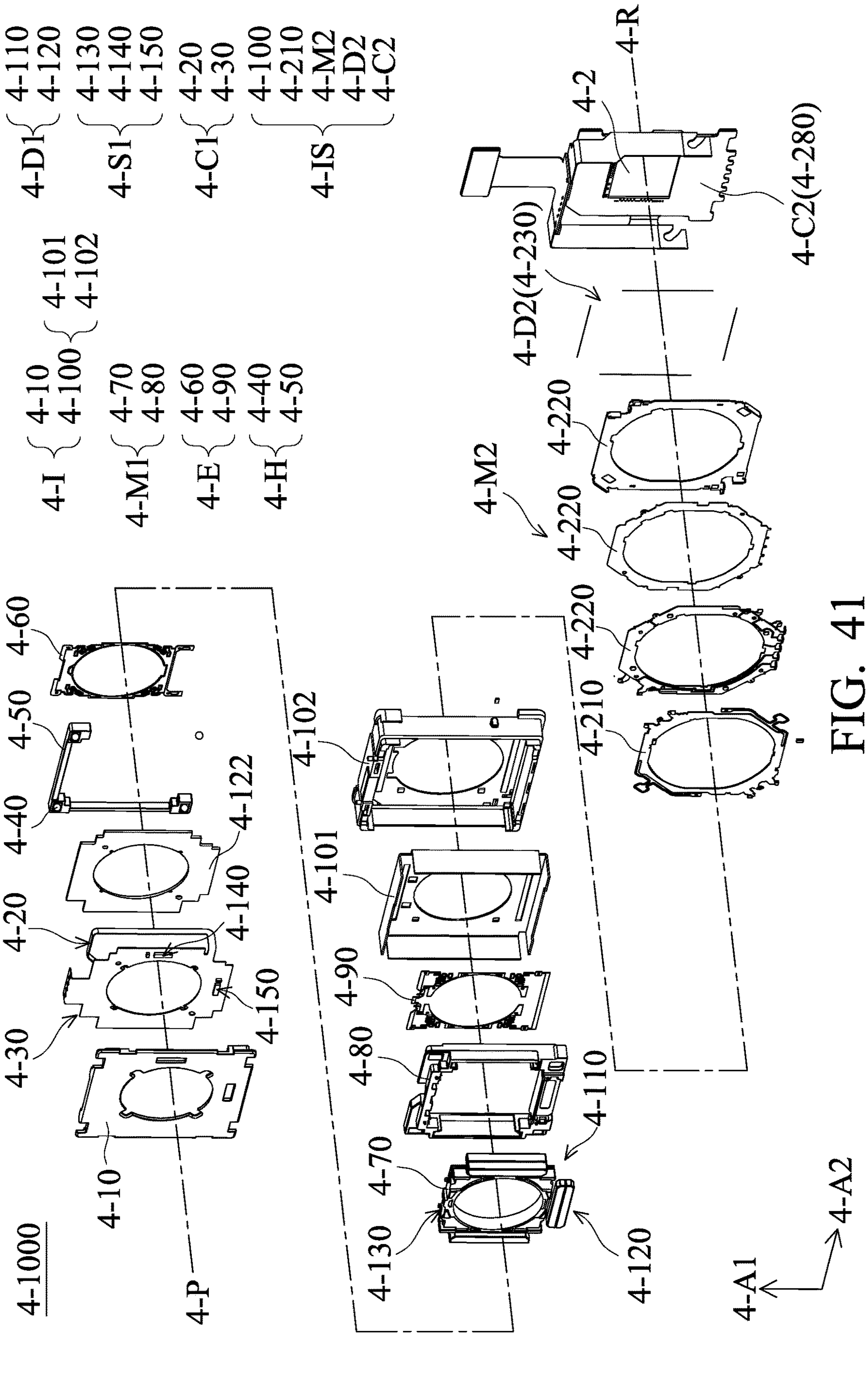
FIG. 41 is an exploded view of the optical system.

Please refer to FIG. 41 to understand the optical system 4-1000. FIG. 41 is an exploded view of the optical system 4-1000. In this embodiment, the optical system 4-1000 includes an immovable part 4-I, a first movable part 4-M1, an elastic element 4-E, a supporting assembly 4-H, a first drive mechanism 4-D1, The first position sensing mechanism 4-S1, a first circuit mechanism 4-C1, and a second optical element module 4-IS. The first movable part 4-M1 is used for connected to a first optical element 4-1. The elastic assembly 4-E is elastically connected to the first movable part 4-M1. The first movable part 4-M1 is movable relative to the immovable part 4-I via the supporting assembly 4-H and the first drive mechanism 4-D1. The first position sensing mechanism 4-S1 may sense the movement of the first movable part 4-M1 relative to the immovable part 4-I. The first circuit mechanism 4-C1 is electrically connected to the first drive mechanism 4-D1. After the light 4-L enters the optical system 4-1000, the light 4-L is converted to an image on the second optical element module 4-IS.

In this embodiment, the immovable part 4-I includes a case 4-10 and a base 4-100. The first movable part 4-M1 includes a holder 4-70 and a frame 4-80. The case 4-10, the holder 4-70, the frame 4-80, and the base 4-100 are sequentially arranged along the primary axis 4-P. The elastic assembly 4-E includes a first elastic element 4-60 and a second elastic element 4-90. The supporting assembly 4-H includes an intermediate assembly 4-40 (details can be seen in FIG. 8, the intermediate assembly 4-40 includes a first intermediate element 4-41, a second intermediate element 4-42, a third intermediate element 4-43, a fourth intermediate element 4-44, a fifth intermediate element 4-45, a sixth intermediate element 4-46, and a seventh intermediate element 4-47) and a supporting element 4-50. The first drive mechanism 4-D1 includes a first drive assembly 4-110 and a second drive assembly 4-120. The first drive assembly 4-110 includes at least a first magnetic element 4-111 and at least a first coil 4-112, and the second drive assembly 4-120 includes at least a second magnetic element 4-121 and at least a second coil 4-122 (details can be seen in FIG. 50). The first position sensing mechanism 4-S1 includes a first position sensing assembly 4-130, a second position sensing assembly 4-140, and a third position sensing assembly 4-150. The first position sensing assembly 4-130 includes a first reference element 4-131 and a first sensing element 4-132. The second position sensing assembly 4-140 includes a second reference element 4-141 and a second sensing element 4-142. The third position sensing assembly 4-150 includes a third reference element 4-151 and a third sensing element 4-152. The first circuit mechanism 4-C1 includes a first circuit assembly 4-20 and a second circuit assembly

4-30. It should be understood that elements may added or removed according to actual needs.

It should be noted that, the magnetic element disposed on the first side 4-1001 is the first magnetic element 4-111 of the first drive assembly 4-110, the second magnetic element 4-121 of the second drive assembly 4-120, and the second reference element 4-141 of the second sensing assembly 4-140 at the same time. The magnetic element disposed on the second side 4-1002 is the second magnetic element 4-121 of the second drive assembly 4-120 and the third reference element 4-151 of the third position sensing assembly 4-150 at the same time. The magnetic element disposed on the third side 4-1003 is the first magnetic element 4-111 of the first drive assembly 4-110 and the second magnetic element 4-121 of the second drive assembly 4-120 at the same time. As a result, since the first drive assembly 4-110, the second drive assembly 4-120, the second position sensing assembly 4-140, and the third position sensing assembly 4-150 share the same magnetic element(s), (the magnetic element may be used for both drive and sensing at the same time), the volume of the optical system 4-1000 may be reduced to achieve miniaturization.

Figure 42:
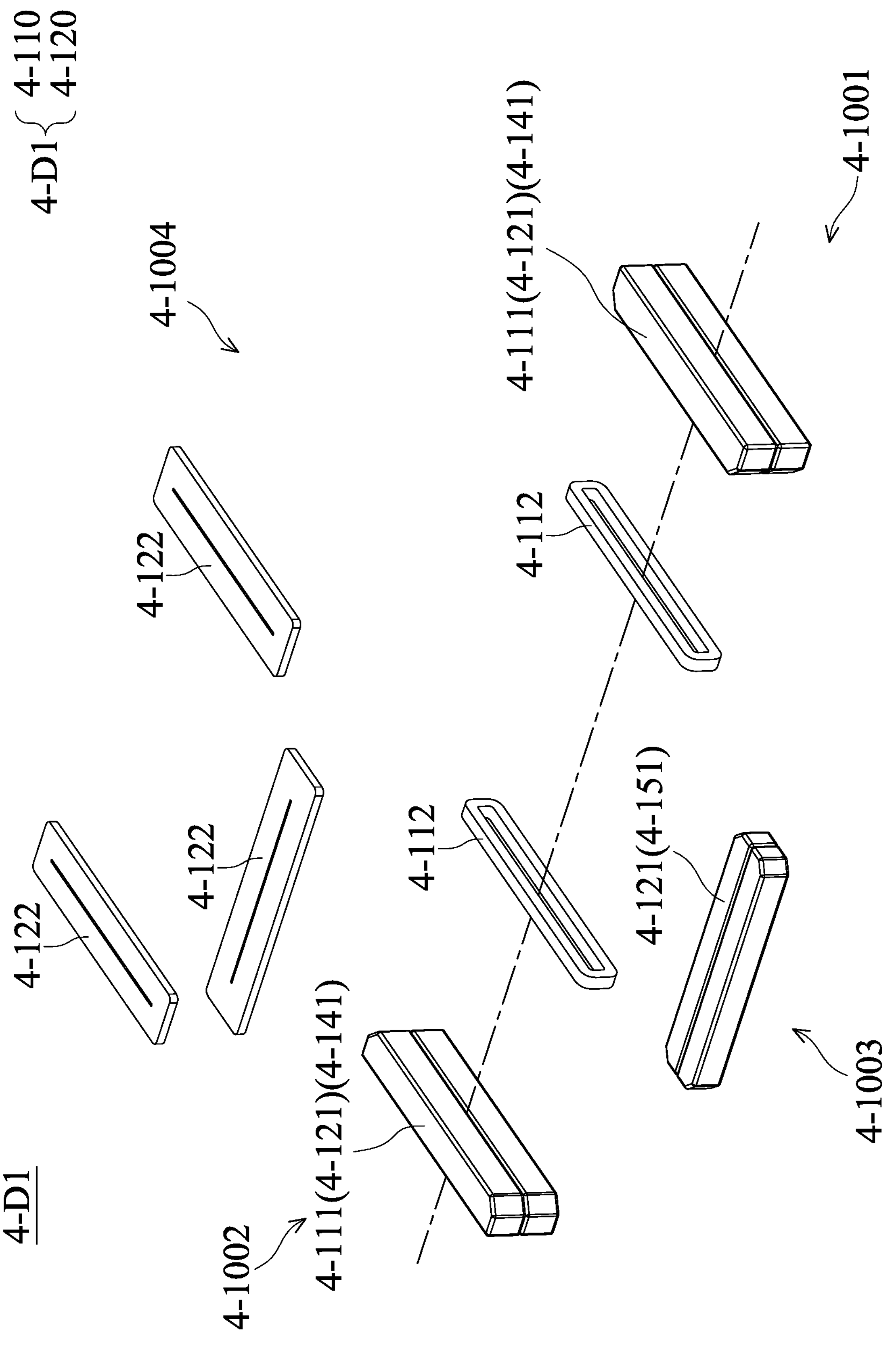
FIG. 42 is an exploded view of the first drive assembly and the second drive assembly.

FIG. 42 is an exploded view of the first drive assembly 4-110 and the second drive assembly 4-120. The first drive assembly 4-110 may drive the holder 4-70 to move relative to the frame 4-80 to achieve autofocus. The second drive assembly 4-120 may drive the first movable part 4-M1 to move relative to the immovable part 4-I to achieve optical image stabilization.

Figure 43:
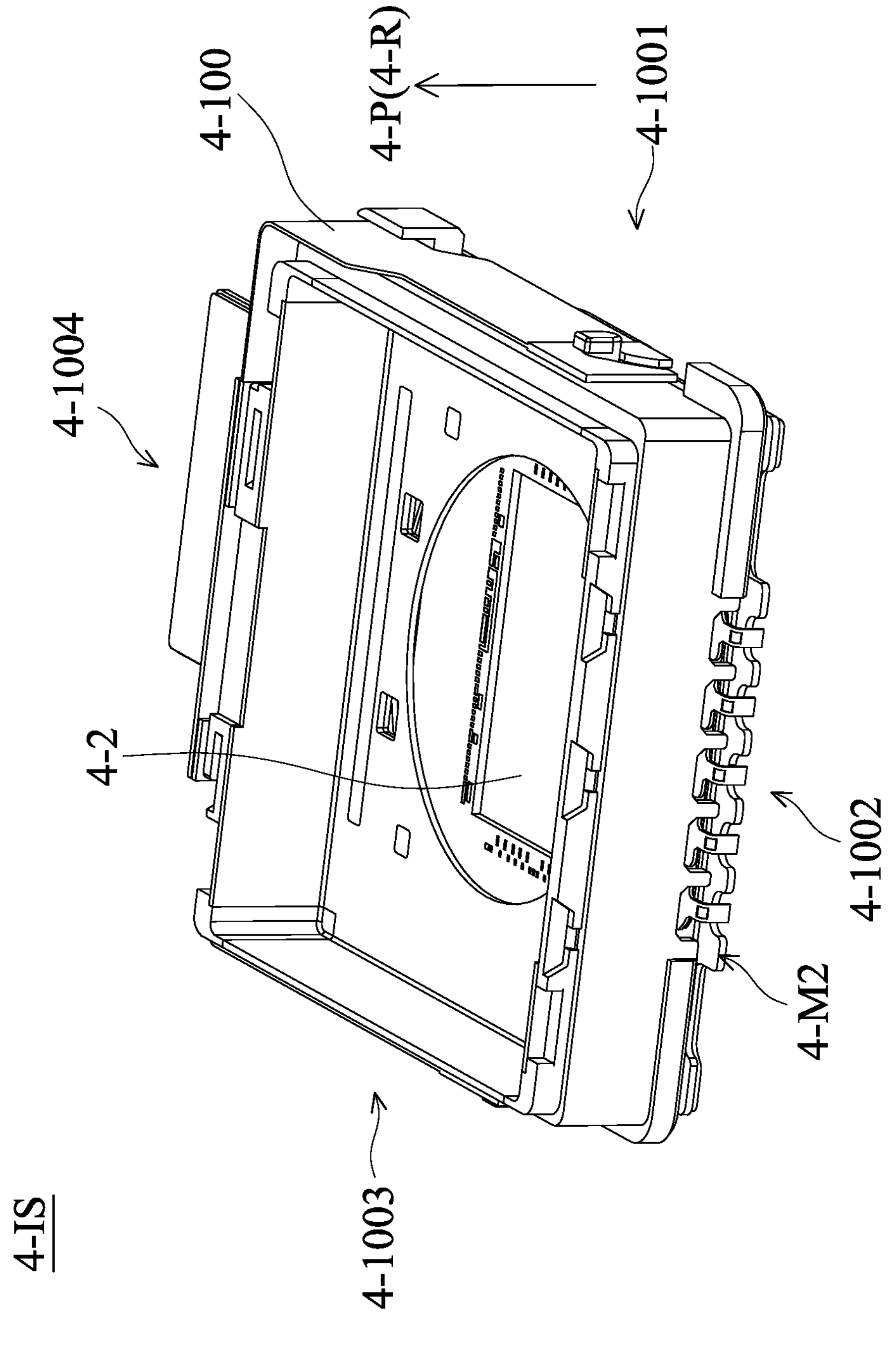
FIG. 43 is a perspective view of the second optical element module.

Please also refer to FIG. 43. FIG. 43 is a perspective view of the second optical element module 4-IS. The second optical element module 4-IS includes part of the immovable part 4-I (e.g. the base 4-100), a second movable part 4-M2, a second drive mechanism 4-D2, and a second circuit mechanism 4-C2. The immovable part 4-I and the second movable part 4-M2 are arranged along the primary axis 4-P. The second movable part 4-M2 is used for connected to a second optical element 4-2. The second optical element 4-2 may be an image sensor. The second movable part 4-M2 is located between the first side 4-1001 and the third side 4-1003. The second drive mechanism 4-D2 may drive the second movable part 4-M2 to move relative to the immovable part 4-I. For example, the second drive mechanism 4-D2 may be used to drive the second movable part 4-M2 to rotate relative to the immovable part 4-I around a rotation axis 4-R, and the rotation axis 4-R is parallel with the primary axis 4-P. In some embodiments, the rotation axis 4-R coincides with the primary axis 4-P. The second circuit mechanism 4-C2 is electrically connected to the second drive mechanism 4-D2.

Figure 44:
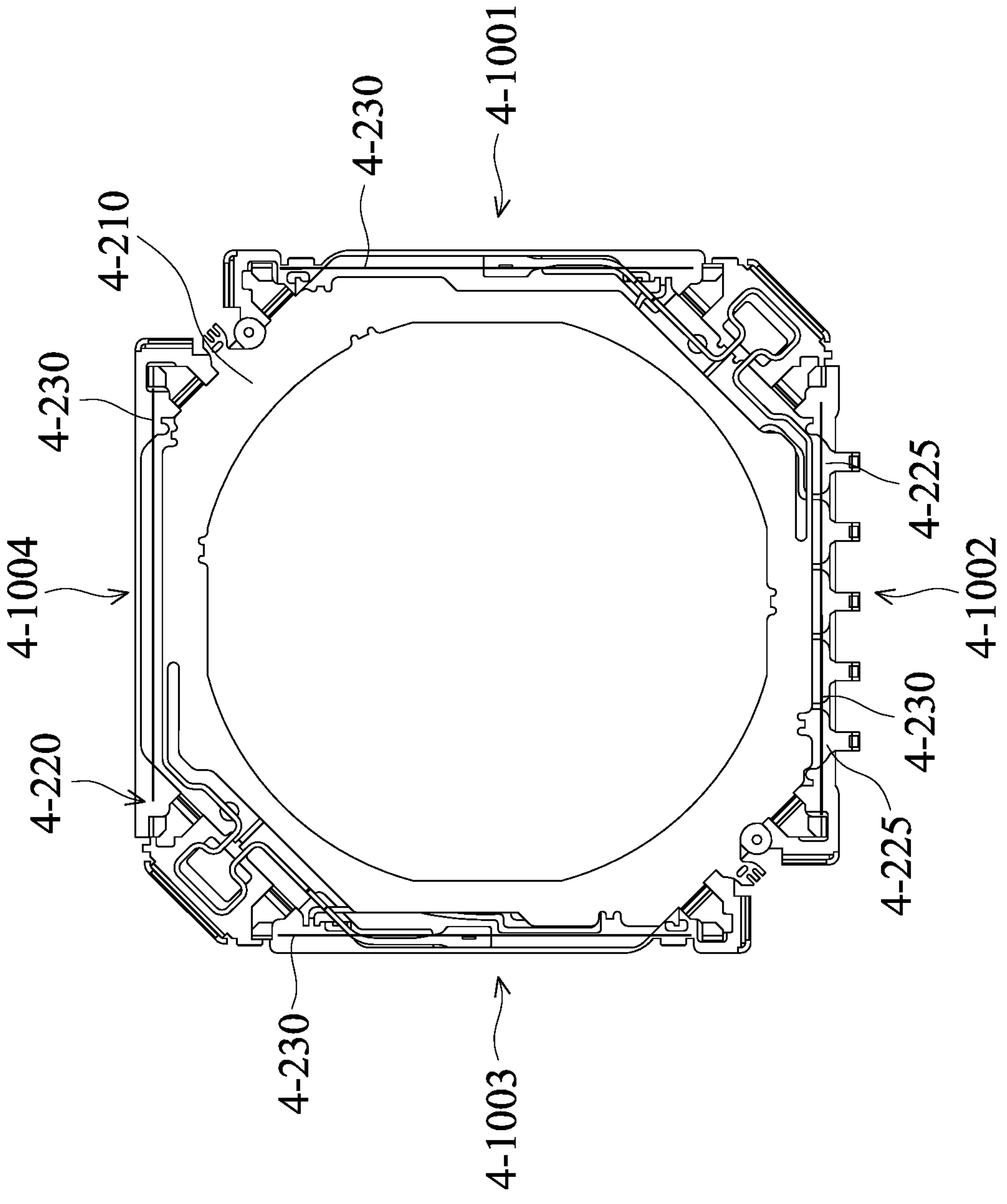
FIG. 44 is a schematic view of part of the second optical element module.

Please also refer to FIG. 44. FIG. 44 is a schematic view of part of the second optical element module 4-IS. In the second optical element module 4-IS, the immovable part 4-I includes an immovable board 4-210. The immovable board 4-210 is fixedly connected to the base 4-100. The second movable part 4-M2 includes a movable board 4-220. The movable board 4-220 may be a multilayer board. The second drive mechanism 4-D2 includes a plurality of bias elements 4-230. The movable board 4-220 is connected to the immovable board 4-210 via bias elements 4-230.

The bias elements 4-230 may include a shape memory alloy (SMA) material, such as a titanium-nickel (TiNi) alloy, a titanium-palladium (TiPd) alloy, a titanium-nickel (TiNiCu) alloy, a titanium-nickel-palladium (TiNiPd) alloy, or a combination thereof. Furthermore, a drive signal (e.g., current) may be applied to the bias elements 4-230 by a power source to change the lengths of the bias elements 4-230. Moreover, different drive signals may be applied to the bias elements 4-230 to independently control the lengths of each of the bias elements 4-230. For example, when the drive signal is applied to the bias elements 4-230, different bias elements 4-230 may produce the same or different change in length, and drive the movable board 4-220 to move relative to the base 4-100 and the immovable board 4-210 of the immovable part 4-I, thereby drive the second optical element 4-2 to move, including linear motion, rotation, etc., in order to achieve autofocus (AF), optical image stabilization (OIS), tilt correction, and the like.

Figure 45:
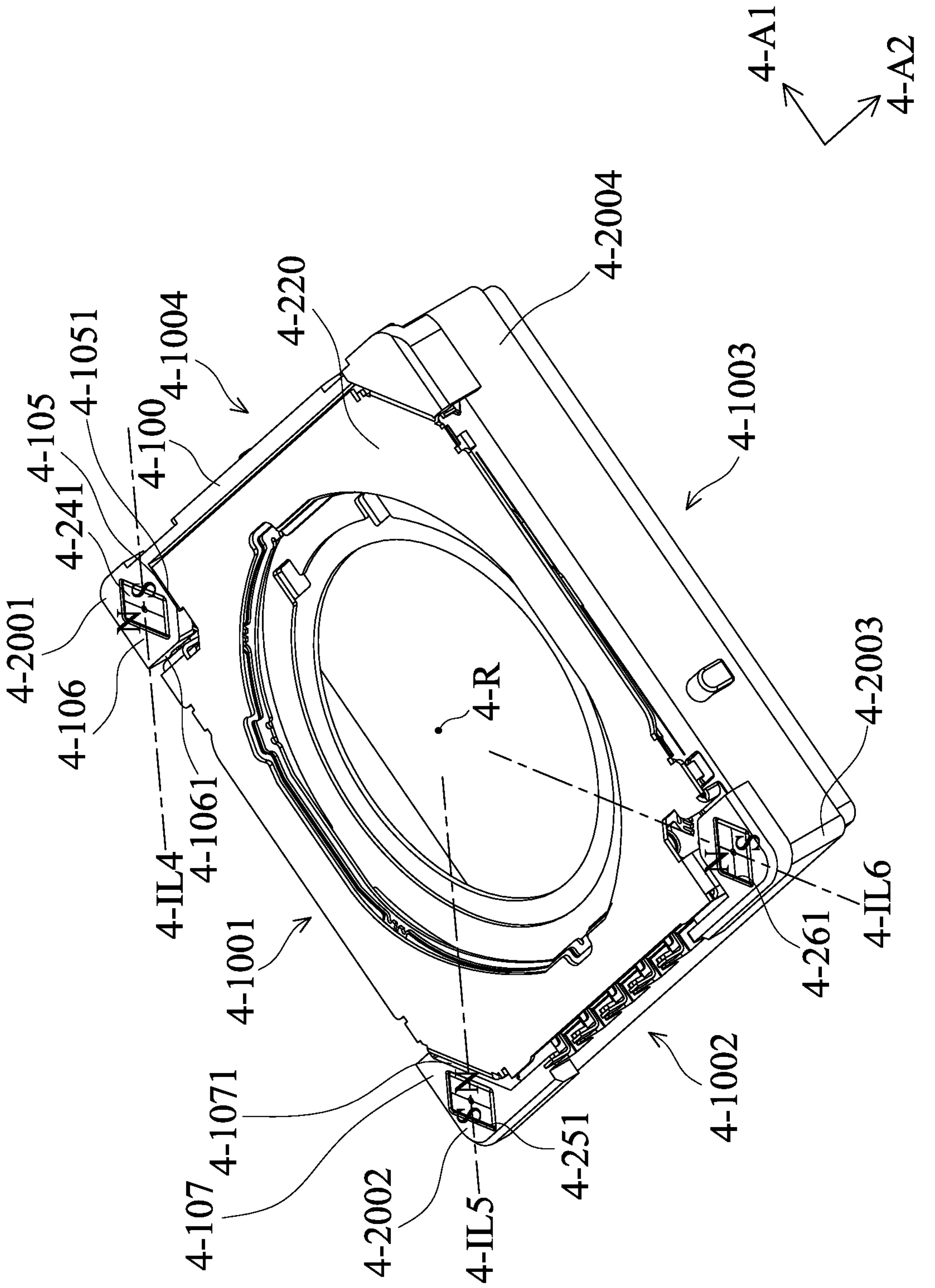
FIG. 45 is a bottom perspective view of part of the second optical element module.
Figure 46:
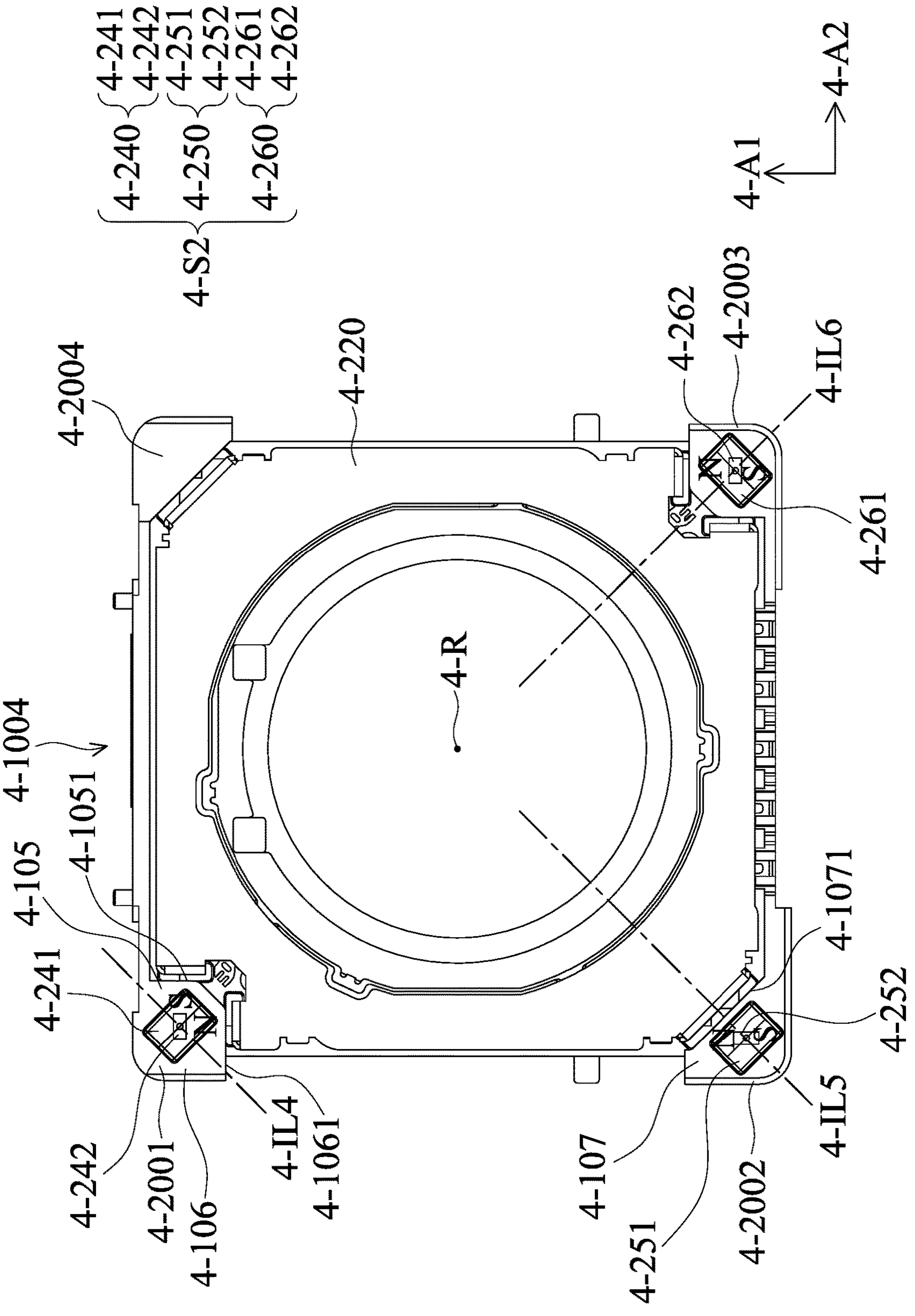
FIG. 46 is a bottom view of part of the second optical element module.

Next, please refer to FIG. 45 and FIG. 46. FIG. 45 is a bottom perspective view of part of the second optical element module 4-IS. FIG. 46 is a bottom view of part of the second optical element module 4-IS. In some embodiments, in order to sense the movement of the second movable part 4-M2 relative to immovable parts 4-I, the optical system 4-1000 further includes a second position sensing mechanism 4-S2. The second position sensing mechanism 4-S2 includes a fourth position sensing assembly 4-240, a fifth position sensing assembly 4-250, and a sixth position sensing assembly 4-260.

The fourth position sensing assembly 4-240 has a fourth reference element 4-241 and a fourth sensing element 4-242. The fourth reference element 4-241 includes a fourth N-pole and a fourth S-pole. The fifth position sensing assembly 4-250 has a fifth reference element 4-251 and a fifth sensing element 4-252. The fifth reference element 4-251 includes a fifth N-pole and a fifth S-pole. The sixth position sensing assembly 4-260 has a sixth reference element 4-261 and a sixth sensing element 4-262. The sixth reference element 4-261 includes a sixth N-pole and a sixth S-pole.

The fourth reference element 4-241, the fifth reference element 4-251, and the sixth reference element 4-261 may be a magnet. In some embodiments, the fourth reference element 4-241, the fifth reference element 4-251, and the sixth reference element 4-261 may be a multi-pole magnet. The fourth reference element 4-241, the fifth reference element 4-251, and the sixth reference element 4-261 are disposed on the base 4-100. The fourth sensing element 4-242 is used for sensing a fourth magnetic field generated by the fourth reference element 4-241. The fifth sensing element 4-252 is used for sensing a fifth magnetic field generated by the fifth reference element 4-251. The sixth sensing element 4-262 is used for sensing a sixth magnetic field generated by the reference element 4-261.

When viewed from the primary axis 4-P, the fourth sensing element 4-242 is located on the first corner 4-2001 of the base 4-100. When viewed from the primary axis 4-P, the fifth sensing element 4-252 is located on the second corner 4-2002 of the base 4-100. When viewed from the primary axis 4-P, the sixth sensing element 4-262 is located on the third corner 4-2003 of the base 4-100. When viewed from the primary axis 4-P, the rotation axis 4-R does not overlap the fourth reference element 4-241, the fifth reference element 4-251, and the sixth reference element 4-261.

When viewed from the primary axis 4-P, at least one of a fourth virtual connecting line 4-IL4 connecting the center of the fourth N-pole and the center of the fourth S-pole, a fifth virtual connecting line 4-IL5 connecting the center of the fifth N-pole and the center of the fifth S-pole, and a sixth virtual connecting line 4-IL6 connecting the center of the sixth N-pole and the center of the sixth S-pole does not pass through rotation axis 4-R. That is, at least one of the fourth virtual connecting line 4-IL4, the fifth virtual connecting line 4-IL5, and the sixth virtual connecting line 4-IL6 does not intersect with the rotation axis 4-R. For example, when viewed from the primary axis 4-P, the fourth virtual connecting line 4-IL4 does not pass through the rotation axis 4-R. When viewed from the primary axis 4-P, the other two of the fourth virtual connecting line 4-IL4, the fifth virtual connecting line 4-IL5, and the sixth virtual connecting line 4-IL6 pass through the rotation axis 4-R. For example, when viewed from the primary axis 4-P, the fifth virtual connecting line 4-IL5 and the sixth virtual connecting line 4-IL6 pass through the rotation axis 4-R.

When viewed from the primary axis 4-P, the fourth virtual connecting line 4-IL4 and the first side 4-1001 are neither parallel nor perpendicular. When viewed from the primary axis 4-P, the fourth virtual connecting line 4-IL4 and the fifth virtual connecting line 4-IL5 are parallel. When viewed from the primary axis 4-P, the fourth virtual connecting line 4-IL4 and the sixth virtual connecting line 4-IR6 are not parallel but perpendicular.

Also, when viewed from the primary axis 4-P, at least part of the first drive assembly 4-110 is located between the fourth position sensing assembly 4-240 and the fifth position sensing assembly 4-250. For example, when viewed from the primary axis 4-P, the first magnetic element 4-111 on the first side of 4-1001 is located between the fourth position sensing assembly 4-240 and the fifth position sensing assembly 4-250. Since the fourth reference element 4-241 is fixedly disposed on the base 4-100, so the first magnetic element 4-111 may move relative to the fourth reference element 4-241.

In addition, when viewed from the primary axis 4-P, at least part of the second drive assembly 4-120 is located between the fifth position sensing assembly 4-250 and the sixth position sensing assembly 4-260. For example, when viewed from the primary axis 4-P, the second magnetic element 4-121 is located between the fifth position sensing assembly 4-250 and the sixth position sensing assembly 4-260. Since the fifth reference element 4-251 and the sixth reference element 4-261 are fixedly disposed on the base 4-100, so the second magnetic element 4-121 may move relative to the fifth reference element 4-251 and the sixth reference element 4-261.

In order to restrict the second movable part 4-M2 to move relative to the immovable part 4-I within a limit range, the base 4-100 may further include a fifth stopper 4-105, a sixth stopper 4-106, and a seventh stopper 4-107.

When viewed from the primary axis 4-P, the fifth stopper 4-105 is located on the first corner 4-2001. The fifth stopper 4-105 has a fifth stop surface 4-1051 facing toward the movable board 4-220. The fifth stop surface 4-1051 and the primary axis 4-P are parallel. When viewed from a direction that is perpendicular to the fifth stop surface 4-1051, the fifth stopper 4-105 at least partially overlaps the second position sensing mechanism 4-S2. For example, when viewed from a direction that is perpendicular to the fifth stop surface 4-1051, the fifth stopper 4-105 at least partially overlaps the fourth position sensing assembly 4-240.

When viewed from the primary axis 4-P, the sixth stopper 4-106 is located on the first corner 4-2001. The sixth stopper 4-106 has a sixth stop surface 4-1061 facing toward the movable board 4-220. The fifth stop surface 4-1051 and the sixth stop surface 4-1061 form an L shape. The sixth stop surface 4-1061 is parallel with the primary axis 4-P. The sixth stop surface 4-1061 and the fifth stop surface 4-1051 are not parallel. For example, the sixth stop surface 4-1061 is perpendicular to the fifth stop surface 4-1051. When viewed from a direction that is perpendicular to the sixth stop surface 4-1061, the sixth stopper 4-106 at least partially overlaps the second position sensing mechanism 4-S2. For example, when viewed from a direction that is perpendicular to the sixth stop surface 4-1061, the sixth stopper 4-106 at least partially overlaps the fourth position sensing assembly 4-240. The third corner 4-2003 of the base 4-100 may also include a structure similar to the fifth stopper 4-105 and the sixth stopper 4-106.

When viewed from the primary axis 4-P, the seventh stopper 4-107 is located on the second corner 4-2002. The seventh stopper 4-107 has a seventh stop surface 4-1071 facing toward the movable board 4-220. The seventh stop surface 4-1071 and the primary axis 4-P are parallel. The seventh stop surface 4-1071 and the fifth stop surface 4-1051 are not parallel. The seventh stop surface 4-1071 and the fifth stop surface 4-1051 are not perpendicular. The seventh stop surface 4-1071 and the sixth stop surface 4-1061 are not parallel. The seventh stop surface 4-1071 and the sixth stop surface 4-1061 are not perpendicular. When viewed from a direction that is perpendicular to the seventh stop surface 4-1071, the seventh stopper 4-107 at least partially overlaps the second position sensing mechanism 4-S2. For example, when viewed from a direction that is perpendicular to the seventh stop surface 4-1071, the seventh stopper 4-107 at least partially overlaps the fifth position sensing assembly 4-250. The fourth corner 4-2004 of the base 4-100 may also include a structure similar to the seventh stopper 4-107.

Specifically, when the bias elements 4-230 moves (e.g. linear motion) in the first direction 4-A1 or the second direction 4-A2 to the limit, the movable board 4-220 collides with the fifth stop surface 4-105 or the sixth stop surface 4-1061. When the bias element 4-230 moves (e.g. rotate) around the rotation axis 4-R to the limit, the movable board 4-220 collides with the seventh stop surface 4-1071. Therefore, the range of motion of the second movable part 4-M2 relative to the immovable part 4-I may be restricted within a limit range.

Figure 47:
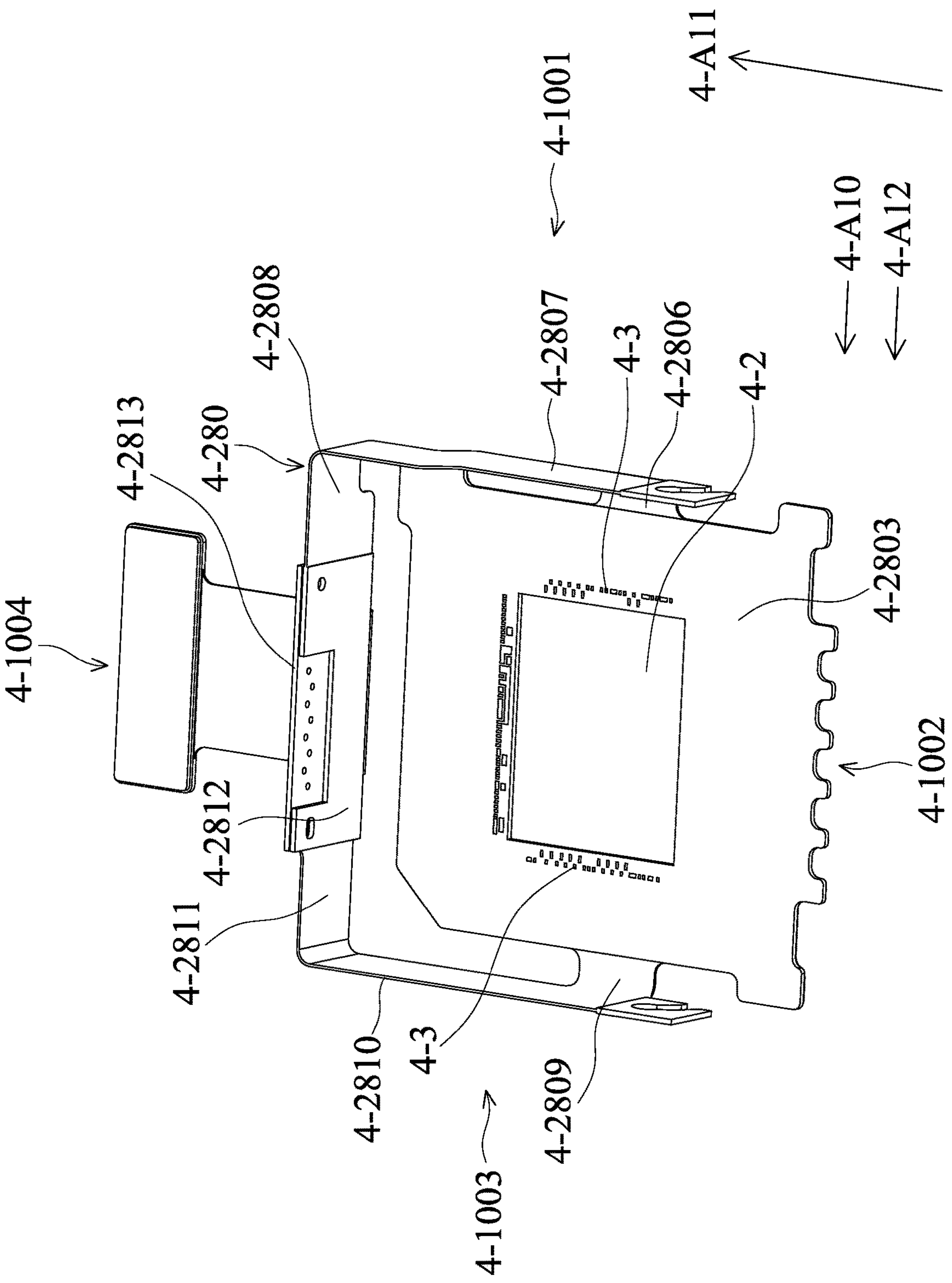
FIG. 47 is a perspective view of the second circuit mechanism.

Next, please refer to FIG. 47. FIG. 47 is a perspective view of the second circuit mechanism 4-C2. The second circuit mechanism 4-C2 includes a third circuit assembly 4-280. Third circuit assembly 4-280 includes a third body 4-2803, a sixth section 4-2806, a seventh section 4-2807, a eighth section 4-2808, a ninth section 4-2809, a tenth section 4-2810, a tenth section 4-2811, a second external circuit 4-2812, and a third external circuit 4-2813.

The third body 4-2803 has a plate-shaped structure, and the third body 4-2803 is not parallel with the primary axis 4-P. The second optical element 4-2 is disposed on the third body 4-2803. The third body 4-2803 is electrically connected to the second optical element 4-2. At lease a passive electronic element 4-3 may be disposed around the second optical element 4-2 and electrically connected to the third body 4-2803. The passive electronic element 4-3 may be a capacitor, an inductor, a resistor, a sensor, an integrated circuit, etc. When viewed from the primary axis 4-P, the second optical element 4-2 does not overlap the second movable part 4-M2. When viewed from the primary axis 4-P, the passive electronic element 4-3 does not overlap the second movable part 4-M2.

The second position sensing mechanism 4-S2 is electrically connected to the third body 4-2803. In detail, the fourth sensing element 4-242, the fifth sensing element 4-252, and the sixth sensing element 4-262 are fixedly disposed on the third body 4-2803. The fourth reference element 4-241, the fifth reference element 4-251, and the sixth reference element 4-261 are fixedly disposed on the base 4-100 of the immovable part 4-I.

The sixth section 4-2806 is electrically connected to the third body 4-2803. The sixth section 4-2806 has a plate-shaped structure, and the sixth section 4-2806 and the third body 4-2803 are parallel. The sixth section 4-2806 may move relative to the second movable part 4-M2 and the immovable part 4-I. The sixth section 4-2806 extends along a tenth direction 4-A10. The tenth direction 4-A10 is not parallel with but perpendicular to the rotation axis 4-R. The tenth direction 4-A10 and the second side 4-1002 are parallel. When viewed from the primary axis 4-P, the sixth section 4-2806 is on the first side 4-1001.

The seventh section 4-2807 is electrically connected to the third body 4-2803 via the sixth section 4-2806. The seventh section 4-2807 has a plate-shaped structure, and the thickness direction of the seventh section 4-2807 is different from the thickness direction of the sixth section 4-2806. For example, the thickness direction of the seventh section 4-2807 is perpendicular to the thickness direction of the sixth section 4-2806. The seventh section 4-2807 may move relative to the second movable part 4-M2 and the immovable part 4-I. The seventh section 4-2807 extends along an eleventh direction 4-A11. The eleventh direction 4-A11 and the tenth direction 4-A10 are not parallel. For example, the eleventh direction 4-A11 is perpendicular to the tenth direction 4-A10. When viewed from the primary axis 4-P, the seventh section 4-2807 is located on the first side 4-1001.

The eighth section 4-2808 is electrically connected to the third body 4-2803 via the seventh section 4-2807. The eighth section 4-2808 has a plate-shaped structure, and the thickness direction of the eighth section 4-2808 is different from the thickness direction of the sixth section 4-2806. For example, the thickness direction of the eighth section 4-2808 is perpendicular to the thickness direction of the sixth section 4-2806. The thickness direction of the eighth section 4-2808 is different from the thickness direction of the seventh section 4-2807. For example, the thickness direction of the eighth section 4-2808 is different from the thickness direction of the seventh section 4-2807. The eighth section 4-2808 may move relative to the second movable part 4-M2 and the immovable part 4-I motion. The eighth section 4-2808 extends along a twelfth direction 4-A12. The twelfth direction 4-A12 is parallel with the tenth direction 4-A10. The twelfth direction 4-A12 is not parallel with the eleventh direction 4-A11. For example, the twelfth direction 4-A12 is perpendicular to the eleventh direction 4-A11. When viewed from the primary axis 4-P, the eighth section 4-2808 is located on the fourth side 4-1004.

The ninth section 4-2809 is electrically connected to the third body 4-2803. The tenth section 4-2810 is electrically connected to the third body 4-2803. The eleventh section 4-2811 is electrically connected to the third body 4-2803 via the ninth section 4-2809 and the section tenth 4-2810. When viewed from the primary axis 4-P, the ninth section 4-2809 and the tenth section 4-2810 are located on the third side 4-1003, and the eleventh section 4-2811 is located on the fourth side 4-1004.

The second external circuit 4-2812 is electrically connected to the third body 4-2803 via the eighth section 4-2808. The second external circuit 4-2812 has a plate-shaped structure. When viewed from the primary axis 4-P, the second external circuit 4-2812 is located on the fourth side 4-1004. The third external circuit 4-2813 is electrically connected to the third body 4-2803 via the eleventh section 4-2811. The third external circuit 4-2813 has a plate-shaped structure. When viewed from the primary axis 4-P, the third external circuit 4-2813 is located on the fourth side 4-1004. The second external circuit 4-2812 is disposed on the third external circuit 4-2813, and the second external circuit 4-2812 and the third external circuit 4-2813 are parallel.

It should be noted that, the third circuit assembly 4-280 may be flat at first. According to actual needs, the third circuit assembly 4-280 may be folded. For example, the third circuit assembly 4-280 may be folded to form the seventh section 4-2807 and the ninth section 4-2809. At the time, the eighth section 4-2808 is still parallel with the seventh section 4-2807, and the eleventh section 4-3811 is still parallel with the tenth section 4-2810. Next, the third circuit assembly 4-280 may be folded to form the eighth section 4-2808 and the eleventh section 4-2811.

Figure 48:
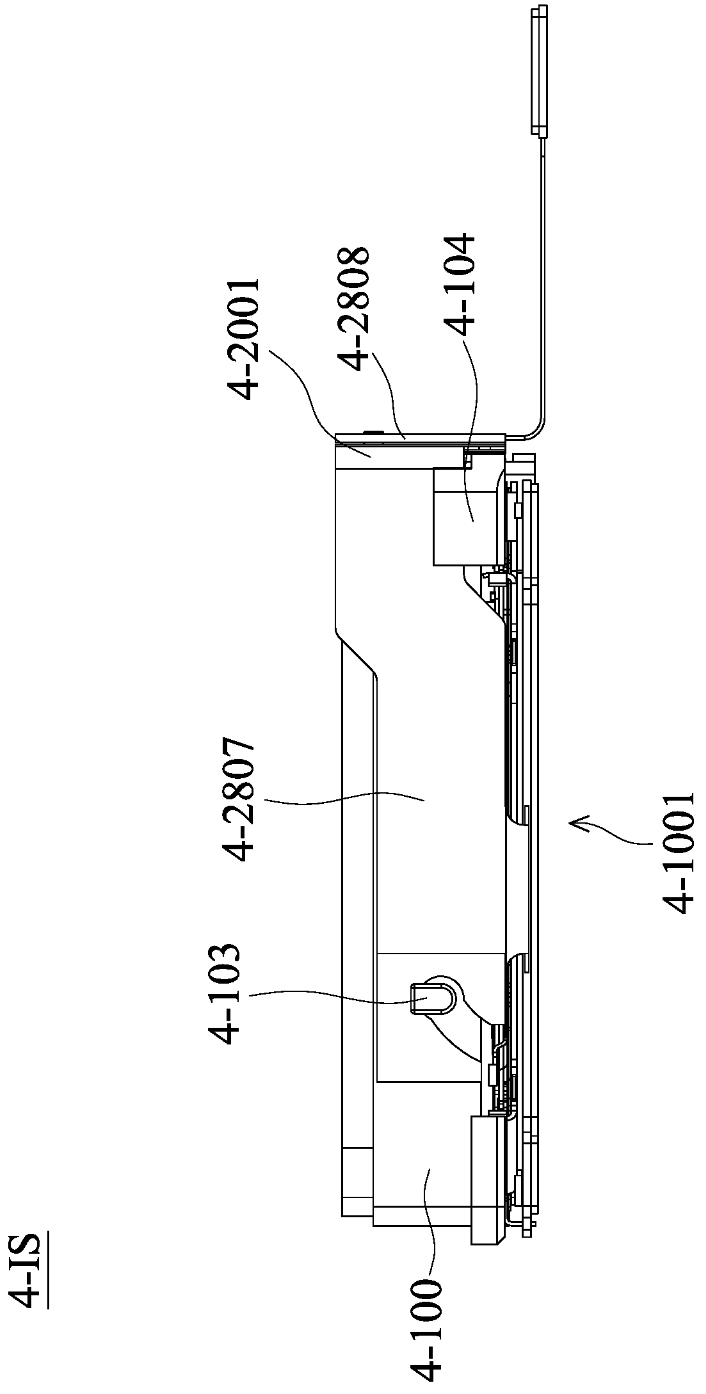
FIG. 48 is a side view of the second optical element module.

Next, please refer to FIG. 48. FIG. 48 is a side view of the second optical element module 4-IS. Since the seventh section 4-2807 and the eighth section 4-2808 may move relative to the second movable part 4-M2 and the immovable part 4-I, the base 4-100 may further include a first position-restriction portion 4-103 and a second position-restriction portion 4-104 to restrict the range of motion of the seventh section 4-2807 and the eighth section 4-2808. The first position-restriction portion 4-103 is used for limiting the range of motion of the seventh section 4-2807. The second position-restriction portion 4-104 is used for limiting the range of motion of the section seventh 4-2807 and the eighth section 4-2808. For example, the first position-restriction portion 4-103 has a hook structure corresponding to the seventh section 4-2807, and the second position-restriction portion 4-104 has another hook structure corresponding to the seventh section 4-2807. When viewed from the primary axis 4-P, the first position-restriction portion 4-103 is located on the first side of 4-1001. When viewed from the primary axis 4-P, the second position-restriction portion 4-104 is located on the first corner 4-2001.

Figure 49:
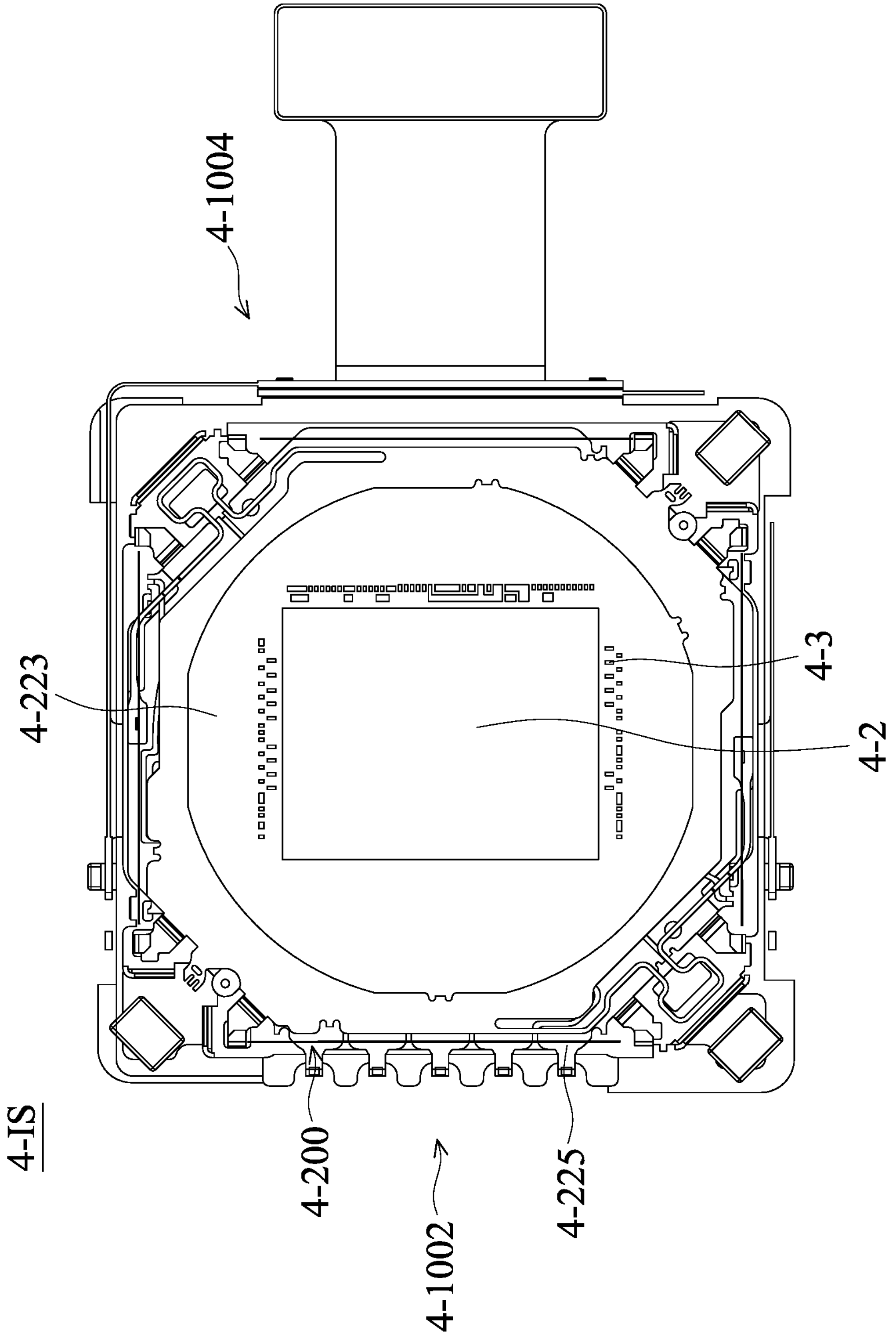
FIG. 49 is a side cross-sectional view of the second optical element module.

Next, please refer to FIG. 49. FIG. 49 is a side cross-sectional view of the second optical element module 4-IS. The movable board 4-220 has a third opening 4-223 corresponding to the second optical element 4-2. The second optical element 4-2 is used for receiving the light 4-L and outputting a signal. The central travel direction of the light 4-L passes through the third opening 4-223 and the second optical element 4-2. In some embodiments, the central travel direction of the light 4-L is parallel with the primary axis 4-P. When viewed from a direction that is perpendicular to the central travel direction, the second optical element 4-2 at least partially overlaps the second movable part 4-M2. When viewed from a direction that is perpendicular to the central travel direction, the second optical element 4-2 at least partially overlaps the third opening 4-223. When viewed from a direction that is perpendicular to the central travel direction, the passive electronic element 4-3 at least partially overlaps the second movable part 4-M2. When viewed from a direction that is perpendicular to the central travel direction, the passive electronic element 4-3 at least partially overlaps the third opening 4-223. When viewed from a direction that is perpendicular to the central travel direction, the passive electronic element 4-3 at least partially overlaps the second optical element 4-2.

In some conventional optical systems, when viewed from a direction that is perpendicular to the center travel direction, the second optical element and the passive electronic element do not overlap the third opening. For example, the second optical element does not overlap the third opening in the primary axis, i.e., the second optical element is disposed under the third opening. In the present disclosure, the third opening 4-223 may receive at least part of the second optical element 4-2 and at least part of the passive electronic element 4-3. Accordingly, the overall height of the optical system 4-1000 of the present disclosure may be reduced in order to achieve miniaturization.

Figure 50:
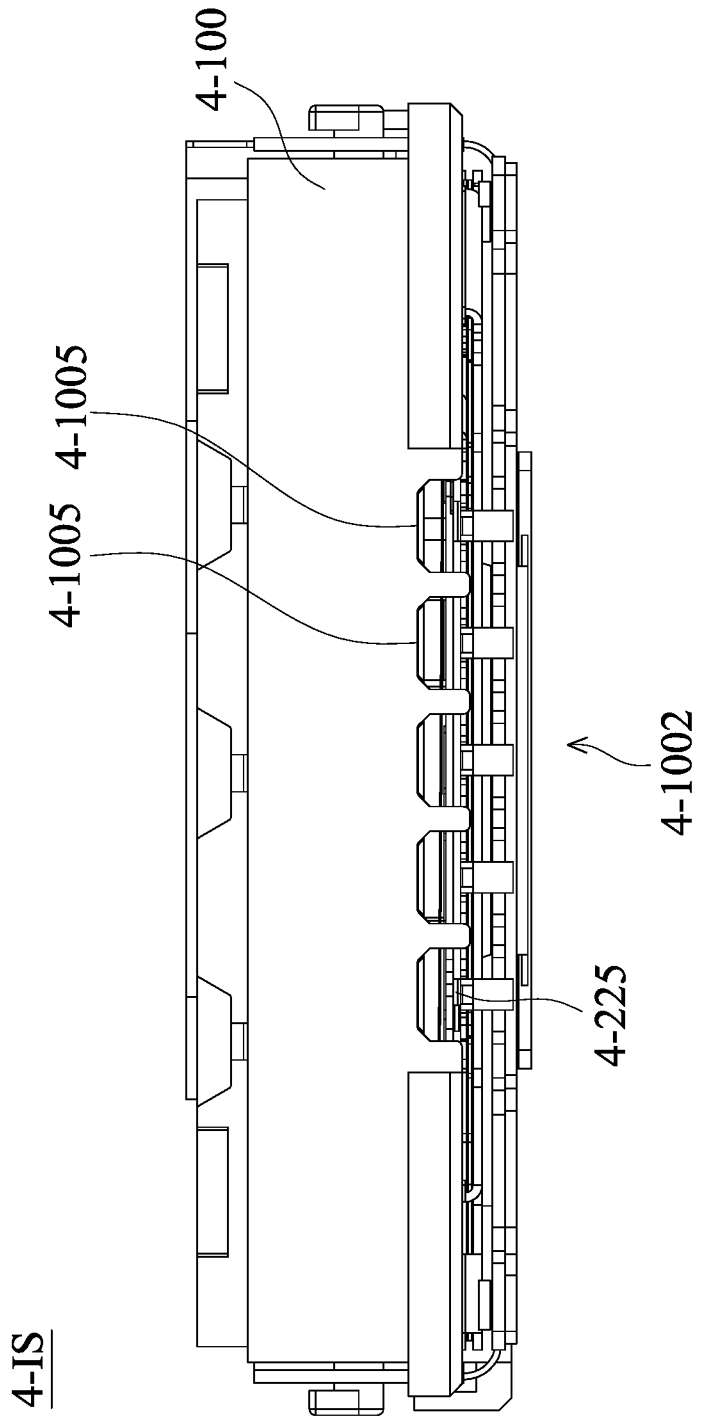
FIG. 50 is a side view of the second optical element module.

Next, please refer to FIG. 44, FIG. 49, and FIG. 50. FIG. 50 is a side view of the second optical element module 4-IS. In some embodiments, the movable board 4-220 further includes at least a circuit terminal 4-225. The circuit terminal 4-225 is electrically connected to the second drive mechanism 4-D2, and the circuit terminal 4-225 is used for electrically connected to the third circuit assembly 4-280. For example, the circuit terminal 4-225 may be electrically connected to the third body 4-2803 of the third circuit assembly 4-280 by welding.

The circuit terminal 4-225 has an elongated structure extending along a direction that is not parallel with the primary axis 4-P. For example, the circuit terminal 4-225 extends along a direction that is perpendicular to the primary axis 4-P. When viewed from the primary axis 4-P, the circuit terminal 4-225 is located on the second side 4-1002. The base 4-100 further includes an avoiding portion 4-1005 for accommodating the circuit terminal 4-225. Within the limit range, wherever the second movable part 4-M2 is located (i.e. at any arbitrary position within the limit range), the circuit terminal 4-225 is not in contact with the immovable part 4-I, and thus preventing the circuit terminal 4-225 from being damaged.

Figure 51:
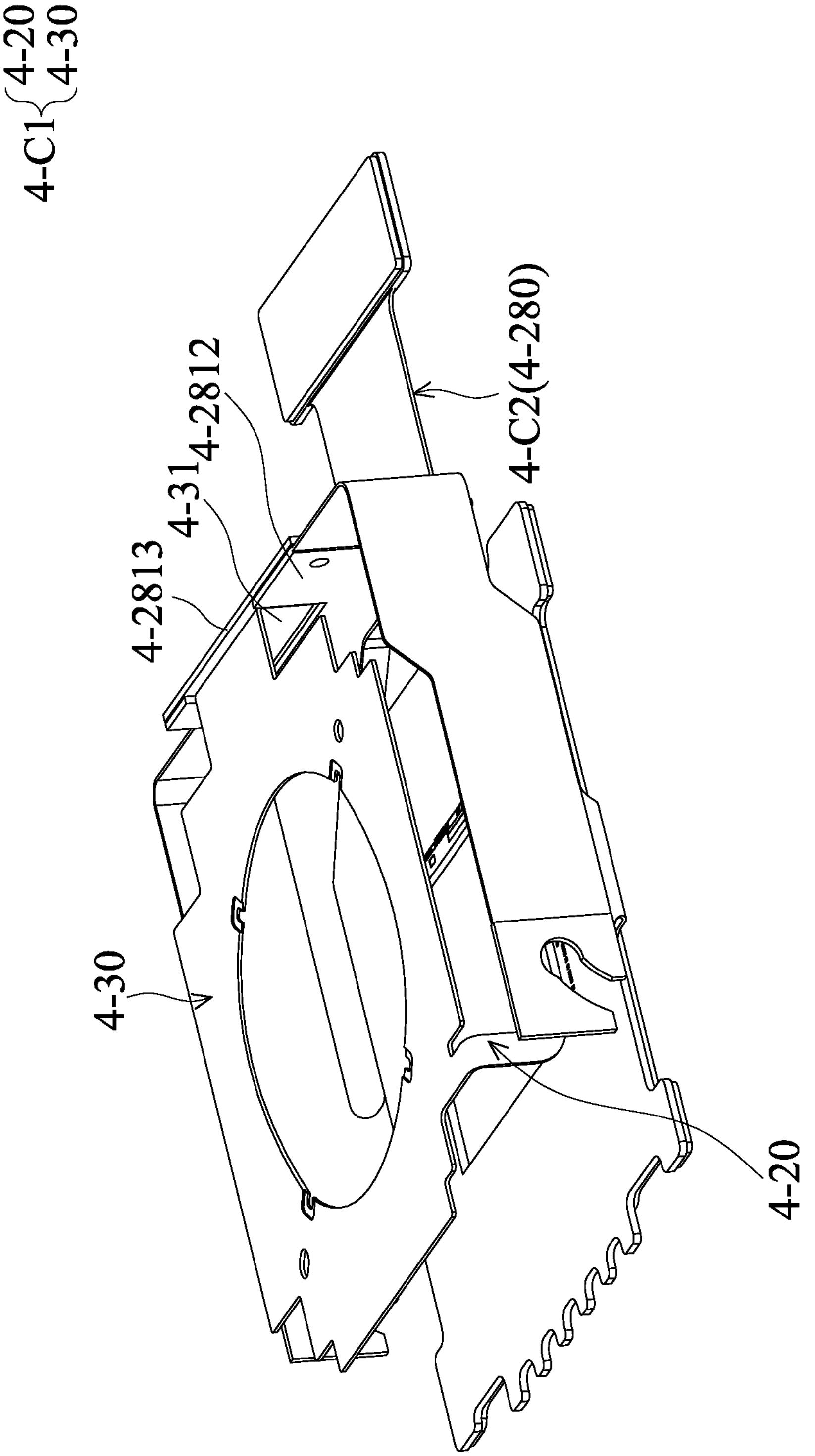
FIG. 51 is a perspective view of the first circuit mechanism and the second circuit mechanism.
Figure 52:
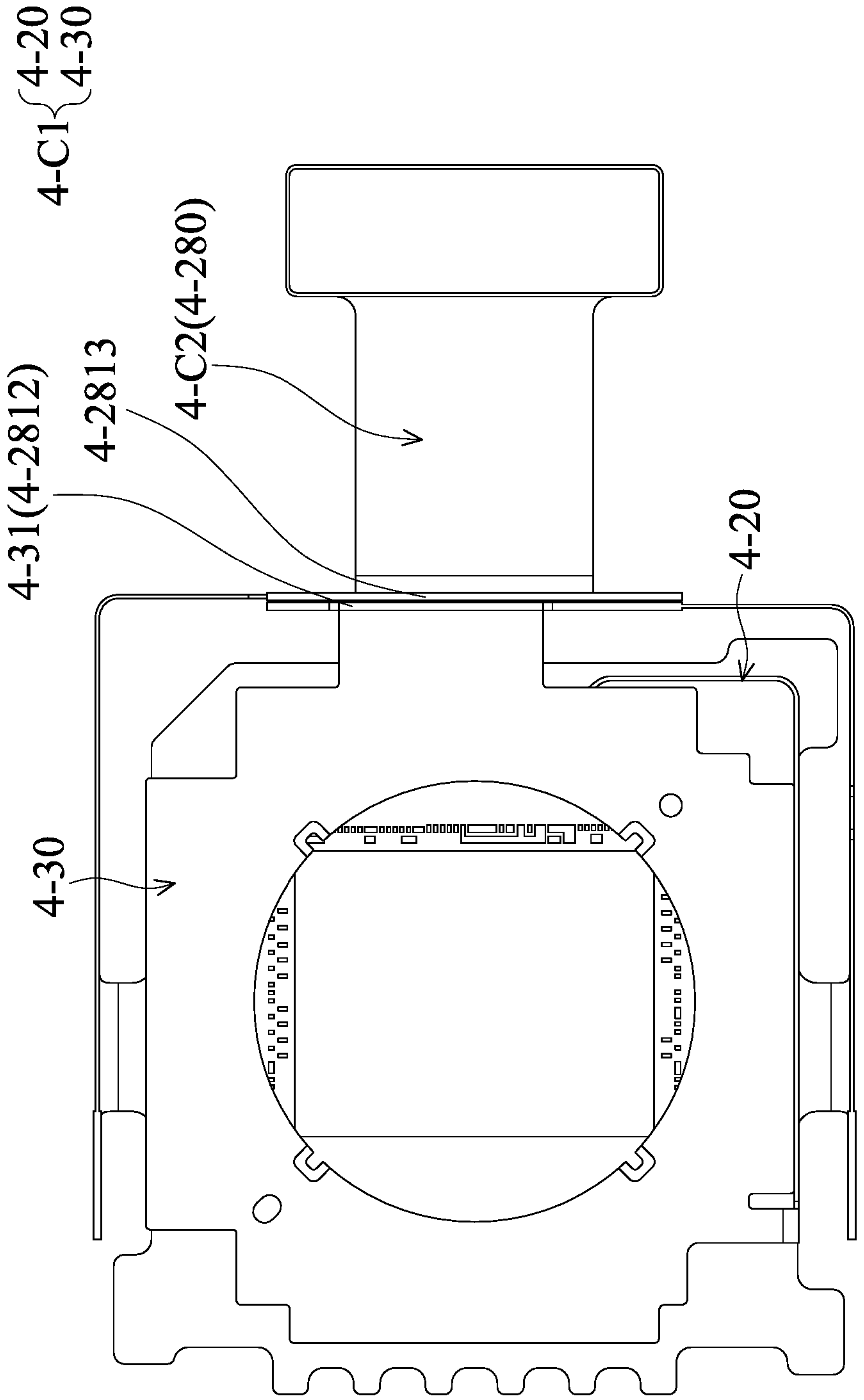
FIG. 52 is a top view of the first circuit mechanism and the second circuit mechanism.
Figure 53:
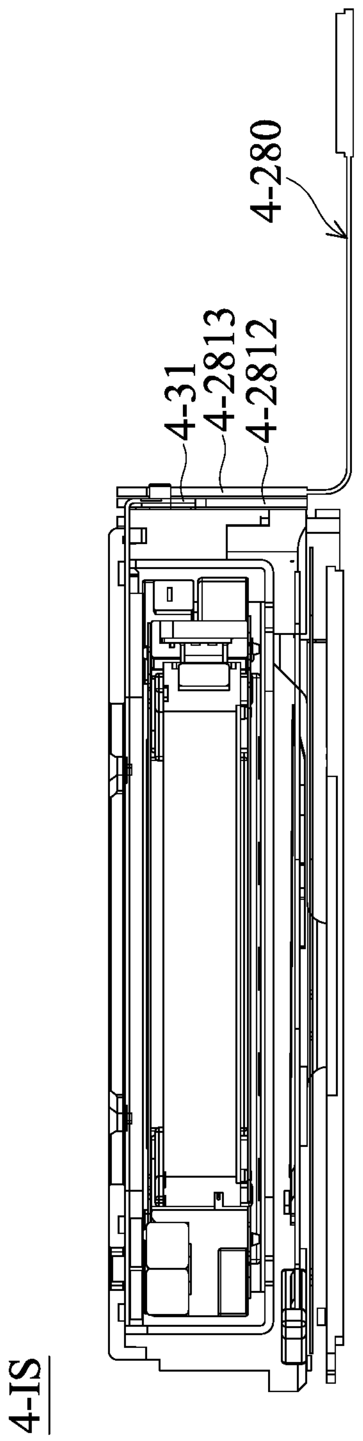
FIG. 53 is a side cross-sectional view of the second optical element module.

Next, please refer to FIG. 51 to FIG. 53 to understand how the first circuit mechanism. 4-C1 is electrically connected to the second circuit mechanism 4-C2. FIG. 51 is a perspective view of the first circuit mechanism 4-C1 and the second circuit mechanism 4-C2. FIG. 52 is a top view of the first circuit mechanism 4-C1 and the second circuit mechanism 4-C2. FIG. 53 is a side cross-sectional view of the second optical element module 4-IS. The first external circuit 4-31 has a plate-shaped structure, and the first external circuit 4-31 is disposed on the third external circuit 4-2813. The first external circuit 4-31 and the third external circuit 4-2813 are parallel. The first external circuit 4-31 is electrically connected to the third external circuit 4-2813. When viewed from a direction that is perpendicular to the thickness direction of the third external circuit 4-2813, the first external circuit 4-31 at least partially overlaps the second external circuit 4-2812. The second external circuit 4-2812 has a notch corresponding to the first external circuit 4-31 (also can be seen in FIG. 47).

The first drive mechanism 4-D1 and the second drive mechanism 4-D2 of the optical system 4-1000 of the present disclosure generate drive force by different methods. One of the first drive mechanism 4-D1 and the second drive mechanism 4-D2 has a magnetic material, and the other one of the first drive mechanism 4-D1 and the second drive mechanism 4-D2 does not have a magnetic material. For example, the first drive mechanism 4-D1 makes use of magnetic elements and coils to drive the first movable part 4-M1 to move relative to the immovable part 4-I, while the second drive mechanism 4-D2 makes use of bias elements to drive the second movable part 4-M2 to move relative to the immovable part 4-I.

An optical system is provided. There is no any magnetic element and coil disposed on one side of the optical system. The first drive mechanism effectively drives the first movable part to achieve AF and OIS. The first circuit mechanism includes a special shape and structure. The first position sensing mechanism may sense the movement of the holder and/or the frame. The structural strengthening element may strengthen the structural strength of the element and may accomplish positioning. In addition, the second drive mechanism effectively drives the second movable part to achieve AF, OIS, tilt correction, etc. Moreover, at least part of the second optical element may be accommodated in the opening of the second movable part, so the overall height of the optical system of the present disclosure may be reduced to achieve miniaturization.

The Fifth Group of Embodiments

Figure 54:
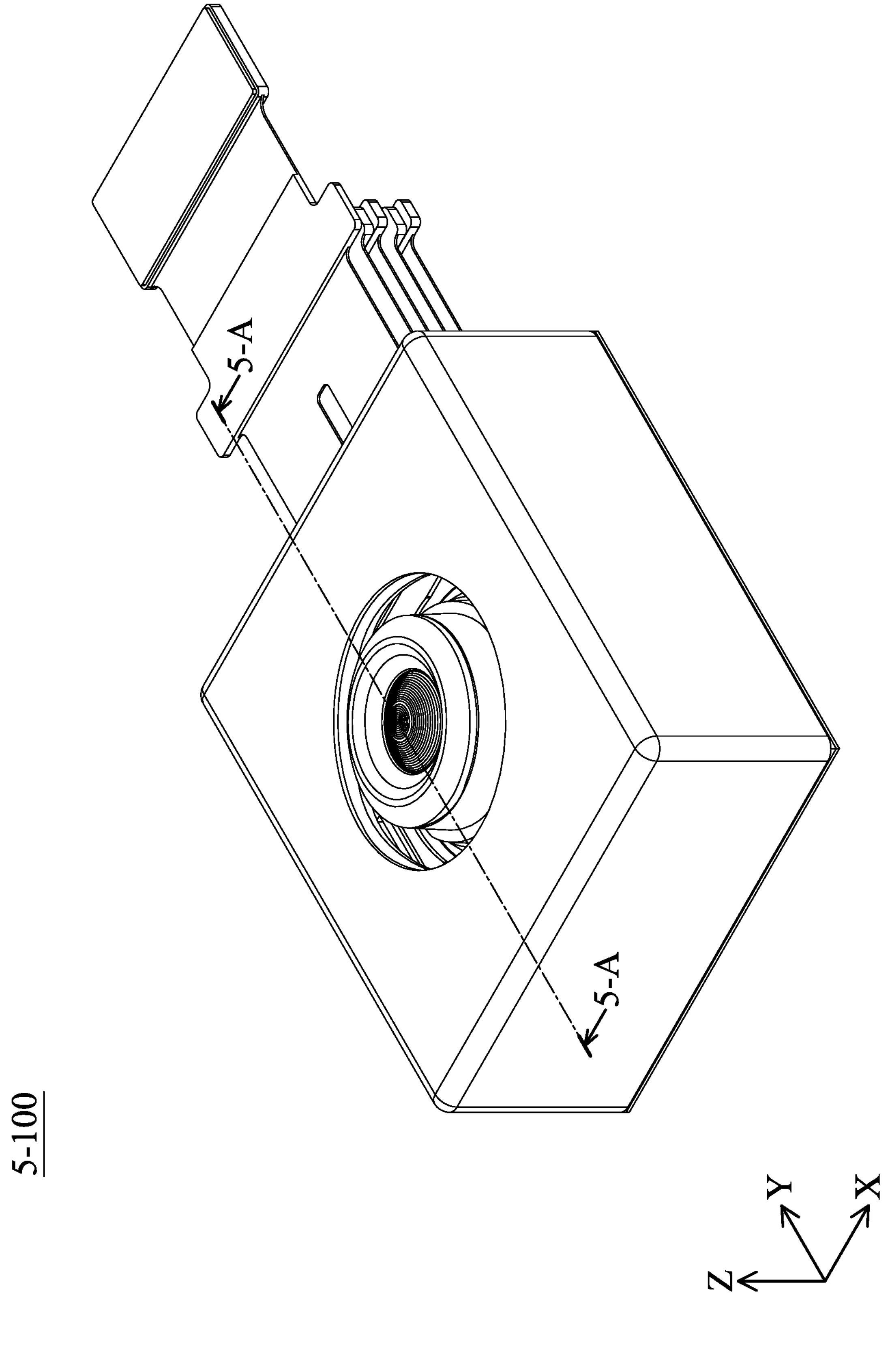
FIG. 54 is a perspective view of an optical system 5-100 according to some embodiments of the present disclosure.
Figure 55:
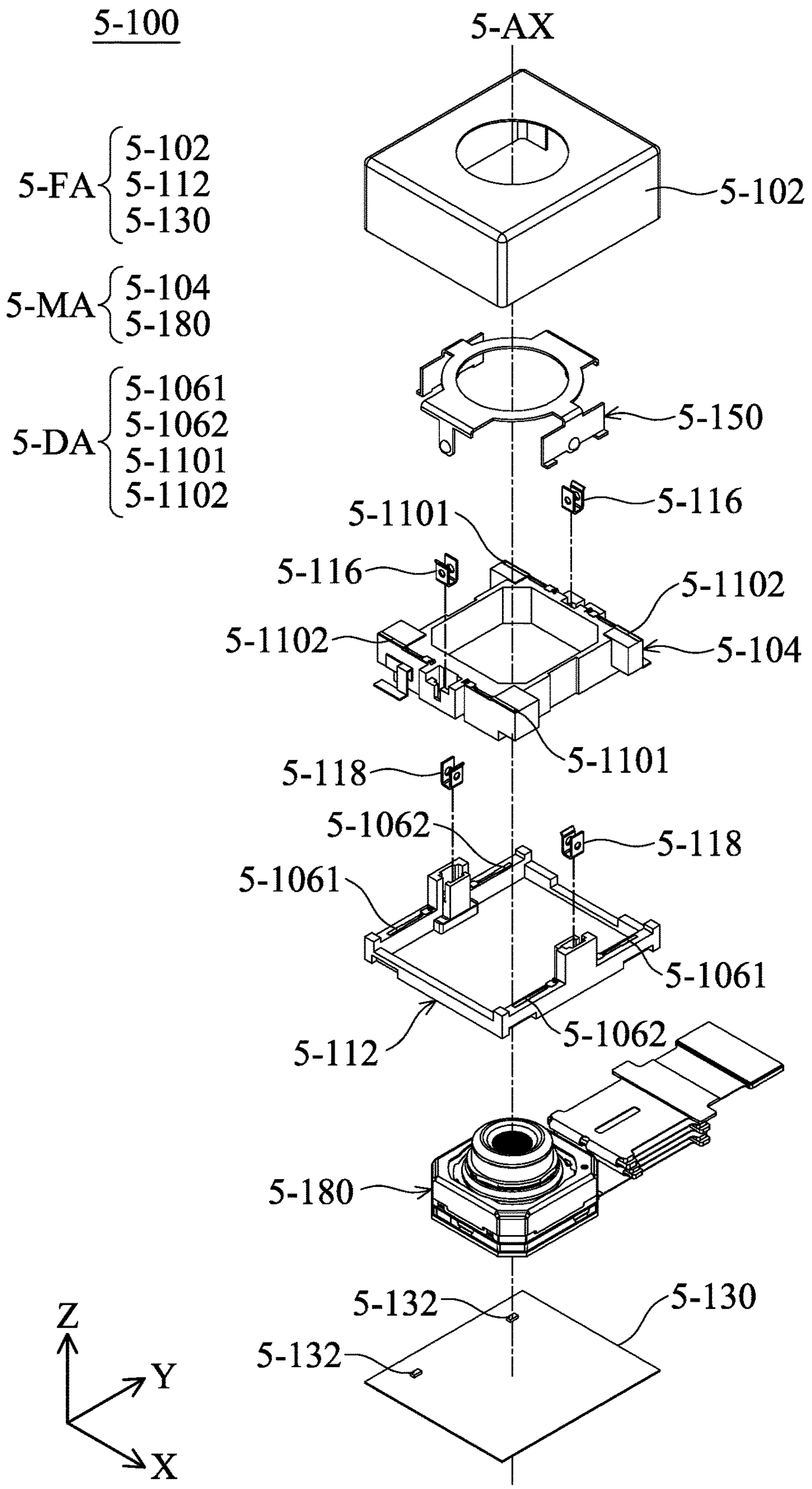
FIG. 55 is an exploded diagram of the optical system 5-100 according to some embodiments of the present disclosure.
Figure 56:
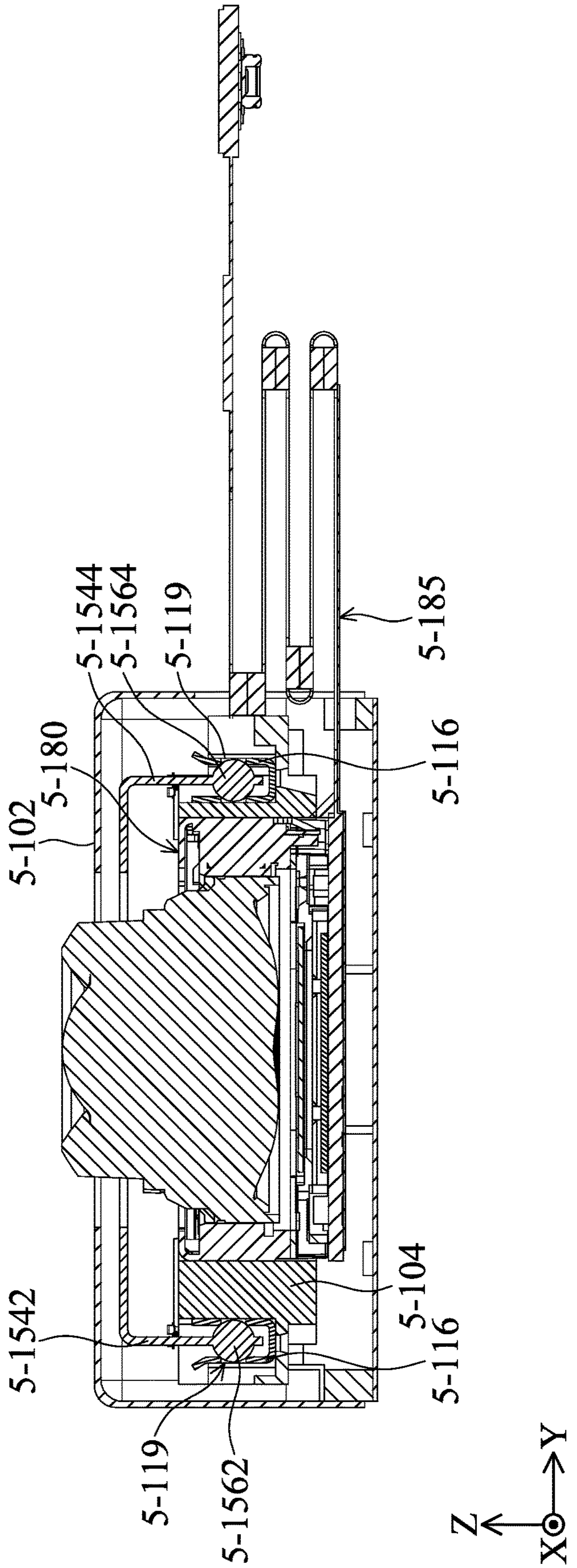
FIG. 56 is a sectional view of the optical system 5-100 along the line 5-A-5-A in FIG. 1 according to some embodiments of the present disclosure.

FIG. 54 is a perspective view of an optical system 5-100 according to some embodiments of the present disclosure, FIG. 55 is an exploded diagram of the optical system 5-100 according to some embodiments of the present disclosure, and FIG. 56 is a sectional view of the optical system 5-100 along the line 5-A-5-A in FIG. 1 according to some embodiments of the present disclosure. In FIG. 55, the optical system 5-100 mainly includes a casing 5-102, a base 5-112, a holder 5-104, driving elements 5-106~1-5-1062, driving elements 5-1101~5-1102, position sensing elements 5-132, a support assembly 5-150, contact elements 5-116, contact elements 5-118, a circuit board 5-130 which are arranged along a main axis 5-AX.

The optical system 5-100 can be used to drive an optical module 5-180, or it can also be used to drive various optical elements (such as lenses, mirrors, prisms, beam splitters), aperture and so on) to move, but it is not limited thereto.

In some embodiments, the casing 5-102 and the base 5-112 can be combined with each other to form a housing of the optical system 5-100. In addition, the casing 5-102 and the base 5-112 can be collectively called as a fixed assembly 5-FA. The holder 5-104 and the optical module 5-180 can be collectively called a movable assembly 5-MA.

In some embodiments, the movable assembly 5-MA may move relative to the fixed assembly 5-FA (e.g. the casing 5-102 and the base 5-112). Therefore, the optical module 5-180 which is disposed on the holder 5-104 may move with the holder 5-104 to achieve auto focus (AF) or optical image stabilization (OIS).

In some embodiments, the driving elements 5-1061, 5-1062 and the driving elements 5-1101, 5-1102 may be collectively referred to as a driving assembly 5-DA, which is used to drive the holder 5-104 to move relative to the fixed assembly 5-FA. In this embodiment, the driving assembly 5-DA may include eight driving elements.

The driving elements can be located on fixed assembly 5-FA and the movable assembly 5-MA (the holder 5-104) respectively. The driving elements can be a shape memory alloy, and the optical module 5-180 is moved relative to the fixed assembly 5-FA by temperature control to produce deformation, which can achieve effects such as auto focus (AF) or optical image stabilization (OIS). In some embodiments, the driving assembly 5-DA may also include driving elements such as piezoelectric elements, magnets, and coils.

It should be noted that a pair of the contact element 5-118 and the contact element 5-116 may be respectively disposed on the base 5-112 and the holder 5-104. The contact elements 5-118 may be disposed at sides of the base 5-112, and the contact elements 5-116 may be disposed on the sides of the holder 5-104. In some embodiments, the base 5-112 and the contact element 5-118 may be formed as one piece or formed separately, and the holder 5-104 and the contact element 5-116 may be formed as one piece or formed separately as well.

Moreover, the circuit board 5-130 may be, for example, a flexible printed circuit (FPC), which may be bonded on the fixed assembly 5-FA by adhesion. In some embodiments, the circuit board 5-130 is electrically connected to other electronic elements in the optical system 5-100 or outside the optical system 5-100. For example, the circuit board 5-130 may be used for transferring electric signal to the driving assembly 5-DA to control the movement of the holder 5-104.

In some embodiments, position sensing elements 5-132 may be disposed in the optical system 5-100 to detect the position of the movable assembly 5-MA relative to the fixed assembly 5-FA. The position sensing elements may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

Figure 57:
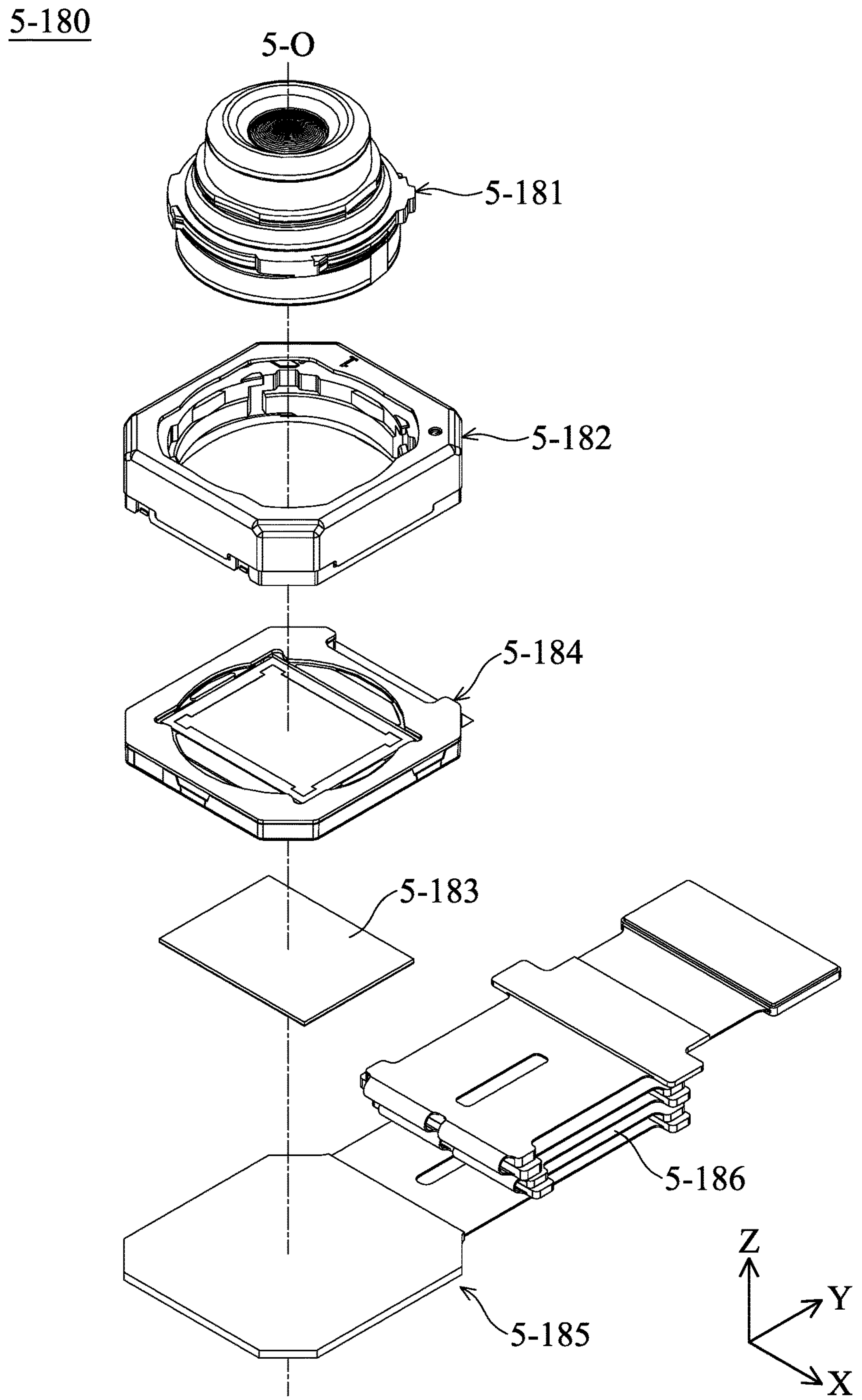
FIG. 57 is an exploded diagram of the optical module 5-180 according to an embodiment of the present disclosure.

FIG. 57 is an exploded diagram of the optical module 5-180 according to an embodiment of the present disclosure. The optical module 5-180 may be used for driving an optical element 5-181, and may include a driving assembly 5-182, an optical sensor 5-183, a holder 5-184, and a substrate 5-185 arranged in an optical axis 5-O of the optical element 5-181. In this embodiment, the optical axis 5-O may be parallel to the main axis 5-AX.

The optical element 5-181 may be affixed on the driving assembly 5-182, such as by locking, adhesion, or snapping. Furthermore, the driving assembly 5-182 may also include additional drive elements (for example, a combination of a magnet and a coil, not shown) for driving the optical element 5-181 to move in different direction from the holder 5-104 to drive the optical element 5-181 in more directions. For example, the optical element 5-181 may be driven in X, Y, or Z directions.

The optical sensor 5-183 may detect the light passing through the optical element 5-181 and transfer the light to electric signal to other external element (e.g. a processor). The holder 5-184 may be disposed between the driving assembly 5-182 and the optical sensor 5-183 to connect the elements.

The substrate 5-185 may be a flexible printed circuit which may be affixed on the holder 5-104 by adhesion. In this embodiment, the substrate 5-185 is electrically connected to electronic elements inside or outside the optical module 5-180. For example, electric signal may be transferred by the substrate 5-185 to the driving assembly to control the movement of the optical element 5-181 in X, Y, or Z directions to achieve auto focus or optical image stabilization.

An extending portion 5-186 may be formed on a side of the substrate 5-185, and the extending portion 5-186 may have a structure that consists of multiple layers stacked in the Z direction to save space and achieve miniaturization.

Figure 58:
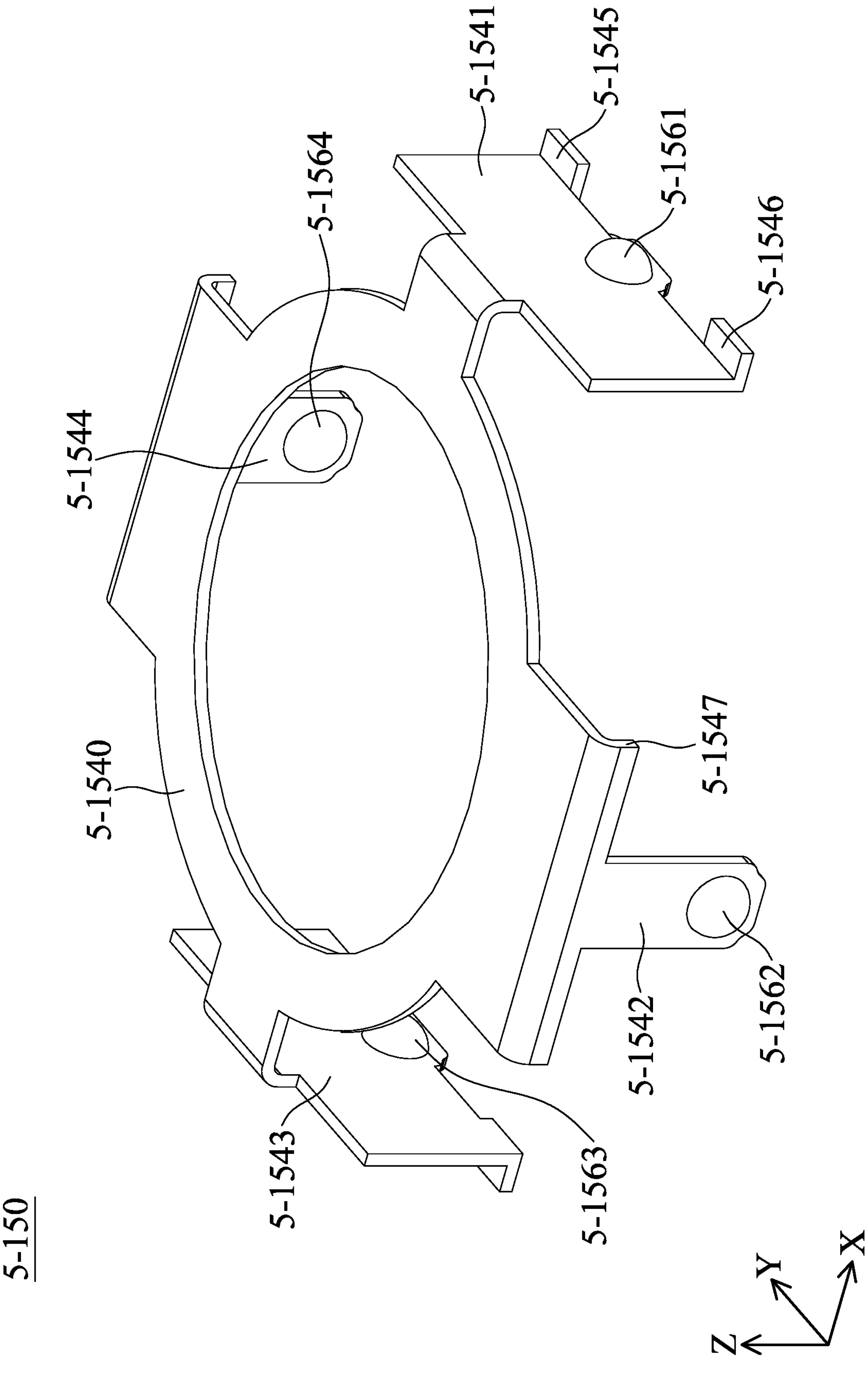
FIG. 58 is a perspective view of the support assembly 5-150 according to an embodiment of the present disclosure.

Please refer to FIG. 56 and FIG. 58. FIG. 58 is a perspective view of the support assembly 5-150 according to an embodiment of the present disclosure. The support assembly 5-150 includes a support body 5-1540, a first connecting portion 5-1541, a second connecting portion 5-1542, a third connecting portion 5-1543, a fourth connecting portion 5-1544, and a plurality of coupling portions 5-1561~5-1564. In some embodiments, the support body 5-1540 may have a circular shape, and the support body 5-1540 has a plate-shaped structure. The first connecting portion 5-1541 to the fourth connecting portion 5-1544 may extend from the support body 5-1540 in the Z-axis. The coupling portions 5-1561 to 5-1564 are respectively located at the first connecting portion 5-1541 to the fourth connecting portion 5-1544 and may have a spherical shape.

The support body 5-1540 is movable relative to the fixed assembly 5-FA and the movable assembly 5-MA. In this embodiment, the support body 5-1540 is movably connected to the base 5-112 of the fixed assembly 5-FA via the first connecting portion 5-1541, the holder 5-104 of the movable assembly 5-MA is movably connected to the support body 5-1540 via the second connecting portion 5-1542, the support body 5-1540 is movably connected to the base 5-112 of the fixed assembly 5-FA via the third connecting portion 5-1543, the holder 5-104 of the movable assembly 5-MA is movably connected to the support body 5-1540 via the fourth connecting portion 5-1544, and the support body 5-1540 is perpendicular to the main axis 5-AX.

Specifically, a pair of connecting portions (the first connecting portion 5-1541 and the third connecting portion 5-1543) of the support assembly 5-150 are disposed in the contact elements 5-118, and the other pair of connecting portions (the second connecting portion 5-1542 and the fourth connecting portion 5-1544) are disposed in the contact elements 5-116. In other words, the contact elements 5-116 or the contact elements 5-118 are in contact with one of the connecting portions.

As shown in FIG. 55 and FIG. 56, the contact element 5-116 and the contact element 5-118 can be clamps, the contact elements 5-116 are affixed to the holder 5-104, and the contact elements 5-118 are affixed to the base 5-112. Furthermore, the coupling portions 5-1561~5-1564 are movably coupled to circular openings 5-119 of the contact elements 5-116 or the contact elements 5-118, so that the support assembly 5-150 is movable relative to the fixed assembly 5-FA and the movable assembly 5-MA.

Figure 59:
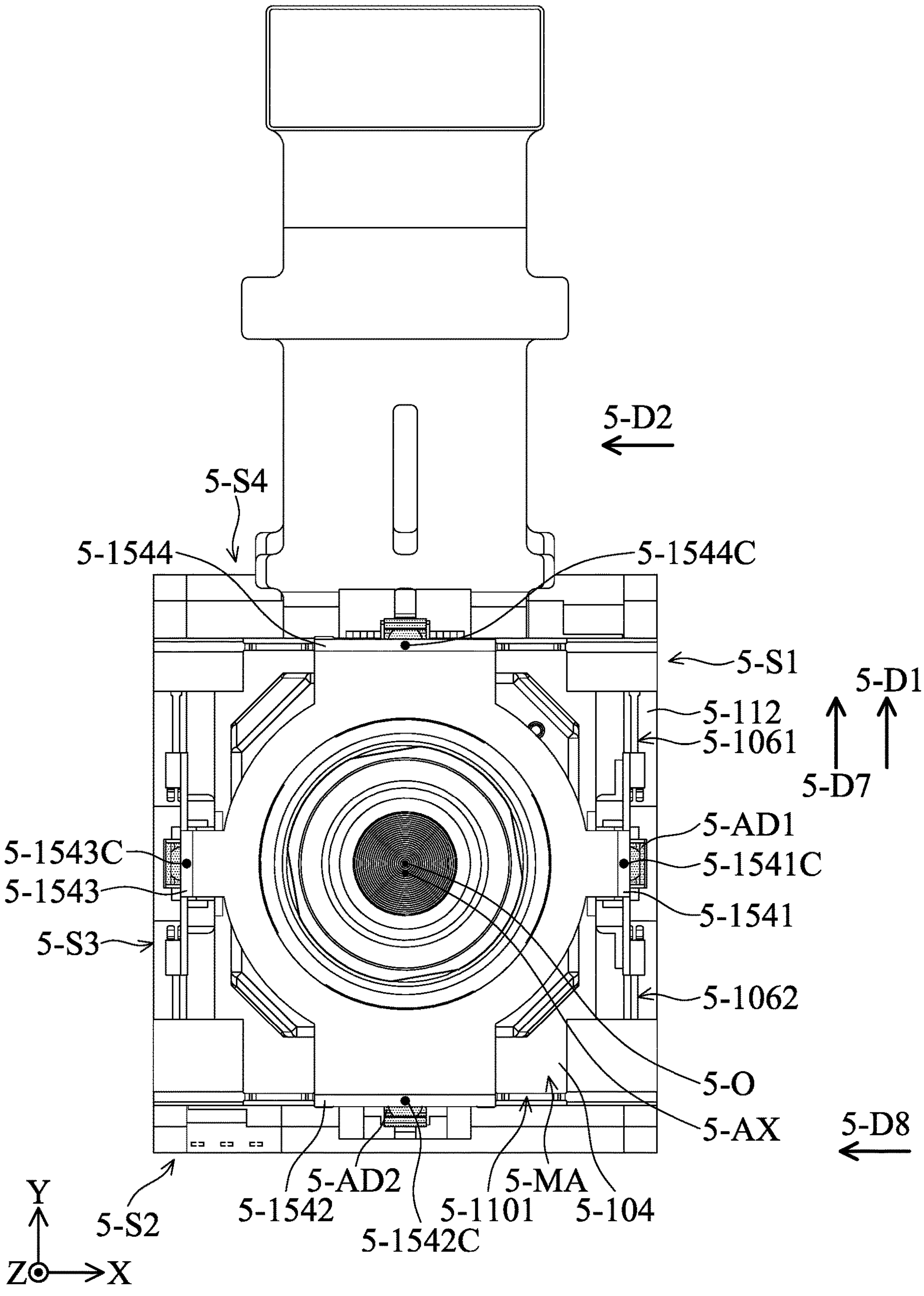
FIG. 59 is a top view of the optical system 5-100 after the casing 5-102 is removed according to an embodiment of the present disclosure.

Please refer to FIG. 59, which is a top view of the optical system 5-100 after the casing 5-102 is removed according to an embodiment of the present disclosure. As shown in FIG. 59, when viewed along the main axis 5-AX, the movable assembly 5-MA is located between the first connecting portion 5-1541 and the third connecting portion 5-1543. When viewed along the main axis 5-AX, the movable assembly 5-MA is located between the second connecting portion 5-1542 and the fourth connecting portion 5-1544.

When viewed along the main axis 5-AX, a shortest distance between a center 5-1541C of the first connecting portion 5-1541 and a center (that is, the optical axis 5-O) of the optical module 5-180 is different than a shortest distance between a center 5-1542C of the second connecting portion 5-1542 and the center of the optical module 5-180. When viewed along the main axis 5-AX, the shortest distance between the center 5-1541C of the first connecting portion 5-1541 and the center of the optical module 5-180 is the same as a shortest distance between a center 5-1543C of the third connecting portion 5-1543 and the center of the optical module 5-180.

When viewed along the main axis 5-AX, the shortest distance between the center 5-1541C of the first connecting portion 5-1541 and the center of the optical module 5-180 is different than a shortest distance between a center 5-1544C of the fourth connecting portion 5-1544 and the center of the optical module 5-180. When viewed along the main axis 5-AX, the shortest distance between the center 5-1542C of the second connecting portion 5-1542 and the center of the optical module 5-180 is different than the shortest distance between the center 5-1544C of the fourth connecting portion 5-1544 and the center of the optical module 5-180.

In addition, it should be noted that when viewed along the main axis 5-AX, the center of the optical module 5-180 and the center of the fixed assembly 5-FA (the main axis 5-AX) do not overlap.

In some embodiments, the shortest distance between the center 5-1541C of the first connecting portion 5-1541 and the center of the optical module 5-180 is less than the shortest distance between the center 5-1542C of the second connecting portion 5-1542 and the center of the optical module 5-180. In some embodiments, the shortest distance between the center 5-1542C of the second connecting portion 5-1542 and the center of the optical module 5-180 is greater than the shortest distance between the center 5-1544C of the fourth connecting portion 5-1544 and the center of the optical module 5-180. It should be noted that the structural configuration between the support assembly 5-150 and the optical module 5-180 is not limited to the above embodiment.

In this embodiment, the optical system 5-100 may include a plurality of damping elements, and the damping elements may be gels, for example. For example, the optical system 5-100 includes a first damping element 5-AD1 and a second damping element 5-AD2. The first damping element 5-AD1 has an elastic material and is disposed between the first connecting portion 5-1541 and the base 5-112 of the fixed assembly 5-FA. The second damping element 5-AD2 has an elastic material and is disposed between the second connecting portion 5-1542 and the holder 5-104 of the movable assembly 5-MA.

The first damping element 5-AD1 is in direct contact with the first connecting portion 5-1541 and the base 5-112 of the fixed assembly 5-FA, and the second damping element 5-AD2 is in direct contact with the second connecting portion 5-1542 and the holder 5-104 of the movable assembly 5-MA. Furthermore, when viewed along the main axis 5-AX, a shortest distance between a center of the first damping element 5-AD1 and the center of the optical module 5-180 is different than a shortest distance between a center of the second damping element 5-AD2 and the center of the optical module 5-180.

In this embodiment, the support assembly 5-150 has a metal material, and the fixed assembly 5-FA (such as the base 5-112) has a non-metal material, such as plastic. The movable assembly 5-MA (for example, the holder 5-104) has a non-metal material, and the first damping element 5-AD1 may have a plastic material.

In addition, when viewed along the main axis 5-AX, the fixed assembly 5-FA has a polygonal structure. Specifically, as shown in FIG. 59, the base 5-112 of the fixed assembly 5-FA has a rectangular structure, including a first side 5-S1, a second side 5-S2, a third side 5-S3 and a fourth side 5-S4. The first side 5-S1 extends in a first direction 5-D1, the second side 5-S2 extends in a second direction 5-D2, the third side 5-S3 extends in the first direction 5-D1, and the fourth side 5-S4 extends in the second direction 5-D2.

The first direction 5-D1 and the second direction 5-D2 are not parallel. Specifically, the first direction 5-D1 and the second direction 5-D2 are perpendicular to each other. The first connecting portion 5-1541 is located on the first side 5-S1, and the second connecting portion 5-1542 is located on the second side 5-S2. The third connecting portion 5-1543 is located on the third side 5-S3, and the fourth connecting portion 5-1544 is located on the fourth side 5-S4.

Figure 60:
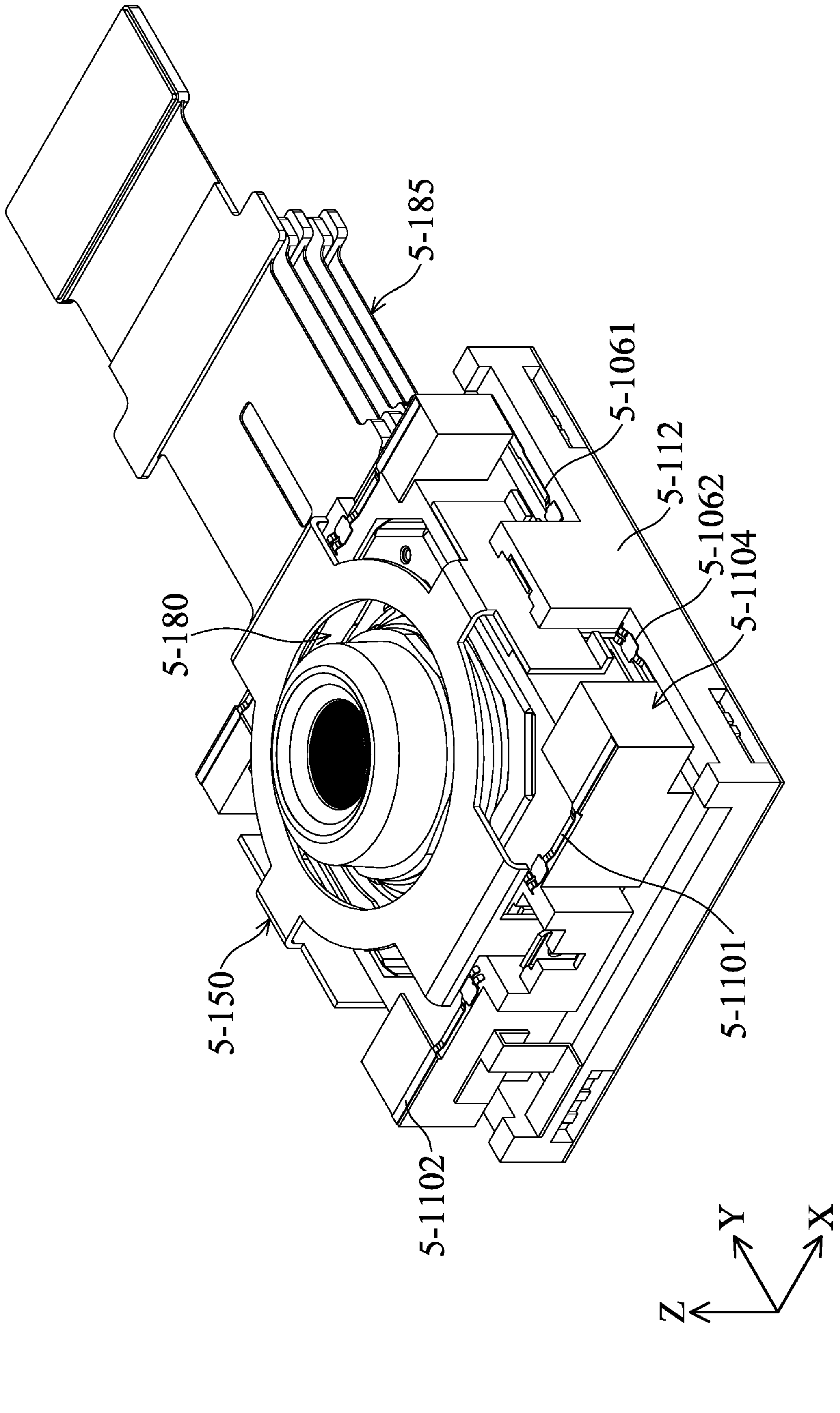
FIG. 60 is a perspective view of the optical system 5-100 after the casing 5-102 is removed according to an embodiment of the present disclosure.
Figure 61:
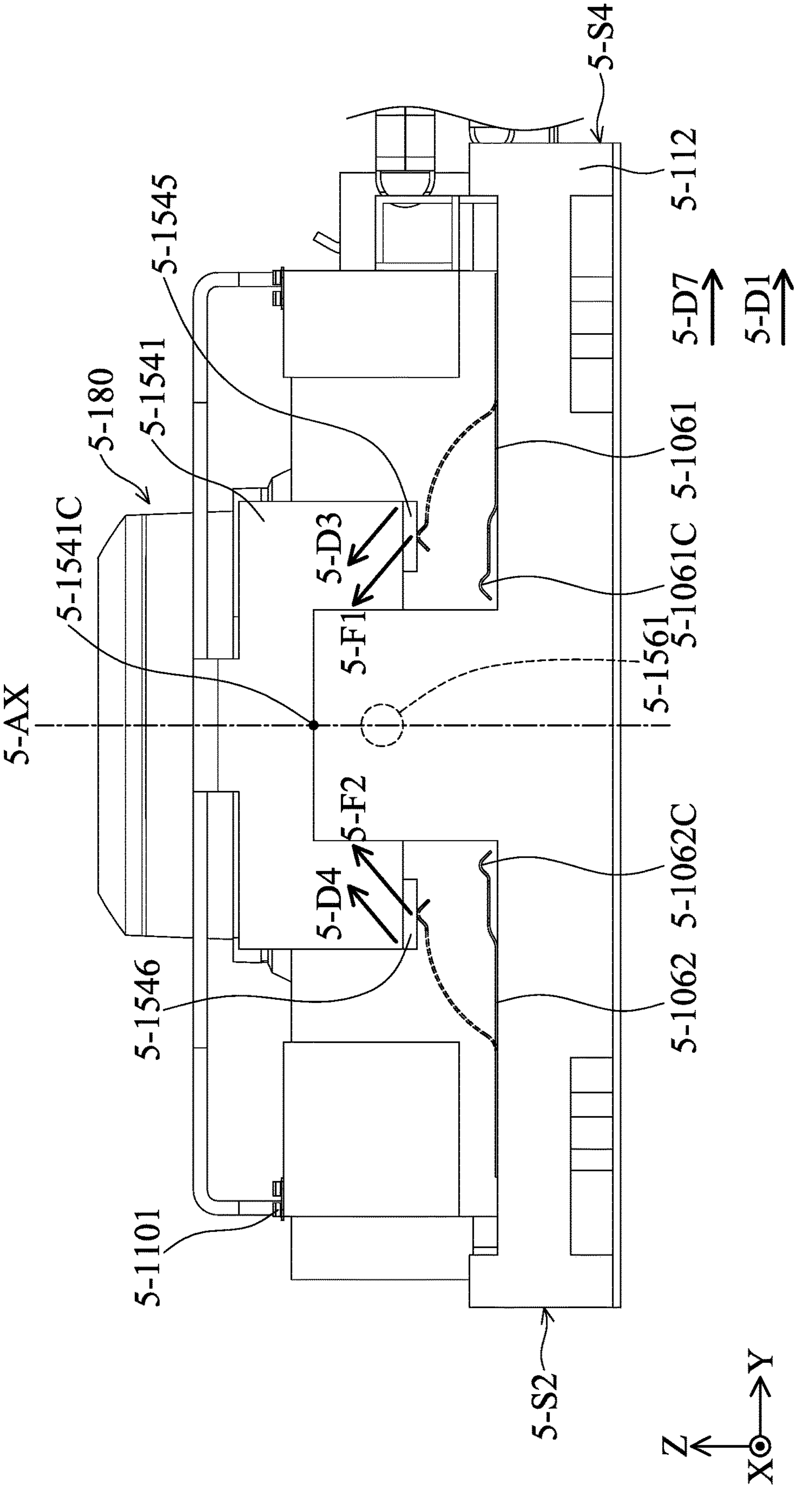
FIG. 61 is a side view of the optical system 5-100 after the casing 5-102 is removed according to an embodiment of the present disclosure.
Figure 62:
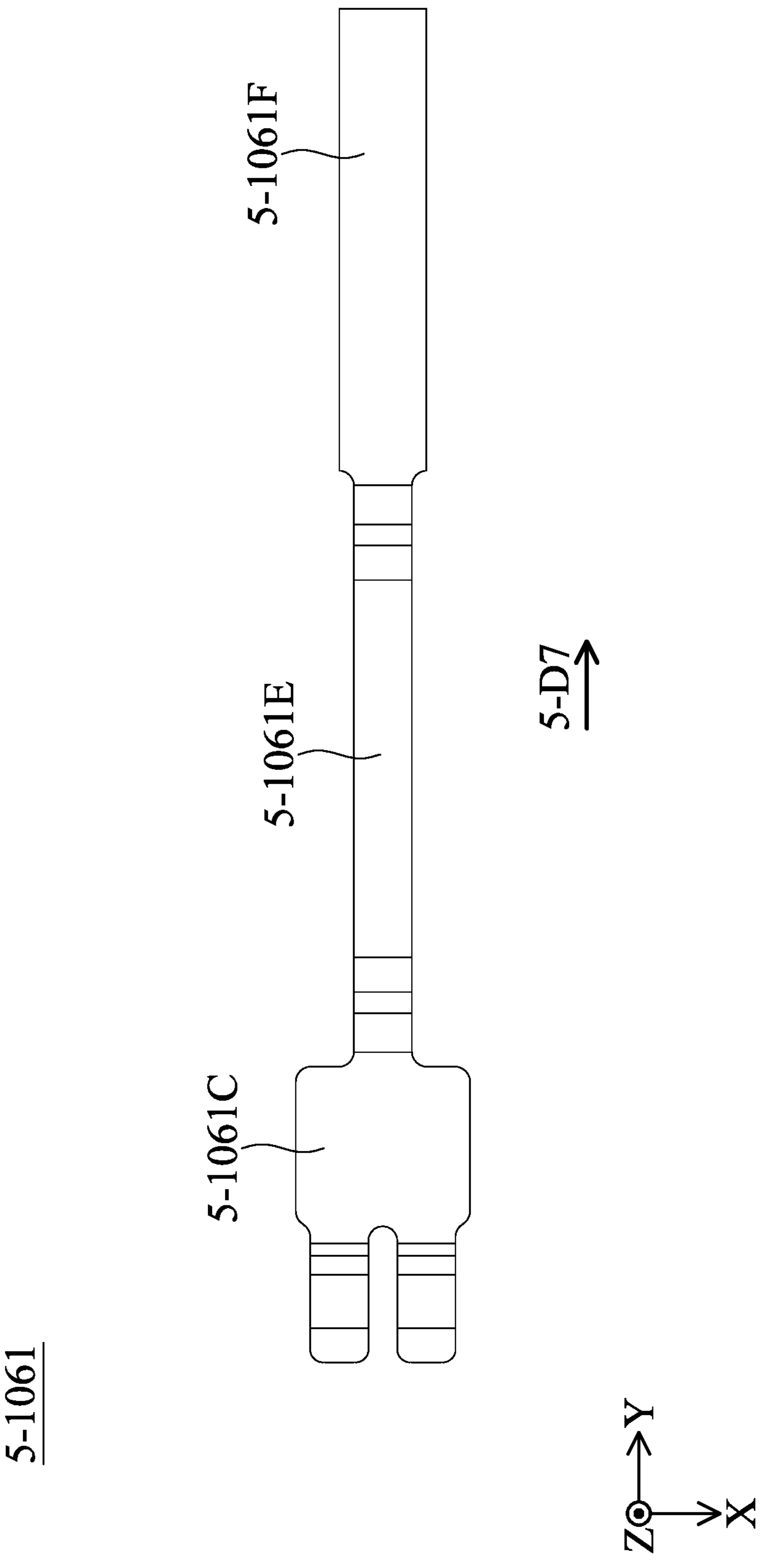
FIG. 62 is a top view of the driving element 5-1061 according to an embodiment of the present disclosure.

Next, please refer to FIG. 59 to FIG. 62. FIG. 60 is a perspective view of the optical system 5-100 after the casing 5-102 is removed according to an embodiment of the present disclosure, FIG. 61 is a side view of the optical system 5-100 after the casing 5-102 is removed according to an embodiment of the present disclosure, and FIG. 62 is a top view of the driving element 5-1061 (the first driving element) according to an embodiment of the present disclosure.

In this embodiment, the driving elements may be formed by shape memory alloy (SMA), which is an alloy that can eliminate the deformation in lower temperature by heating. When the shape memory alloy performs plastic deformation under its phase transition temperature, it may return to its original shape by heating.

In FIG. 61, the driving element 5-1061 (the first driving element) is configured to generate a first driving force 5-F1 to push the first connecting portion 5-1541. The driving element 5-1061 includes a first contact portion 5-1061C, a first fixed portion 5-1061F, and a first connecting section 5-1061E, and the first connecting section 5-1061E is connected between the first contact portion 5-1061C and the first fixed portion 5-1061F. In this embodiment, the temperature of the first connecting section 5-1061E can be changed by passing current, so as to change the shape of the first connecting section 5-1061E, and the first contact portion 5-1061C which is resilient may be moved accordingly.

In this embodiment, when the driving element 5-1061 (the first driving element) is not activated, as shown in FIG. 61, the driving element 5-1061 (the first driving element) is not in contact with at least two of the movable assembly 5-MA, the fixed assembly 5-FA and the support assembly 5-150. Specifically, as shown in FIG. 61, the driving element 5-1061 only contacts the base 5-112 of the fixed assembly 5-FA.

When the driving element 5-1061 (the first driving element) is activated, the driving element 5-1061 (first driving element) is in direct contact with at least two of the movable assembly 5-MA, the fixed assembly 5-FA, and the support assembly 5-150.

Specifically, when the driving element 5-1061 (the first driving element) is activated, the first connecting section 5-1061E will bend and drive the first contact portion 5-1061C to move toward the first connecting portion 5-1541 to the dotted line position in FIG. 61, so that the first contact portion 5-1061C is in direct contact with the bottom of the first connecting portion 5-1541 of the support assembly 5-150, and at least a part (the first fixed portion 5-1061F) of the driving element 5-1061 (the first driving element) is fixedly connected to the base 5-112 of the fixed assembly 5-FA.

It should be noted that in other embodiments, the first contact portion 5-1061C may be in direct contact with the movable assembly 5-MA to drive the movable assembly 5-MA to move.

When the first contact portion 5-1061C contacts the first connecting portion 5-1541, the first driving force 5-F1 is generated to drive the support assembly 5-150 to drive the movable assembly 5-MA to rotate. For example, The movable assembly 5-MA can rotate counterclockwise (such as around the X-axis). The first driving force 5-F1 is parallel to a third direction 5-D3. The third direction 5-D3 is not parallel to the main axis 5-AX, and the third direction 5-D3 is not perpendicular to the main axis 5-AX.

When viewed along the main axis 5-AX, the driving element 5-1061 (the first driving element) is located on the first side 5-S1. When viewed along the main axis 5-AX (or the X-axis), a shortest distance between the first contact portion 5-1061C and the center 5-1541C of the first connecting portion 5-1541 is less than a shortest distance between the first contact portion 5-1061C and the fourth side 5-S4. When viewed along the main axis 5-AX, the shortest distance between the first contact portion 5-1061C and the fourth side 5-S4 is less than a shortest distance between the first contact portion 5-1061C and the second side 5-S2.

In FIG. 61, the left driving element 5-1062 (the second driving element) is configured to generate a second driving force 5-F2 to push the first connecting portion 5-1541. Similarly, the driving element 5-1062 (the second driving element) also includes a second contact portion 5-1062C.

When the driving element 5-1062 (the second driving element) is activated, the second contact portion 5-1062C moves to the dotted line position to be in direct contact with the support assembly 5-150 or the movable assembly 5-MA. In this embodiment, when the driving element 5-1062 (the second driving element) is activated, the second contact portion 5-1062C is in direct contact with the support assembly 5-150.

When the second contact portion 5-1062C contacts the first connecting portion 5-1541, the second driving force 5-F2 is generated to drive the support assembly 5-150 to drive the movable assembly 5-MA to rotate. For example, the movable assembly 5-MA can rotate clockwise. The second driving force 5-F2 is parallel to a fourth direction 5-D4, the fourth direction 5-D4 is not parallel to the main axis 5-AX, the fourth direction 5-D4 is not perpendicular to the main axis 5-AX, and the direction 5-D4 is not parallel to the third direction 5-D3. At this time, at least a part of the driving element 5-1062 (the second driving element) is fixedly connected to the base 5-112 of the fixed assembly 5-FA.

When viewed along the main axis 5-AX, the driving element 5-1062 (the second driving element) is located on the first side 5-S1. When viewed along the main axis 5-AX (or the X-axis), a shortest distance between the second contact portion 5-1062C and the center 5-1541C of the first connecting portion 5-1541 is less than a shortest distance between the second contact portion 5-1062C and the second side 5-S2. When viewed along the main axis 5-AX (or the X-axis), a shortest distance between the second contact portion 5-1062C and the fourth side 5-S4 is greater than the shortest distance between the second contact portion 5-1062C and the second side 5-S2. When viewed along the main axis 5-AX, the first contact portion 5-1061C and the second contact portion 5-1062C are located on the two respective sides of the connecting line from the center of the optical module 5-180 to the center of the first connecting portion 5-1541.

In this embodiment, as shown in FIG. 58 and FIG. 61, the support assembly 5-150 may further include a first contacting portion 5-1545, a second contacting portion 5-1546, and a third contacting portion 5-1547. The first contacting portion 5-1545 corresponds to the first contact portion 5-1061C, the second contacting portion 5-1546 corresponds to the second contact portion 5-1062C, and the third contacting portion 5-1547 corresponds to a third contact portion 5-1101C (FIG. 63).

As shown in FIG. 58, the first contacting portion 5-1545 has a plate-shaped structure and is not parallel to the first connecting portion 5-1541 having a plate-shaped structure. The second contacting portion 5-1546 has a plate-shaped structure and is parallel to the first contacting portion 5-1545. The first contacting portion 5-1545 and the second contacting portion 5-1546 are located on the first connecting portion 5-1541. The third contacting portion 5-1547 has a plate-shaped structure and is not parallel to the first contacting portion 5-1545, and the third contacting portion 5-1547 is located on the support body 5-1540.

Figure 63:
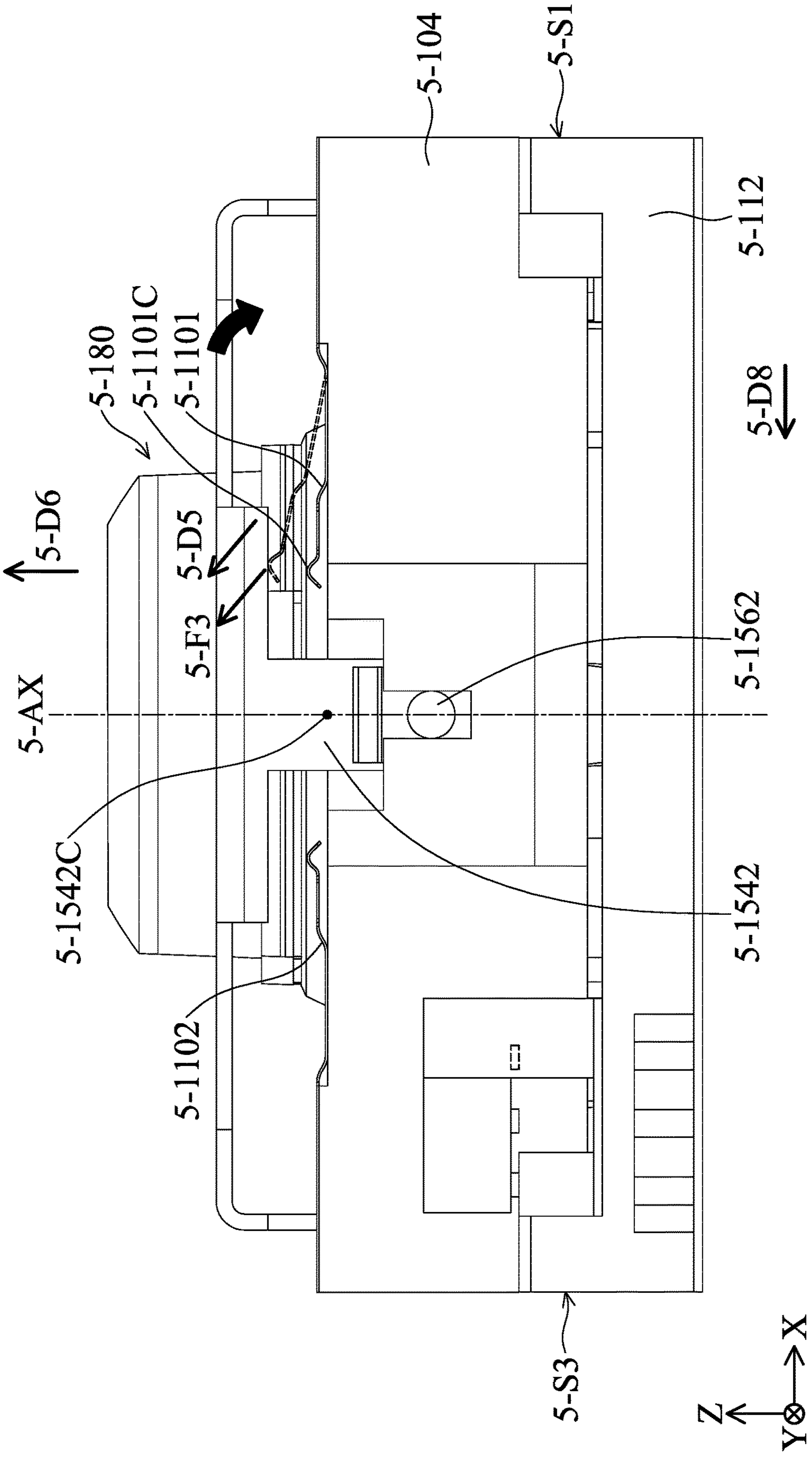
FIG. 63 is a front view of the optical system 5-100 after the casing 5-102 is removed according to an embodiment of the present disclosure.

Please refer to FIG. 63, which is a front view of the optical system 5-100 after the casing 5-102 is removed according to an embodiment of the present disclosure. In FIG. 63, the right driving element 5-1101 (the third driving element) is configured to generate a third driving force 5-F3 to contact the third contacting portion 5-1547 of the second connecting portion 5-1542. The driving element 5-1101 and the driving element 5-1061 have the same structure and include a third contact portion 5-1101C, and when the driving element 5-1101 (the third driving element) is activated, the third contact portion 5-1101C is in direct contact with the support assembly 5-150, but it not limited thereto. In other embodiments, the driving element 5-1101 may be in direct contact with the fixed assembly 5-FA.

At least a part of the driving element 5-1101 (the third driving element) is fixedly connected to the holder 5-104 of the movable assembly 5-MA. Specifically, when the driving element 5-1101 (the third driving element) is activated, the third contact portion 5-1101C directly contacts the second connecting portion 5-1542 of the support assembly 5-150. At this time, the second connecting portion 5-1542 generates a reaction force of the third driving force 5-F3, so that the driving element 5-1101 drives the holder 5-104 and the optical module 5-180 to rotate clockwise (for example, around the Y-axis), as shown by the arrow in FIG. 63.

The third driving force 5-F3 is parallel to a fifth direction 5-D5, the fifth direction 5-D5 is not parallel to the main axis 5-AX, the fifth direction 5-D5 is not perpendicular to the main axis 5-AX, and the fifth direction 5-D5 is not parallel to the third direction 5-D3.

Furthermore, when viewed along the main axis 5-AX, the driving element 5-1101 (the third driving element) is located on the second side 5-S2. When viewed along the main axis 5-AX (or the Y-axis), a shortest distance between the third contact portion 5-1101C and the center 5-1542C of the second connecting portion 5-1542 is less than a shortest distance between the third contact portion 5-1101C and the first side 5-S1. When viewed along the main axis 5-AX (or the Y-axis), the shortest distance between the third contact portion 5-1101C and the first side 5-S1 is less than a shortest distance between the third contact portion 5-1101C and the third side 5-S3.

It should be noted that the first driving force 5-F1, the second driving force 5-F2, and the third driving force 5-F3 all have a component greater than zero in a sixth direction 5-D6. The sixth direction 5-D6 is parallel to the main axis 5-AX and the Z-axis.

In this embodiment, the driving element 5-1061 (the first driving element) is a first shape memory alloy unit with a shape memory alloy. As shown in FIG. 61 and FIG. 62, the first shape memory alloy unit has a long strip-shaped structure and extends in a seventh direction 5-D7. Similarly, the driving element 5-1062 (the second driving element) is a second shape memory alloy unit with a shape memory alloy. The second shape memory alloy unit has a long strip-shaped structure and extends in the seventh direction 5-D7.

The driving element 5-1101 (the third driving element) is a third shape memory alloy unit with a shape memory alloy unit. As shown in FIG. 63, the third shape memory alloy unit has a long strip-shaped structure and extends in an eighth direction 5-D8. The seventh direction 5-D7 and the eighth direction 5-D8 are not parallel. The seventh direction 5-D7 is perpendicular to the eighth direction 5-D8. The seventh direction 5-D7 is parallel to the first direction 5-D1.

It should be noted that, as shown in FIG. 61, in the direction of the main axis 5-AX (the Z-axis), there is a distance between the driving element 5-1061 (the first driving element) and the driving element 5-1101 (the third driving element), and the distance is greater than zero. Furthermore, as shown in FIG. 59 and FIG. 61, when viewed along the main axis 5-AX, the driving element 5-1062 (the second driving element) overlaps at least a part of the driving element 5-1101 (the third driving element). Based on the above structural design, the purpose of miniaturization can be further achieved.

The present disclosure provides an optical system, including the support assembly 5-150, the holder 5-104, the optical module 5-180, and the base 5-112. The optical module 5-180 can be fixedly connected to the holder 5-104, and the holder 5-104 can move relative to the base 5-112 through the support assembly 5-150 to achieve the optical image stabilization function. Furthermore, the driving assembly 5-DA includes multiple driving elements, which are respectively disposed on the holder 5-104 and the base 5-112 to drive the holder 5-104 and the optical module 5-180 to the desired positions quickly and accurately.

The design of the present disclosure allows the optical module 5-180 to move in different directions to enhance the performance of the optical system, and it may also achieve miniaturization.

The Sixth Group of Embodiments

Figure 64:
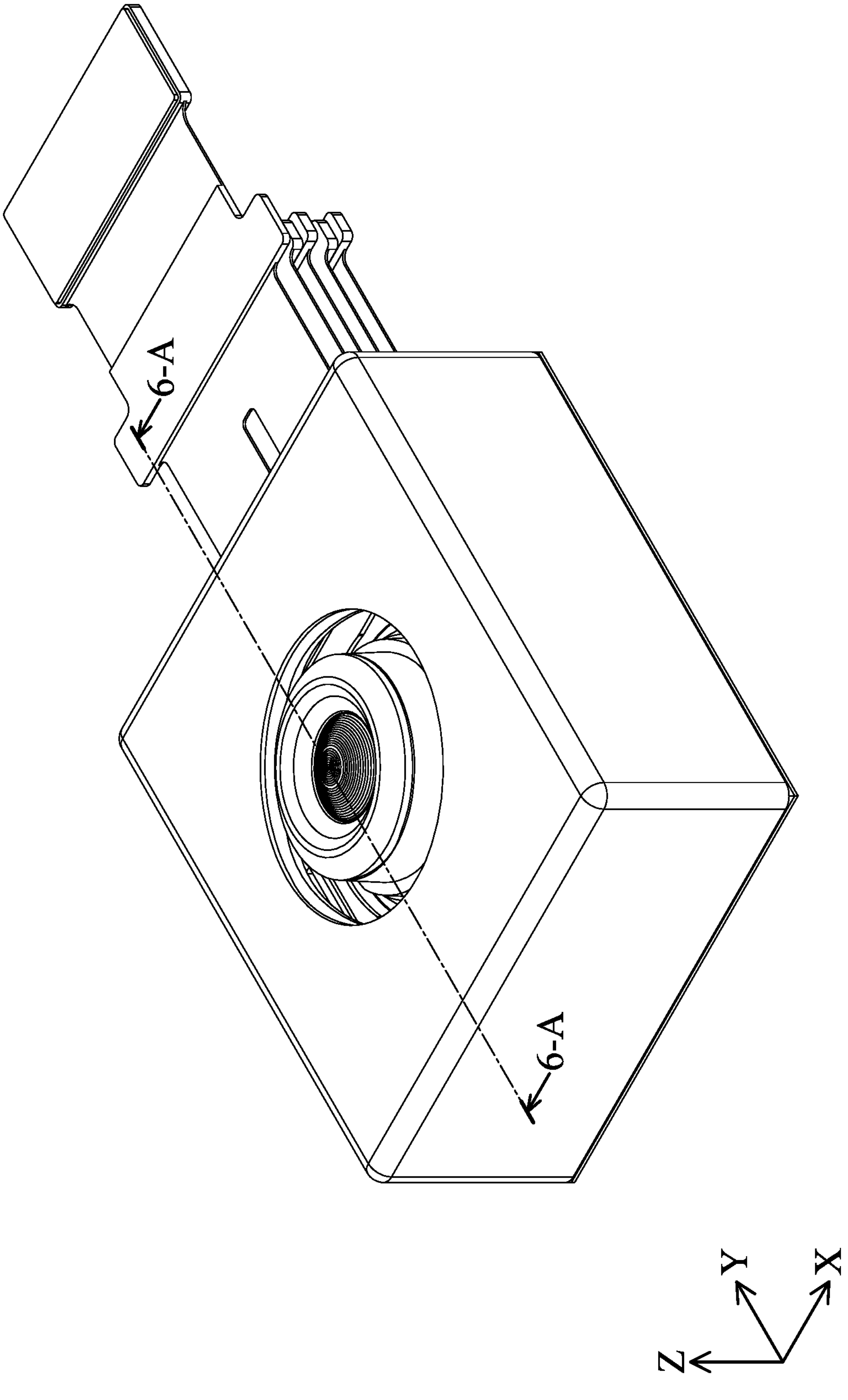
FIG. 64 is a perspective view of an optical system 6-100 according to some embodiments of the present disclosure.
Figure 65:
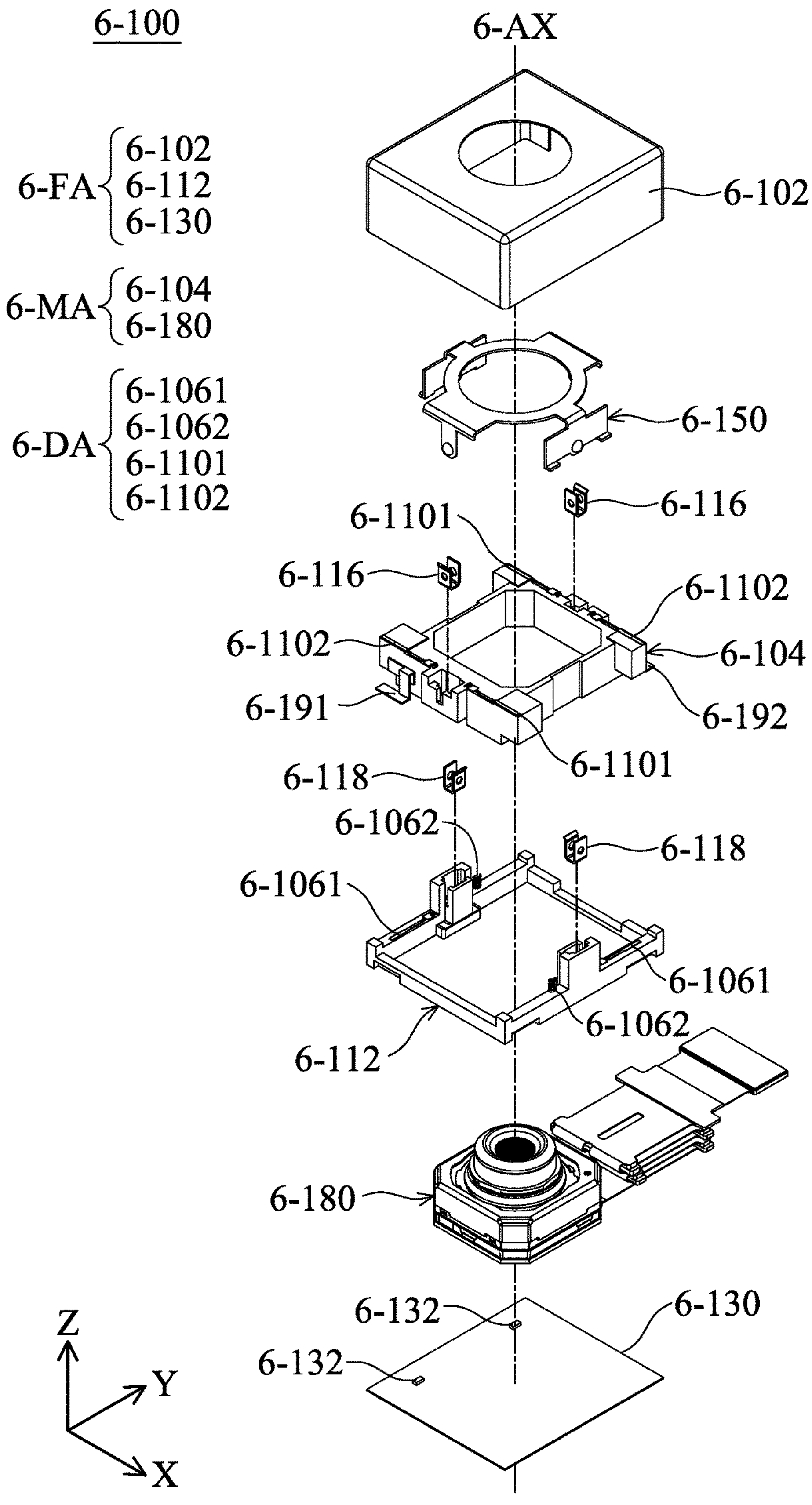
FIG. 65 is an exploded diagram of the optical system 6-100 according to some embodiments of the present disclosure.
Figure 66:
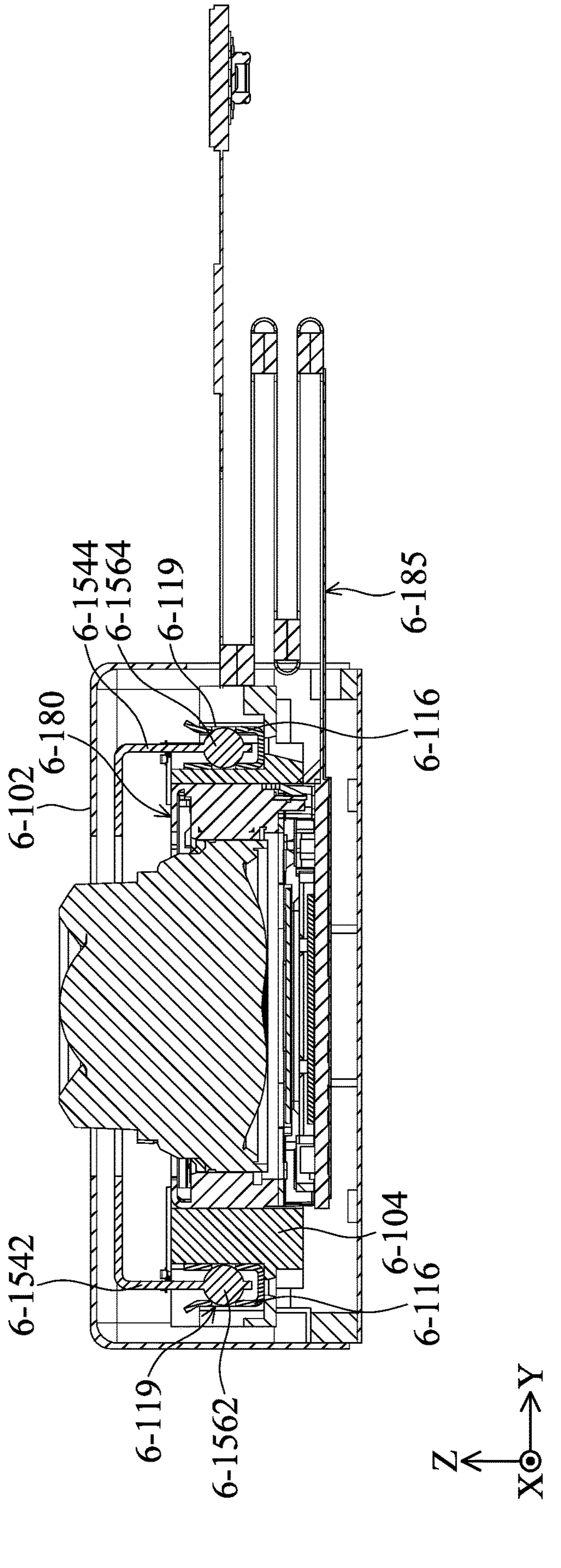
FIG. 66 is a sectional view of the optical system 6-100 along the line 6-A-6-A in FIG. 1 according to some embodiments of the present disclosure.

FIG. 64 is a perspective view of an optical system 6-100 according to some embodiments of the present disclosure, FIG. 65 is an exploded diagram of the optical system 6-100 according to some embodiments of the present disclosure, and FIG. 66 is a sectional view of the optical system 6-100 along the line 6-A-6-A in FIG. 1 according to some embodiments of the present disclosure. In FIG. 65, the optical system 6-100 mainly includes a casing 6-102, a base 6-112, a holder 6-104, driving elements 6-1061~6-1062, driving elements 6-1101~6-1102, position sensing elements 6-132, a support assembly 6-150, contact elements 6-116, contact elements 6-118, a circuit board 6-130 which are arranged along a main axis 6-AX The optical system 6-100 can be used to drive an optical module 6-180, or it can also be used to drive various optical elements (such as lenses, mirrors, prisms, beam splitters), aperture and so on) to move, but it is not limited thereto.

In some embodiments, the casing 6-102 and the base 6-112 can be combined with each other to form a housing of the optical system 6-100. In addition, the casing 6-102 and the base 6-112 can be collectively called as a fixed assembly 6-FA. The holder 6-104 and the optical module 6-180 can be collectively called a movable assembly 6-MA.

In some embodiments, the movable assembly 6-MA may move relative to the fixed assembly 6-FA (e.g. the casing 6-102 and the base 6-112). Therefore, the optical module 6-180 which is disposed on the holder 6-104 may move with the holder 6-104 to achieve auto focus (AF) or optical image stabilization (OIS).

In some embodiments, the driving elements 6-1061, 6-1062 and the driving elements 6-1101, 6-1102 may be collectively referred to as a driving assembly 6-DA, which is used to drive the holder 6-104 to move relative to the fixed assembly 6-FA. In this embodiment, the driving assembly 6-DA may include eight driving elements.

The driving elements can be located on fixed assembly 6-FA and the movable assembly 6-MA (the holder 6-104) respectively. The driving elements can be a shape memory alloy, and the optical module 6-180 is moved relative to the fixed assembly 6-FA by temperature control to produce deformation, which can achieve effects such as auto focus (AF) or optical image stabilization (OIS). In some embodiments, the driving assembly 6-DA may also include driving elements such as piezoelectric elements, magnets, and coils.

It should be noted that a pair of the contact element 6-118 and the contact element 6-116 may be respectively disposed on the base 6-112 and the holder 6-104. The contact elements 6-118 may be disposed at sides of the base 6-112, and the contact elements 6-116 may be disposed on the sides of the holder 6-104. In some embodiments, the base 6-112 and the contact element 6-118 may be formed as one piece or formed separately, and the holder 6-104 and the contact element 6-116 may be formed as one piece or formed separately as well.

Moreover, the circuit board 6-130 may be, for example, a flexible printed circuit (FPC), which may be bonded on the fixed assembly 6-FA by adhesion. In some embodiments, the circuit board 6-130 is electrically connected to other electronic elements in the optical system 6-100 or outside the optical system 6-100. For example, the circuit board 6-130 may be used for transferring electric signal to the driving assembly 6-DA to control the movement of the holder 6-104.

In some embodiments, position sensing elements 6-132 may be disposed in the optical system 6-100 to detect the position of the movable assembly 6-MA relative to the fixed assembly 6-FA. The position sensing elements may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

Figure 67:
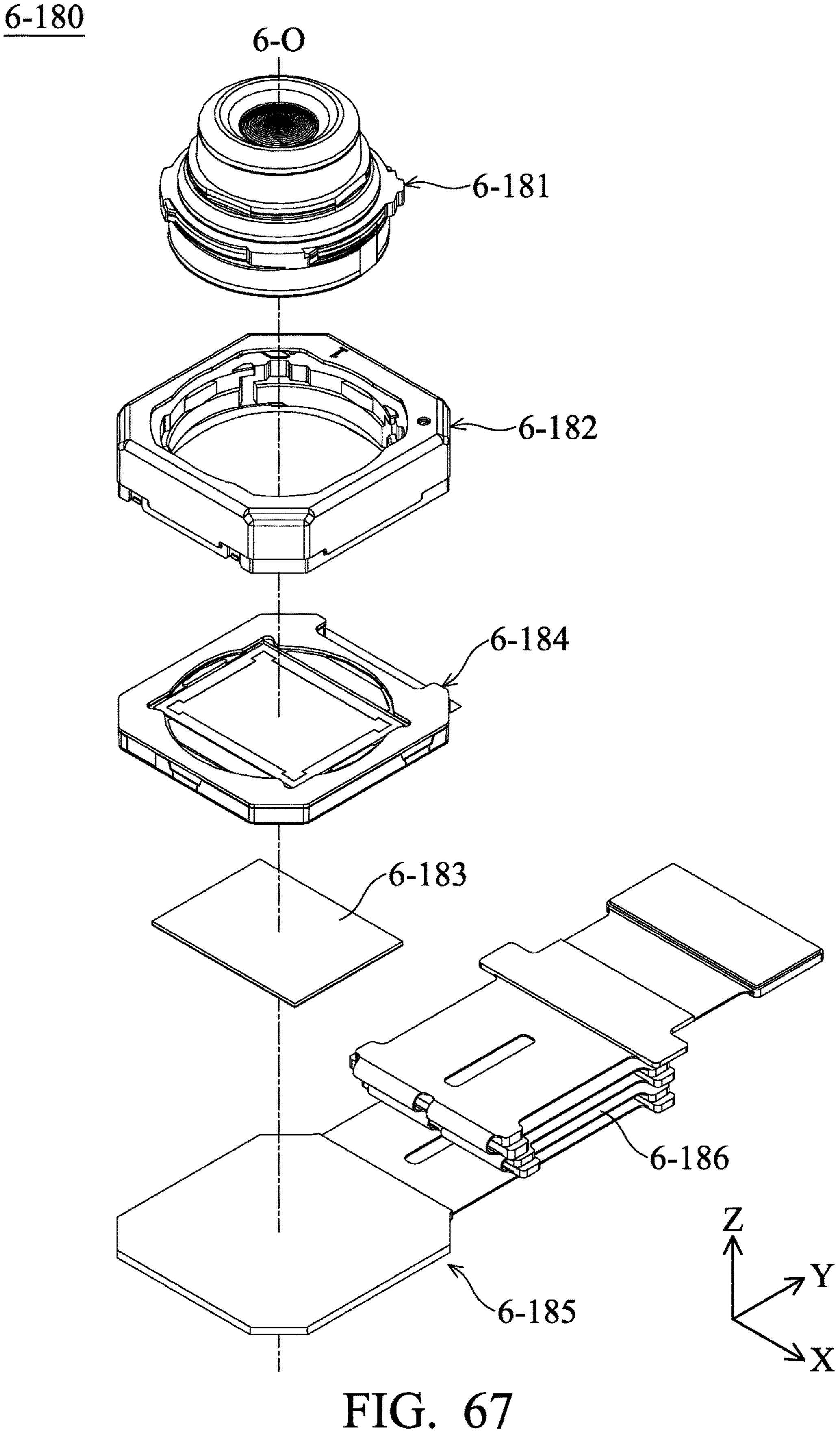
FIG. 67 is an exploded diagram of the optical module 6-180 according to an embodiment of the present disclosure.

FIG. 67 is an exploded diagram of the optical module 6-180 according to an embodiment of the present disclosure. The optical module 6-180 may be used for driving an optical element 6-181, and may include a driving assembly 6-182, an optical sensor 6-183, a holder 6-184, and a substrate 6-185 arranged in an optical axis 6-O of the optical element 6-181. In this embodiment, the optical axis 6-O may be parallel to the main axis 6-AX.

The optical element 6-181 may be affixed on the driving assembly 6-182, such as by locking, adhesion, or snapping. Furthermore, the driving assembly 6-182 may also include additional drive elements (for example, a combination of a magnet and a coil, not shown) for driving the optical element 6-181 to move in different direction from the holder 6-104 to drive the optical element 6-181 in more directions. For example, the optical element 6-181 may be driven in X, Y, or Z directions.

The optical sensor 6-183 may detect the light passing through the optical element 6-181 and transfer the light to electric signal to other external element (e.g. a processor). The holder 6-184 may be disposed between the driving assembly 6-182 and the optical sensor 6-183 to connect the elements.

The substrate 6-185 may be a flexible printed circuit which may be affixed on the holder 6-104 by adhesion. In this embodiment, the substrate 6-185 is electrically connected to electronic elements inside or outside the optical module 6-180. For example, electric signal may be transferred by the substrate 6-185 to the driving assembly to control the movement of the optical element 6-181 in X, Y, or Z directions to achieve auto focus or optical image stabilization.

An extending portion 6-186 may be formed on a side of the substrate 6-185, and the extending portion 6-186 may have a structure that is stacked in the Z direction as multiple layers to save the space and achieve miniaturization.

Figure 68:
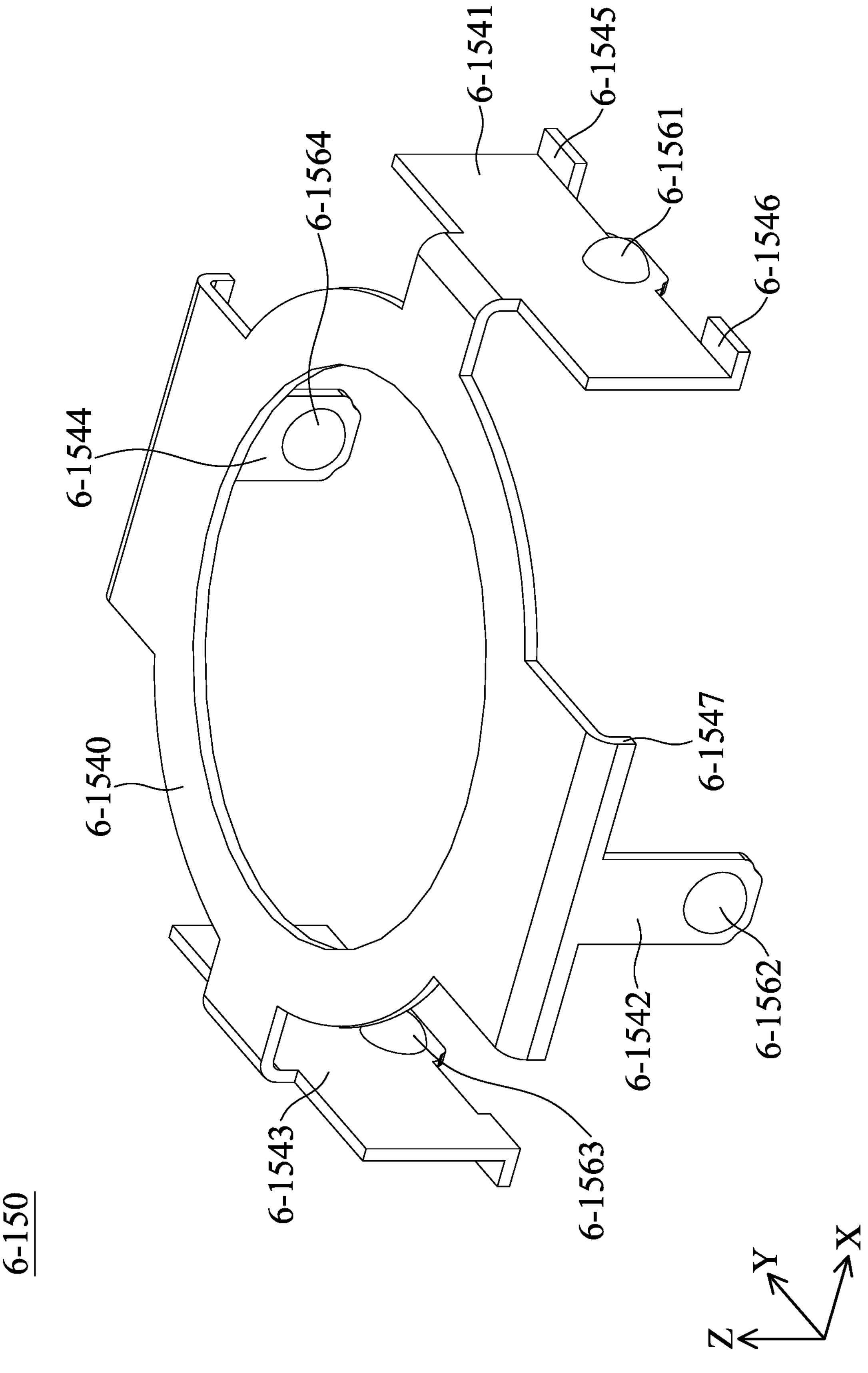
FIG. 68 is a perspective view of the support assembly 6-150 according to an embodiment of the present disclosure.

Please refer to FIG. 66 and FIG. 68, and FIG. 68 is a perspective view of the support assembly 6-150 according to an embodiment of the present disclosure. The support assembly 6-150 includes a support body 6-1540, a first connecting portion 6-1541, a second connecting portion 6-1542, a third connecting portion 6-1543, a fourth connecting portion 6-1544, and a plurality of coupling portions 6-1561~6-1564. In some embodiments, the support body 6-1540 may have a circular shape, and the support body 6-1540 has a plate-shaped structure. The first connecting portion 6-1541 to the fourth connecting portion 6-1544 may extend from the support body 6-1540 in the Z-axis. The coupling portions 6-1561 to 6-1564 are respectively located at the first connecting portion 6-1541 to the fourth connecting portion 6-1544 and may have a spherical shape.

The support body 6-1540 is movable relative to the fixed assembly 6-FA and the movable assembly 6-MA. In this embodiment, the support body 6-1540 is movably connected to the base 6-112 of the fixed assembly 6-FA via the first connecting portion 6-1541, the holder 6-104 of the movable assembly 6-MA is movably connected to the support body 6-1540 via the second connecting portion 6-1542, the support body 6-1540 is movably connected to the base 6-112 of the fixed assembly 6-FA via the third connecting portion 6-1543, the holder 6-104 of the movable assembly 6-MA is movably connected to the support body 6-1540 via the fourth connecting portion 6-1544, and the support body 6-1540 is perpendicular to the main axis 6-AX.

Specifically, a pair of connecting portions (the first connecting portion 6-1541 and the third connecting portion 6-1543) of the support assembly 6-150 are disposed in the contact elements 6-118, and the other pair of connecting portions (the second connecting portion 6-1542 and the fourth connecting portion 6-1544) are disposed in the contact elements 6-116. In other words, the contact elements 6-116 or the contact elements 6-118 are in contact with one of the connecting portions.

As shown in FIG. 65 and FIG. 66, the contact element 6-116 and the contact element 6-118 can be clamps, the contact elements 6-116 are affixed to the holder 6-104, and the contact elements 6-118 are affixed to the base 6-112. Furthermore, the coupling portions 6-1561~6-1564 are movably coupled to circular openings 6-119 of the contact elements 6-116 or the contact elements 6-118, so that the support assembly 6-150 is movable relative to the fixed assembly 6-FA and the movable assembly 6-MA.

Figure 69:
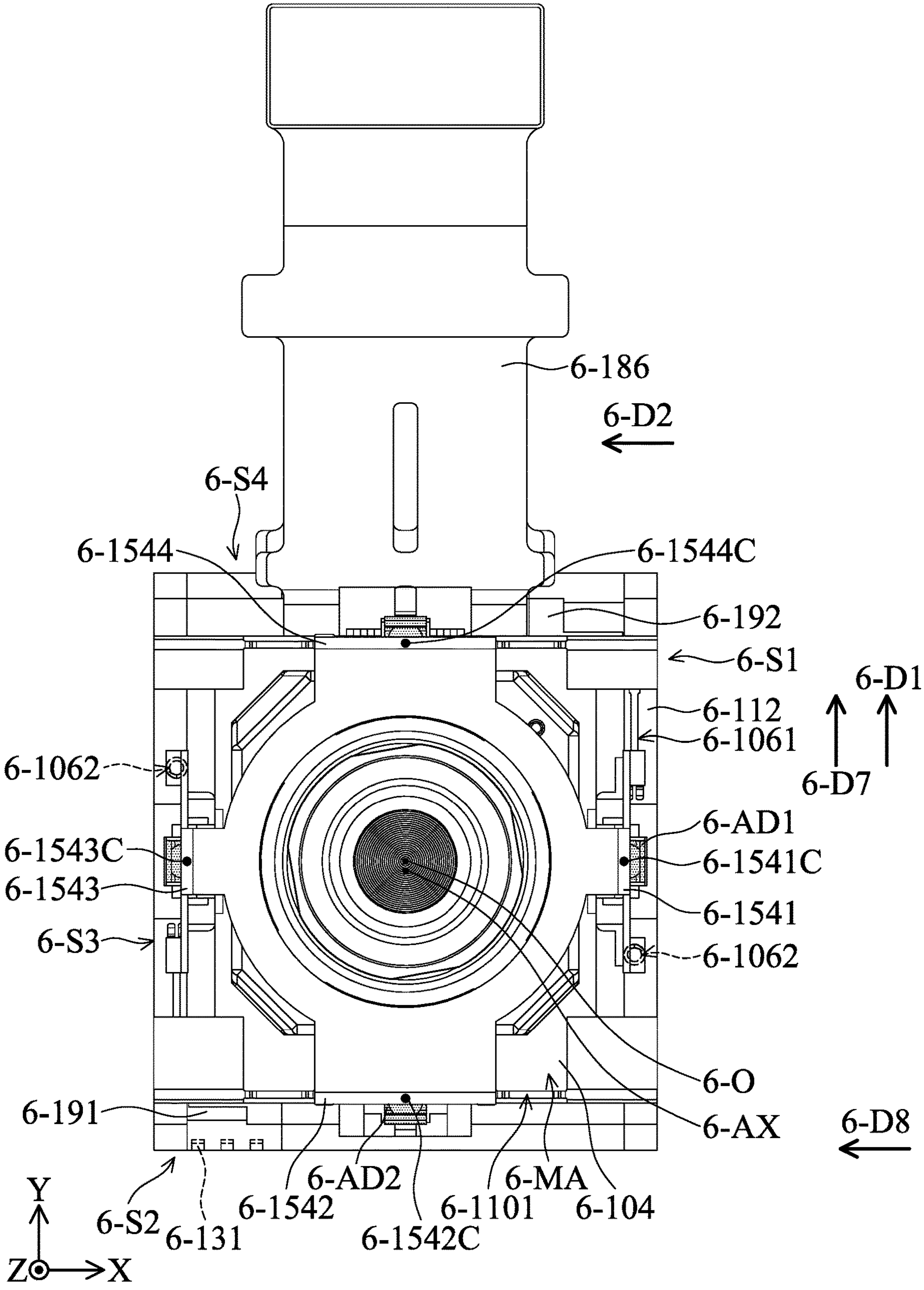
FIG. 69 is a top view of the optical system 6-100 after the casing 6-102 is removed according to an embodiment of the present disclosure.

Please refer to FIG. 69, which is a top view of the optical system 6-100 after the casing 6-102 is removed according to an embodiment of the present disclosure. As shown in FIG. 69, when viewed along the main axis 6-AX, the movable assembly 6-MA is located between the first connecting portion 6-1541 and the third connecting portion 6-1543. When viewed along the main axis 6-AX, the movable assembly 6-MA is located between the second connecting portion 6-1542 and the fourth connecting portion 6-1544.

When viewed along the main axis 6-AX, a shortest distance between a center 6-1541C of the first connecting portion 6-1541 and a center (that is, the optical axis 6-O) of the optical module 6-180 is different from a shortest distance between a center 6-1542C of the second connecting portion 6-1542 and the center of the optical module 6-180. When viewed along the main axis 6-AX, the shortest distance between the center 6-1541C of the first connecting portion 6-1541 and the center of the optical module 6-180 is the same as a shortest distance between a center 6-1543C of the third connecting portion 6-1543 and the center of the optical module 6-180.

When viewed along the main axis 6-AX, the shortest distance between the center 6-1541C of the first connecting portion 6-1541 and the center of the optical module 6-180 is different from a shortest distance between a center 6-1544C of the fourth connecting portion 6-1544 and the center of the optical module 6-180. When viewed along the main axis 6-AX, the shortest distance between the center 6-1542C of the second connecting portion 6-1542 and the center of the optical module 6-180 is different from the shortest distance between the center 6-1544C of the fourth connecting portion 6-1544 and the center of the optical module 6-180.

In addition, it is worth noting that when viewed along the main axis 6-AX, the center of the optical module 6-180 and the center of the fixed assembly 6-FA (the main axis 6-AX) do not overlap.

In some embodiments, the shortest distance between the center 6-1541C of the first connecting portion 6-1541 and the center of the optical module 6-180 is less than the shortest distance between the center 6-1542C of the second connecting portion 6-1542 and the center of the optical module 6-180. In some embodiments, the shortest distance between the center 6-1542C of the second connecting portion 6-1542 and the center of the optical module 6-180 is greater than the shortest distance between the center 6-1544C of the fourth connecting portion 6-1544 and the center of the optical module 6-180. It should be noted that the structural configuration between the support assembly 6-150 and the optical module 6-180 is not limited to the above embodiment.

In this embodiment, the optical system 6-100 may include a plurality of damping elements, and the damping elements may be gels, for example. For example, the optical system 6-100 includes a first damping element 6-AD1 and a second damping element 6-AD2. The first damping element 6-AD1 has an elastic material and is disposed between the first connecting portion 6-1541 and the base 6-112 of the fixed assembly 6-FA. The second damping element 6-AD2 has an elastic material and is disposed between the second connecting portion 6-1542 and the holder 6-104 of the movable assembly 6-MA.

The first damping element 6-AD1 is directly in contact with the first connecting portion 6-1541 and the base 6-112 of the fixed assembly 6-FA, and the second damping element 6-AD2 is directly in contact with the second connecting portion 6-1542 and the holder 6-104 of the movable assembly 6-MA. Furthermore, when viewed along the main axis 6-AX, a shortest distance between a center of the first damping element 6-AD1 and the center of the optical module 6-180 is different from a shortest distance between a center of the second damping element 6-AD2 and the center of the optical module 6-180.

In this embodiment, the support assembly 6-150 has a metal material, and the fixed assembly 6-FA (such as the base 6-112) has a non-metal material, such as plastic. The movable assembly 6-MA (for example, the holder 6-104) has a non-metal material, and the first damping element 6-AD1 may have a plastic material.

In addition, when viewed along the main axis 6-AX, the fixed assembly 6-FA has a polygonal structure. Specifically, as shown in FIG. 69, the base 6-112 of the fixed assembly 6-FA has a rectangular structure, including a first side 6-S1, a second side 6-S2, a third side 6-S3 and a fourth side 6-S4. The first side 6-S1 extends in a first direction 6-D1, the second side 6-S2 extends in a second direction 6-D2, the third side 6-S3 extends in the first direction 6-D1, and the fourth side 6-S4 extends in the second direction 6-D2.

The first direction 6-D1 and the second direction 6-D2 are not parallel. Specifically, the first direction 6-D1 and the second direction 6-D2 are perpendicular to each other. The first connecting portion 6-1541 is located at the first side 6-S1, and the second connecting portion 6-1542 is located at the second side 6-S2. The third connecting portion 6-1543 is located at the third side 6-S3, and the fourth connecting portion 6-1544 is located at the fourth side 6-S4.

Figure 70:
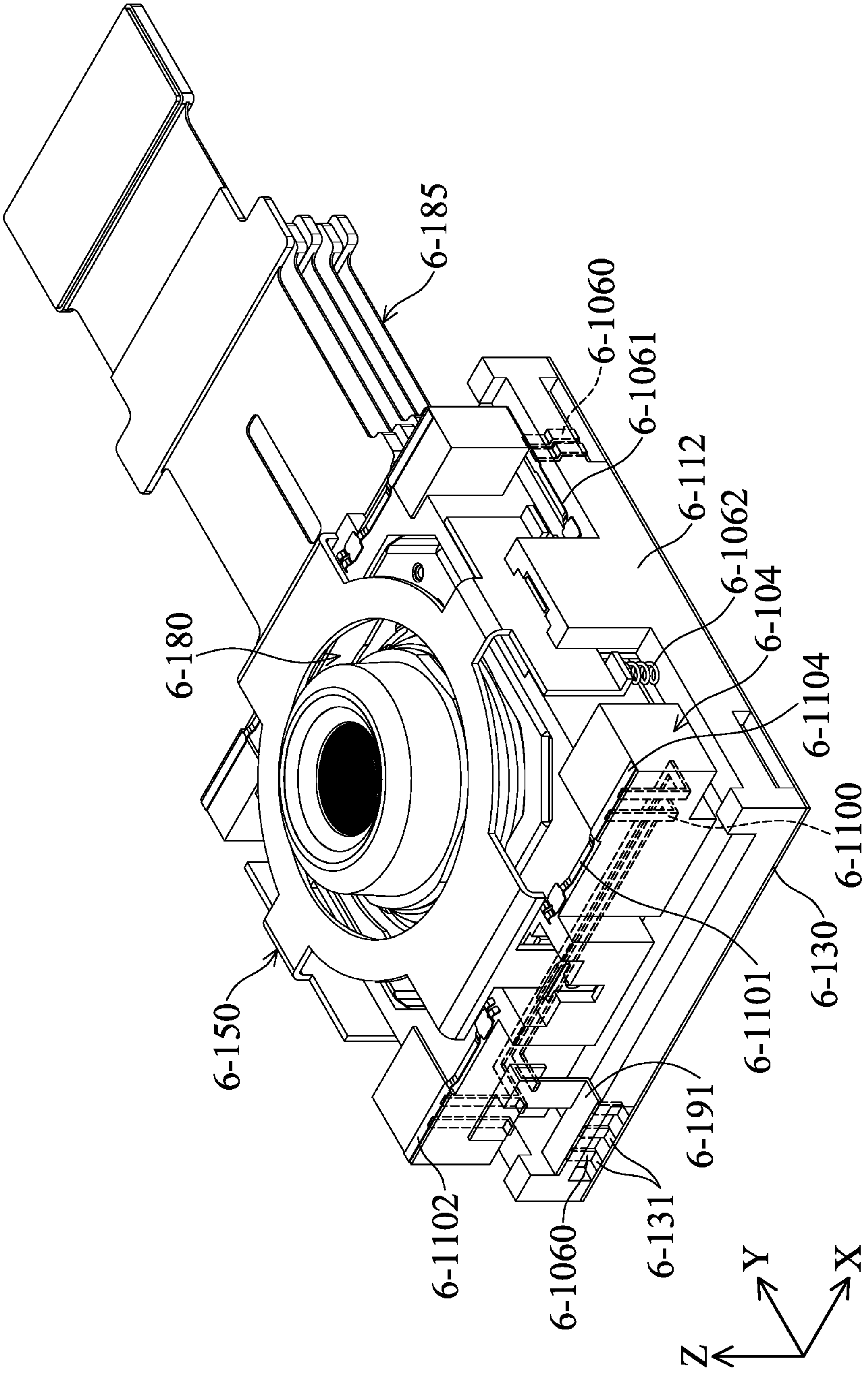
FIG. 70 is a perspective view of the optical system 6-100 after the casing 6-102 is removed according to an embodiment of the present disclosure.
Figure 71:
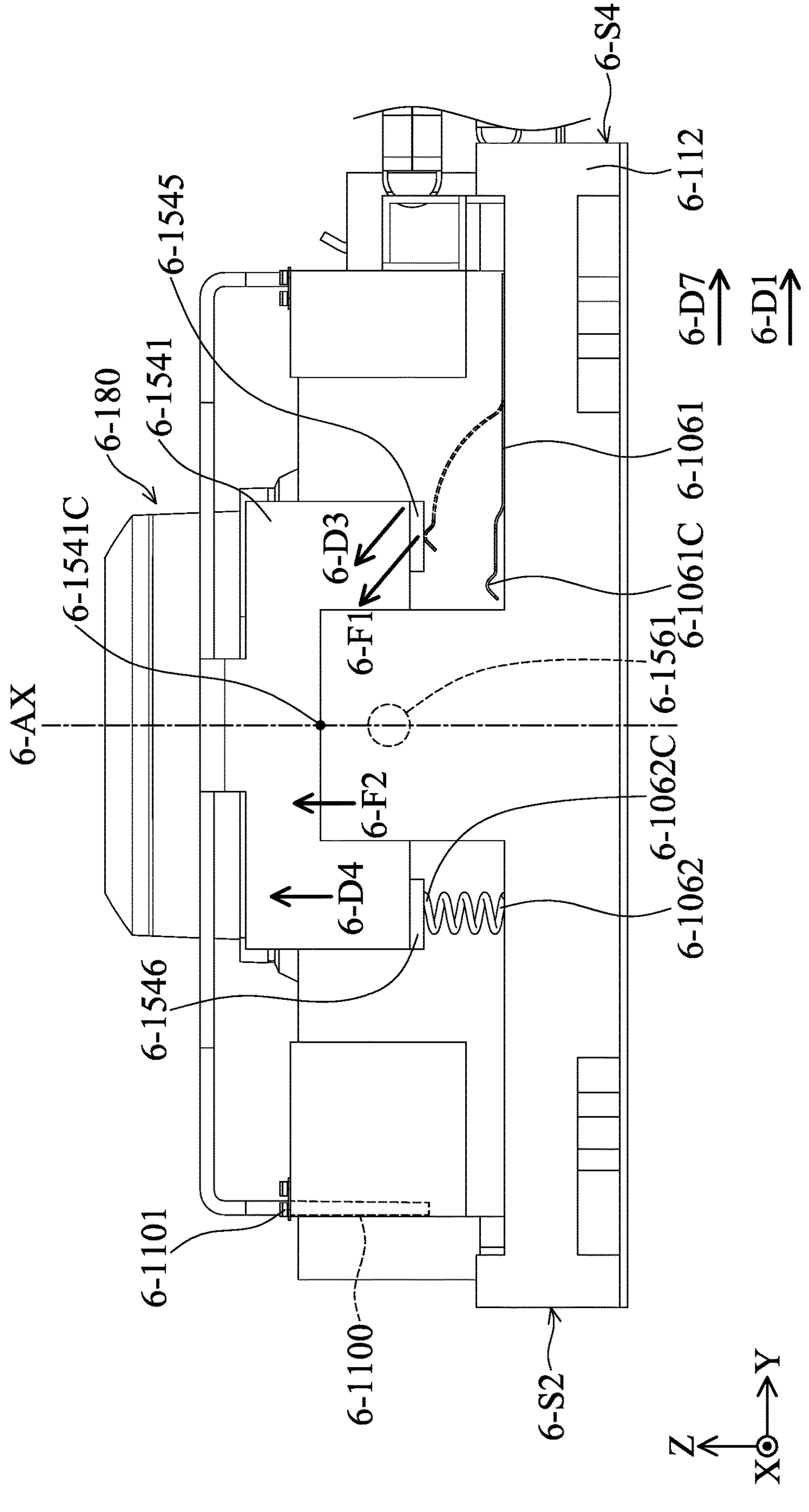
FIG. 71 is a side view of the optical system 6-100 after the casing 6-102 is removed according to an embodiment of the present disclosure.
Figure 72:
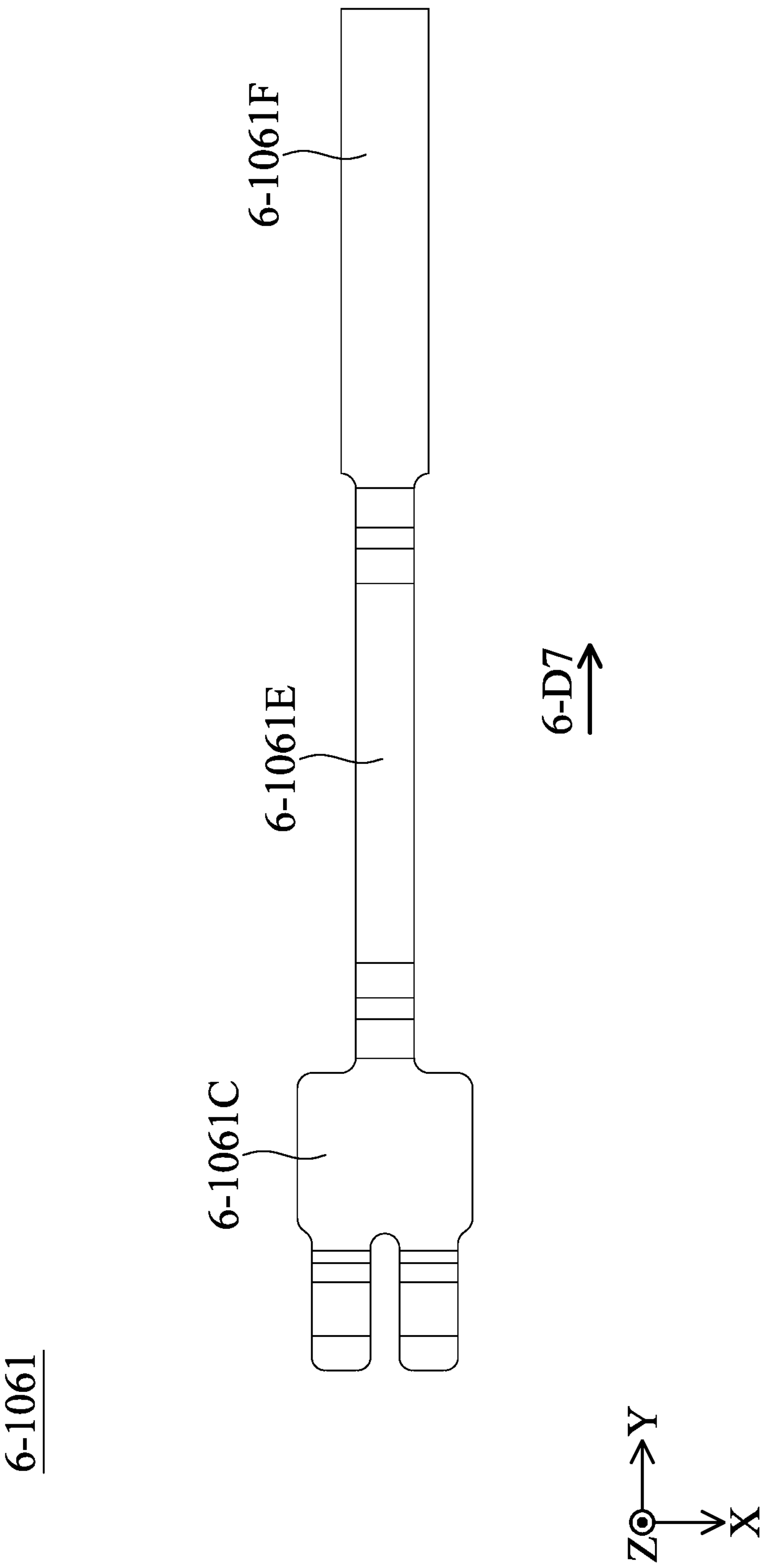
FIG. 72 is a top view of the driving element 6-1061 according to an embodiment of the present disclosure.

Next, please refer to FIG. 69 to FIG. 72. FIG. 70 is a perspective view of the optical system 6-100 after the casing 6-102 is removed according to an embodiment of the present disclosure, FIG. 71 is a side view of the optical system 6-100 after the casing 6-102 is removed according to an embodiment of the present disclosure, and FIG. 72 is a top view of the driving element 6-1061 (the first driving element) according to an embodiment of the present disclosure.

In this embodiment, the driving elements may be formed by shape memory alloy (SMA), which is an alloy that can eliminate the deformation in lower temperature by heating. When the shape memory alloy performs plastic deformation under its phase transition temperature, it may return to its original shape by heating.

In FIG. 71, the driving element 6-1061 (the first driving element) is configured to generate a first driving force 6-F1 to push the first connecting portion 6-1541. The driving element 6-1061 includes a first contact portion 6-1061C, a first fixed portion 6-1061F, and a first connecting section 6-1061E, and the first connecting section 6-1061E is connected between the first contact portion 6-1061C and the first fixed portion 6-1061F. In this embodiment, the temperature of the first connecting section 6-1061E can be changed by passing current, so as to change the shape of the first connecting section 6-1061E, and the first contact portion 6-1061C which is resilient may be moved accordingly.

In this embodiment, when the driving element 6-1061 (the first driving element) is not activated, as shown in FIG. 71, the driving element 6-1061 (the first driving element) is not in contact with at least two of the movable assembly 6-MA, the fixed assembly 6-FA and the support assembly 6-150. Specifically, as shown in FIG. 71, the driving element 6-1061 only contacts the base 6-112 of the fixed assembly 6-FA. When the driving element 6-1061 (the first driving element) is activated, the driving element 6-1061 (first driving element) is in direct contact with at least two of the movable assembly 6-MA, the fixed assembly 6-FA, and the support assembly 6-150.

Specifically, when the driving element 6-1061 (the first driving element) is activated, the first connecting section 6-1061E will bend and drive the first contact portion 6-1061C to move toward the first connecting portion 6-1541 to the dotted line position in FIG. 71, so that the first contact portion 6-1061C is in direct contact with the bottom of the first connecting portion 6-1541 of the support assembly 6-150, and at least a part (the first fixed portion 6-1061F) of the driving element 6-1061 (the first driving element) is fixedly connected to the base 6-112 of the fixed assembly 6-FA.

It should be noted that in other embodiments, the first contact portion 6-1061C may be in direct contact with the movable assembly 6-MA to drive the movable assembly 6-MA to move.

When the first contact portion 6-1061C contacts the first connecting portion 6-1541, the first driving force 6-F1 is generated to drive the support assembly 6-150 to drive the movable assembly 6-MA to rotate. For example, The movable assembly 6-MA can rotate counterclockwise (such as around the X-axis). The first driving force 6-F1 is parallel to a third direction 6-D3. The third direction 6-D3 is not parallel to the main axis 6-AX, and the third direction 6-D3 is not perpendicular to the main axis 6-AX.

When viewed along the main axis 6-AX, the driving element 6-1061 (the first driving element) is located at the first side 6-S1. When viewed along the main axis 6-AX (or the X-axis), a shortest distance between the first contact portion 6-1061C and the center 6-1541C of the first connecting portion 6-1541 is less than a shortest distance between the first contact portion 6-1061C and the fourth side 6-S4. When viewed along the main axis 6-AX, the shortest distance between the first contact portion 6-1061C and the fourth side 6-S4 is less than a shortest distance between the first contact portion 6-1061C and the second side 6-S2.

In this embodiment, the left driving element 6-1062 (the second driving element) can be a resilient element which is configured to generate a second driving force 6-F2 (a resilient force) to push the first connecting portion 6-1541. Similarly, the driving element 6-1062 (the second driving element) also includes a second contact portion 6-1062C. The second contact portion 6-1062C can be in direct contact with the support assembly 6-150.

When the second contact portion 6-1062C contacts the first connecting portion 6-1541, the second driving force 6-F2 is generated to drive the support assembly 6-150 to drive the movable assembly 6-MA to rotate. For example, the driving element 6-1062 is connected between the first connecting portion 6-1541 and the base 6-112, and the first driving force 6-F1 and the second driving force 6-F2 can cooperatively control the movable assembly 6-MA to move relative to the fixed assembly 6-FA.

For example, when the driving element 6-1061 is not activated, the second driving force 6-F2 maintains the first connecting portion 6-1541 at an initial position in FIG. 71. Furthermore, when the first contact portion 6-1061C pushes the first connecting portion 6-1541 and the first driving force 6-F1 is greater than the second driving force 6-F2, the movable assembly 6-MA can rotate counterclockwise. The second driving force 6-F2 is parallel to a fourth direction 6-D4, the fourth direction 6-D4 is parallel to the main axis 6-AX, the fourth direction 6-D4 is not perpendicular to the main axis 6-AX, and the direction 6-D4 is not parallel to the third direction 6-D3. At least a part of the driving element 6-1062 (the second driving element) is fixedly connected to the base 6-112 of the fixed assembly 6-FA.

When viewed along the main axis 6-AX, the driving element 6-1062 (the second driving element) is located at the first side 6-S1. When viewed along the main axis 6-AX (or the X-axis), a shortest distance between the second contact portion 6-1062C and the center 6-1541C of the first connecting portion 6-1541 is less than a shortest distance between the second contact portion 6-1062C and the second side 6-S2. When viewed along the main axis 6-AX (or the X-axis), a shortest distance between the second contact portion 6-1062C and the fourth side 6-S4 is greater than the shortest distance between the second contact portion 6-1062C and the second side 6-S2. When viewed along the main axis 6-AX, the first contact portion 6-1061C and the second contact portion 6-1062C are respectively located on two sides of a connecting line of the center of the optical module 6-180 and the center of the first connecting portion 6-1541.

As shown in FIG. 69, the two driving elements 6-1062 of the present disclosure both are resilient elements, and the two driving elements 6-1062 are rotationally symmetrical with respect to the main axis 6-AX. Based on this structural configuration, the movable assembly 6-MA can be rotated around the X-axis to a desired position more quickly, so as to achieve the effect of optical image stabilization fast. In addition, the two driving elements 6-1061 in FIG. 69 can individually or cooperatively provide the first driving force 6-F1 to the support assembly 6-150, so that the movement of the movable assembly 6-MA can be faster and more precise.

In this embodiment, as shown in FIG. 68 and FIG. 71, the support assembly 6-150 may further include a first contacting portion 6-1545, a second contacting portion 6-1546, and a third contacting portion 6-1547. The first contacting portion 6-1545 corresponds to the first contact portion 6-1061C, the second contacting portion 6-1546 corresponds to the second contact portion 6-1062C, and the third contacting portion 6-1547 corresponds to a third contact portion 6-1101C (FIG. 73).

As shown in FIG. 68, the first contacting portion 6-1545 has a plate-shaped structure and is not parallel to the first connecting portion 6-1541 having a plate-shaped structure. The second contacting portion 6-1546 has a plate-shaped structure and is parallel to the first contacting portion 6-1545. The first contacting portion 6-1545 and the second contacting portion 6-1546 are located on the first connecting portion 6-1541. The third contacting portion 6-1547 has a plate-shaped structure and is not parallel to the first contacting portion 6-1545, and the third contacting portion 6-1547 is located on the support body 6-1540.

Figure 73:
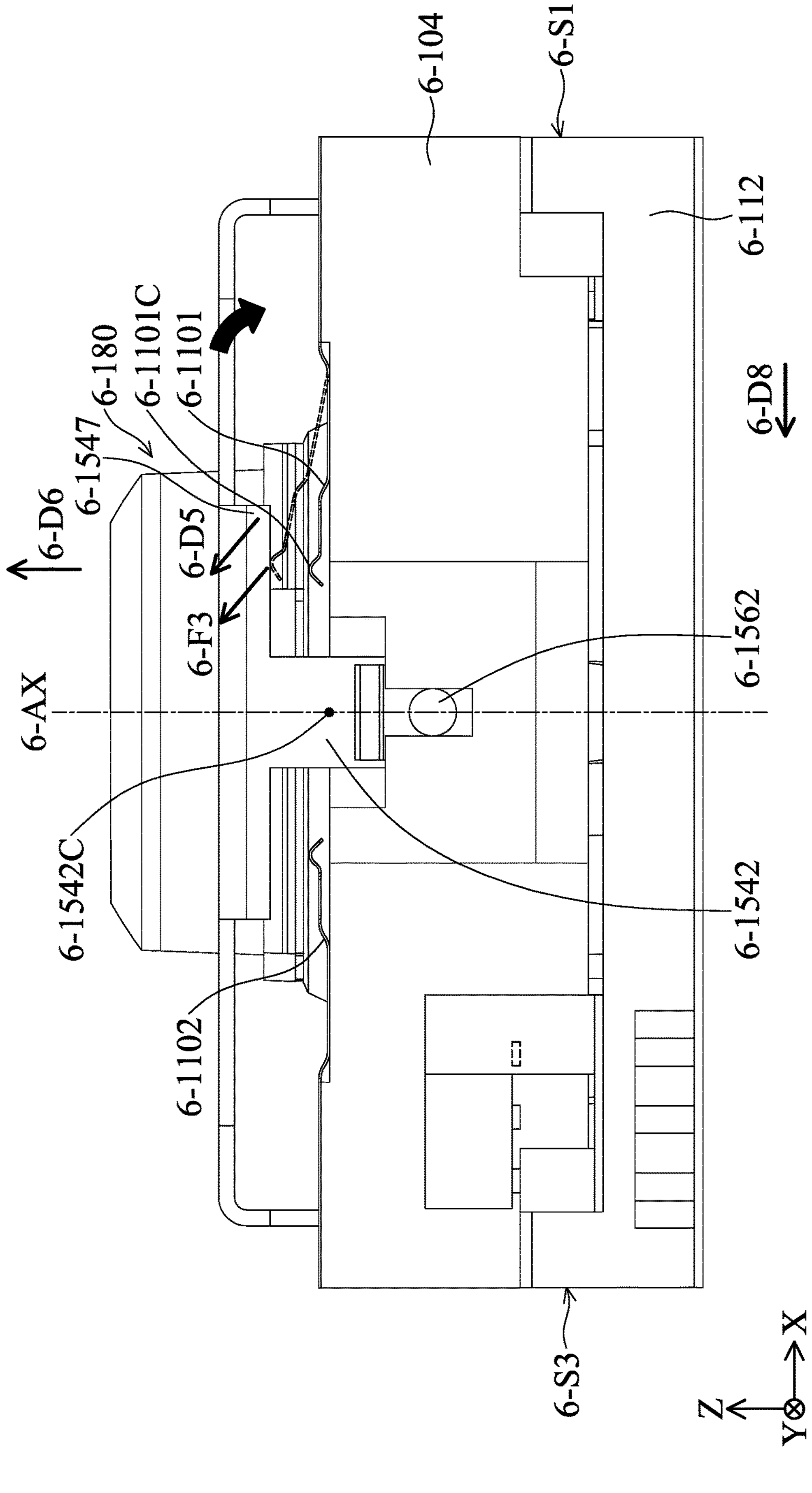
FIG. 73 is a front view of the optical system 6-100 after the casing 6-102 is removed according to an embodiment of the present disclosure.

Please refer to FIG. 73, which is a front view of the optical system 6-100 after the casing 6-102 is removed according to an embodiment of the present disclosure. In FIG. 73, the right driving element 6-1101 (the third driving element) is configured to generate a third driving force 6-F3 to contact the third contacting portion 6-1547 of the second connecting portion 6-1542. The driving element 6-1101 and the driving element 6-1061 have the same structure and include a third contact portion 6-1101C, and when the driving element 6-1101 (the third driving element) is activated, the third contact portion 6-1101C is in direct contact with the support assembly 6-150, but it not limited thereto. In other embodiments, the driving element 6-1101 may be in direct contact with the fixed assembly 6-FA.

At least a part of the driving element 6-1101 (the third driving element) is fixedly connected to the holder 6-104 of the movable assembly 6-MA. Specifically, when the driving element 6-1101 (the third driving element) is activated, the third contact portion 6-1101C directly contacts the second connecting portion 6-1542 of the support assembly 6-150. At this time, the second connecting portion 6-1542 generates a reaction force of the third driving force 6-F3, so that the driving element 6-1101 drives the holder 6-104 and the optical module 6-180 to rotate clockwise (for example, around the Y-axis), as shown by the arrow in FIG. 73.

The third driving force 6-F3 is parallel to a fifth direction 6-D5, the fifth direction 6-D5 is not parallel to the main axis 6-AX, the fifth direction 6-D5 is not perpendicular to the main axis 6-AX, and the fifth direction 6-D5 is not parallel to the third direction 6-D3.

Furthermore, when viewed along the main axis 6-AX, the driving element 6-1101 (the third driving element) is located at the second side 6-S2. When viewed along the main axis 6-AX (or the Y-axis), a shortest distance between the third contact portion 6-1101C and the center 6-1542C of the second connecting portion 6-1542 is less than a shortest distance between the third contact portion 6-1101C and the first side 6-S1. When viewed along the main axis 6-AX (or the Y-axis), the shortest distance between the third contact portion 6-1101C and the first side 6-S1 is less than a shortest distance between the third contact portion 6-1101C and the third side 6-S3.

It should be noted that the first driving force 6-F1, the second driving force 6-F2, and the third driving force 6-F3 all have a component greater than zero in a sixth direction 6-D6. The sixth direction 6-D6 is parallel to the main axis 6-AX and the Z-axis.

In this embodiment, the driving element 6-1061 (the first driving element) is a first shape memory alloy unit with a shape memory alloy. As shown in FIG. 71 and FIG. 72, the first shape memory alloy unit has a long strip-shaped structure and extends in a seventh direction 6-D7.

The driving element 6-1101 (the third driving element) is a third shape memory alloy unit with a shape memory alloy unit. As shown in FIG. 73, the third shape memory alloy unit has a long strip-shaped structure and extends in an eighth direction 6-D8. The seventh direction 6-D7 and the eighth direction 6-D8 are not parallel. The seventh direction 6-D7 is perpendicular to the eighth direction 6-D8. The seventh direction 6-D7 is parallel to the first direction 6-D1.

It is worth noting that, as shown in FIG. 71, in the direction of the main axis 6-AX (the Z-axis), there is a spacing between the driving element 6-1061 (the first driving element) and the driving element 6-1101 (the third driving element), and the spacing is greater than zero. Based on the above structural design, the purpose of miniaturization can be further achieved.

Figure 74:
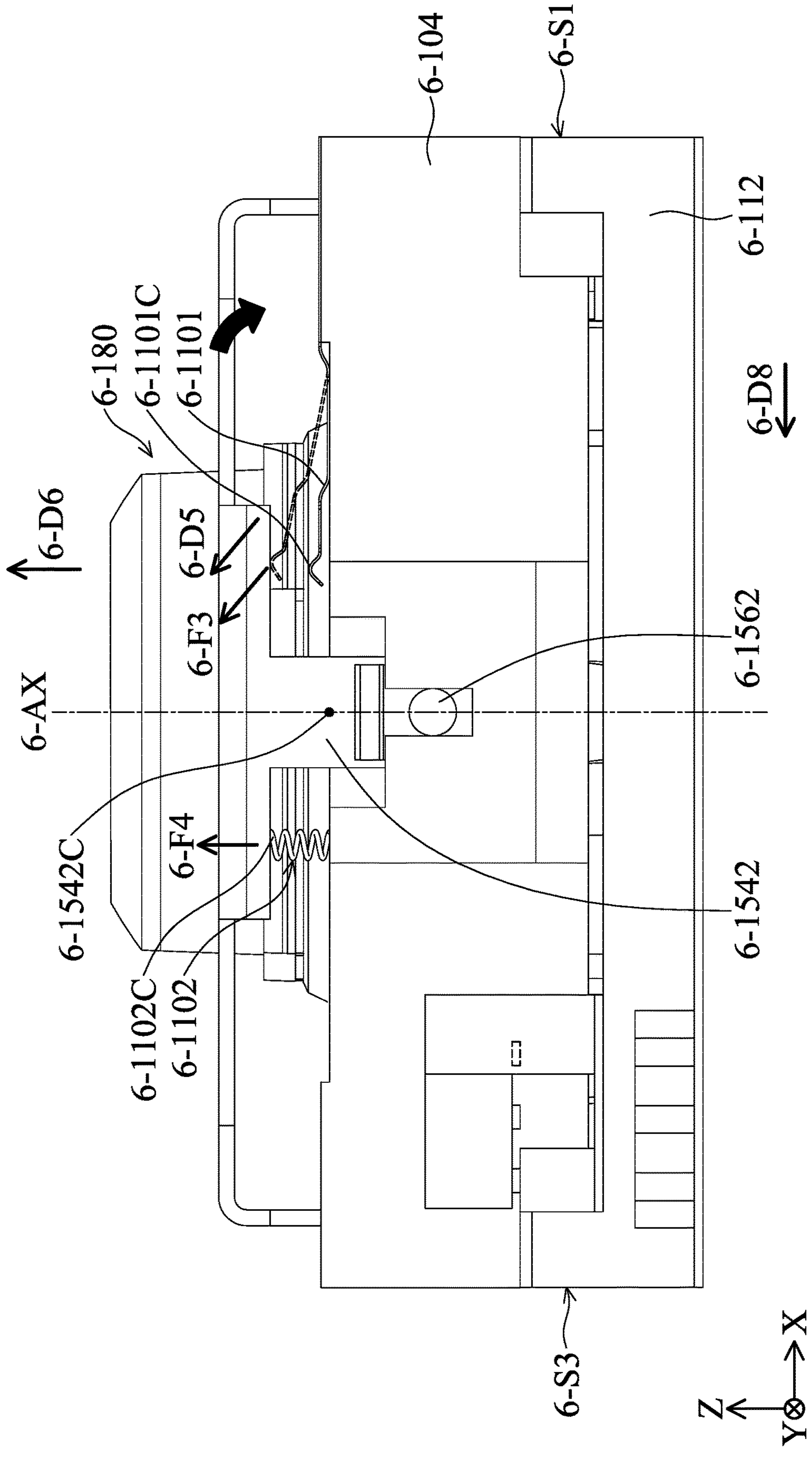
FIG. 74 is a front view of the optical system 6-100 after the casing 6-102 is removed according to another embodiment of the present disclosure.

Please refer to FIG. 74, which is a front view of the optical system 6-100 after the casing 6-102 is removed according to another embodiment of the present disclosure. In this embodiment, the driving element 6-1102 (the fourth driving element) may be an resilient element, such as a spring. The driving element 6-1102 (the fourth driving element) is configured to generate a fourth driving force 6-F4 to push the second connecting portion 6-1542. The driving element 6-1102 (the fourth driving element) includes a fourth contact portion 6-1102C, and the fourth contact portion 6-1102C directly contacts the support assembly 6-150.

The driving element 6-1102 (the fourth driving element) is connected between the second connecting portion 6-1542 and the holder 6-104, and at least a part of the driving element 6-1102 (the fourth driving element) is fixedly connected to the holder 6-104 of the movable assembly 6-MA. The driving element 6-1102 (the fourth driving element) and the driving element 6-1101 (the third driving element) can cooperatively control the rotation of the movable assembly 6-MA relative to the fixed assembly 6-FA around the Y-axis, and the operation is the similar to the aforementioned operation of the first driving element and the second driving element, so it is omitted herein.

In addition, the fourth driving force 6-F4 is parallel to the sixth direction 6-D6, the sixth direction 6-D6 is parallel to the main axis 6-AX, the sixth direction 6-D6 is not perpendicular to the main axis 6-AX, and the sixth direction 6-D6 and the fifth direction 6-D5 are not parallel.

Please return to FIG. 69 to FIG. 71. In this embodiment, the optical system 6-100 may further include a plurality of circuit members 6-1110 (the first circuit unit), which are fixedly disposed on the movable assembly 6-MA. The circuit member 6-1100 is disposed in the holder 6-104 by insert molding technology, and at least a part of the circuit member 6-1100 (the first circuit unit) is embedded in and not exposed from the holder 6-104 of the movable assembly 6-MA. The circuit member 6-1100 (the first circuit unit) is electrically connected to the driving element 6-1101 (the third driving element).

The optical system 6-100 may further include a plurality of circuit members 6-1060 (the second circuit unit), which are fixedly disposed at the base 6-112 of the fixed assembly 6-FA. Similarly, the circuit member 6-1060 is disposed in the base 6-112 by insert molding technology, and at least a part of the circuit member 6-1060 (the second circuit unit) is embedded in and not exposed from the base 6-112 of the fixed assembly 6-FA. The circuit member 6-1060 (the second circuit unit) is electrically connected to the driving element 6-1061 (the first driving element).

Since the holder 6-104 is movable relative to the base 6-112, the circuit member 6-1100 (the first circuit unit) is movable relative to the circuit member 6-1060 (the second circuit unit).

In this embodiment, the circuit board 6-130 can be called as a third circuit unit, and is configured to be electrically connected to the circuit member 6-1100 (the first circuit unit) and the circuit member 6-1060 (the second circuit unit). Similarly, the circuit member 6-1100 (the first circuit unit) on the holder 6-104 is movable relative to the circuit board 6-130 (the third circuit unit).

In this embodiment, the aforementioned two position sensing elements 6-132 can be collectively referred to as a position sensing assembly, and the circuit board 6-130 (the third circuit unit) is electrically connected to the position sensing assembly. The position sensing assembly is used to sense the movement of the movable assembly 6-MA relative to the fixed assembly 6-FA.

In addition, in this embodiment, the substrate 6-185 can be referred to as a fourth circuit unit, and the driving assembly 6-182 of the optical module 6-180 is electrically connected to an external circuit through the substrate 6-185 (the fourth circuit unit) and the extending portion 6-186. In this embodiment, the first circuit unit, the second circuit unit, the third circuit unit, and the fourth circuit unit can be collectively referred to as a circuit assembly.

Please refer to FIG. 65, FIG. 69, and FIG. 70. The circuit assembly of the optical system 6-100 may further include a first circuit substrate 6-191 (the first elastic part) and a second circuit substrate 6-192 (the second elastic part). The holder 6-104 of the movable assembly 6-MA is movably connected to the base 6-112 of the fixed assembly 6-FA via the first circuit substrate 6-191 (the first elastic part), and the holder 6-104 of the movable assembly 6-MA is movably connected to the base 6-112 of the fixed assembly 6-FA via the second circuit substrate 6-192 (the second elastic part).

Specifically, the first circuit substrate 6-191 and the second circuit substrate 6-192 are flexible printed circuit boards (FPC), so the first circuit substrate 6-191 (the first elastic part) can generate a first pre-pressure to the holder 6-104 of the movable assembly 6-MA, and the second circuit substrate 6-192 (the second elastic part) can generate a second pre-pressure to the holder 6-104 of the movable assembly 6-MA.

The directions of the first pre-pressure and the second pre-pressure are different. For example, as shown in FIG. 69, the first pre-pressure is toward the +Y-axis, and the second pre-pressure is toward the −Y-axis.

When viewed along the main axis 6-AX, the movable assembly 6-MA is located between the first circuit substrate 6-191 (the first elastic part) and the second circuit substrate 6-192 (the second elastic part). Specifically, when viewed along the main axis 6-AX, the first circuit substrate 6-191 (the first elastic part) and the second circuit substrate 6-192 (the second elastic part) are rotationally symmetrical relative to the center of the optical module 6-180. Based on the above structural configuration, the optical system 6-100 can quickly reach a stable state when performing the optical image stabilization function.

In this embodiment, as shown in FIG. 70, the driving element 6-1101 (the third driving element) is electrically connected to an external circuit through the circuit member 6-1100 (the first circuit unit), the first circuit substrate 6-191 (the first elastic part) and the circuit member 6-1060 (the second circuit unit) in sequence. Specifically, the driving element 6-1101 (the third driving element) is electrically connected to the external circuit through the circuit member 6-1100 (the first circuit unit), the first circuit substrate 6-191 (the first elastic part), the circuit member 6-1060 (the second circuit unit) and the circuit board 6-130 (the third circuit unit) in sequence.

Furthermore, the driving element 6-1061 (the first driving element) is electrically connected to the external circuit through the circuit member 6-1060 (the second circuit unit). Specifically, the driving element 6-1061 (the first driving element) is electrically connected to the external circuit through the circuit member 6-1060 (the second circuit unit) and the circuit board 6-130 (the third circuit unit) in sequence. The driving element 6-1061 (the first driving element) and the circuit member 6-1100 (the first circuit unit) are electrically independent of each other, and the circuit board 6-130 (the third circuit unit) and the substrate 6-185 (the fourth circuit unit) are electrically independent of each other.

In addition, it is worth noting that when viewed along the main axis 6-AX, the movable assembly 6-MA is located between a first external connection portion 6-131 of the circuit board 6-130 (the third circuit unit) and an extension portion 6-186 (a second external connection portion) of the substrate 6-185 (the fourth circuit unit).

Since the first external connection portion 6-131 and the extension portion 6-186 (the second external connection portion) extend in opposite directions, the optical system 6-100 can be matched with circuit layouts of different external circuits, and optimize the circuit layouts.

The present disclosure provides an optical system, including the support assembly 6-150, the holder 6-104, the optical module 6-180, and the base 6-112. The optical module 6-180 can be fixedly connected to the holder 6-104, and the holder 6-104 can move relative to the base 6-112 through the support assembly 6-150 to achieve the optical image stabilization function. Furthermore, the driving assembly 6-DA includes multiple driving elements, which are respectively disposed on the holder 6-104 and the base 6-112 to drive the holder 6-104 and the optical module 6-180 to the desired positions quickly and accurately.

The design of present disclosure may allow the optical module 6-180 to move in different directions to enhance the performance of the optical system, and may achieve miniaturization.

The Seventh Group of Embodiments

Figure 75:
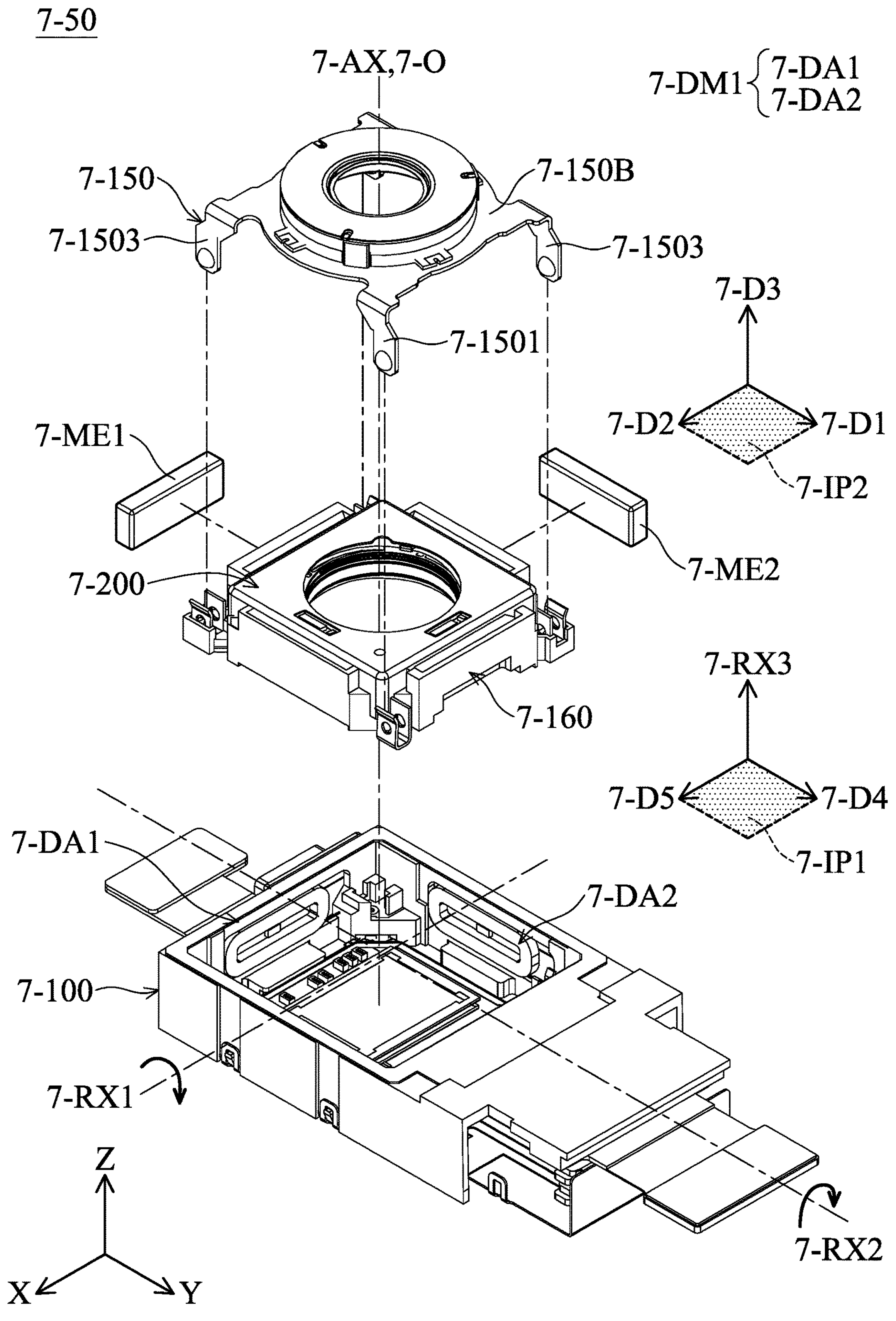
FIG. 75 is an exploded view of an optical system 7-50 of an embodiment of the present disclosure.
Figure 76:
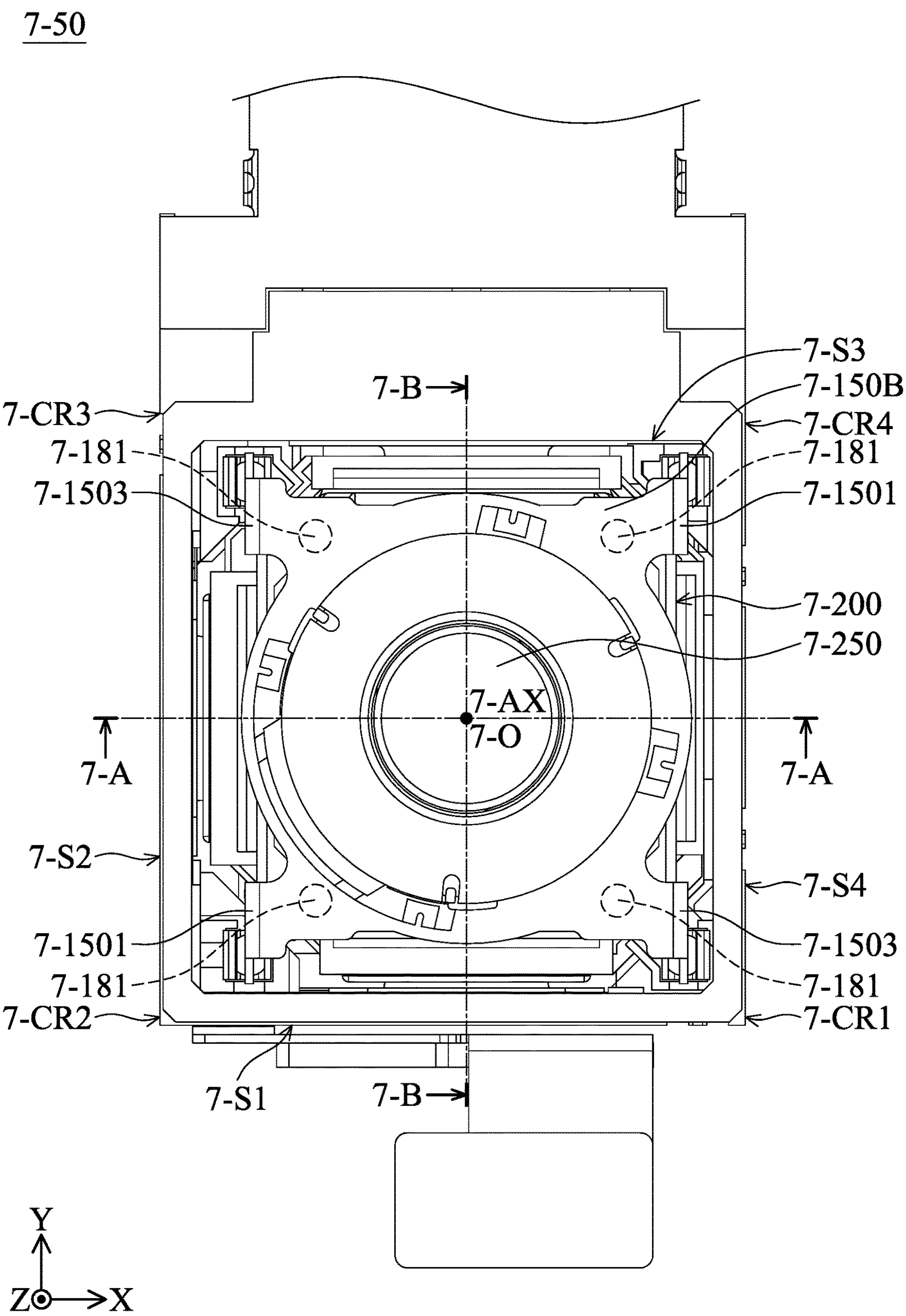
FIG. 76 is a top view of the optical system 7-50 of an embodiment of the present disclosure.

Please refer to FIG. 75 to FIG. 76. FIG. 75 is an exploded view of an optical system 7-50 of an embodiment of the present disclosure, and FIG. 76 is a top view of the optical system 7-50 of an embodiment of the present disclosure. The optical system 7-50 includes a fixed module 7-100, a movable module 7-200, a first driving mechanism 7-DM1, and a first supporting assembly 7-150. The movable module 7-200 is configured to connect to a first optical element 7-250, and the movable module 7-200 is movable relative to the fixed module 7-100.

The first driving mechanism 7-DM1 is configured to drive the movable module 7-200 to move relative to the fixed module 7-100 in a first dimension, and the movable module 7-200 is movable relative to the fixed module 7-100 through the first supporting assembly 7-150. Specifically, the movable module 7-200 is movably connected to the fixed module 7-100 via an outer frame 7-160 and the first supporting assembly 7-150. The movement in the first dimension includes movement around the X-axis.

The movable module 7-200 and the fixed module 7-100 are arranged along a main axis 7-AX. The optical system 7-50 may have a polygonal structure, such as a quadrilateral, an octagon, or an asymmetric polygon. In this embodiment, as shown in FIG. 76, the optical system 7-50 may include a first side 7-51, a second side 7-S2, a third side 7-S3, and a fourth side 7-S4. When viewed along the main axis 7-AX, the second side 7-S2 is not parallel to the first side 7-51. When viewed along the main axis 7-AX, the first side 7-51 is parallel to the third side 7-S3. When viewed along the main axis 7-AX, the second side 7-S2 is parallel to the fourth side 7-S4.

Furthermore, the optical system 7-50 further includes a first corner 7-CR1, a second corner 7-CR2, a third corner 7-CR3, and a fourth corner 7-CR4. The first corner 7-CR1 is located between the first side 7-51 and the fourth side 7-S4. The second corner 7-CR2 is located between the first side 7-S1 and the second side 7-S2. The third corner 7-CR3 is located between the second side 7-S2 and the third side 7-S3. The fourth corner 7-CR4 is located between the third side 7-S3 and the fourth side 7-S4.

In this embodiment, the first driving mechanism 7-DM1 can be used to drive the movable module 7-200 to move relative to the fixed module 7-100 in a second dimension. The first dimension is different from the second dimension, and the second dimension includes movement around the Y-axis, for example. In addition, the main axis 7-AX is parallel to an optical axis 7-O of the first optical element 7-250, and in this embodiment, the main axis 7-AX may overlap the optical axis 7-O.

The first driving mechanism 7-DM1 includes a first driving assembly 7-DA1 and a second driving assembly 7-DA2. The first driving assembly 7-DA1 is used to drive the movable module 7-200 to move relative to the fixed module 7-100 in the first dimension, and the second driving assembly 7-DA2 is used to drive the movable module 7-200 to move relative to the fixed module 7-100 in the second dimension.

Figure 77:
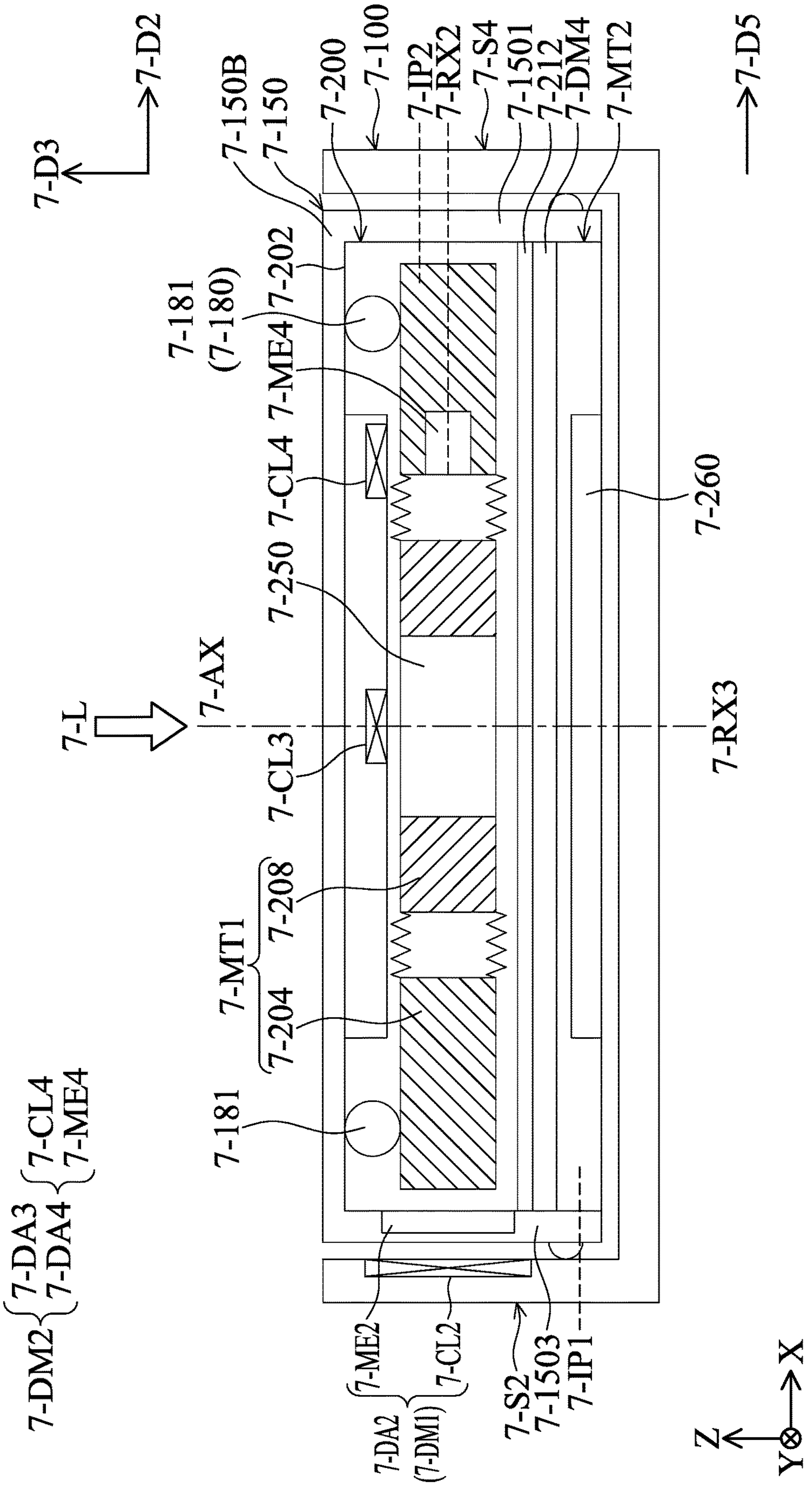
FIG. 77 is a schematic cross-sectional view of the optical system 7-50 along the line 7-A-7-A in FIG. 76 according to an embodiment of the present disclosure.

Please refer to FIG. 75 to FIG. 77 together. FIG. 77 is a schematic cross-sectional view of the optical system 7-50 along the line 7-A-7-A in FIG. 76 according to an embodiment of the present disclosure. In this embodiment, the movable module 7-200 may include a casing 7-202, a first movable part 7-MT1, a second movable part 7-MT2, a base 7-212, a second driving mechanism 7-DM2, a third driving mechanism 7-DM3, and a fourth driving mechanism 7-DM4.

The first movable part 7-MT1 is used to connect to the first optical element 7-250, and the second movable part 7-MT2 is used to connect to a second optical element 7-260. The first optical element 7-250 is, for example, a camera lens, and the second optical element 7-260 is, for example, an image sensor.

The second driving mechanism 7-DM2 can be used to drive the first movable part 7-MT1 to move relative to the base 7-212 in a third dimension, and the second driving mechanism 7-DM2 can be used to drive the first movable part 7-MT1 to move relative to base 7-212 in a fourth dimension.

In this embodiment, the first movable part 7-MT1 is movable relative to the base 7-212, and the first optical element 7-250 can include at least one lens corresponding to a light 7-L. The first movable part 7-MT1 may include a holder 7-208, and the holder 7-208 may be used to connect to the first optical element 7-250. Furthermore, the first movable part 7-MT1 can further include a frame 7-204, the holder 7-208 is movable relative to the frame 7-204, and the third driving mechanism 7-DM3 can be used to drive the holder 7-208 to move relative to the frame 7-204 in a fifth dimension.

The second optical element 7-260 is used to receive the light 7-L to output an electrical signal, such as an image signal. The fourth driving mechanism 7-DM4 can be used to drive the second movable part 7-MT2 to move relative to base 7-212 in a sixth dimension, and the fourth driving mechanism 7-DM4 can be used to drive the second movable part 7-MT2 to move relative to base 7-212 in a seventh dimension. Furthermore, the fourth driving mechanism 7-DM4 can also be used to drive the second movable part 7-MT2 to move relative to the base 7-212 in an eighth dimension. Furthermore, as shown in FIG. 76 and FIG. 77, when viewed along the main axis 7-AX, the first driving mechanism 7-DM1 does not overlap the fourth driving mechanism 7-DM4.

In this embodiment, the first dimension is different from the second dimension, the third dimension is different from the fourth dimension, the fifth dimension is different from the third dimension, the fifth dimension is different from the fourth dimension, the sixth dimension is different from the seventh dimension, the sixth dimension is different from the eighth dimension, the seventh dimension is different from the eighth dimension, the eighth dimension is different from the first dimension, the eighth dimension is different from the second dimension, the third dimension is the same as the sixth dimension, and the fourth dimension is the same as the seventh dimension.

In this embodiment, the movement in at least one of the first, second, third, fourth, fifth, sixth, seventh, and eighth dimensions includes the rotation around a first rotating axis 7-RX1. Specifically, the movement in the first dimension includes the rotation around the first rotating axis 7-RX1. As shown in FIG. 75, the first rotating axis 7-RX1 is parallel to the X-axis, and the movable module 7-200 is rotatable around the first rotating axis 7-RX1.

The movement in at least one of the first, second, third, fourth, fifth, sixth, seventh, and eighth dimensions includes rotation around a second rotating axis 7-RX2. Specifically, the movement in the second dimension includes the rotation around the second rotating axis 7-RX2. As shown in FIG. 75, the second rotating axis 7-RX2 is parallel to the Y-axis, and the movable module 7-200 is rotatable around the second rotating axis 7-RX2.

The movement in at least one of the first, second, third, fourth, fifth, sixth, seventh, and eighth dimensions includes movement along a first direction 7-D1. Specifically, the movement in the fourth dimension includes the movement along the first direction 7-D1. As shown in FIG. 75 and FIG. 77, the first movable part 7-MT1 is movable along the first direction 7-D1.

The movement in at least one of the first, second, third, fourth, fifth, sixth, seventh, and eighth dimensions includes movement along a second direction 7-D2. Specifically, the movement in the third dimension includes the movement along the second direction 7-D2. As shown in FIG. 75 and FIG. 77, the first movable part 7-MT1 is movable along the second direction 7-D2.

The movement in at least one of the first, second, third, fourth, fifth, sixth, seventh, and eighth dimensions includes movement along a third direction 7-D3. Specifically, the movement in the fifth dimension includes the movement along the third direction 7-D3. As shown in FIG. 75 and FIG. 77, the holder 7-208 of the first movable part 7-MT1 is movable relative to the frame 7-204 along the third direction 7-D3.

The movement in at least one of the first, second, third, fourth, fifth, sixth, seventh, and eighth dimensions includes movement along a fourth direction 7-D4. Specifically, the movement in the sixth dimension includes the movement along the fourth direction 7-D4. As shown in FIG. 75 and FIG. 77, the second movable part 7-MT2 is movable along the fourth direction 7-D4.

The movement in at least one of the first, second, third, fourth, fifth, sixth, seventh, and eighth dimensions includes movement along a fifth direction 7-D5. Specifically, the movement in the seventh dimension includes the movement along the fifth direction 7-D5. As shown in FIG. 75 and FIG. 77, the second movable part 7-MT2 is movable along the fifth direction 7-D5.

The movement in at least one of the first, second, third, fourth, fifth, sixth, seventh, and eighth dimensions includes rotation around a third rotating axis 7-RX3. Specifically, the movement in the eighth dimension includes the rotation around the third rotating axis 7-RX3. As shown in FIG. 75 and FIG. 77, the second movable part 7-MT2 is rotatable around the third rotating axis 7-RX3.

In this embodiment, the first direction 7-D1 is parallel to the Y-axis, the second direction 7-D2 is parallel to the X-axis, and the third direction 7-D3 is parallel to the Z-axis. The fourth direction 7-D4 is parallel to the Y-axis, the fifth direction 7-D5 is parallel to the X-axis, and the third rotating axis 7-RX3 is parallel to the Z-axis.

In this embodiment, the first rotating axis 7-RX1 and the second rotating axis 7-RX2 are not parallel. Specifically, the first rotating axis 7-RX1 is perpendicular to the second rotating axis 7-RX2. The first rotating axis 7-RX1 and the third rotating axis 7-RX3 are not parallel. Specifically, the first rotating axis 7-RX1 is perpendicular to the third rotating axis 7-RX3. The second rotating axis 7-RX2 and the third rotating axis 7-RX3 are not parallel. Specifically, the second rotating axis 7-RX2 is perpendicular to the third rotating axis 7-RX3.

The first direction 7-D1 and the second direction 7-D2 are not parallel. Specifically, the first direction 7-D1 is perpendicular to the second direction 7-D2. The third direction 7-D3 is not parallel to the first direction 7-D1. Specifically, the first direction 7-D1 is perpendicular to the third direction 7-D3. The third direction 7-D3 is not parallel to the second direction 7-D2. Specifically, the third direction 7-D3 is perpendicular to the second direction 7-D2.

The fourth direction 7-D4 and the fifth direction 7-D5 are not parallel. Specifically, the fourth direction 7-D4 is perpendicular to the fifth direction 7-D5. The fourth direction 7-D4 and the fifth direction 7-D5 define a first imaginary plane 7-IP1 that is not perpendicular to a second imaginary plane 7-IP2 defined by the first direction 7-D1 and the second direction 7-D2. Specifically, as shown in FIG. 77, the first imaginary plane 7-IP1 is parallel to the second imaginary plane 7-IP2.

In this embodiment, the third rotating axis 7-RX3 is parallel to the third direction 7-D3. The first rotating axis 7-RX1 is parallel to the first direction 7-D1. The second rotating axis 7-RX2 is parallel to the second direction 7-D2. The third direction 7-D3 is parallel to the main axis 7-AX. In addition, the third rotating axis 7-RX3 may overlap the main axis 7-AX, for example, but it is not limited thereto.

Figure 78:
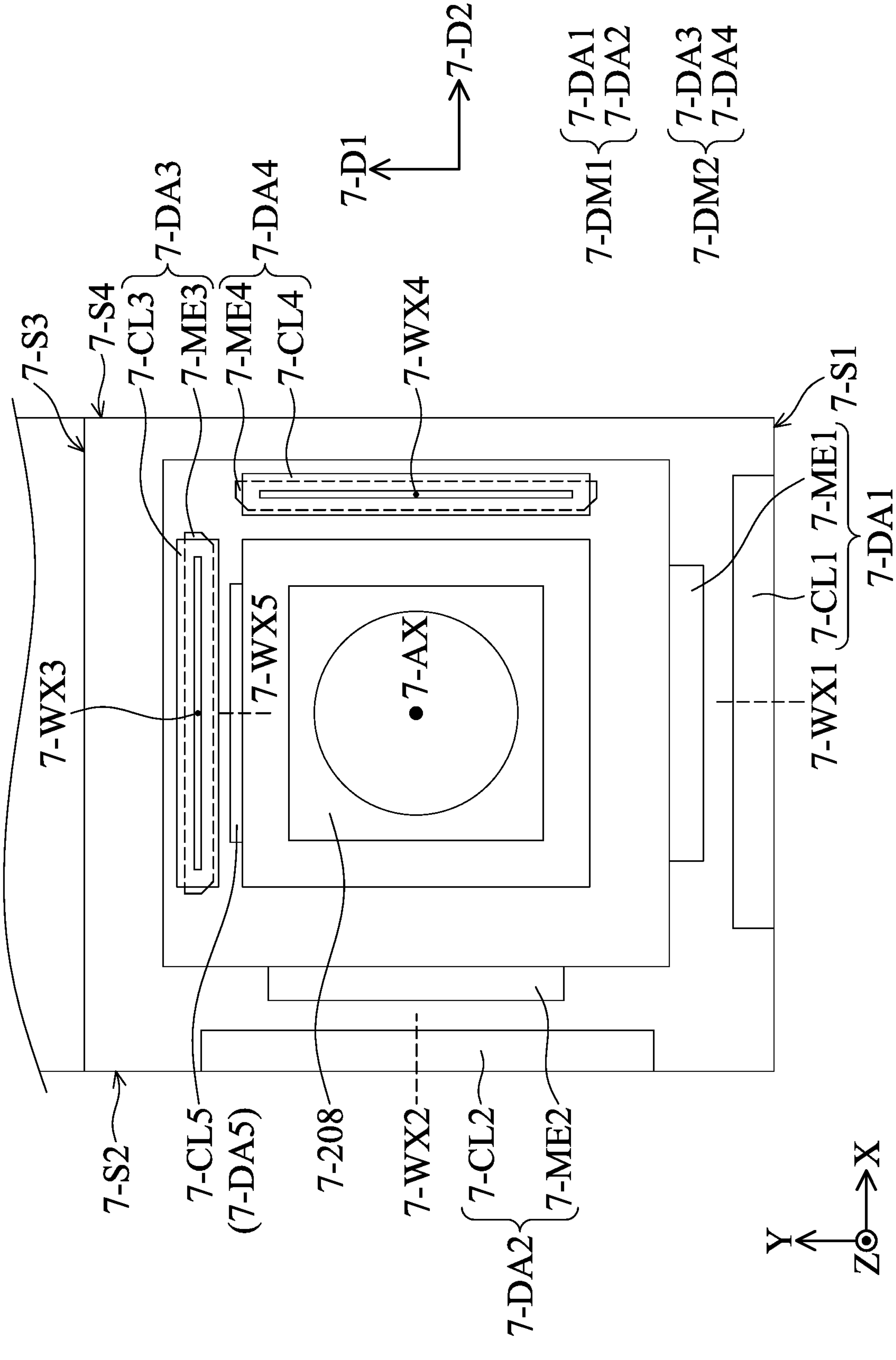
FIG. 78 is a top view of the optical system 7-50 according to an embodiment of the present disclosure.
Figure 79:
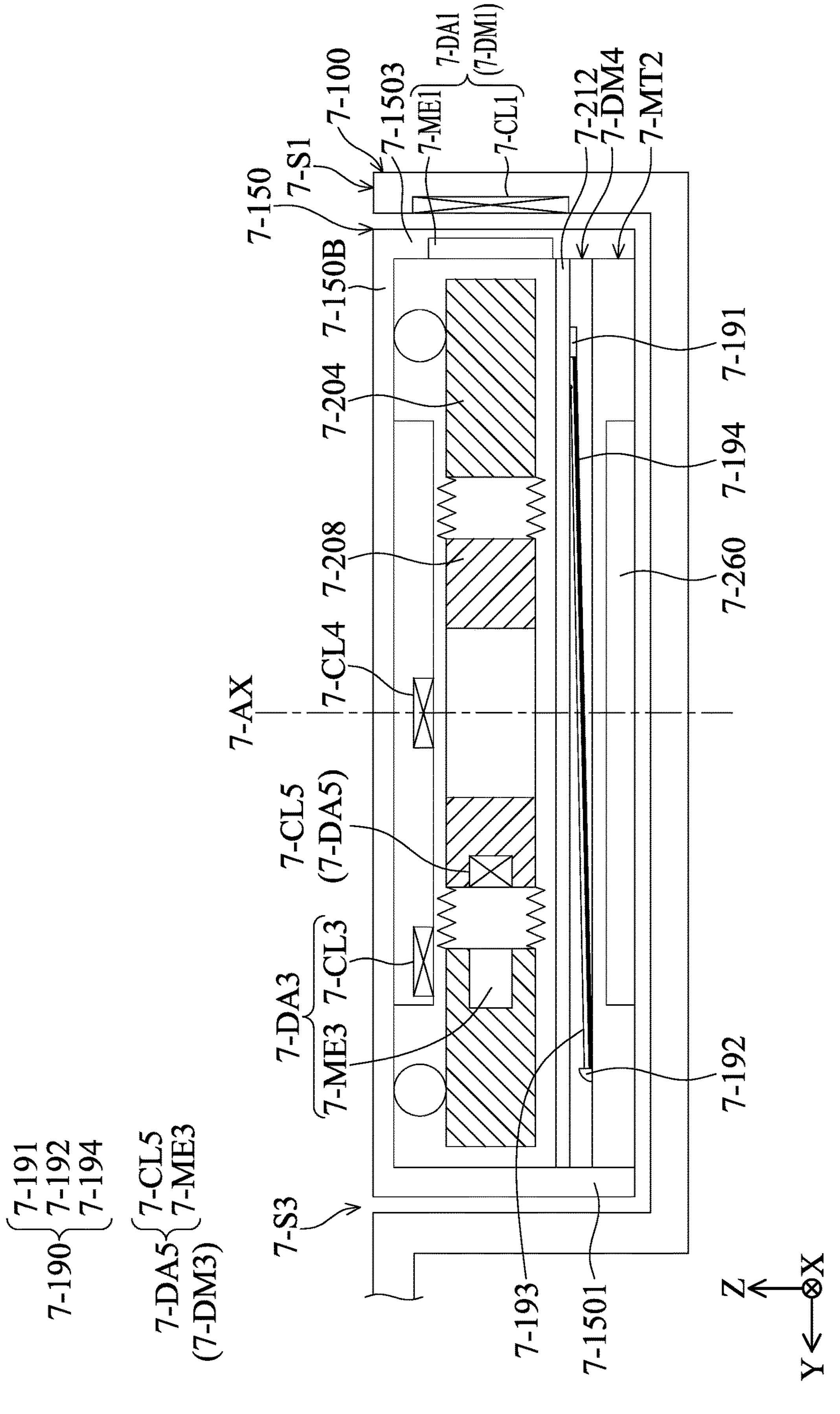
FIG. 79 is a schematic cross-sectional view of the optical system 7-50 along the line 7-B-7-B in FIG. 76 according to an embodiment of the present disclosure.

Please refer to FIG. 75 to FIG. 79. FIG. 78 is a top view of the optical system 7-50 according to an embodiment of the present disclosure, and FIG. 79 is a schematic cross-sectional view of the optical system 7-50 along the line 7-B-7-B in FIG. 76 according to an embodiment of the present disclosure. When viewed along the main axis 7-AX, the first driving assembly 7-DA1 is located on the first side 7-S1. The first driving assembly 7-DA1 includes a first coil 7-CL1 and a first magnetic element 7-ME1. The first coil 7-CL1 has a first winding axis 7-WX1, and the first winding axis 7-WX1 is perpendicular to an extending direction (for example, the X-axis) of the first side 7-S1. The first winding axis 7-WX1 is, for example, parallel to the Y-axis, and the first winding axis 7-WX1 is perpendicular to the main axis 7-AX.

When viewed along the main axis 7-AX, the second driving assembly 7-DA2 is located on the second side 7-S2. The second driving assembly 7-DA2 includes a second coil 7-CL2 and a second magnetic element 7-ME2. The second coil 7-CL2 has a second winding axis 7-WX2, and the second winding axis 7-WX2 is perpendicular to an extending direction (for example, the Y-axis) of the second side 7-S2. The second winding axis 7-WX2 is, for example, parallel to the X-axis, and the second winding axis 7-WX2 is perpendicular to the main axis 7-AX.

The second driving mechanism 7-DM2 includes a third driving assembly 7-DA3 and a fourth driving assembly 7-DA4. When viewed along the main axis 7-AX, the second driving mechanism 7-DM2 does not overlap the first driving mechanism 7-DM1. Furthermore, when viewed along the extending direction of the first side 7-S1, the second driving mechanism 7-DM2 overlaps at least a part of the first driving mechanism 7-DM1. When viewed along the extending direction of the second side 7-S2, the second driving mechanism 7-DM2 overlaps at least a part of the first driving mechanism 7-DM1.

The third driving assembly 7-DA3 can be used to drive the first movable part 7-MT1 to move relative to the base 7-212 in the third dimension, and the fourth driving assembly 7-DA4 can be used to drive the first movable part 7-MT1 to move relative to base 7-212 in the fourth dimension.

When viewed along the main axis 7-AX, the third driving assembly 7-DA3 is located on the third side 7-S3. The third driving assembly 7-DA3 includes a third coil 7-CL3 and a third magnetic element 7-ME3. The third coil 7-CL3 has a third winding axis 7-WX3, and the third winding axis 7-WX3 is perpendicular to the extending direction (for example, the X-axis) of the third side 7-S3. The third winding axis 7-WX3 is, for example, parallel to the Z-axis, and the third winding axis 7-WX3 is parallel to the main axis 7-AX.

When viewed along the main axis 7-AX, the fourth driving assembly 7-DA4 is located on the fourth side 7-S4. The fourth driving assembly 7-DA4 includes a fourth coil 7-CL4 and a fourth magnetic element 7-ME4. The fourth coil 7-CL4 has a fourth winding axis 7-WX4, and the fourth winding axis 7-WX4 is parallel to the third winding axis 7-WX3. The fourth winding axis 7-WX4 is perpendicular to the extending direction (for example, the Y-axis) of the fourth side 7-S4, and the fourth winding axis 7-WX4 is parallel to the main axis 7-AX.

When viewed along the main axis 7-AX, the third driving mechanism 7-DM3 does not overlap the first driving mechanism 7-DM1. When viewed along the extending direction of the first side 7-S1, the third driving mechanism 7-DM3 overlaps at least a part of the first driving mechanism 7-DM1, such as overlapping the second driving assembly 7-DA2. When viewed along the extending direction of the second side 7-S2, the third driving mechanism 7-DM3 overlaps at least a part of the first driving mechanism 7-DM1, such as overlapping the first driving assembly 7-DA1.

The third driving mechanism 7-DM3 includes a fifth driving assembly 7-DA5 for driving the holder 7-208 to move relative to the frame 7-204 in the fifth dimension.

When viewed along the main axis 7-AX, the fifth driving assembly 7-DA5 is located on the third side 7-S3, but it is not limited thereto. In other embodiments, the fifth driving assembly 7-DA5 may be located on the fourth side 7-S4. The fifth driving assembly 7-DA5 includes a fifth coil 7-CL5, and the fifth coil 7-CL5 corresponds to the third magnetic element 7-ME3 to generate an electromagnetic driving force. The third magnetic element 7-ME3 can also be included in the fifth driving assembly 7-DA5, which means that the third coil 7-CL3 and the fifth coil 7-CL5 share the third magnetic element 7-ME3. The fifth coil 7-CL5 has a fifth winding axis 7-WX5, and the fifth winding axis 7-WX5 is perpendicular to the main axis 7-AX.

When viewed along the main axis 7-AX, the fourth driving mechanism 7-DM4 does not overlap the first driving mechanism 7-DM1. When viewed along the main axis 7-AX, the fourth driving mechanism 7-DM4 overlaps at least a part of the second driving mechanism 7-DM2. When viewed along the main axis 7-AX, the fourth driving mechanism 7-DM4 overlaps at least a part of the third driving mechanism 7-DM3.

As shown in FIG. 77 to FIG. 79, when viewed along the extending direction of the first side 7-S1, the fourth driving mechanism 7-DM4 overlaps at least a part of the first driving mechanism 7-DM1 (such as the second driving assembly 7-DA2). When viewed along the extending direction of the second side 7-S2, the fourth driving mechanism 7-DM4 overlaps at least a part of the first driving mechanism 7-DM1 (such as the first driving assembly 7-DA1).

When viewed along the extending direction of the first side 7-S1, the fourth driving mechanism 7-DM4 does not overlap the second driving mechanism 7-DM2. When viewed along the extending direction of the second side 7-S2, the fourth driving mechanism 7-DM4 does not overlap the second driving mechanism 7-DM2.

When viewed along the extending direction of the first side 7-S1, the fourth driving mechanism 7-DM4 does not overlap the third driving mechanism 7-DM3. When viewed along the extending direction of the second side 7-S2, the fourth driving mechanism 7-DM4 does not overlap the third driving mechanism 7-DM3.

Figure 80:
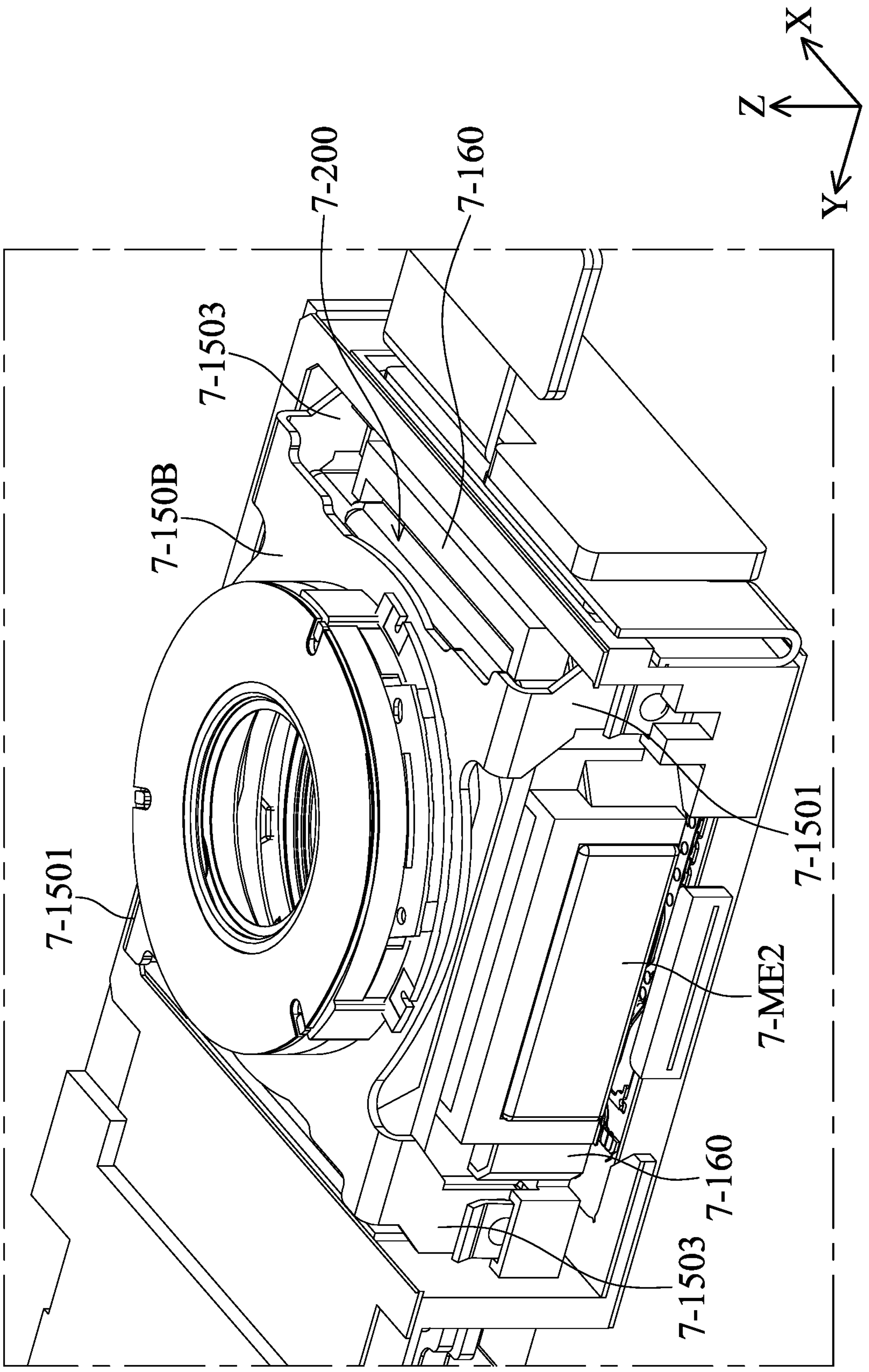
FIG. 80 is a perspective cross-sectional view of the optical system 7-50 according to an embodiment of the present disclosure.

Please refer to FIG. 75, FIG. 76, and FIG. 80. FIG. 80 is a perspective cross-sectional view of the optical system 7-50 according to an embodiment of the present disclosure. In this embodiment, the first supporting assembly 7-150 includes a main body 7-150B, two first supporting portions 7-1501, and two second supporting portions 7-1503. The main body 7-150B has a plate-shaped structure, and the main body 7-150B is not parallel to the main axis 7-AX.

The main body 7-150B is movably connected to the fixed module 7-100 through the first supporting portions 7-1501, and the first supporting portion 7-1501 has a plate-shaped structure and is not parallel to the main body 7-150B, such as perpendicular to the main body 7-150B. The main body 7-150B is movably connected to the outer frame 7-160 and the movable module 7-200 through the second supporting portions 7-1503, and the second supporting portion 7-1503 has a plate-shaped structure and is not parallel to the main body 7-150B, such as perpendicular to the main body 7-150B.

It should be noted that a circuit (not shown in the figures) may be provided on the first supporting assembly 7-150, so that the movable module 7-200 can be electrically connected to an external circuit (not shown in the figures) through the first supporting assembly 7-150. In addition, as shown in FIG. 80, the outer frame 7-160 is fixedly connected to the movable module 7-200, and the second magnetic element 7-ME2 (and the first magnetic element 7-ME1) is disposed on the outer frame 7-160.

Please go back to FIG. 76 and FIG. 77. The optical system 7-50 may further include a second supporting assembly 7-180, and the first movable part 7-MT1 is movable relative to the base 7-212 through the second supporting assembly 7-180. The second supporting assembly 7-180 may include one or more first intermediate elements 7-181, which can move relative to the first movable part 7-MT1 or the base 7-212. The first intermediate element 7-181 has a spherical structure, and the first intermediate element 7-181 may have a ceramic material.

When viewed along the main axis 7-AX, the second supporting assembly 7-180 overlaps at least a part of the first supporting assembly 7-150. Specifically, when viewed along the main axis 7-AX, the first intermediate elements 7-181 of the second supporting assembly 7-180 do not overlap the first supporting portion 7-1501. Similarly, when viewed along the main axis 7-AX, the first intermediate elements 7-181 of the second supporting assembly 7-180 do not overlap the second supporting portion 7-1503. In addition, when viewed along the main axis 7-AX, the second supporting assembly 7-180 overlaps at least a part of the main body 7-150B.

As shown in FIG. 77, when viewed in a direction perpendicular to the main axis 7-AX (for example, along the X-axis or the Y-axis), the second supporting assembly 7-180 overlaps at least a part of the first supporting portion 7-1501. When viewed in the direction perpendicular to the main axis 7-AX, the second supporting assembly 7-180 overlaps at least a part of the second supporting portion 7-1503. When viewed in the direction perpendicular to the main axis 7-AX, the second supporting assembly 7-180 does not overlap the main body 7-150B.

Figure 81:
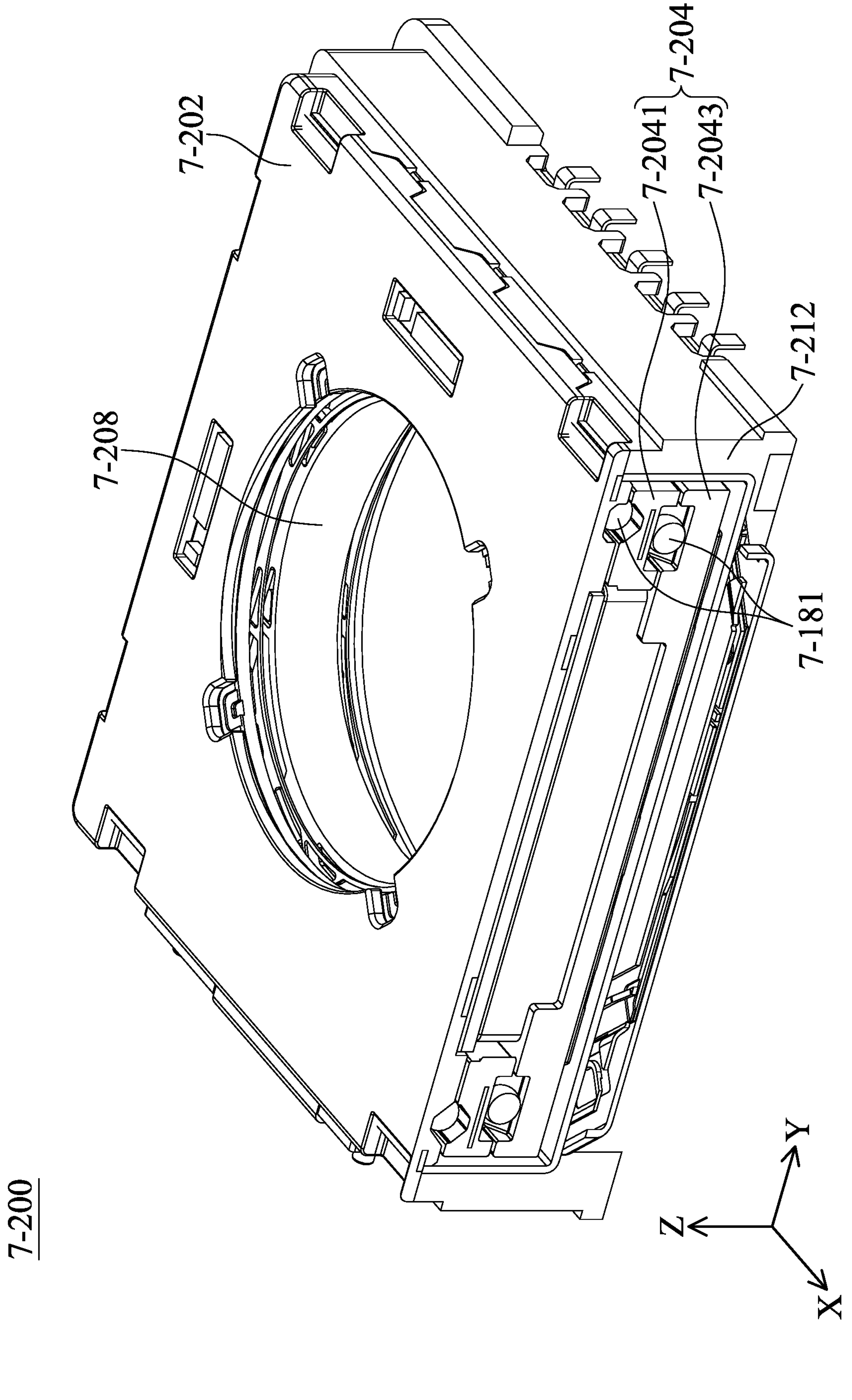
FIG. 81 is a perspective cross-sectional view of the movable module 7-200 according to an embodiment of the present disclosure.

Please refer to FIG. 81, which is a perspective cross-sectional view of the movable module 7-200 according to an embodiment of the present disclosure. In this embodiment, the frame 7-204 may include a first frame portion 7-2041 and a second frame portion 7-2043, a plurality of first intermediate elements 7-181 may be disposed between the casing 7-202 and the first frame portions 7-2041, and a plurality of first intermediate elements 7-181 may be disposed between the first frame portion 7-2041 and the second frame portion 7-2043.

Based on the configuration of the first intermediate elements 7-181, the first frame portion 7-2041 can drive the holder 7-208 to move along the X-axis relative to the casing 7-202, and the second frame portion 7-2043 can drive the holder 7-208 to move along the Y axis relative to the base 7-212 so as to achieve the function of optical image stabilization.

Please go back to FIG. 79. The fourth driving mechanism 7-DM4 of the optical system 7-50 may further include a third supporting assembly 7-190, and the second movable part 7-MT2 is movable relative to the base 7-212 through the third supporting assembly 7-190.

The third supporting assembly 7-190 includes a first connecting end 7-191, a second connecting end 7-192, and an elastic portion 7-194. The first connecting end 7-191 is fixedly connected to the base 7-212, the second connecting end 7-192 is fixedly connected to the second movable part 7-MT2, and the second connecting end 7-192 is movably connected to the first connecting end 7-191 through the elastic portion 7-194.

In addition, in this embodiment, the fourth driving mechanism 7-DM4 may include a first driving element 7-193, and the first driving element 7-193 may be made of shape memory alloys (SMA). Shape memory alloy (SMA) is an alloy that can eliminate the deformation in lower temperature by heating. When the shape memory alloy performs plastic deformation under its phase transition temperature, it may return to its original shape by heating. By controlling the temperature of the first driving element 7-193, the second movable part 7-MT2 can be moved relative to the base 7-212.

Figure 82:
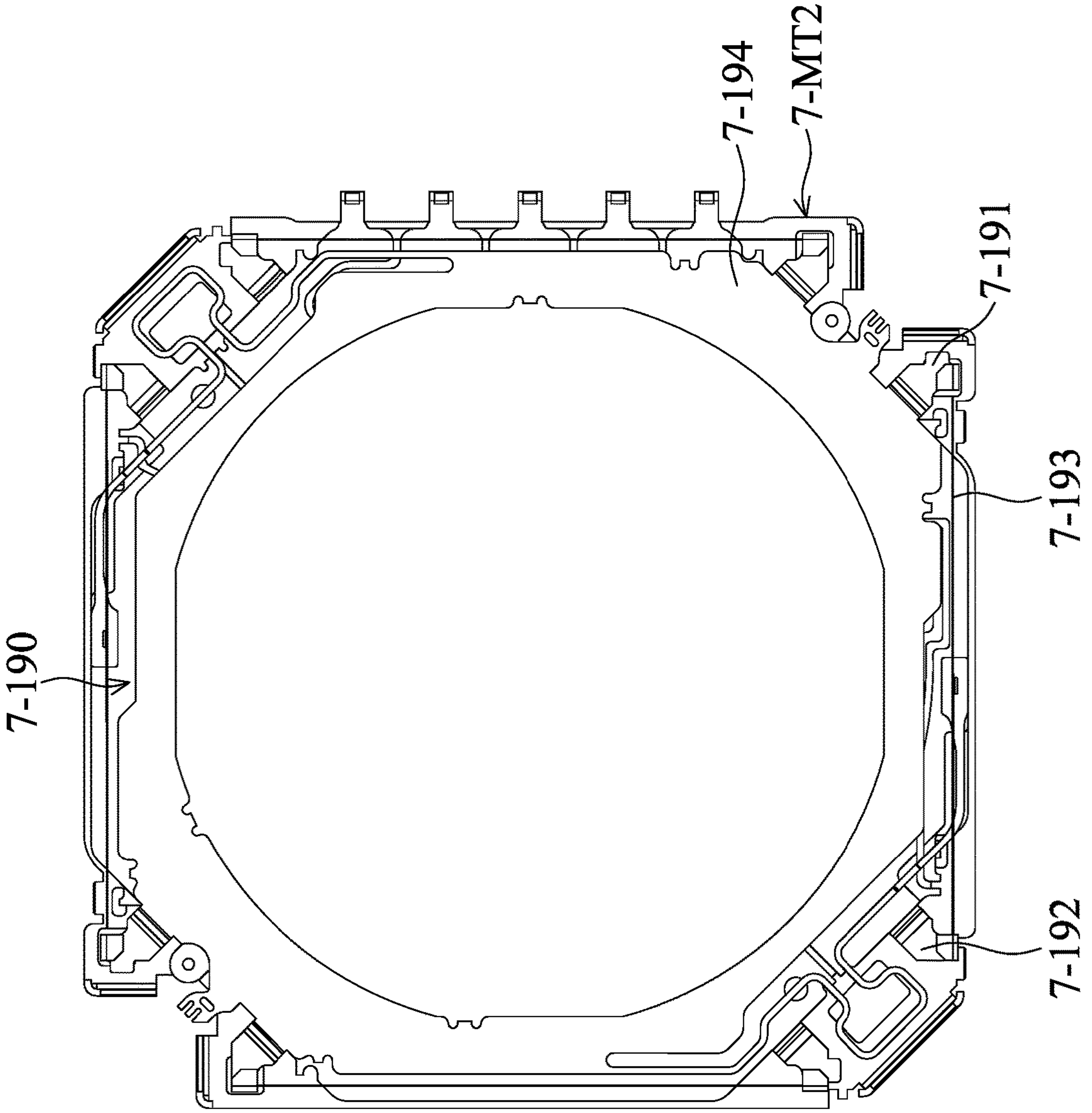
FIG. 82 is a top view of the third supporting assembly 7-190 and the second movable part 7-MT2 according to an embodiment of the present disclosure.

Please refer to FIG. 79 and FIG. 82 together. FIG. 82 is a top view of the third supporting assembly 7-190 and the second movable part 7-MT2 according to an embodiment of the present disclosure. The third supporting assembly 7-190 may have a plate-shaped structure, at least a part of the third supporting assembly 7-190 is parallel to the main body 7-150B, and the third supporting assembly 7-190 is not parallel to the main axis 7-AX. When viewed in the direction perpendicular to the main axis 7-AX, at least a part of the base 7-212 is located between the main body 7-150B and the third supporting assembly 7-190.

In this embodiment, the third supporting assembly 7-190 can be made of a conductive material, so that the first driving element 7-193 of the fourth driving mechanism 7-DM4 can be electrically connected to the external circuit through the third supporting assembly 7-190.

Figure 83:
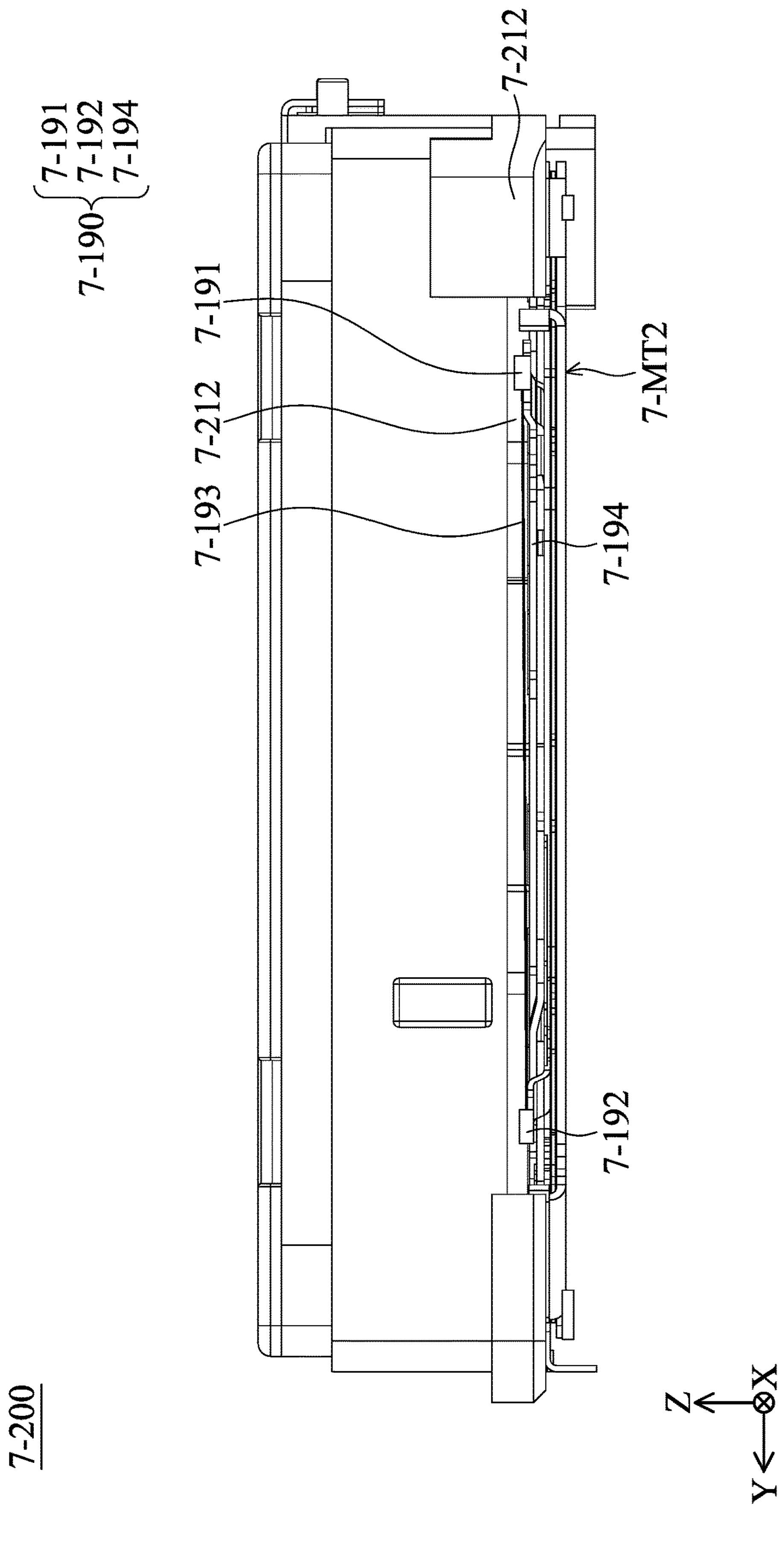
FIG. 83 is a side view of the movable module 7-200 according to an embodiment of the present disclosure.

Please refer to FIG. 79, FIG. 82 and FIG. 83 together. FIG. 83 is a side view of the movable module 7-200 according to an embodiment of the present disclosure. As shown in FIG. 79, when viewed along the main axis 7-AX, the third supporting assembly 7-190 overlaps at least a part of the first supporting assembly 7-150. When viewed along the main axis 7-AX, the third supporting assembly 7-190 does not overlap the first supporting portion 7-1501. When viewed along the main axis 7-AX, the third supporting assembly 7-190 does not overlap the second supporting portion 7-1503.

When viewed along the main axis 7-AX, the third supporting assembly 7-190 overlaps at least a part of the main body 7-150B. Furthermore, when viewed in a direction perpendicular to the main axis 7-AX (such as the Y-axis), the third supporting assembly 7-190 overlaps at least a part of the first supporting portion 7-1501.

When viewed in a direction perpendicular to the main axis 7-AX (such as the Y-axis), the third supporting assembly 7-190 overlaps at least a part of the second supporting portion 7-1503. When viewed in the direction perpendicular to the main axis 7-AX, the third supporting assembly 7-190 does not overlap the main body 7-150B.

As shown in FIG. 83, in the Z-axis, the third supporting assembly 7-190 is connected between the second movable part 7-MT2 and the base 7-212, and at least part of the third supporting assembly 7-190 is exposed from the base 7-212. This structural design can effectively use the space of the movable module 7-200, thereby achieving the effects of miniaturization.

The present disclosure provides an optical system 7-50. The first driving mechanism 7-DM1 can drive the movable module 7-200 to rotate around the first rotating axis 7-RX1 and/or the second rotating axis 7-RX2 relative to the fixed module 7-100. The second driving mechanism 7-DM2 can drive the first movable part 7-MT1 with the first optical element 7-250 to move in the first direction 7-D1 and/or the second direction 7-D2. The third driving mechanism 7-DM3 can drive the holder 7-208 carrying the first optical element 7-250 to move in the third direction 7-D3. The fourth driving mechanism 7-DM4 can drive the second movable part 7-MT2 with the second optical element 7-260 to move in the fourth direction 7-D4 and/or the fifth direction 7-D5 and/or to rotate around the third rotating axis 7-RX3.

Based on the structural configuration of the first driving mechanism 7-DM1 to the fourth driving mechanism 7-DM4, movement in multiple dimensions can be achieved, so that optical compensation can be effectively achieved, and the purpose of miniaturization of the optical system 7-50 can also be achieved.

The Eighth Group of Embodiments

Figure 84:
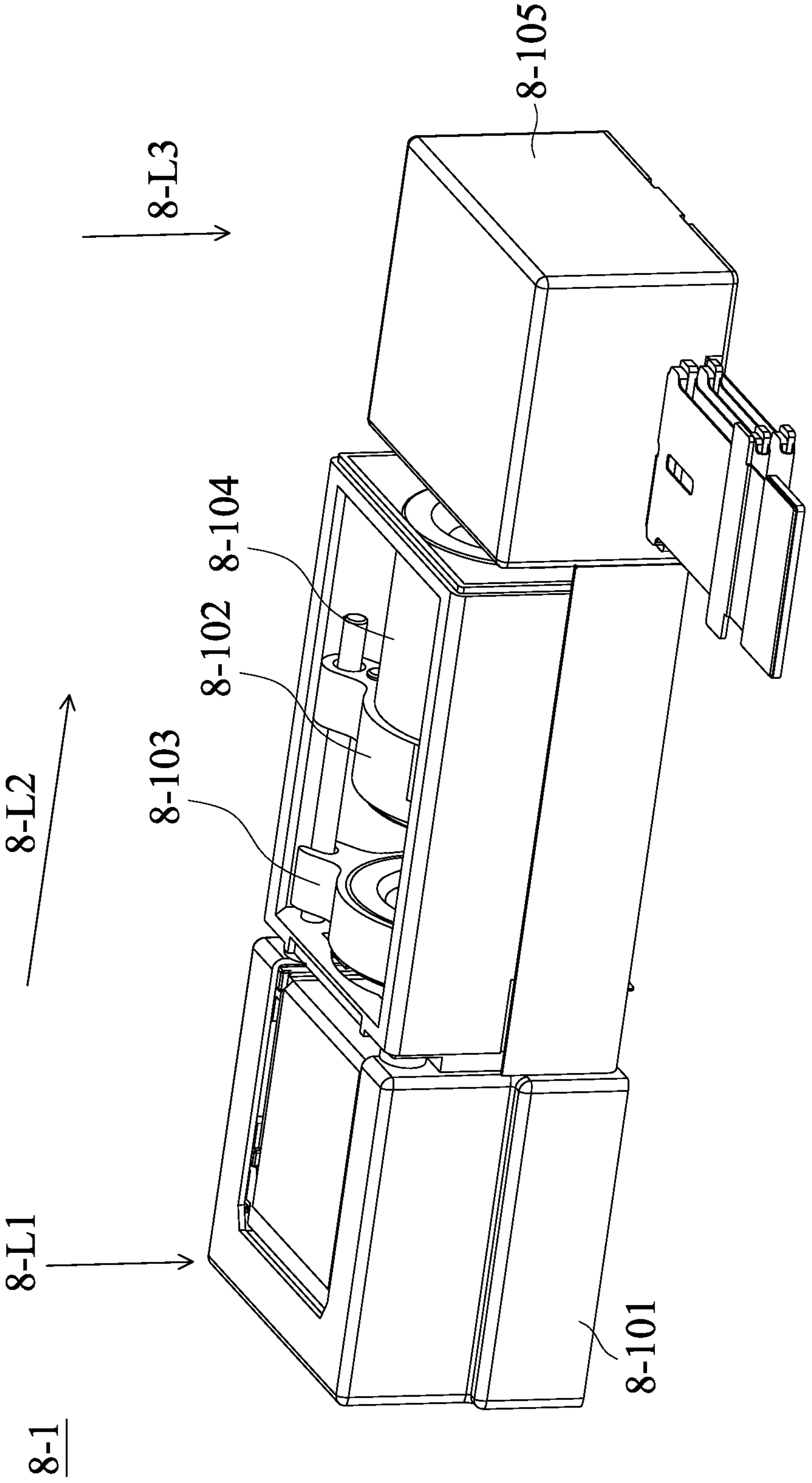
FIG. 84 is a perspective view of the optical system.
Figure 85:
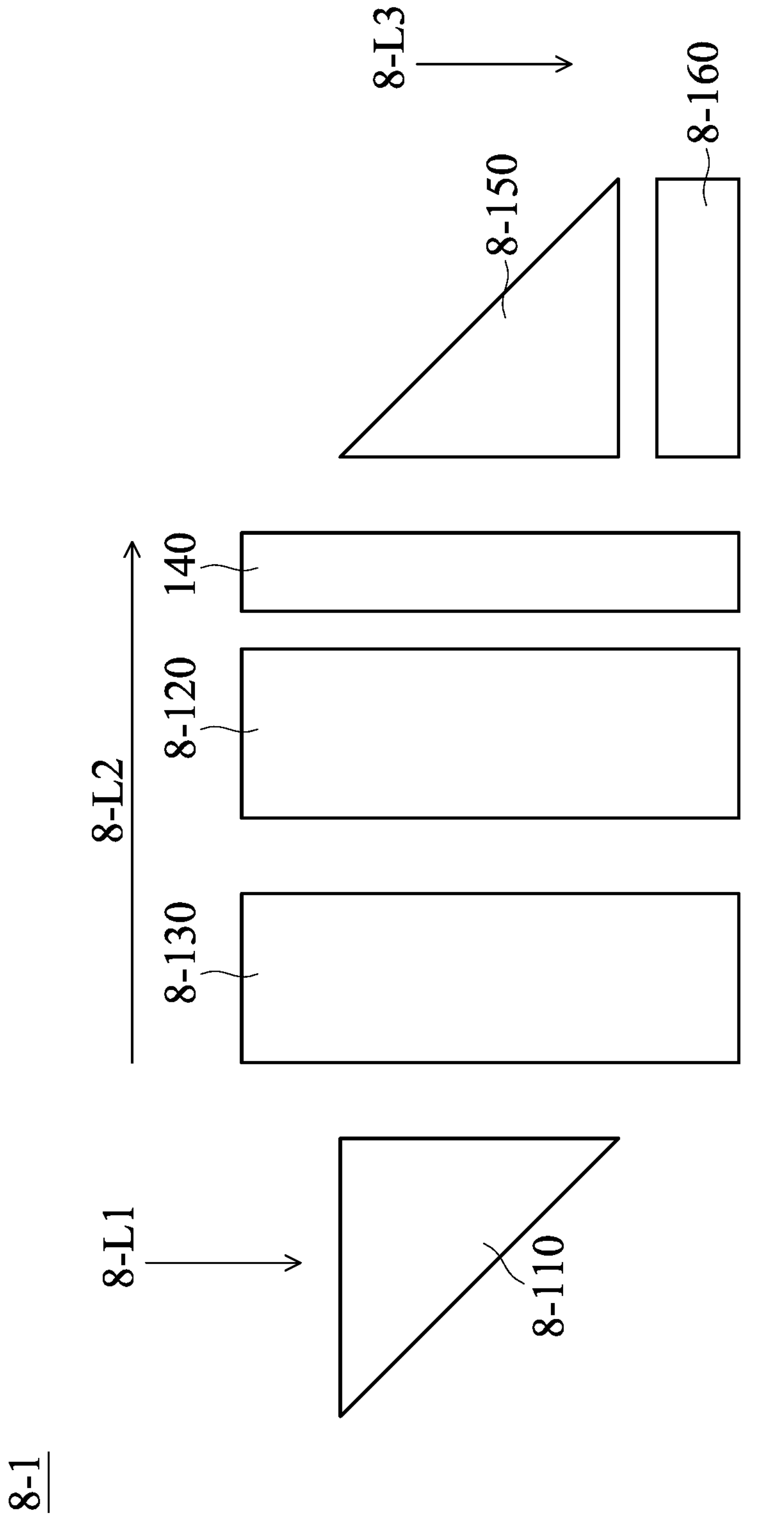
FIG. 85 is a schematic diagram of optical elements in the optical system.

According to some embodiments, an optical system 8-1 is provided. FIG. 84 is a perspective view of the optical system 8-1. FIG. 85 is a schematic diagram of the optical elements in the optical system 8-1. For simplicity, only the optical elements are shown in FIG. 85. The optical system 8-1 may be a periscope optical system. The optical system 8-1 includes a first optical module 8-101, a second optical module 8-102, a third optical module 8-103, a fourth optical module 8-104, and a fifth optical module 8-105.

A light above the first optical module 8-101 enters the first optical module 8-101 along a first incident direction 8-L1, and is adjusted to pass through the third optical module 8-103, the second optical module 8-102, and the fourth optical module 8-104 sequentially along a second incident direction 8-L2 by the first optical module 8-101, and the optical path of the light is adjusted to be along a third incident direction 8-L3 in the fifth optical module 8-105, and imaging in the fifth optical module 8-105.

The first optical module 8-101 and the fifth optical module 8-105 may include a first optical element 8-110 and a fifth optical element 8-150, respectively. The first optical element 8-110 and the fifth optical element 8-150 may be a prism, a mirror, a refractive prism, or a beam splitter, etc. By rotating the first optical element 8-110 and the fifth optical element 8-150, the optical path of the light may be changed. The second optical module 8-102, the third optical module 8-103, and the fourth optical module 8-104 may respectively include a second optical element 8-120, a third optical element 8-130, and a fourth optical element 8-140. The second optical module 8-102, the third optical module 8-103, and the fourth optical module 8-104 may drive the second optical element 8-120, the third optical element 8-130, and the fourth optical element 8-140 respectively. The second optical element 8-120, the third optical element 8-130, and the fourth optical element 8-140 may be one or more lenses, optical lenses, etc., and are made of materials such as glass and resin. The fifth optical module 8-105 may also include a sixth optical element 8-160. The sixth optical element 8-160 may be an image sensor (or called a photosensitive element), etc., for example, a charge-coupled Device (CCD).

In some embodiments, an optical element corresponding to a focal length of the first optical element 8-110 that is not zero (not shown, for example, one or more lens, optical lens, etc.) may be provided above the first optical element 8-110. In other words, the optical element whose focal length is not zero may be fixedly connected to the first optical element 8-110, and arranged along the first incident direction 8-L1 with the first optical element 8-110, and the shooting effect of the optical system 8-1 may be enhanced by increasing the quantity of the optical element.

In some embodiments, the first optical module 8-101 and the fifth optical module 8-105 may perform yawing and pitching, respectively. In some embodiments, the first optical module 8-101 may also perform pitching, and the fifth optical module 8-105 may perform yawing. In some embodiments, the first optical module 8-101 and the fifth optical module 8-105 may both perform pitching. In some embodiments, the first optical module 8-101 and the fifth optical module 8-105 may both perform yawing. In some embodiments, the second optical module 8-102 and the third optical module 8-103 may achieve the functions of zooming and auto focusing (AF), respectively. In some embodiments, the second optical module 8-102 may also perform auto focusing, and the third optical module 8-103 may perform zooming. In other words, terms such as yawing, pitching, zooming, and auto focusing, etc., do not constitute limitations.

In some embodiments, the fourth optical module 8-104 may achieve the function of Optical Image Stabilization (OIS). In some embodiments, the position of the fourth optical module 8-104 may be changed, for example, the fourth optical module 8-104 is disposed between the third optical module 8-103 and the fifth optical module 8-105. In some embodiments, the fourth optical module 8-104 may be integrated into the second optical module 8-102 or the third optical module 8-103, and the functions of auto focusing and optical image stabilization may be simultaneously achieved through a single second optical module 8-102 or a single third optical module 103. In some embodiments, the fourth optical module 8-104 may be omitted.

Figure 86:
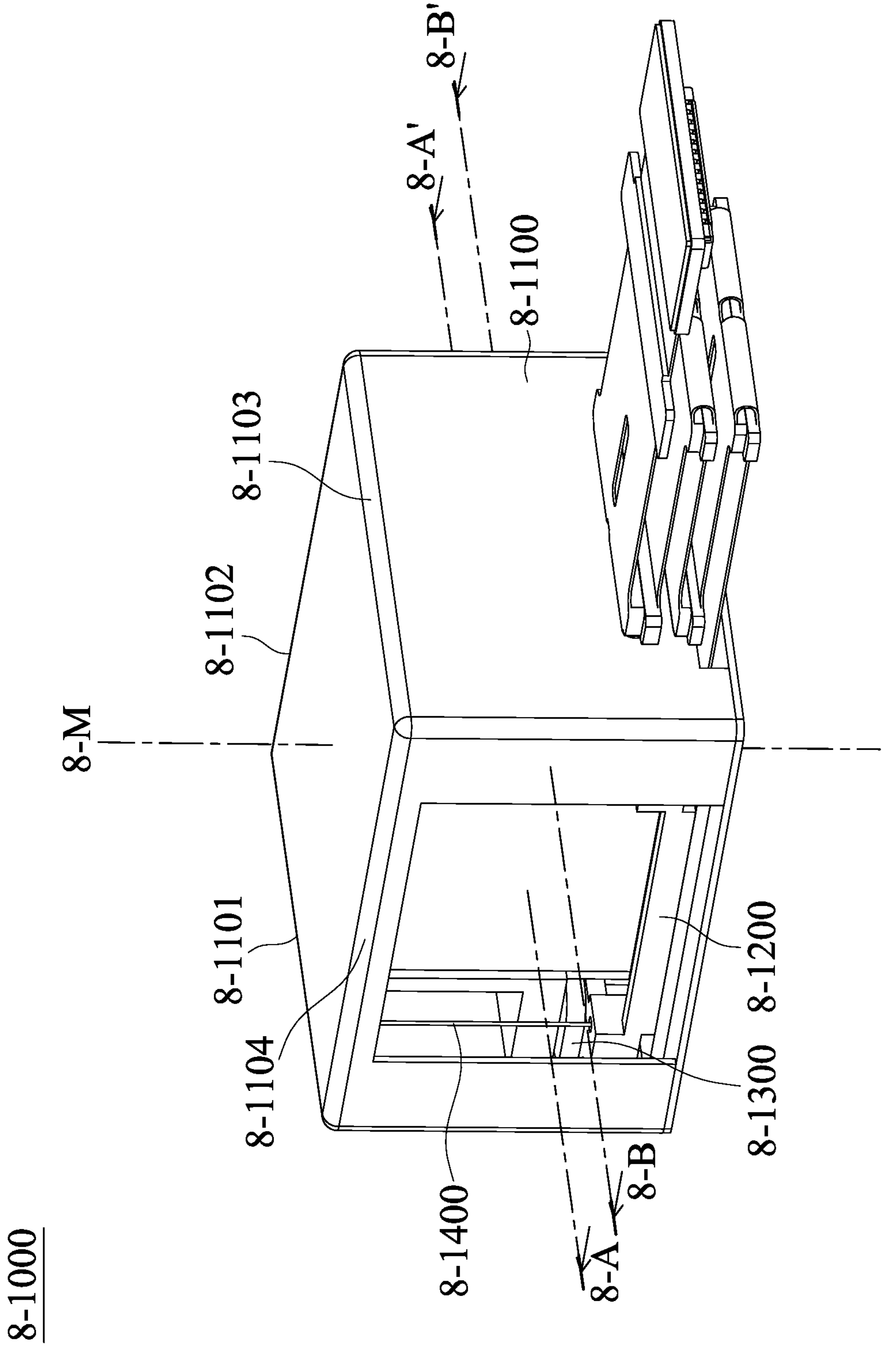
FIG. 86 is a perspective view of an optical module according to an embodiment of the disclosure.
Figure 87:
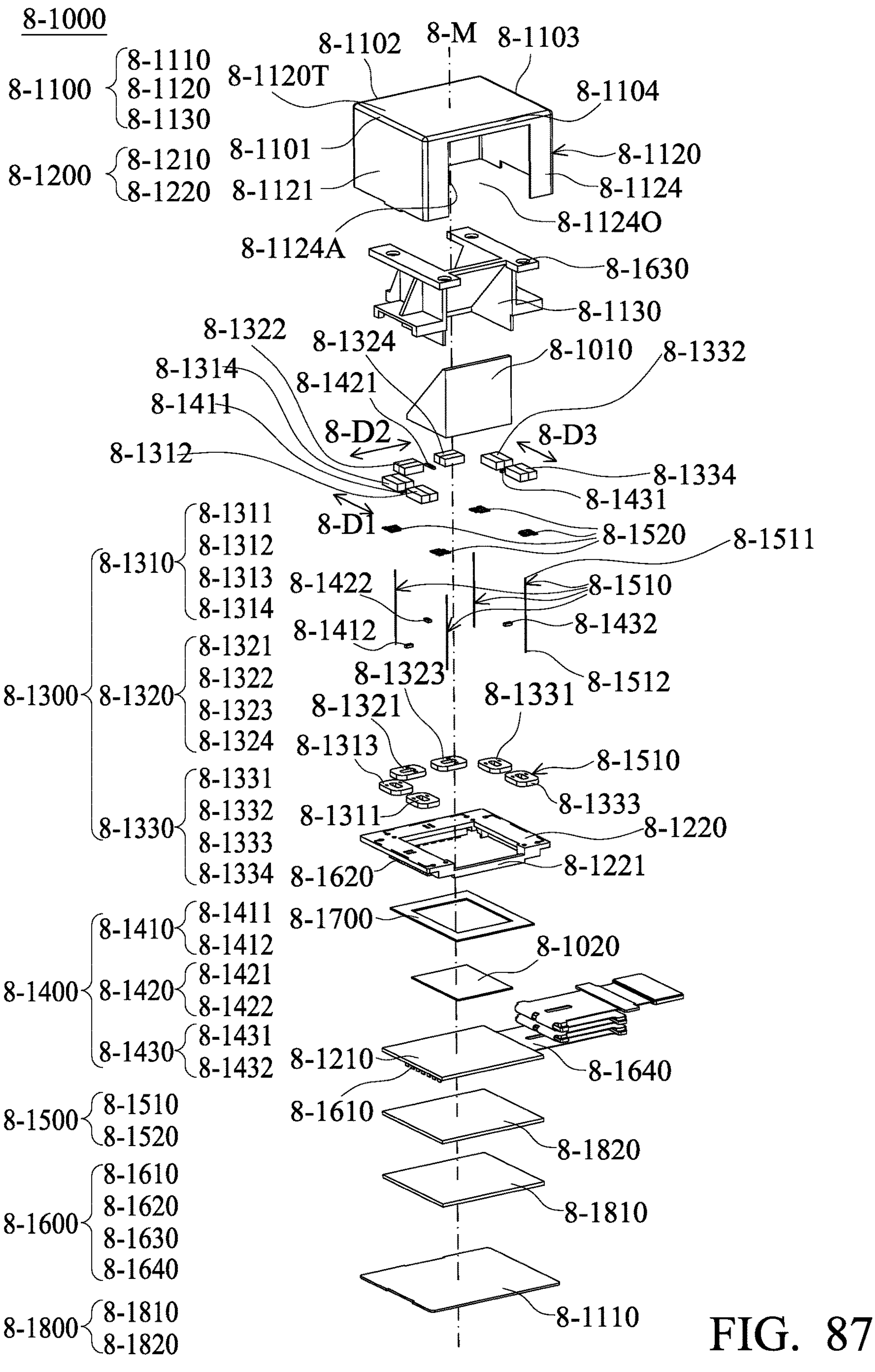
FIG. 87 is an exploded view of the optical module according to an embodiment of the disclosure.
Figure 88:
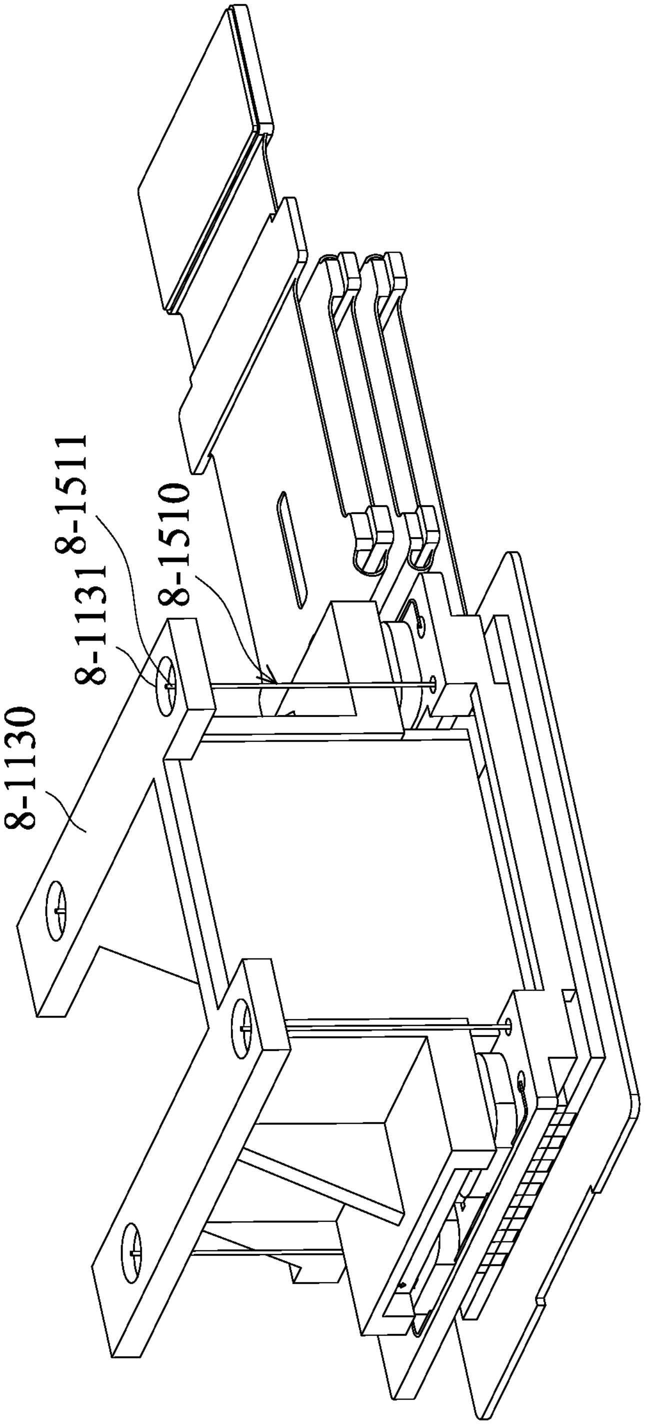
FIG. 88 is a perspective view of a partial structure of the optical module according to an embodiment of the disclosure.
Figure 89:
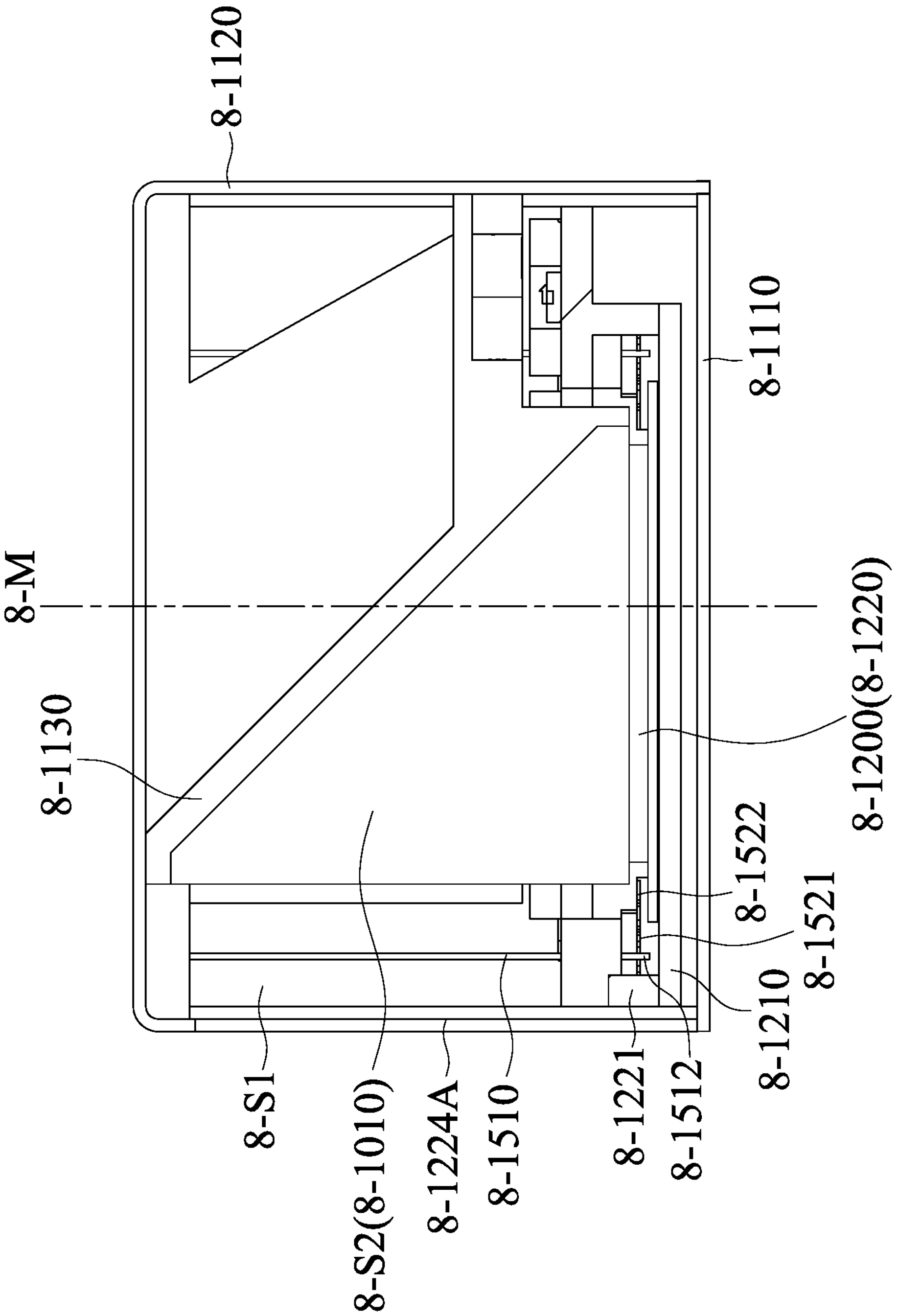
FIG. 89 is a cross-sectional view of the optical module taken along the line 8-A-8-A' in FIG. 86.
Figure 90:
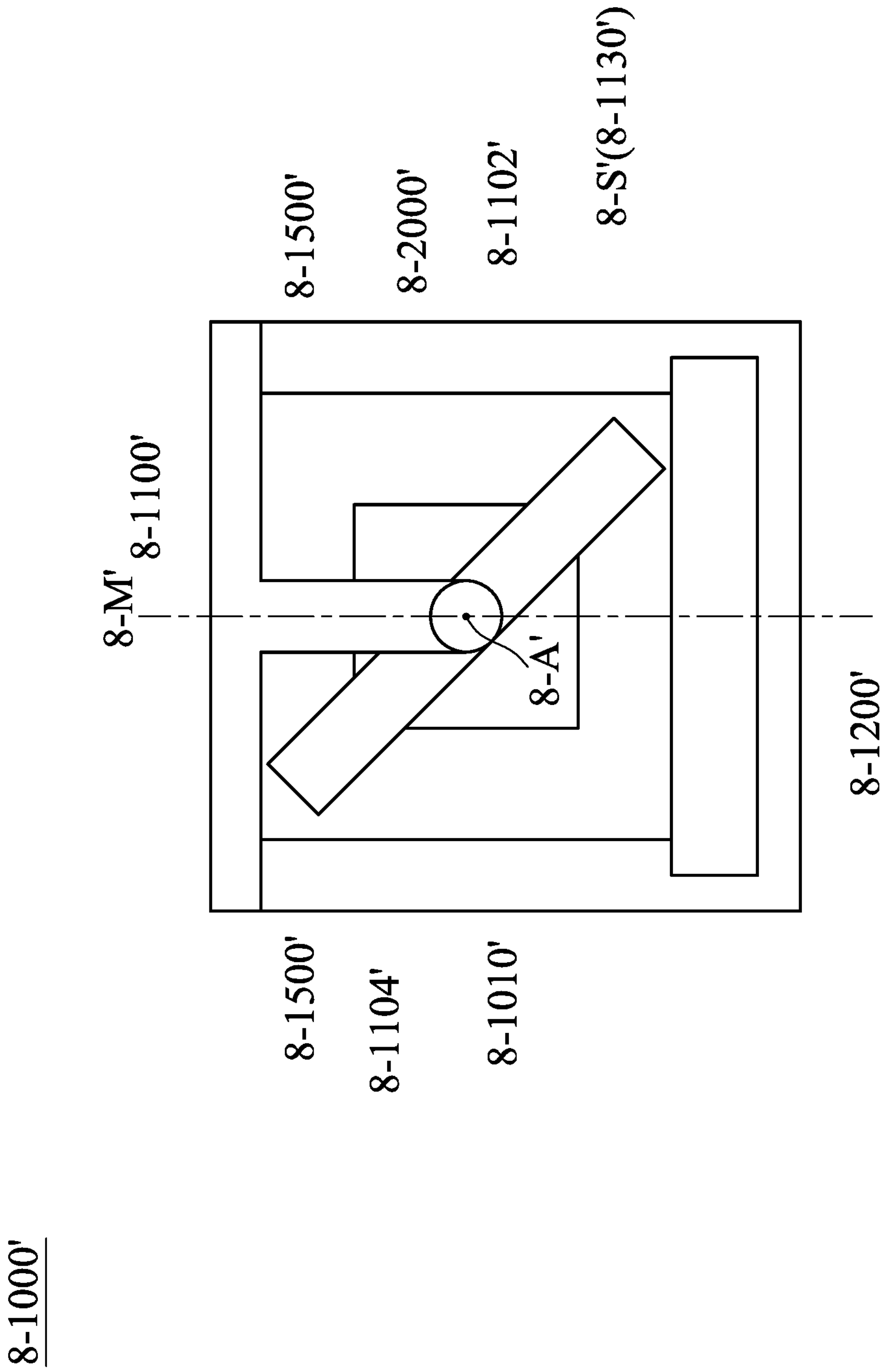
FIG. 90 is a schematic diagram of a partial structure of an optical module according to another embodiment of the disclosure.

Refer to FIG. 86 to FIG. 90. FIG. 86 is a perspective view of an optical module 8-1000 according to an embodiment of the present disclosure. FIG. 87 is an exploded view of the optical module 8-1000 according to an embodiment of the disclosure. FIG. 88 is a perspective view a partial structure of the optical module 8-1000 according to an embodiment of the disclosure. FIG. 89 is a cross-sectional view of the optical module 8-1000 taken along the line 8-A-8-A' in FIG. 86. FIG. 90 is a schematic diagram of a partial structure of an optical module 8-1000' according to another embodiment of the disclosure. In the following embodiments, the optical module 8-1000 has a similar structure to the fifth optical module 8-105 described above. The optical module 8-1000 has a main axis 8-M, and includes an optical path adjustment element 8-1010, an optical element 8-1020, a fixed portion 8-1100, a movable portion 8-1200, a driving mechanism 8-1300, a position sensing module 8-1400, a supporting assembly 8-1500, a circuit assembly 8-1600, a dust-proof assembly 8-1700, a heat dissipation assembly 8-1800, and a damping assembly 8-1900 (shown in FIG. 92).

The optical path adjustment element 8-1010 has a structure similar to the fifth optical element 8-150 mentioned above. In some embodiments, the optical path adjustment element 8-1010 is a right-angle prism, but is not limited to this. The optical element 8-1020 has a structure similar to the sixth optical element 8-160 mentioned above. In some embodiments, the optical element 8-1020 is an image sensor, but is not limited to this.

When viewed along a direction that is parallel to the main axis 8-M, the fixed portion 8-1100 is a polygonal structure with a first side 8-1101, a second side 8-1102, a third side 8-1103 and a fourth side 8-1104. The first side 8-1101 is parallel to the third side 8-1103, the second side 8-1102 is parallel to the fourth side 8-1104, and the first side 8-1101 and the second side 8-1102 are not parallel.

As shown in FIG. 86 to FIG. 88, the fixed portion 8-1100 includes a base 8-1110, an outer frame 8-1120, and a frame 8-1130. The base 8-1110 has a plate-like structure and is perpendicular to the main axis 8-M. The outer frame 8-1120 and the base 8-1110 are arranged along the main axis 8-M. The outer frame 8-1120 includes a top wall 8-1120T, a first side wall 8-1121, a second side wall 8-1122, a third side wall 8-1123, and a fourth side wall 8-1124. The top wall 8-1110T has a plate-like structure and is not parallel to the main axis 8-M. In more detail, the top wall 1121T is parallel to the base 8-1110. The first side wall 8-1121 extends from an edge of the top wall 8-1120T and is not parallel to the top wall 8-1120T. When viewed along the direction that is parallel to the main axis 8-M, the first side wall 8-1121 is disposed on the first side 8-1101. The second side wall 8-1122 extends from an edge of the top wall 8-1120T and is not parallel to the top wall 8-1120T. When viewed along a direction that is parallel to the main axis 8-M, the second side wall 8-1122 is disposed on the second side 8-1102. The third side wall 8-1123 extends from an edge of the top wall 8-1120T and is not parallel to the top wall 8-1120T. When viewed along the direction that is parallel to the main axis 8-M, the third side wall 8-1123 is disposed on the third side 8-1103. The fourth side wall 8-1124 extends from an edge of the top wall 8-1120T and is not parallel to the top wall 8-1120T. The fourth side wall 8-1124 has an opening 8-11240 corresponding to the incident light 8-L. The opening 8-11240 is disposed between the outer frame 8-1120 and the base 8-1110. When viewed along the direction that is parallel to the main axis 8-M, the fourth side wall 8-1124 is disposed on the fourth side 8-1104.

As shown in FIG. 89, the base 8-1110 and the outer frame 8-1120 form a first accommodating space 8-S1. The first accommodating space 8-S1 accommodates the movable portion 8-1200 and the frame 8-1130. There is a second accommodating space 8-S2 between the frame 8-1130 and the movable portion 8-1200 for accommodating the optical path adjustment element 8-1010. Although in this embodiment, the frame 8-1130 is connected and fixed to the outer frame 8-1120, and the optical path adjustment element 8-1010 is connected and fixed to the frame 8-1130, it is not limited to this. In some embodiments, the frame 8-1130 may be included in the movable portion 8-1200, and the frame 8-1130 and the optical path adjustment element 8-1010 may move relative to the fixed portion 8-1100.

As shown in FIG. 90, the optical module 8-1000' has a similar structure to the optical module 8-1000, except that the optical module 8-1000' includes an anti-vibration driving mechanism 8-2000' and a frame 8-1130' has an inclined surface 8-S' that may move relative to the fixed portion 8-1100'. The optical path adjustment element 8-1010' is fixedly disposed on the inclined surface 8-S' of the frame 8-1130'. When viewed along the direction that is parallel to the main axis 8-M', the anti-vibration driving mechanism 8-2000' is disposed on the second side 8-1102', and the anti-vibration driving mechanism 8-2000' and the driving mechanism 8-1300' at least partially overlap. The anti-vibration driving mechanism 8-2000' may drive the optical path adjustment element 8-1010' to move relative to the fixed portion 8-1100'. In more detail, according to the configuration of the anti-vibration driving mechanism 8-2000', the optical path adjustment element 8-1010' may be controlled to be yawing and pitching. In the embodiment shown in FIG. 90, the anti-vibration driving mechanism 8-2000' drives the optical path adjustment element 8-1010' to rotate in a first rotating axis 8-A' relative to the fixed portion 8-1100', and the first rotating axis 8-A' is parallel to the second side 8-1102'.

Back to FIG. 86 to FIG. 89, the movable portion 8-1200 is connected to the optical element 8-1020 and may move relative to the fixed portion 8-1100. The movable portion 8-1200 includes a pedestal 8-1210 and a holder 8-1220. The pedestal 8-1210 is connected to the optical element 8-1020 and has a plate-like structure. The holder 8-1220 is fixedly disposed on the pedestal 8-1210, and has a shielding portion 8-1221, which is arranged near the fourth side 8-1104. In more detail, when viewed along the direction that is parallel to the main axis 8-M, the light enters the optical module 8-1000 from the fourth side 8-1104, and enters the optical element 8-1020 through the optical path adjustment element 8-1010. The optical path adjustment element 8-1010 is configured to adjust the light traveling in the direction that is parallel to the first side 8-1101 to travel in the direction that is parallel to the main axis 8-M. The shielding portion 8-1221 is a protruding structure which protrudes along the direction that is parallel to the main axis 8-M. When viewed along the direction that is parallel to the first side 8-1101, the shielding portion 8-1221 and the optical element 8-1020 at least partially overlap, so a stray light may be shielded, and the stray light may not enter the optical element 8-1020.

The shielding portion 8-1221 may also be used as a stopping portion 8-1221. An inner side wall located on the fourth side 8-1104 and close to the stopping portion 8-1221 may be used as a stopping surface 8-1124A, so the stopping portion 8-1221 and the stopping surface 8-1124A may form a stopping assembly 8-1600 configured to restrict the movable portion 8-1200 to move within a moving range relative to the fixed portion 8-1100. In more detail, when the stopping portion 8-1221 touches the stopping surface 8-1124A, the movable portion 8-1200 stops moving, so the movable portion 8-1200 moving along a direction that is not parallel to the main axis 8-M may be restricted within a moving range relative to the fixed portion 8-1100.

The dust-proof assembly 8-1700 may be adhesive, glue or the like, which has a higher viscosity. The dust-proof assembly 8-1700 is at least partly disposed on the pedestal 8-1210 and at least partly disposed on the holder 8-1220. When viewed along the direction that is parallel to the main axis 8-M, the dust-proof assembly 8-1700 does not overlap the optical element 8-1020, and the dust-proof assembly 8-1700 is located around the optical element 8-1020. In more detail, the dust-proof assembly 8-1700 has a closed structure surrounding the optical element 8-1020. Due to the higher viscosity of the dust-proof assembly 8-1700, the dust-proof assembly 8-1700 may capture foreign objects and restrict the path of the foreign objects to prevent the foreign objects from contacting the optical element 8-1020.

The heat dissipation assembly 8-1800 is configured to improve the heat dissipation efficiency of the optical element 8-1020 and the driving mechanism 8-1300. The heat dissipation assembly 8-1800 includes a first heat dissipation element 8-1810 and a second heat dissipation element 8-1920. The first heat dissipation element 8-1810 has a plate-shaped structure with a thermal conductivity greater than 10 W/(m×K), and may be made of carbon fiber, ceramic or metal. The first heat dissipation element 8-1810 is closer to the optical element 8-1020 than the top wall 8-1120T, and the first heat dissipation element 8-1810 and the base 8-1110 may have an integrated structure.

The second heat dissipation element 8-1820 has a plate-shaped structure with a thermal conductivity greater than 10 W/(m×K), and is fixedly disposed on the pedestal 8-1210 and is at least partially embedded in the pedestal 8-1210. The second heat dissipation element 8-1820 has a magnetically permeable material to improve the driving efficiency of the driving mechanism 8-1300. In more detail, the second heat dissipation element 8-1820 corresponds to the driving mechanism 8-1300, and because of the magnetic material, the second heat dissipation element 8-1820 may generate an attractive force or a repulsive force to improve the driving efficiency of the driving mechanism 8-1300. The second heat dissipation element 8-1820 is parallel to the first heat dissipation element 8-1810, and there is a gap greater than zero between the first heat dissipation element 8-1810 and the second heat dissipation element 8-1820.

The driving mechanism 8-1300 drives the movable portion 8-1200 to move relative to the fixed portion 8-1100. The driving mechanism 8-1300 includes a first driving assembly 8-1310, a second driving assembly 8-1320, and a third driving assembly 8-1330. The first driving assembly 8-1310 is disposed on the first side 8-1101, and includes a first coil 8-1311, a first magnetic element 8-1312, a second coil 8-1313, and a second magnetic element 8-1314. The first magnetic element 8-1312 corresponds to the first coil 8-1311, and the first coil 8-1311 and the first magnetic element 8-1312 are arranged along a direction that is parallel to the main axis 8-M. The second coil 8-1313 and the first coil 8-1311 are arranged along a first direction 8-D1, and the first direction 8-D1 is parallel to the first side 8-1101. The second magnetic element 8-1314 corresponds to the second coil 8-1313, and the second magnetic element 8-1314 and the first magnetic element 8-1312 are arranged along the first direction 8-D1. The second driving assembly 8-1320 is disposed on the second side 8-1102, and includes a third coil 8-1321, a third magnetic element 8-1322, a fourth coil 8-1323, and a fourth magnetic element 8-1324. The third magnetic element 8-1322 corresponds to the third coil 8-1321, and the third coil 8-1321 and the third magnetic element 8-1322 are arranged along a direction that is parallel to the main axis 8-M. The fourth coil 8-1323 and the third coil 8-1321 are arranged along the second direction 8-D2, and the second direction 8-D2 is parallel to the second side 8-1102. The fourth magnetic element 8-1324 corresponds to the fourth coil 8-1323. The third driving assembly 8-1330 is disposed on the third side 8-1103, and includes a fifth coil 8-1331, a fifth magnetic element 8-1332, a sixth coil 8-1333, and a sixth magnetic element 8-1334. The fifth magnetic element 8-1332 corresponds to the fifth coil 8-1331, and the fifth coil 8-1331 and the fifth magnetic element 8-1332 are arranged along the direction that is parallel to the main axis 8-M. The sixth coil 8-1333 and the fifth coil 8-1331 is arranged along a third direction 8-D3, and the third direction 8-D3 is parallel to the third side 8-1103. The sixth magnetic element 8-1334 corresponds to the sixth coil 8-1333. A winding axis of the second coil 8-1313 is parallel to a winding axis of the first coil 8-1311. The winding axis of the first coil 8-1311 is parallel to the main axis 8-M. A winding axis of the fourth coil 8-1323 is parallel to a winding axis of the third coil 8-1321. The winding axis of the fourth coil 8-1323 is parallel to the main axis 8-M. A winding axis of the sixth coil 8-1333 is parallel to a winding axis of the fifth coils 8-1331. The winding axis of the sixth coil 8-1333 is parallel to the main axis 8-M. When viewed along the direction that is parallel to the main axis 8-M, the driving mechanism 8-1300 is not disposed on the fourth side 8-1104. The driving assembly is at least partially fixedly disposed on the holder 8-1220.

In some embodiments, the first coil 8-1311, the second coil 8-1313, the third coil 8-1321, the fourth coil 8-1323, the fifth coil 8-1331, and the sixth coil 8-1333 are disposed on the holder 8-1220 of the movable portion 8-1200, the first magnetic element 8-1312, the second magnetic element 8-1314, the third magnetic element 8-1322, the fourth magnetic element 8-1324, the five magnetic elements 8-1332, and the sixth magnetic element 8-1334 are disposed on the frame 8-1130 of the fixed portion 8-1100, but not limited to this. In some embodiments, the first coil 8-1311, the second coil 8-1313, the third coil 8-1321, the fourth coil 8-1323, the fifth coil 8-1331, and the sixth coil 8-1333 are disposed on the frame 8-1130 of the fixed portion 8-1100, and the first magnetic element 8-1312, the second magnetic element 8-1314, the third magnetic element 8-1322, the fourth magnetic element 8-1324, the fifth magnetic element 8-1332, and the sixth magnetic element 8-1334 are disposed on the holder 8-1220 of the movable portion 8-1200.

In addition, in the embodiment of FIG. 87, the first driving assembly 8-1310, the second driving assembly 8-1320, and the third driving assembly 8-1330 respectively include two magnetic elements, but it is not limited to this. In some embodiments, the first magnetic element 8-1312 and the second magnetic element 8-1314 have an integrally formed structure, the third magnetic element 8-1322 and the fourth magnetic element 8-1324 have an integrally formed structure, and the fifth magnetic element 8-1332 and the sixth magnetic element 8-1334 have an integrated structure.

The position sensing module 8-1400 is configured to sense the movement of the movable portion 8-1200 relative to the fixed portion 8-1100, and includes a first position sensing assembly 8-1410, a second position sensing assembly 8-1420, and a third position sensing assembly 8-1430. The first position sensing assembly 8-1410 has a first reference element 8-1411 and a first sensing element 8-1412, and the first sensing element 8-1412 is configured to sense a first magnetic field generated by the first reference element 8-1411. When viewed along the direction that is parallel to the main axis 8-M, the first sensing element 8-1412 and the first reference element 8-1411 are disposed on the first side 8-1101. The second position sensing assembly 8-1420 has a second reference element 8-1421 and a second sensing element 8-1422, and the second sensing element 8-1422 is configured to sense the second magnetic field generated by the second reference element 8-1421. When viewed along the direction that is parallel to the main axis 8-M, the second sensing element 8-1422 and the second reference element 8-1421 are disposed on the second side 8-1102. The third position sensing assembly 8-1430 has a third reference element 8-1431 and a third sensing element 8-1432. The third sensing element 8-1432 is configured to sense a third magnetic field generated by the third reference element 8-1431. When viewed in the direction that is parallel to the main axis 8-M, the third sensing element 8-1432 and the third reference element 8-1431 are disposed on the third side 8-1103. When viewed along the direction that is parallel to the main axis 8-M, the position sensing module 8-1400 is not disposed on the fourth side 8-1104.

In some embodiments, the first reference element 8-1411, the second reference element 8-1421, and the third reference element 8-1431 are respectively magnetic elements, which are disposed on the frame 8-1130. When viewed along the direction that is perpendicular to the main axis 8-M, the first reference element 8-1411 is disposed between the first magnetic element 8-1312 and the second magnetic element 8-1314, the second reference element 8-1421 is disposed between the third magnetic elements 8-1322 and the fourth magnetic element 8-1324, the third reference element 8-1431 is arranged between the fifth magnetic element 8-1332 and the sixth magnetic element 8-1334. The first sensing element 8-1412, the second sensing element 8-1422, and the third sensing element 8-1432 may be, for example, a Hall effect sensor, a magnetoresistive (MR) sensor, or a Fluxgate, etc. The first sensing element 8-1412, the second sensing element 8-1422, and the third sensing element 8-1432 are disposed on the holder 8-1220. When viewed along the direction that is perpendicular to the main axis 8-M, the first sensing element 8-1412 is disposed between the first coil 8-1311 and the second coil 8-1313, the second sensing element 8-1422 is located between the third coil 8-1321 and the fourth coil 8-1323, and the third sensing element 8-1432 is located between the fifth coil 8-1331 and the sixth coil 8-1333 to respectively sense the first magnetic field of the first reference element 8-1411, the second magnetic field of the second reference element 8-1421, and the third magnetic field of the third reference element 8-1431 to obtain the position of the holder 8-1220 relative to the frame 8-1130.

In some embodiments, three sets of position sensing assemblies are provided (a first position sensing assembly 8-1410, a second position sensing assembly 8-1420, and a third position sensing assembly 8-1430) to sense the movement and rotation of the movable portion 8-1200 relative to the fixed portion 8-1100, but not limited to this. In some embodiments, only two sets of position sensing assemblies that are not parallel to each other may be provided to sense the movement of the movable portion 8-1200 relative to the fixed portion 8-1100.

The above-mentioned example with the position sensing module 8-1400 is driven by a closed-loop control. That is, the position sensing module 8-1400 is used to sense whether the movable portion 8-1200 reaches the expected position, and if it does not reach the expected position, a command may be made by a controller of the driving mechanism 8-1300 to make corrections until the movable portion 8-1200 reaches the expected position. However, the present disclosure is not limited to this. It may also be driven by an open-loop control without the position sensing module 8-1400 with the position feedback, and by establishing a database in advance, then the movable portion 8-1200 may be driven directly to the expected position.

Figure 91:
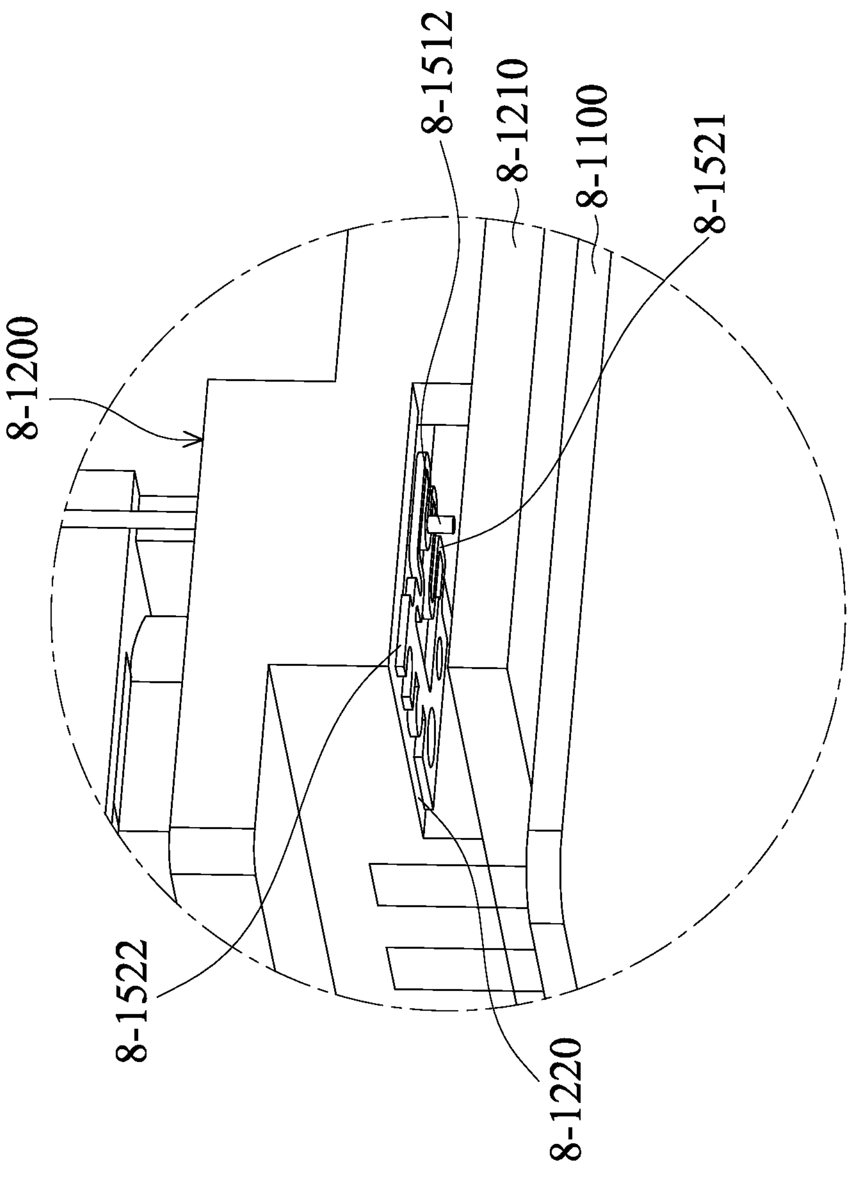
FIG. 91 is an enlarged schematic diagram of the framed part of FIG. 88.

Next, refer to FIG. 87 to FIG. 89, and FIG. 91. FIG. 91 is an enlarged schematic view of the framed part of FIG. 88. The supporting assembly 8-1500 is connected to the movable portion 8-1200 and the fixed portion 8-1100. The supporting assembly 8-1500 includes a first elastic element 8-1510 and a second elastic element 8-1520. The first elastic element 8-1510 has a long strip structure extending along the direction that is parallel to the main axis 8-M, and pass through the frame 8-1130 and the holder 8-1220. The first elastic element 8-1510 has a first end portion 8-1511 and a second end portion 8-1512. The first end portion 8-1511 is fixed to the frame 8-1130, and is located between the frame 8-1130 and the top wall 8-1120T, but does not directly contact the top wall 8-1120T. In more detail, the frame 8-1130 has a groove 8-1131 to accommodate the first end portion 8-1511. The second end portion 8-1512 is connected to the second elastic element 8-1520.

As shown in FIG. 91, the second elastic element 8-1520 has a plate-like structure, which is not parallel to the first elastic element 8-1510. The second elastic element 8-1520 has an impact absorbing portion 8-1521 and a fixed end portion 8-1522. The impact absorbing portion 8-1521 is connected to the second end portion 8-1512. The impact absorbing portion 8-1521 absorbs the impact of the first elastic element 8-1510. The fixed end portion 8-1522 is fixed to the holder 8-1220. Therefore, the second elastic element 8-1520 contacts to the holder 8-1220, and does not directly contact the pedestal 8-1210. When viewed along the direction that is perpendicular to the main axis 8-M, the second elastic element 8-1520 is located between the pedestal 8-1210 and the holder 8-1220. When viewed along the direction that is parallel to the main axis 8-M, the first elastic element 8-1510, the pedestal 8-1210 and the holder 8-1220 at least partially overlap.

Figure 92:
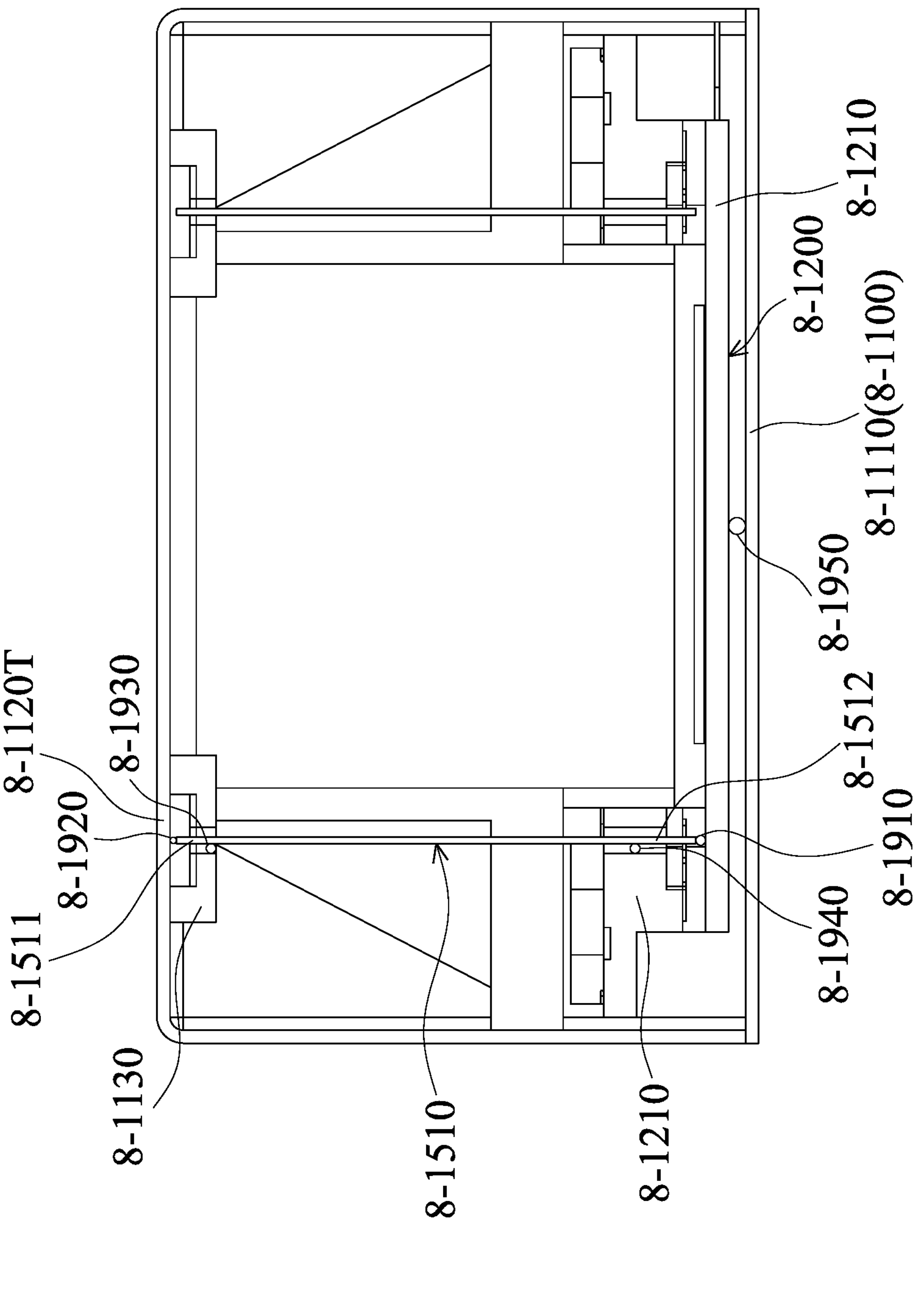
FIG. 92 is a schematic cross-sectional view of the optical module taken along the line 8-B-8-B' in FIG. 86.

Refer to FIG. 87 and FIG. 92. FIG. 92 is a schematic cross-sectional view of the optical module 8-1000 along the line B-B' in FIG. 86. The damping assembly 8-1900 may have a gel material, and includes a first damping element 8-1910, a second damping element 8-1920, a third damping element 8-1930, a fourth damping element 8-1940, and a fifth damping element 8-1950. The first damping element 8-1910 directly contacts the first elastic element 8-1510 and the movable portion 8-1200. In more detail, the first damping element 8-1910 is disposed between the second end portion 8-1512 and the pedestal 8-1210. The second damping element 8-1920 directly contacts the first elastic element 8-1510 and the fixing portion 8-1100. In more detail, the second damping element 8-1920 is disposed between the first end portion 8-1511 and the top wall 8-1120T to avoid short-circuit causing by the first end portion 8-1511 contacts the top wall 8-1120T.

The third damping element 8-1930 directly contacts the first elastic element 8-1510 and the frame 8-1130. The fourth damping element 8-1940 directly contacts the first elastic element 8-1510 and the movable portion 8-1200. In more detail, the fourth damping element 8-1940 is disposed between the first elastic element 8-1510 and the holder 1210. The fifth damping element 8-1950 directly contacts the movable portion 8-1200 and the fixed portion 8-1100. In more detail, the fifth damping element 8-1950 is disposed between the movable portion 8-1200 and the base 8-1110. By providing the damping assembly 8-1900, the connection between the supporting assembly 8-1500 and the movable portion 8-1200 and the fixed portion 8-1100 may be strengthened, and the movement of the movable portion 8-1200 relative to the fixed portion 8-1100 may be stabilized.

Figure 93:
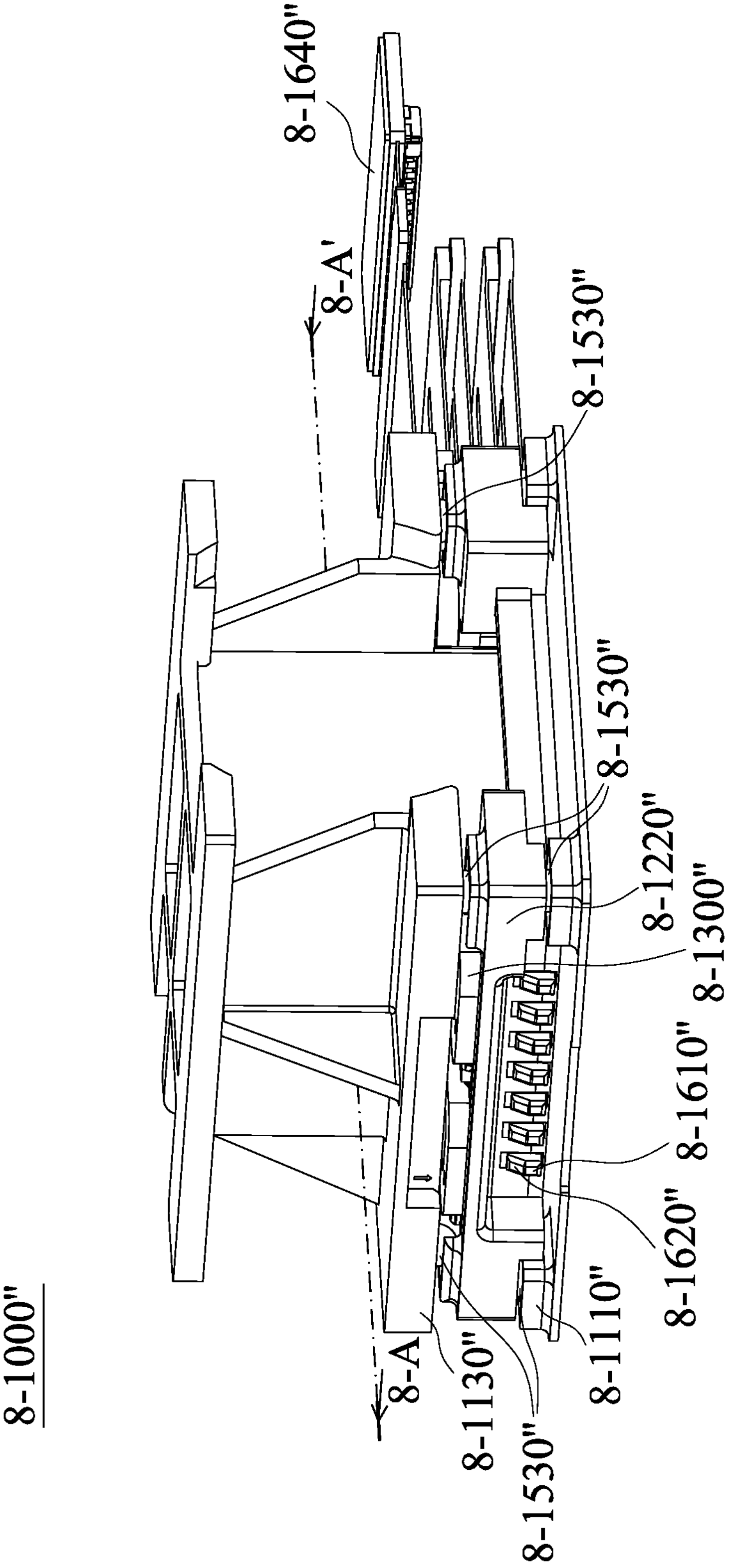
FIG. 93 is a perspective view of a partial structure of an optical module according to another embodiment of the disclosure.
Figure 94:
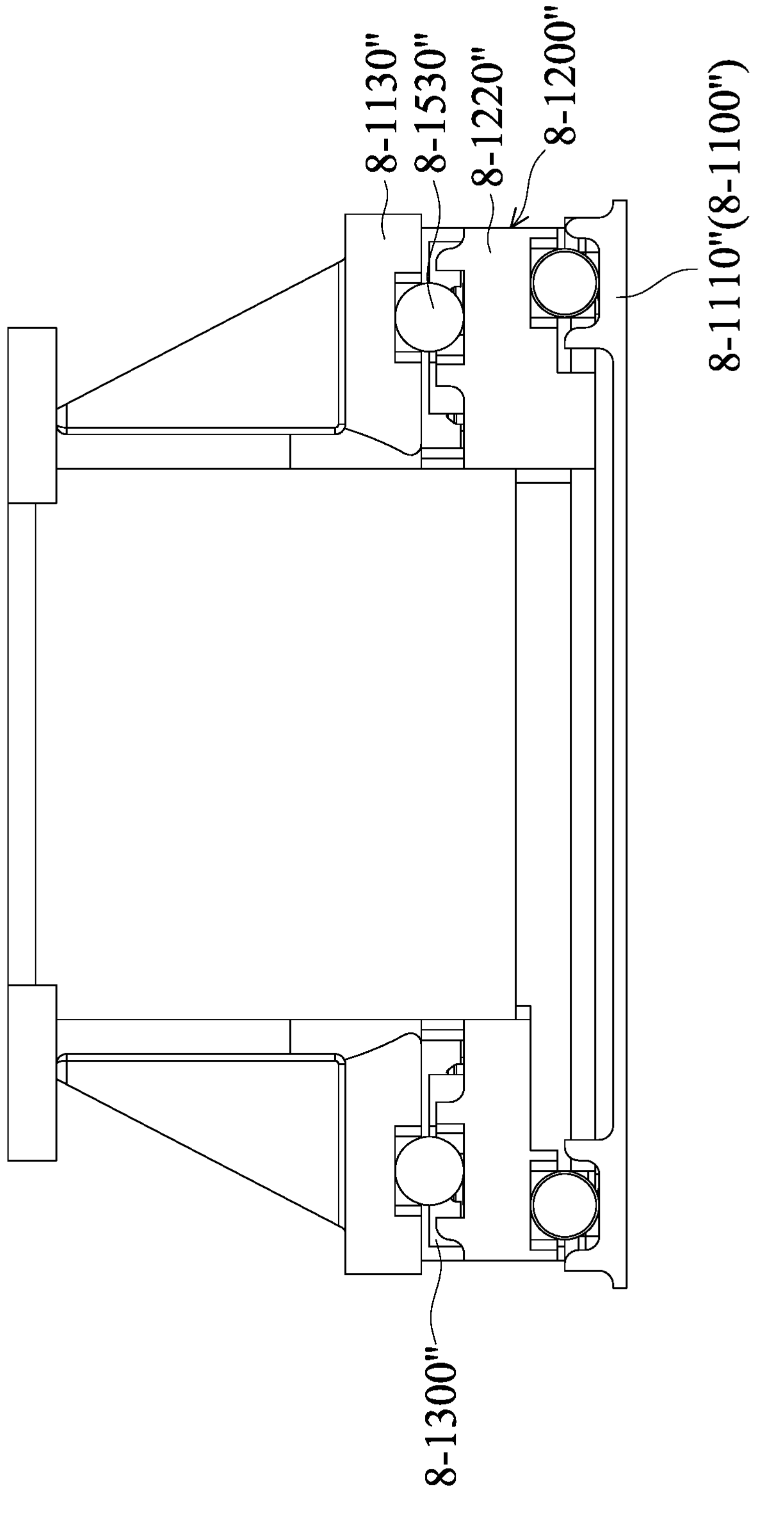
FIG. 94 is a cross-sectional view of the optical module taken along the line 8-A-8-A' in FIG. 93.

In addition, an intermediate element 8-1530" may be used to replace the first elastic element 8-1510 and the second elastic element 8-1520 to form the supporting assembly 8-1500". As shown in FIG. 93 and FIG. 94, FIG. 93 is a perspective view of a partial structure of an optical module 8-1000" according to another embodiment of the disclosure, and FIG. 94 is a cross-sectional view of the optical module 8-1000" taken along the line 8-A-8-A' in FIG. 93. The supporting assembly 8-1500" includes eight intermediate elements 8-1530", and each intermediate element 8-1530" has a spherical structure. In this embodiment, the four corners of the upper and lower sides of the holder 8-1220" are provided with recesses, and the frame 8-1130" is provided with four recesses corresponding to the recesses on the upper side of the holder 8-1220", and the base 8-1110" is provided with four recesses corresponding to the recesses on the lower side of the holder 8-1220". These recesses respectively accommodate a part of the eight intermediate elements 8-1530". When the driving mechanism 8-1300" drives the movable portion 8-1200" to move, the movable portion 8-1200" may move relative to the fixed portion 8-1100" by the intermediate element 8-1530".

Figure 95:
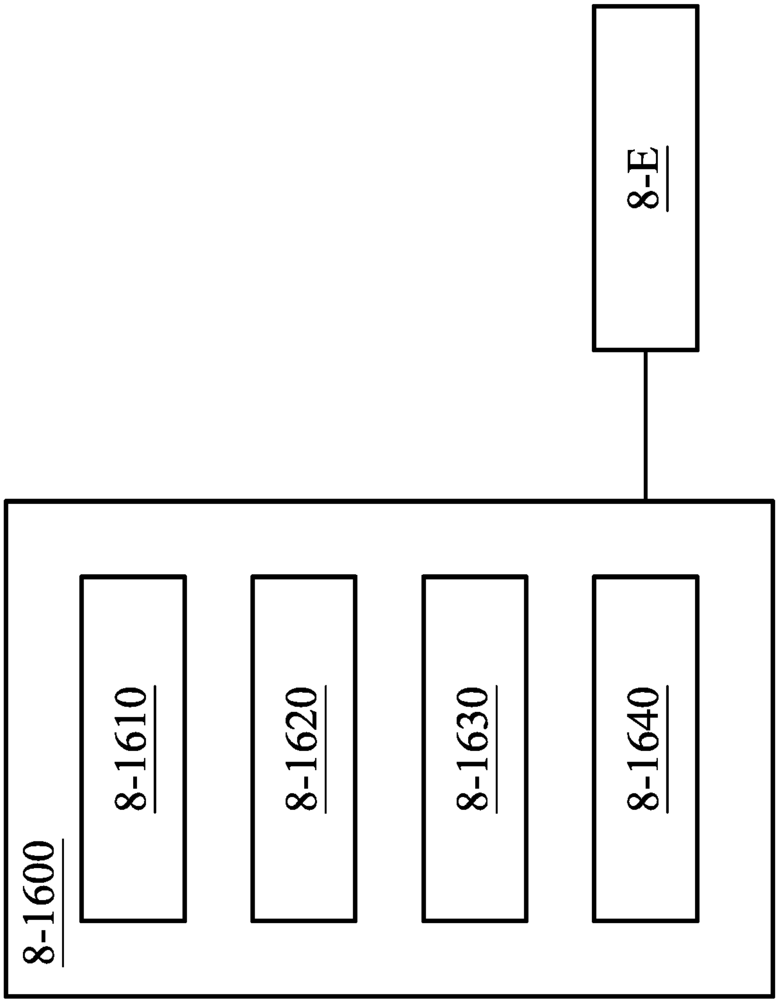
FIG. 95 is a block diagram of the circuit assembly of the optical module according to an embodiment of the disclosure.

Refer to FIG. 87 and FIG. 95. FIG. 95 is a block diagram of the circuit assembly 8-1600 in the optical module 8-1000 according to an embodiment of the disclosure. The circuit assembly 8-1600 is electrically connected to a circuit 8-E located outside the optical module 8-1000. The circuit assembly 8-1600 includes a first circuit 8-1610, a second circuit 8-1620, and a third circuit 8-1630, and an external circuit 8-1640. The first circuit 8-1610 is fixedly disposed on the pedestal 8-1210, and is integrally formed with the pedestal 8-1210. The second circuit 8-1620 is fixedly disposed on the holder 8-1220, and is at least partially embedded in the holder 8-1220. The third circuit 8-1630 is fixedly disposed on the frame 8-1130 and is at least partially embedded in the frame 8-1130. The third circuit 8-1630 has a first connecting portion 8-1631, which is made of metal and is at least partially embedded in frame 8-1130, and may connect to the first end portion 8-1511 of the first elastic element 8-1510. The external circuit 8-1640 is connected to the circuit 8-E outside the optical module 8-1000 and is connected to the first circuit 8-1610. The external circuit 8-1640 is flexible, for example, it can be a flexible printed circuit board (FPC). The external circuit 8-1640 has a plurality of holes 8-H, which makes the whole body of the external circuit 8-1640 easier to be bent and not easier to be broken, and also makes the movable portion 8-1200 easier to move.

In addition, in the embodiment of FIG. 93, at least one of the first circuit 8-1610", the second circuit 8-1620", and the third circuit 8-1630" (not shown for embedding in the frame 8-1130') has a magnetically permeable material. In more detail, the second circuit 8-1620" has a magnetically permeable material and corresponds to the driving mechanism 8-1300", so that the movable portion 8-1200" may move close to the intermediate element 8-1530" by the attraction force, thus moving more stably relative to the fixed portion 8-1100".

Figure 96:
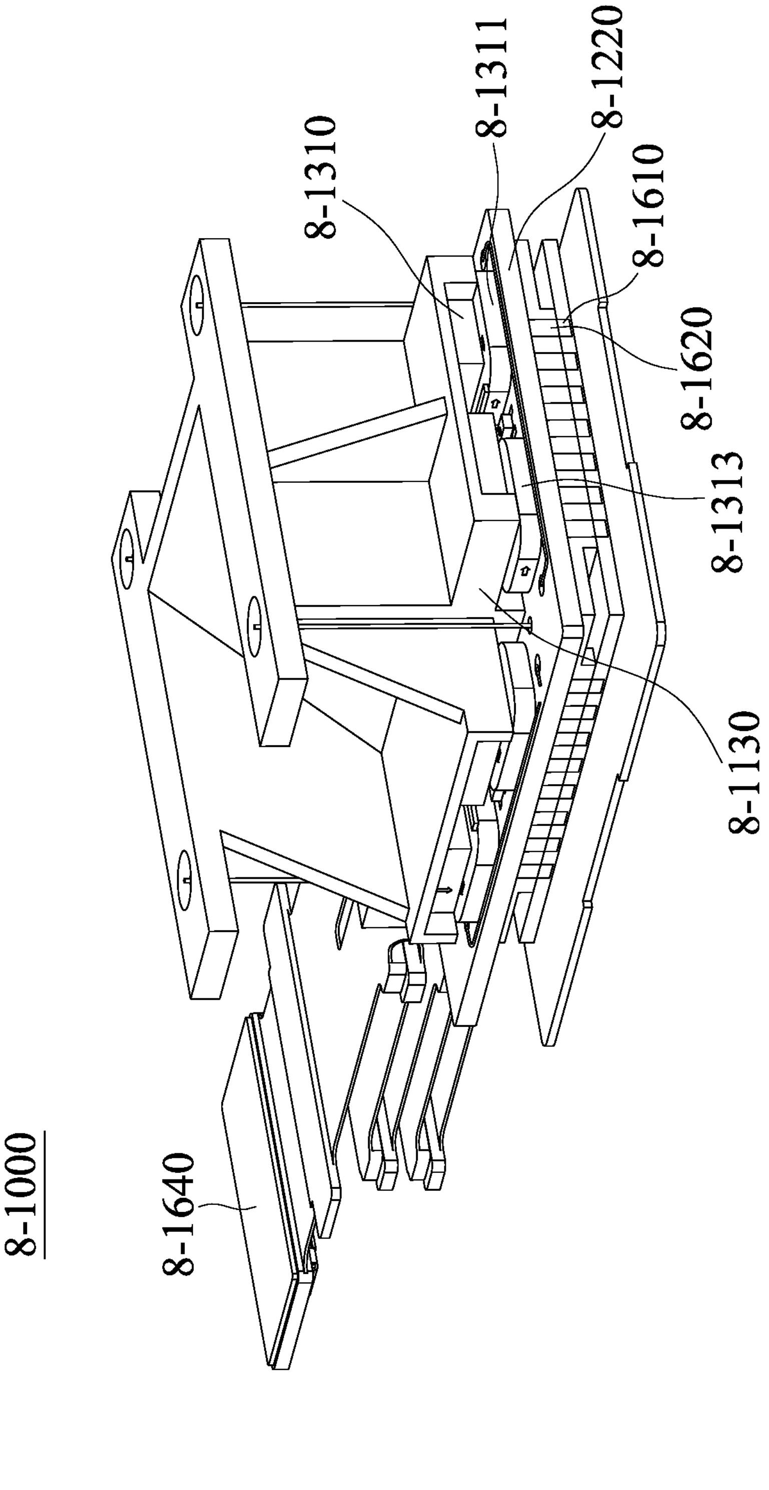
FIG. 96 is a schematic diagram of a partial structure of an optical module according to an embodiment of the disclosure.
Figure 97:
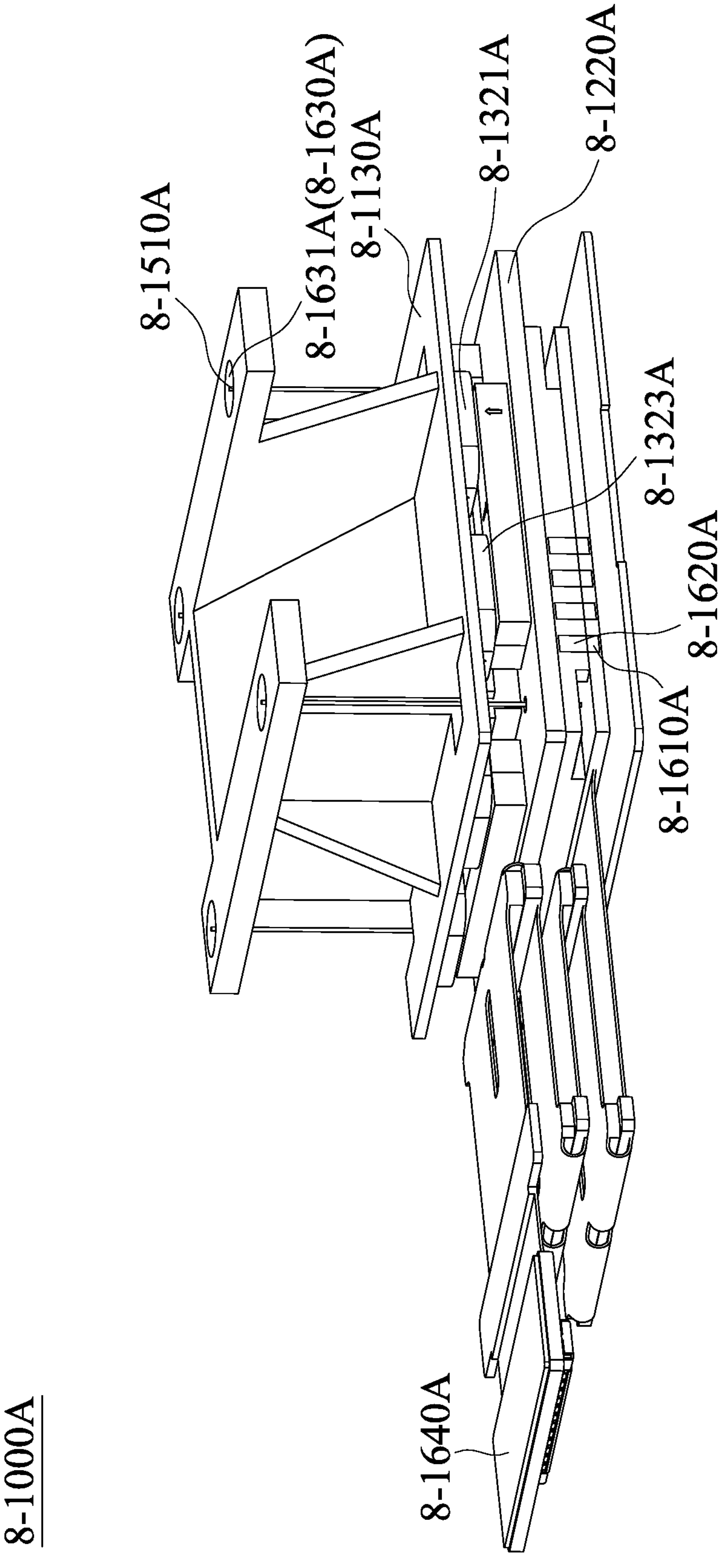
FIG. 97 is a schematic diagram of a partial structure of another optical module according to an embodiment of the disclosure.
Figure 98:
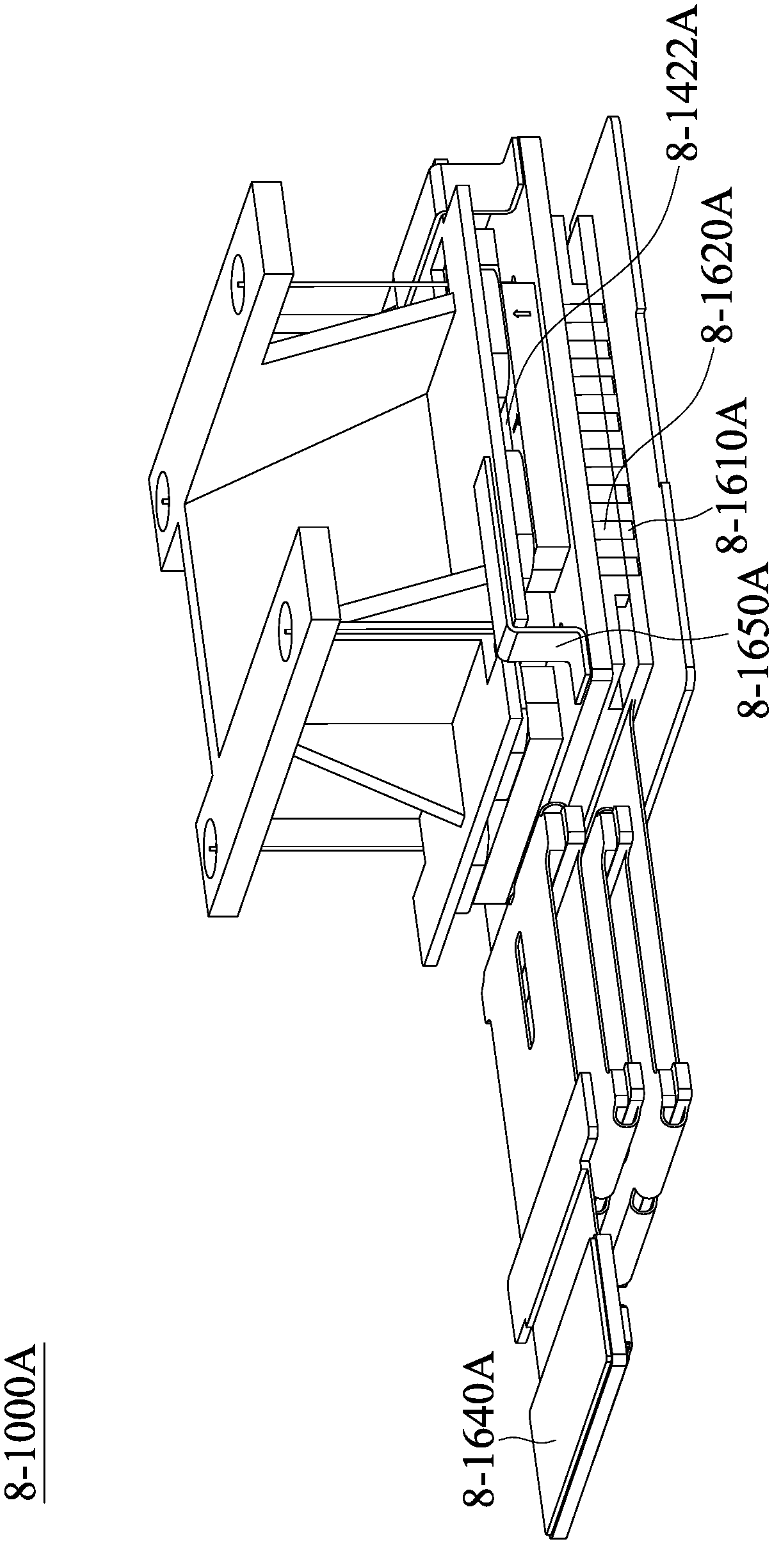
FIG. 98 is a schematic diagram of a partial structure of another optical module according to an embodiment of the disclosure.
Figure 99:
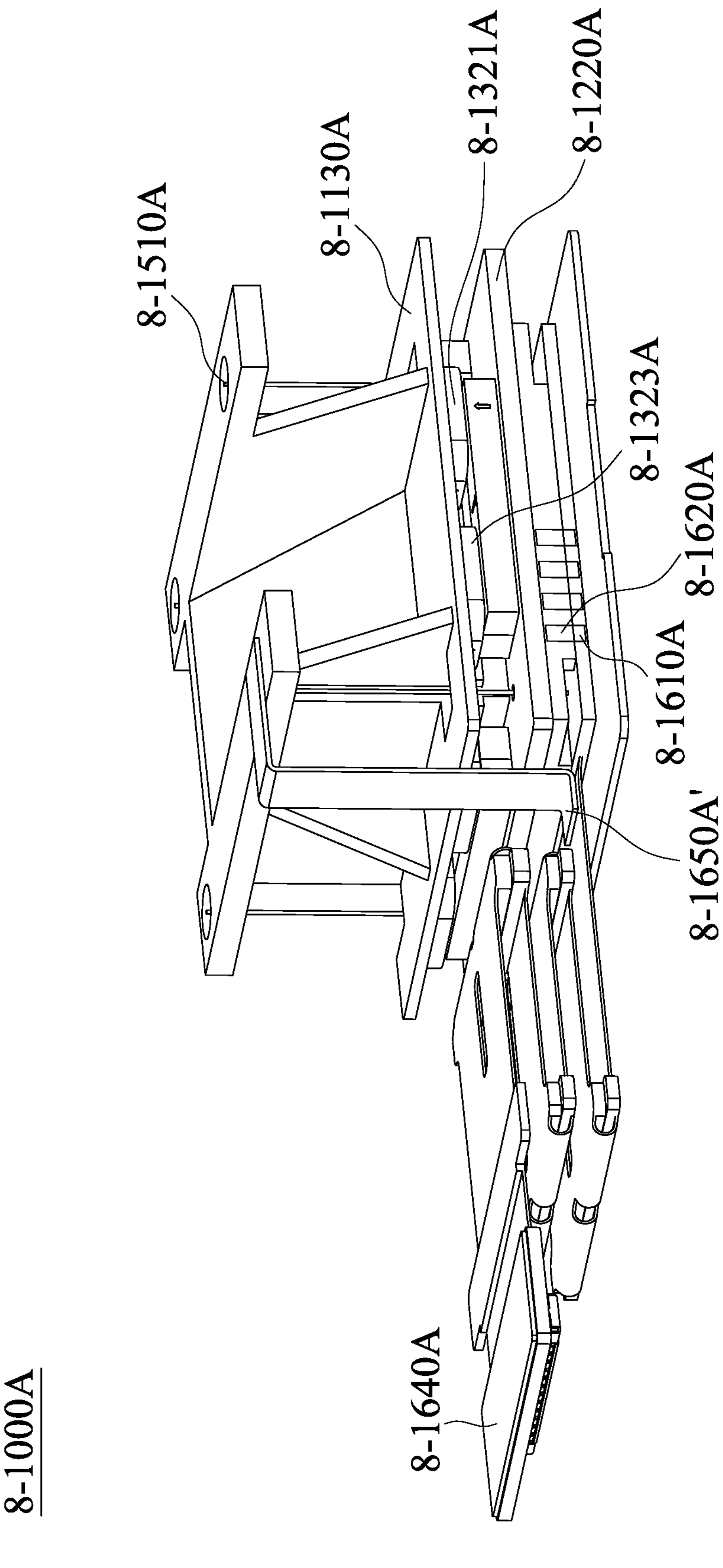
FIG. 99 is a schematic diagram of a partial structure of another optical module according to an embodiment of the disclosure.

Next, refer to FIG. 96 to FIG. 99, several different electrical connections will be described. FIG. 96 is a schematic diagram of a partial structure of an optical module 8-1000 according to an embodiment of the disclosure. FIG. 97 to FIG. 99 are schematic diagrams of a partial structure of an optical module 8-1000A according to an embodiment of the disclosure.

In the embodiment of FIG. 96, the coils are disposed on the holder 8-1220, and the electrical connection is illustrated by taking the first driving assembly 8-1310 as an example, the second driving assembly 8-1320 and the third driving assembly 8-1330 may be electrically connected in the same way. The first driving assembly 8-1310 is electrically connected to the second circuit 8-1620, and is electrically connected to the first circuit 8-1610 via the second circuit 8-1620. In more detail, the first coil 8-1311 and the second coil 8-1313 are connected to the contacts of the second circuit 8-1620 exposed on the surface of the holder 8-1220 by welding, etc., and the partial contacts of the second circuit 8-1620 and the partial contacts of the first circuit 8-1610 are arranged in cooperation. Therefore, when the holder 8-1220 is assembled to the pedestal 8-1210, the second circuit 8-1620 and the first circuit 8-1610 are electrically connected at the same time. Thus, the first driving assembly 8-1310 is electrically connected to the external circuit 8-1640 via the second circuit 8-1620 and the first circuit 8-1610 in sequence, and then electrically connected to the circuit 8-E outside the optical module 8-1000 via the external circuit 8-1640. The second driving assembly 8-1320 and the third driving assembly 8-1330 are also electrically connected in a similar way.

In the embodiment shown in FIG. 97, the coils of the optical module 8-1000A are disposed on the frame 8-1130A, and the electrical connection is illustrated by taking the second driving assembly 8-1320A as an example. The first driving assembly 8-1310A and the third driving assembly 8-1330A may be electrically connected in the same way. The third coil 8-1321A and the fourth coil 8-1323A of the second driving assembly 8-1320A are welded to the contacts (not shown) of the third circuit 8-1630A on the frame 8-1130A, and are electrically connected to the third circuit 8-1630A. The first connecting portion 8-1631A of the third circuit 8-1630A is electrically connected to the first end portion 8-1511A of the first elastic element 8-1510A, and the first elastic element 8-1510A is electrically connected to the second elastic element. The second elastic element is connected to the contacts (not shown) of the second circuit 8-1620A disposed on the holder 8-1220A. Then, as in the embodiment of FIG. 96, the partial contacts of the second circuit 8-1620 and the partial contacts of the first circuit 8-1610 are arranged in cooperation, so that the second circuit 8-1620A is electrically connected to the first circuit 8-1610A, and electrically connected the circuit 8-E outside the optical module 8-1000A via the external circuit 8-1640A. Therefore, the second driving assembly 8-1320A is electrically connected to the circuit 8-E outside the optical module 8-1000A passes via the third circuit 8-1630A, the first elastic element 8-1510A, the second elastic element A, the second circuit 8-1620A, the first circuit 8-1610A, and the external circuit 8-1640A in sequence.

In the embodiment of FIG. 98, an intermediate circuit 8-1650A may also be provided on the frame 8-1130A, and the intermediate circuit 8-1650A may be a flexible printed circuit board with flexibility. The second sensing element 8-1422A may be electrically connected to the second circuit 8-1620A via the intermediate circuit 8-1650A, and then electrically connected to the circuit 8-E outside the optical module 8-1000A via the first circuit 8-1610A and the external circuit 8-1640A in sequence.

In the embodiment of FIG. 99, the second driving assembly 8-1320A may also be directly connected to the external circuit 8-1640A via the first elastic element 8-1510A to be electrically connected to the circuit 8-E outside the optical module 8-1000A. In other words, another intermediate circuit 8-1650A' may be provided on the top of the frame 8-1130A. The intermediate circuit 8-1650A' may be a flexible printed circuit board with flexibility, which is directly connected to the first elastic element 8-1510A and the external circuit 8-1640A. Therefore, the second driving assembly 8-1320A is connected to the circuit 8-E outside the optical module 8-1000A via the third circuit 8-1630A, the first elastic element 8-1510A, the intermediate circuit 8-1650A', and the external circuit 8-1640A in sequence.

However, the electrical connection is not limited to the above-mentioned embodiments, and the configuration of the optical module 8-1000 may be changed in combination with the electrical connection described above as required, so that the three driving assemblies may be electrically connected in different ways. For example, in an optical module 8-1000B (not shown), the first driving assembly 8-1310B is connected to the circuit 8-E outside the optical module 8-1000B via the second circuit 8-1620B, the first circuit 8-1610B, and the external circuit 8-1640B in sequence. The second driving assembly 8-1320B is connected to the circuit 8-E outside the optical module 8-1000B via the third circuit 8-1630B, the first elastic element 8-1510B, the second elastic element B, the second circuit 8-1620B, the first circuit 8-1610B, and the external circuit 8-1640B in sequence. The third driving assembly 8-1330B is connected to the circuit 8-E outside the optical module 8-1000B via the third circuit 8-1630B, the first elastic element 8-1510B, the intermediate circuit 8-1650B, and the external circuit 8-1640B in sequence.

In addition, in the embodiment in which the intermediate element constitutes the supporting assembly, if the coils are disposed on the holder 8-1220", as shown in FIG. 93, the electrical connection is similar to the embodiment in FIG. 96. The first driving assembly 8-1310" is electrically connected to the circuit 8-E outside the optical module 8-1000" via the second circuit 8-1620" and the first circuit 8-1610" and the external circuit 8-1640" in sequence.

If the coils is disposed on the frame 8-1130" (not shown), the electrical connection is similar to the embodiment in FIG. 98 and/or FIG. 99. The first driving assembly 8-1310" is electrically connected the intermediate circuit 8-1650" via the third circuit 8-1630", and the intermediate circuit 8-1650" may be electrically connected to one of the first circuit 8-1610" and the external circuit 8-1640", and then, electrically connected the circuit 8-E outside the optical module 8-1000" via the external circuit 8-1640". In this embodiment, the first driving assembly 8-1310" is electrically connected to the circuit 8-E outside the optical module 8-1000" via the third circuit 8-1630", the intermediate circuit 8-1650" and the external circuit 8-1640" in sequence.

As described above, an embodiment of the present invention provides an optical system includes an optical module with a main axis. The optical module includes a fixed portion, a movable portion, a driving mechanism, and a supporting assembly. The movable portion is connected with an optical element and is moved relative to the fixed portion. The driving mechanism drives the movable portion to move relative to the fixed portion. The supporting assembly is connected to the movable portion and the fixed portion. When viewed along a direction that is parallel to the main axis, the fixed portion is a polygonal structure with a first side, a second side, a third side, and a fourth side, the first side is parallel to the third side, the second side is parallel to the fourth side, the first side is not parallel to the second side. The special position and size relationship of each element disclosed in the present invention may enable the optical element driving mechanism to achieve a specific direction of thinning and overall miniaturization. In addition, by applying with different optical modules, the optical element driving mechanism may further improve the optical quality (such as shooting quality or depth sensing accuracy, etc.).

The Ninth Group of Embodiments

Figure 100:
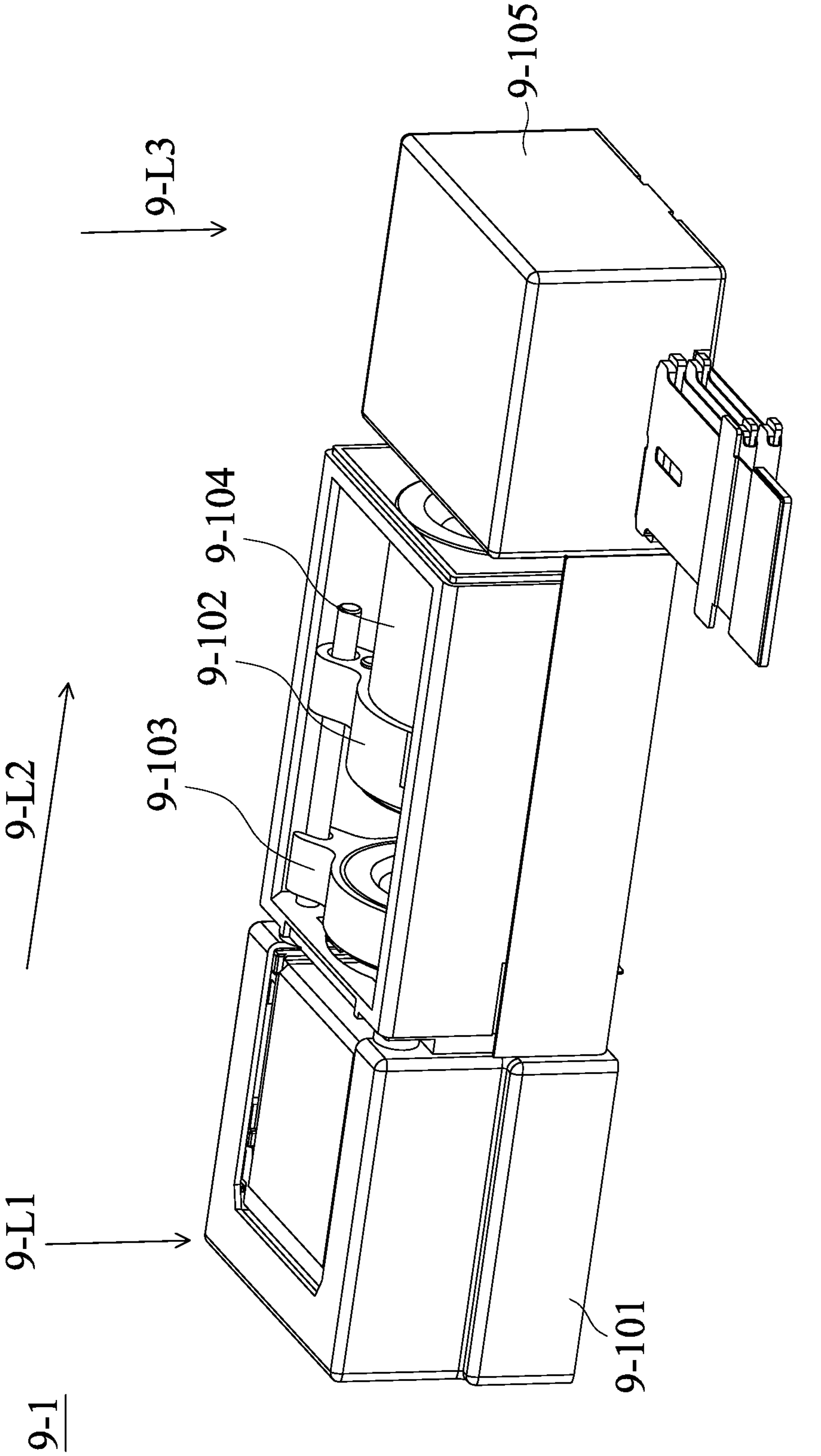
FIG. 100 is a perspective view of the optical system.
Figure 101:
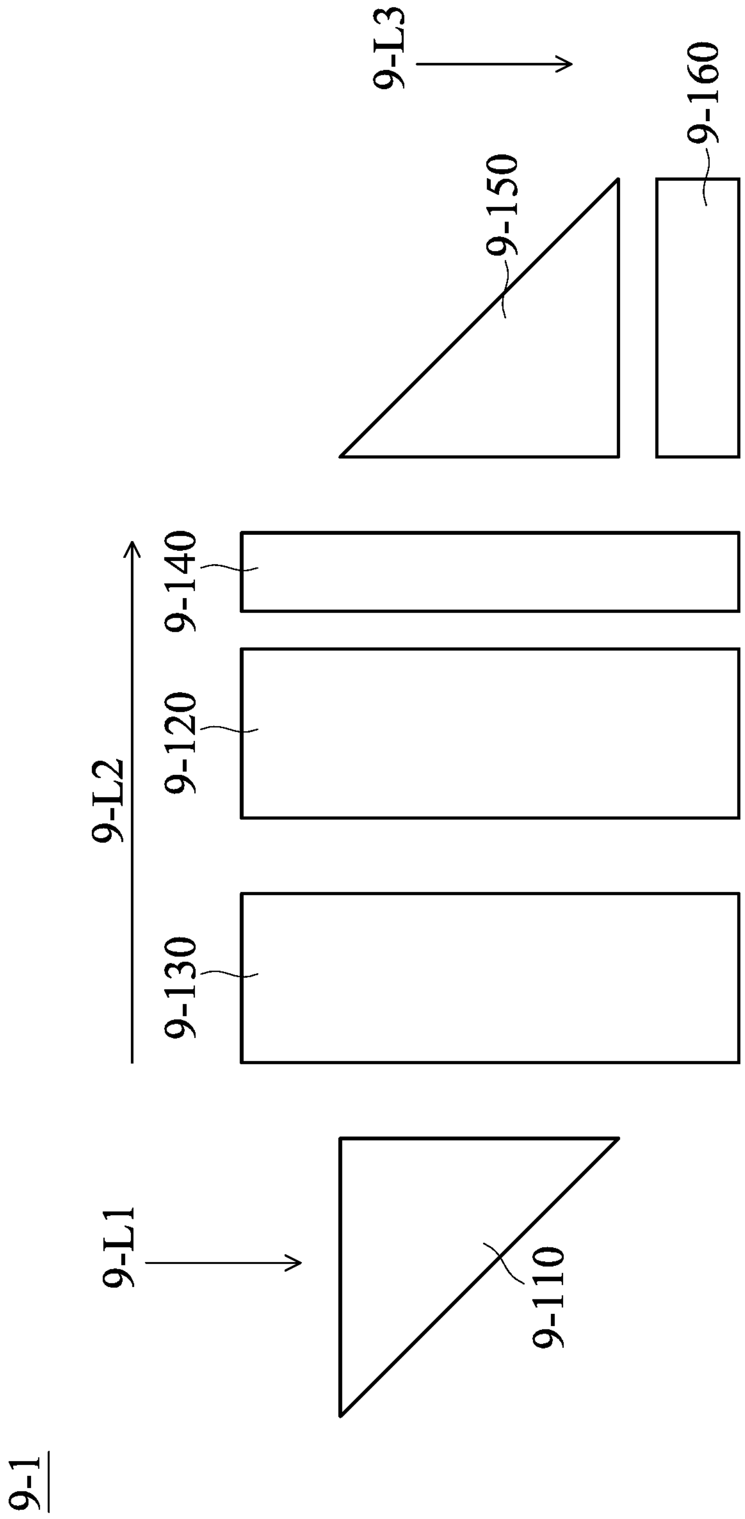
FIG. 101 is a schematic diagram of optical elements in the optical system.

According to some embodiments, an optical system 9-1 is provided. FIG. 100 is a perspective view of the optical system 9-1. FIG. 101 is a schematic diagram of the optical elements in the optical system 9-1. For simplicity, only the optical elements are shown in FIG. 101. The optical system 9-1 may be a periscope optical system. The optical system 9-1 includes a first optical module 9-101, a second optical module 9-102, a third optical module 9-103, a fourth optical module 9-104, and a fifth optical module 9-105.

A light above the first optical module 9-101 enters the first optical module 9-101 along a first incident direction 9-L1, and is adjusted to pass through the third optical module 9-103, the second optical module 9-102, and the fourth optical module 9-104 sequentially along a second incident direction 9-L2 by the first optical module 9-101, and the optical path of the light is adjusted to be along a third incident direction 9-L3 in the fifth optical module 9-105, and imaging in the fifth optical module 9-105.

The first optical module 9-101 and the fifth optical module 9-105 may include a first optical element 9-110 and a fifth optical element 9-150, respectively. The first optical element 9-110 and the fifth optical element 9-150 may be a prism, a mirror, a refractive prism, or a beam splitter, etc. By rotating the first optical element 9-110 and the fifth optical element 9-150, the optical path of the light may be changed. The second optical module 9-102, the third optical module 9-103, and the fourth optical module 9-104 may respectively include a second optical element 9-120, a third optical element 9-130, and a fourth optical element 9-140. The second optical module 9-102, the third optical module 9-103, and the fourth optical module 9-104 may drive the second optical element 9-120, the third optical element 9-130, and the fourth optical element 9-140 respectively. The second optical element 9-120, the third optical element 9-130, and the fourth optical element 9-140 may be one or more lenses, optical lenses, etc., and are made of materials such as glass and resin. The fifth optical module 9-105 may also include a sixth optical element 9-160. The sixth optical element 9-160 may be an image sensor (or called a photo-sensitive element), etc., for example, a charge-coupled Device (CCD).

In some embodiments, an optical element corresponding to a focal length of the first optical element 9-110 that is not zero (not shown, for example, one or more lens, optical lens, etc.) may be provided above the first optical element 9-110. In other words, the optical element whose focal length is not zero may be fixedly connected to the first optical element 9-110, and arranged along the first incident direction 9-L1 with the first optical element 9-110, and the shooting effect of the optical system 9-1 may be enhanced by increasing the quantity of the optical element.

In some embodiments, the first optical module 9-101 and the fifth optical module 9-105 may perform yawing and pitching, respectively. In some embodiments, the first optical module 9-101 may also perform pitching, and the fifth optical module 9-105 may perform yawing. In some embodiments, the first optical module 9-101 and the fifth optical module 9-105 may both perform pitching. In some embodiments, the first optical module 9-101 and the fifth optical module 9-105 may both perform yawing. In some embodiments, the second optical module 9-102 and the third optical module 9-103 may achieve the functions of zooming and auto focusing (AF), respectively. In some embodiments, the second optical module 9-102 may also perform auto focusing, and the third optical module 9-103 may perform zooming. In other words, terms such as yawing, pitching, zooming, and auto focusing, etc., do not constitute limitations.

In some embodiments, the fourth optical module 9-104 may achieve the function of Optical Image Stabilization (OIS). In some embodiments, the position of the fourth optical module 9-104 may be changed, for example, the fourth optical module 9-104 is disposed between the third optical module 9-103 and the fifth optical module 9-105. In some embodiments, the fourth optical module 9-104 may be integrated into the second optical module 9-102 or the third optical module 9-103, and the functions of auto focusing and optical image stabilization may be simultaneously achieved through a single second optical module 9-102 or a single third optical module 103. In some embodiments, the fourth optical module 9-104 may be omitted.

Figure 102:
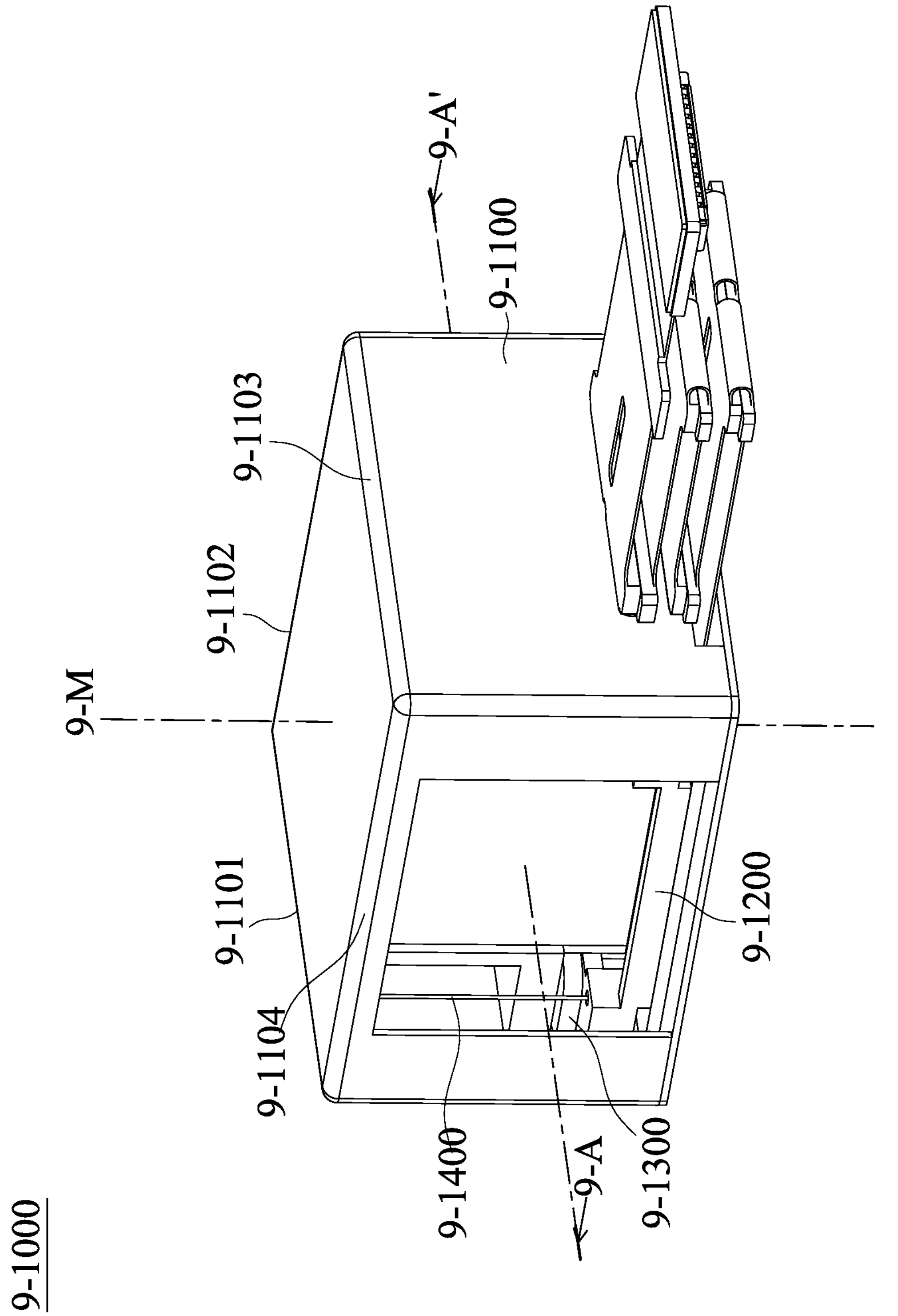
Figure 103:
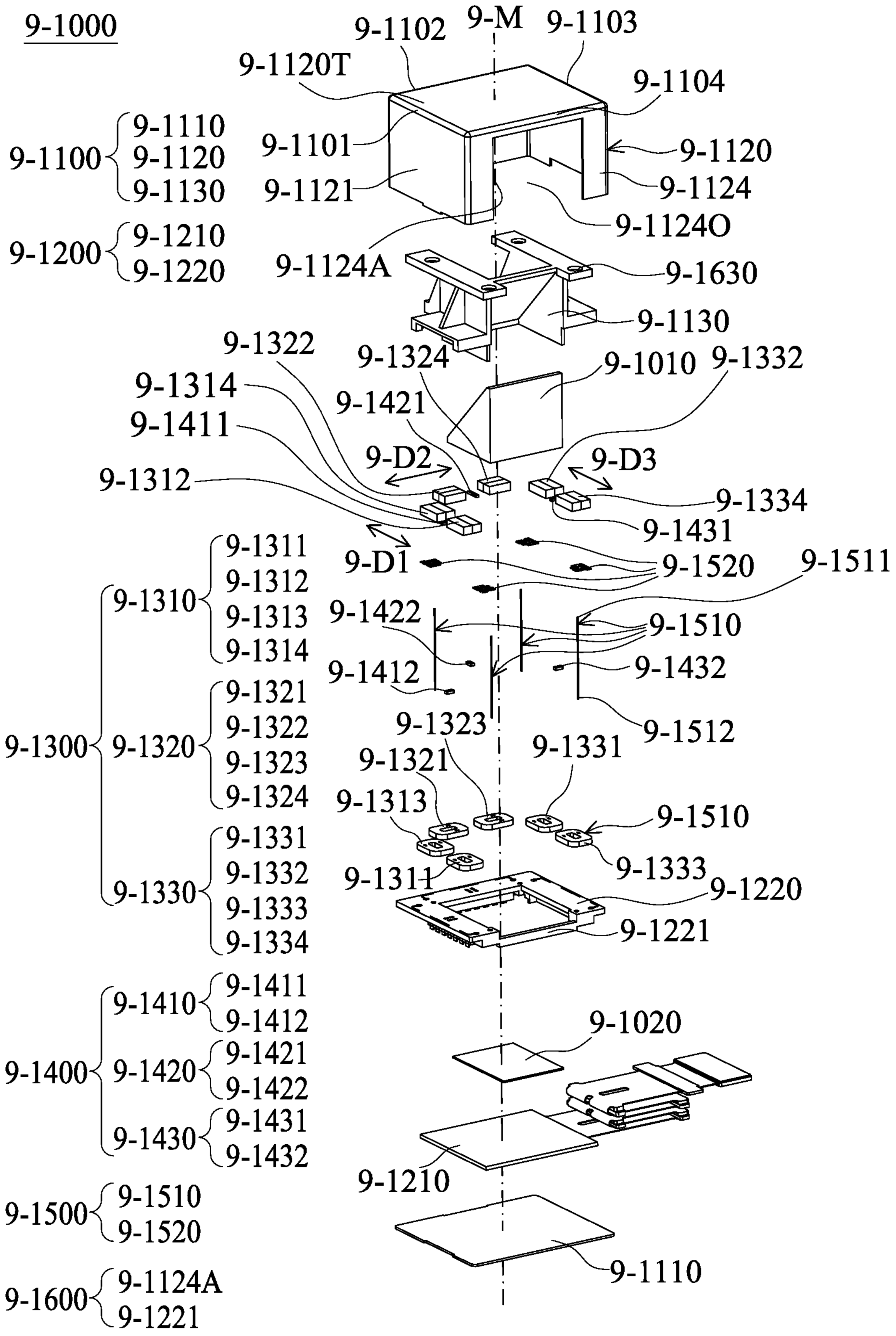
Figure 104:
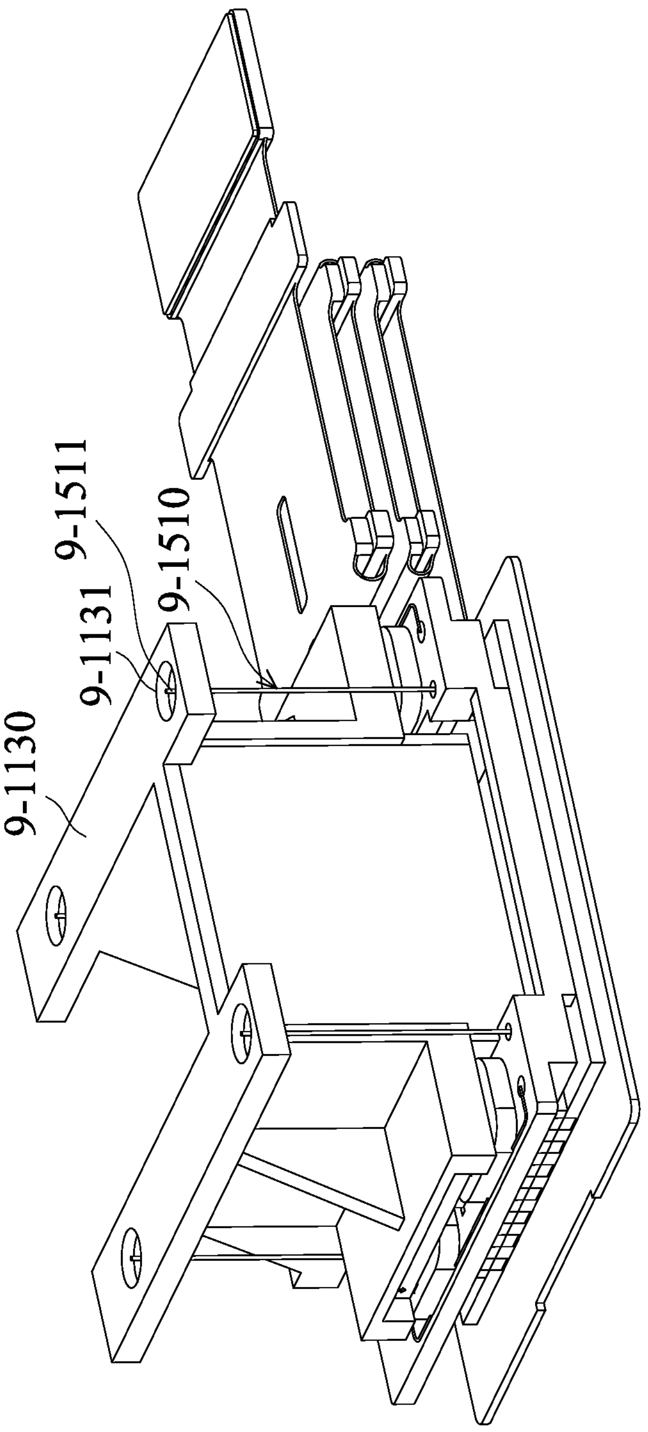
Figure 105:
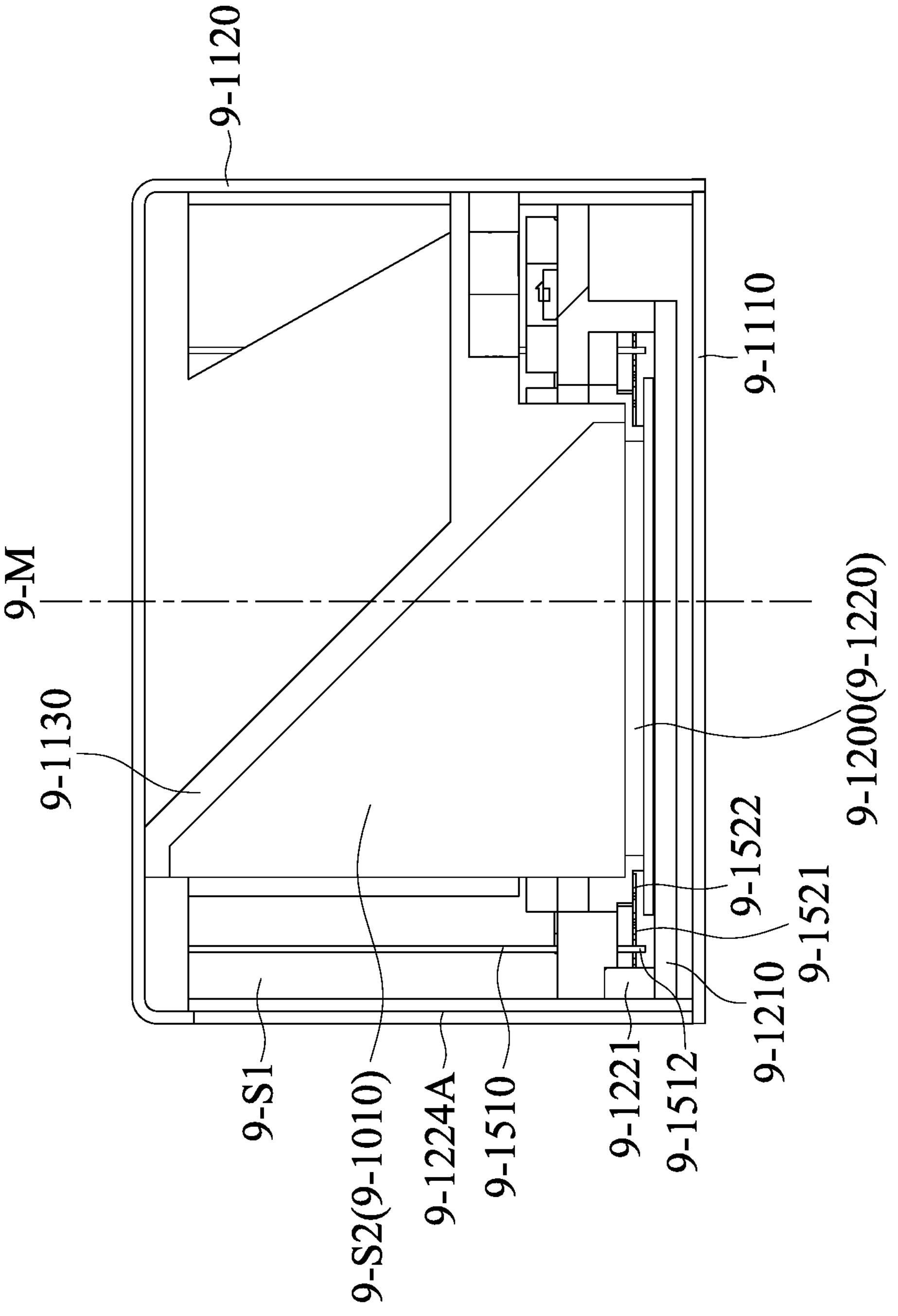

Refer to FIG. 102 to FIG. 105. FIG. 102 is a perspective view of an optical module 9-1000 according to an embodiment of the present disclosure. FIG. 103 is an exploded view of the optical module 9-1000 according to an embodiment of the disclosure. FIG. 104 is a perspective view a partial structure of the optical module 9-1000 according to an embodiment of the disclosure. FIG. 105 is a cross-sectional view of the optical module 9-1000 taken along the line A-A' in FIG. 102. In the following embodiments, the optical module 9-1000 has a similar structure to the fifth optical module 9-105 described above. The optical module 9-1000 has a main axis 9-M, and includes an optical path adjustment element 9-1010, an optical element 9-1020, a fixed portion 9-1100, a movable portion 9-1200, a driving mechanism 9-1300, a position sensing module 9-1400, a supporting assembly 9-1500, and a stopping assembly 9-1600.

The optical path adjustment element 9-1010 has a structure similar to the fifth optical element 9-150 mentioned above. In some embodiments, the optical path adjustment element 9-1010 is a right-angle prism, but is not limited to this. The optical element 9-1020 has a structure similar to the sixth optical element 9-160 mentioned above. In some embodiments, the optical element 9-1020 is an image sensor, but is not limited to this.

When viewed along a direction that is parallel to the main axis 9-M, the fixed portion 9-1100 is a polygonal structure with a first side 9-1101, a second side 9-1102, a third side 9-1103 and a fourth side 9-1104. The first side 9-1101 is parallel to the third side 9-1103, the second side 9-1102 is parallel to the fourth side 9-1104, and the first side 9-1101 and the second side 9-1102 are not parallel.

As shown in FIG. 103 and FIG. 104, the fixed portion 9-1100 includes a base 9-1110, an outer frame 9-1120, and a frame 9-1130. The base 9-1110 has a plate-like structure and is perpendicular to the main axis 9-M. The outer frame 9-1120 and the base 9-1110 are arranged along the main axis 9-M. The outer frame 9-1120 includes a top wall 9-1120T, a first side wall 9-1121, a second side wall 9-1122, a third side wall 9-1123, and a fourth side wall 9-1124. The top wall 9-1110T has a plate-like structure and is not parallel to the main axis 9-M. In more detail, the top wall 1121T is parallel to the base 9-1110. The first side wall 9-1121 extends from an edge of the top wall 9-1120T and is not parallel to the top wall 9-1120T. When viewed along the direction that is parallel to the main axis 9-M, the first side wall 9-1121 is disposed on the first side 9-1101. The second side wall 9-1122 extends from an edge of the top wall 9-1120T and is not parallel to the top wall 9-1120T. When viewed along a direction that is parallel to the main axis 9-M, the second side wall 9-1122 is disposed on the second side 9-1102. The third side wall 9-1123 extends from an edge of the top wall 9-1120T and is not parallel to the top wall 9-1120T. When viewed along the direction that is parallel to the main axis 9-M, the third side wall 9-1123 is disposed on the third side 9-1103. The fourth side wall 9-1124 extends from an edge of the top wall 9-1120T and is not parallel to the top wall 9-1120T. It has an opening 9-11240 corresponding to the incident light 9-L. The opening 9-11240 is disposed between the outer frame 9-1120 and the base 9-1110. When viewed along the direction that is parallel to the main axis 9-M, the fourth side wall 9-1124 is disposed on the fourth side 9-1104.

As shown in FIG. 105, the base 9-1110 and the outer frame 9-1120 form a first accommodating space 9-S1. The first accommodating space 9-S1 accommodates the movable portion 9-1200 and the frame 9-1130. There is a second accommodating space 9-S2 between the frame 9-1130 and the movable portion 9-1200 for accommodating the optical path adjustment element 9-1010. Although in this embodiment, the frame 9-1130 is connected and fixed to the outer frame 9-1120, and the optical path adjustment element 9-1010 is connected and fixed to the frame 9-1130, it is not limited to this. In some embodiments, the frame 9-1130 may be included in the movable portion 9-1200, and the frame 9-1130 and the optical path adjustment element 9-1010 may move relative to the fixed portion 9-1100.

As shown in FIG. 103 and FIG. 105, the movable portion 9-1200 is connected to the optical element 9-1020 and may move relative to the fixed portion 9-1100. The movable portion 9-1200 includes a pedestal 9-1210 and a holder 9-1220. The pedestal 9-1210 is connected to the optical element 9-1020 and has a plate-like structure. The holder 9-1220 is fixedly disposed on the pedestal 9-1210, and has a shielding portion 9-1221, which is arranged near the fourth side 9-1104. In more detail, when viewed along the direction that is parallel to the main axis 9-M, the light enters the optical module 9-1000 from the fourth side 9-1104, and enters the optical element 9-1020 through the optical path adjustment element 9-1010. The optical path adjustment element 9-1010 is configured to adjust the light traveling in the direction that is parallel to the first side 9-1101 to travel in the direction that is parallel to the main axis 9-M. The shielding portion 9-1221 is a protruding structure which protrudes along the direction that is parallel to the main axis 9-M. When viewed along the direction that is parallel to the first side 9-1101, the shielding portion 9-1221 and the optical element 9-1020 at least partially overlap, so a stray light may be shielded, and the stray light may not enter the optical element 9-1020.

The shielding portion 9-1221 may also be used as a stopping portion 9-1221. An inner side wall located on the fourth side 9-1104 and close to the stopping portion 9-1221 may be used as a stopping surface 9-1124A, so the stopping portion 9-1221 and the stopping surface 9-1124A may form a stopping assembly 9-1600 configured to restrict the movable portion 9-1200 to move within a moving range relative to the fixed portion 9-1100. In more detail, when the stopping portion 9-1221 touches the stopping surface 9-1124A, the movable portion 9-1200 stops moving, so the movable portion 9-1200 moving along a direction that is not parallel to the main axis 9-M may be restricted within a moving range relative to the fixed portion 9-1100.

The supporting assembly 9-1500 is connected to the movable portion 9-1200 and the fixed portion 9-1100. The supporting assembly 9-1500 includes a first elastic element 9-1510 and a second elastic element 9-1520. The first elastic element 9-1510 is a long strip structure extending along the direction that is parallel to the main axis 9-M, and has a first end portion 9-1511 and a second end portion 9-1512. The first end portion 9-1511 is fixed to the frame 9-1130, and the second end portion 9-1512 is connected to the second elastic element 9-1520. The second elastic element 9-1520 is a plate-like structure, which is not parallel to the first elastic element 9-1510, and has an impact absorbing portion 9-1521 and a fixed end portion 9-1522. The impact absorbing portion 9-1521 is connected to the second end portion 9-1512. The impact absorbing portion 9-1521 absorbs the impact of the first elastic element 9-1510. The fixed end portion 9-1522 is fixed to the holder 9-1220. Therefore, the second elastic element 9-1520 is contacted to the holder 9-1220, and does not directly contact the pedestal 9-1210. When viewed along the direction that is perpendicular to the main axis 9-M, the second elastic element 9-1520 is located between the pedestal 9-1210 and the holder 9-1220. When viewed along the direction that is parallel to the main axis 9-M, the first elastic element 9-1510, the pedestal 9-1210 and the holder 9-1220 at least partially overlap.

The driving mechanism 9-1300 drives the movable portion 9-1200 to move relative to the fixed portion 9-1100. The driving mechanism 9-1300 includes a first driving assembly 9-1310, a second driving assembly 9-1320, and a third driving assembly 9-1330. The first driving assembly 9-1310 is disposed on the first side 9-1101, and includes a first coil 9-1311, a first magnetic element 9-1312, a second coil 9-1313, and a second magnetic element 9-1314. The first magnetic element 9-1312 corresponds to the first coil 9-1311, and the first coil 9-1311 and the first magnetic element 9-1312 are arranged along a direction that is parallel to the main axis 9-M. The second coil 9-1313 and the first coil 9-1311 are arranged along a first direction 9-D1, and the first direction 9-D1 is parallel to the first side 9-1101. The second magnetic element 9-1314 corresponds to the second coil 9-1313, and the second magnetic element 9-1314 and the first magnetic element 9-1312 are arranged along the first direction 9-D1. The second driving assembly 9-1320 is disposed on the second side 9-1102, and includes a third coil 9-1321, a third magnetic element 9-1322, a fourth coil 9-1323, and a fourth magnetic element 9-1324. The third magnetic element 9-1322 corresponds to the third coil 9-1321, and the third coil 9-1321 and the third magnetic element 9-1322 are arranged along a direction that is parallel to the main axis 9-M. The fourth coil 9-1323 and the third coil 9-1321 are arranged along the second direction 9-D2, and the second direction 9-D2 is parallel to the second side 9-1102. The fourth magnetic element 9-1324 corresponds to the fourth coil 9-1323. The third driving assembly 9-1330 is disposed on the third side 9-1103, and includes a fifth coil 9-1331, a fifth magnetic element 9-1332, a sixth coil 9-1333, and a sixth magnetic element 9-1334. The fifth magnetic element 9-1332 corresponds to the fifth coil 9-1331, and the fifth coil 9-1331 and the fifth magnetic element 9-1332 are arranged along the direction that is parallel to the main axis 9-M. The sixth coil 9-1333 and the fifth coil 9-1331 is arranged along a third direction 9-D3, and the third direction 9-D3 is parallel to the third side 9-1103. The sixth magnetic element 9-1334 corresponds to the sixth coil 9-1333. A winding axis of the second coil 9-1313 is parallel to a winding axis of the first coil 9-1311. The winding axis of the first coil 9-1311 is parallel to the main axis 9-M. A winding axis of the fourth coil 9-1323 is parallel to a winding axis of the third coil 9-1321. The winding axis of the fourth coil 9-1323 is parallel to the main axis 9-M. A winding axis of the sixth coil 9-1333 is parallel to a winding axis of the fifth coils 9-1331. The winding axis of the sixth coil 9-1333 is parallel to the main axis 9-M. When viewed along the direction that is parallel to the main axis 9-M, the driving mechanism 9-1300 is not disposed on the fourth side 9-1104. The driving assembly is at least partially fixedly disposed on the holder 9-1220.

In the embodiment of FIG. 103, the first coil 9-1311, the second coil 9-1313, the third coil 9-1321, the fourth coil 9-1323, the fifth coil 9-1331, and the sixth coil 9-1333 are disposed on the holder 9-1220 of the movable portion 9-1200, the first magnetic element 9-1312, the second magnetic element 9-1314, the third magnetic element 9-1322, the fourth magnetic element 9-1324, the five magnetic elements 9-1332, and the sixth magnetic element 9-1334 are disposed on the frame 9-1130 of the fixed portion 9-1100, but not limited to this. In some embodiments, the first coil 9-1311, the second coil 9-1313, the third coil 9-1321, the fourth coil 9-1323, the fifth coil 9-1331, and the sixth coil 9-1333 are disposed on the frame 9-1130 of the fixed portion 9-1100, and the first magnetic element 9-1312, the second magnetic element 9-1314, the third magnetic element 9-1322, the fourth magnetic element 9-1324, the fifth magnetic element 9-1332, and the sixth magnetic element 9-1334 are disposed on the holder 9-1220 of the movable portion 9-1200.

In addition, in the embodiment of FIG. 103, the first driving assembly 9-1310, the second driving assembly 9-1320, and the third driving assembly 9-1330 respectively include two magnetic elements, but it is not limited to this. In some embodiments, the first magnetic element 9-1312 and the second magnetic element 9-1314 have an integrally formed structure, the third magnetic element 9-1322 and the fourth magnetic element 9-1324 have an integrally formed structure, and the fifth magnetic element 9-1332 and the sixth magnetic element 9-1334 have an integrated structure.

The position sensing module 9-1400 is configured to sense the movement of the movable portion 9-1200 relative to the fixed portion 9-1100, and includes a first position sensing assembly 9-1410, a second position sensing assembly 9-1420, and a third position sensing assembly 9-1430. The first position sensing assembly 9-1410 has a first reference element 9-1411 and a first sensing element 9-1412, and the first sensing element 9-1412 is configured to sense a first magnetic field generated by the first reference element 9-1411. When viewed along the direction that is parallel to the main axis 9-M, the first sensing element 9-1412 and the first reference element 9-1411 are disposed on the first side 9-1101. The second position sensing assembly 9-1420 has a second reference element 9-1421 and a second sensing element 9-1422, and the second sensing element 9-1422 is configured to sense the second magnetic field generated by the second reference element 9-1421. When viewed along the direction that is parallel to the main axis 9-M, the second sensing element 9-1422 and the second reference element 9-1421 are disposed on the second side 9-1102. The third position sensing assembly 9-1430 has a third reference element 9-1431 and a third sensing element 9-1432. The third sensing element 9-1432 is configured to sense a third magnetic field generated by the third reference element 9-1431. When viewed in the direction that is parallel to the main axis 9-M, the third sensing element 9-1432 and the third reference element 9-1431 are disposed on the third side 9-1103. When viewed along the direction that is parallel to the main axis 9-M, the position sensing module 9-1400 is not disposed on the fourth side 9-1104.

In the embodiment of FIG. 103, the first reference element 9-1411, the second reference element 9-1421, and the third reference element 9-1431 are respectively magnetic elements, which are disposed on the frame 9-1130. When viewed along the direction that is perpendicular to the main axis 9-M, the first reference element 9-1411 is disposed between the first magnetic element 9-1312 and the second magnetic element 9-1314, the second reference element 9-1421 is disposed between the third magnetic elements 9-1322 and the fourth magnetic element 9-1324, the third reference element 9-1431 is arranged between the fifth magnetic element 9-1332 and the sixth magnetic element 9-1334. The first sensing element 9-1412, the second sensing element 9-1422, and the third sensing element 9-1432 may be, for example, a Hall effect sensor, a magnetoresistive (MR) sensor, or a Fluxgate, etc. The first sensing element 9-1412, the second sensing element 9-1422, and the third sensing element 9-1432 are disposed on the holder 9-1220. When viewed along the direction that is perpendicular to the main axis 9-M, the first sensing element 9-1412 is disposed between the first coil 9-1311 and the second coil 9-1313, the second sensing element 9-1422 is located between the third coil 9-1321 and the fourth coil 9-1323, and the third sensing element 9-1432 is located between the fifth coil 9-1331 and the sixth coil 9-1333 to respectively sense the first magnetic field of the first reference element 9-1411, the second magnetic field of the second reference element 9-1421, and the third magnetic field of the third reference element 9-1431 to obtain the position of the holder 9-1220 relative to the frame 9-1130.

In the embodiment of FIG. 103, three sets of position sensing assemblies are provided (a first position sensing assembly 9-1410, a second position sensing assembly 9-1420, and a third position sensing assembly 9-1430) to sense the movement and rotation of the movable portion 9-1200 relative to the fixed portion 9-1100, but not limited to this. In some embodiments, only two sets of position sensing assemblies that are not parallel to each other may be provided to sense the movement of the movable portion 9-1200 relative to the fixed portion 9-1100.

Figure 106:
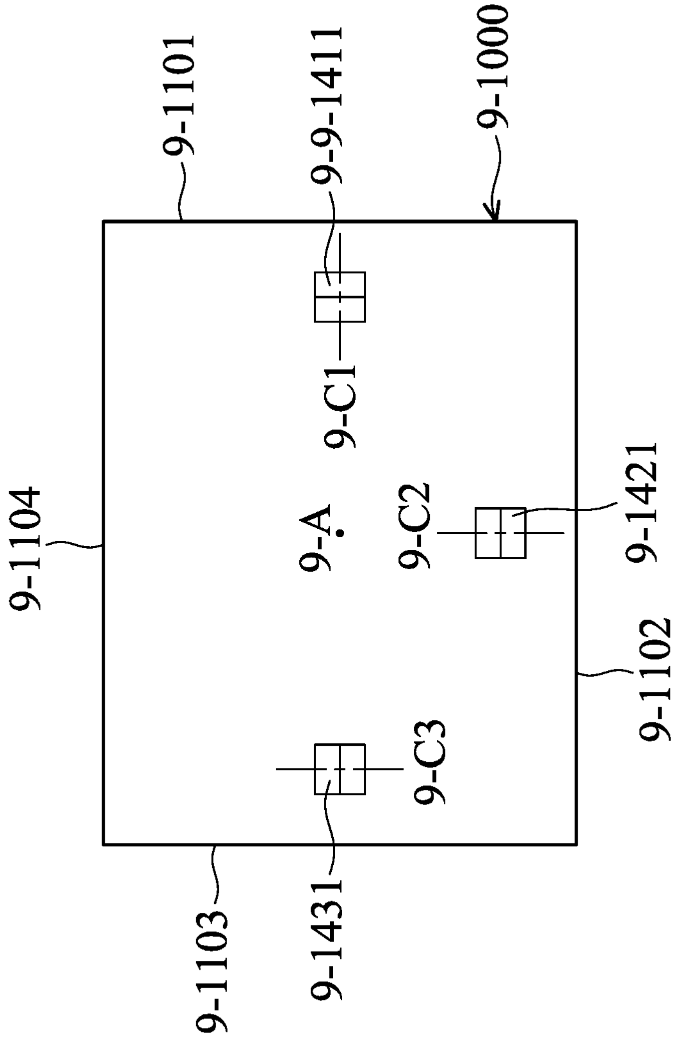

Refer to FIG. 106, FIG. 106 is a schematic diagram of the configuration of the reference elements in the optical module 9-1000 according to an embodiment of the present disclosure. In some embodiments, the driving mechanism 9-1300 may drive the movable portion 9-1200 to rotate relative to the fixed portion 9-1100 in a rotating axis 9-A, and the rotating axis 9-A is parallel to the main axis 9-M. As mentioned above, the reference elements (the first reference element 9-1411, the second reference element 9-1421, and the third reference element 9-1431) are magnetic elements, and the first reference element 9-1411, the second reference element 9-1421 and the third reference element 9-1431 respectively have a first N pole and a first S pole. The first reference element 9-1411 has a first line 9-C1, and the first line 9-C1 is an imaginary line between the center of the first N pole of the first reference element 9-1411 and the center of the S pole of the first reference element 9-1411. The second reference element 9-1421 has a second line 9-C2, and the second line 9-C2 is an imaginary line between the center of the first N pole of the second reference element 9-1421 and the center of the S pole of the second reference element 9-1421. The third reference element 9-1431 has a third line 9-C3, and the third line 9-C3 is an imaginary line between the center of the first N pole of the third reference element 9-1431 and the center of the S pole of the third reference elements 9-1431. When viewed along the direction that is parallel to the main axis 9-M, the rotating axis 9-A does not overlap with the first reference element 9-1411, the second reference element 9-1421, and the third reference element 9-1431. In some embodiments, when viewed along the direction that is parallel to the main axis 9-M, at least one of the first line 9-C1, the second line 9-C2, and the third line 9-C3 does not pass through the rotating axis 9-A. In other embodiments, when viewed along the direction that is parallel to the main axis 9-M, at least two of the first line 9-C1, the second line 9-C2, and the third line 9-C3 pass through the rotating axis 9-A.

In the embodiment shown in FIG. 106, the third line 9-C3 does not pass through the rotating axis 9-A. One reference element is disposed to make the imaginary line does not pass the rotating axis 9-A to sense the rotation of the movable portion 9-1200 relative to the fixed portion 9-1100, and the other two reference elements are disposed to make the imaginary lines pass the rotating axis 9-A to respectively sense the movement of the movable portion 9-1200 relative to the fixed portion 9-1100 in two different directions. But it is not limited to this. Three reference elements may be disposed to make the imaginary lines to pass through the rotating axis 9-A, and the measured values of the three reference elements may be calculated to obtain the rotation of the movable portion 9-1200 relative to the fixed portion 9-1100.

Therefore, it can be seen from the above that the configuration between the magnetic element, the coil, the reference element, and the sensing element may include various combinations in addition to the embodiment shown in FIG. 103. Then please refer to FIG. 107 to FIG. 111, and several examples are illustrated. FIG. 107 to FIG. 111 are schematic diagrams of a partial structure of an optical module 9-1000 according to another embodiment of the present disclosure. Although FIG. 107 to FIG. 111 only show a partial structure of the first side 9-1101, the similar elements in the second side 9-1102 and the third side 9-1103 may also have the same configuration.

Figure 107:
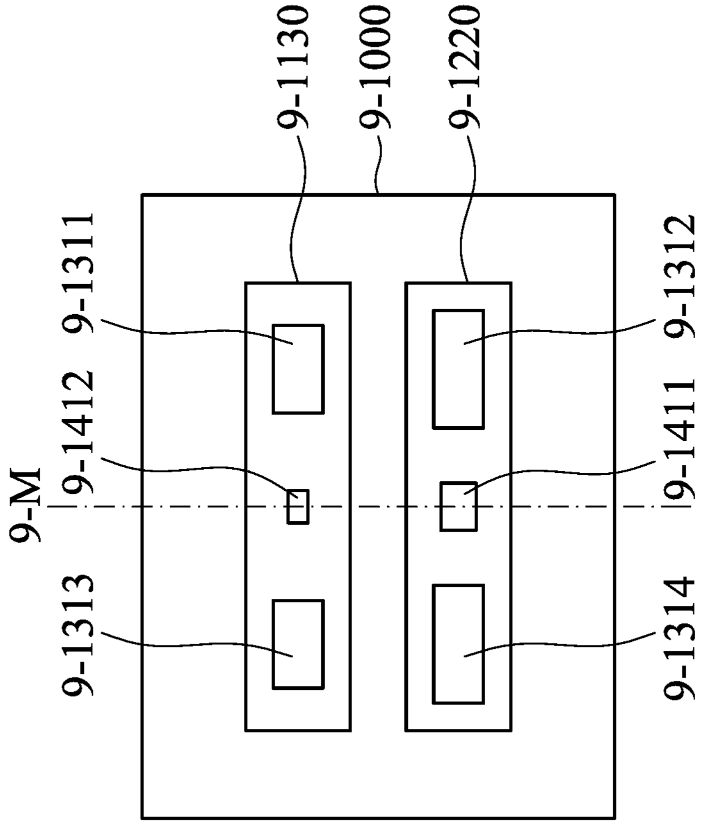

In the example of FIG. 107, it has a similar configuration to FIG. 103, except that the first sensing element 9-1412, the first coil 9-1311 and the second coil 9-1313 are disposed on the frame 9-1130, the first reference element 9-1411, the first magnetic element 9-1312, and the second magnetic element 9-1314 are disposed on the holder 9-1220.

Figure 108:
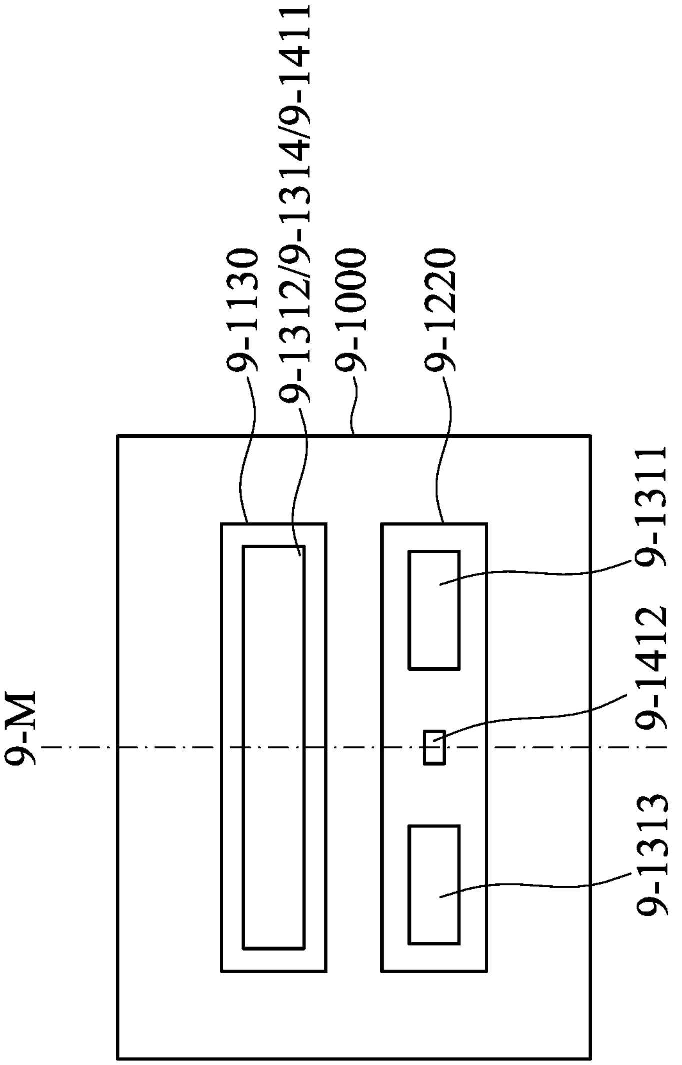
Figure 109:
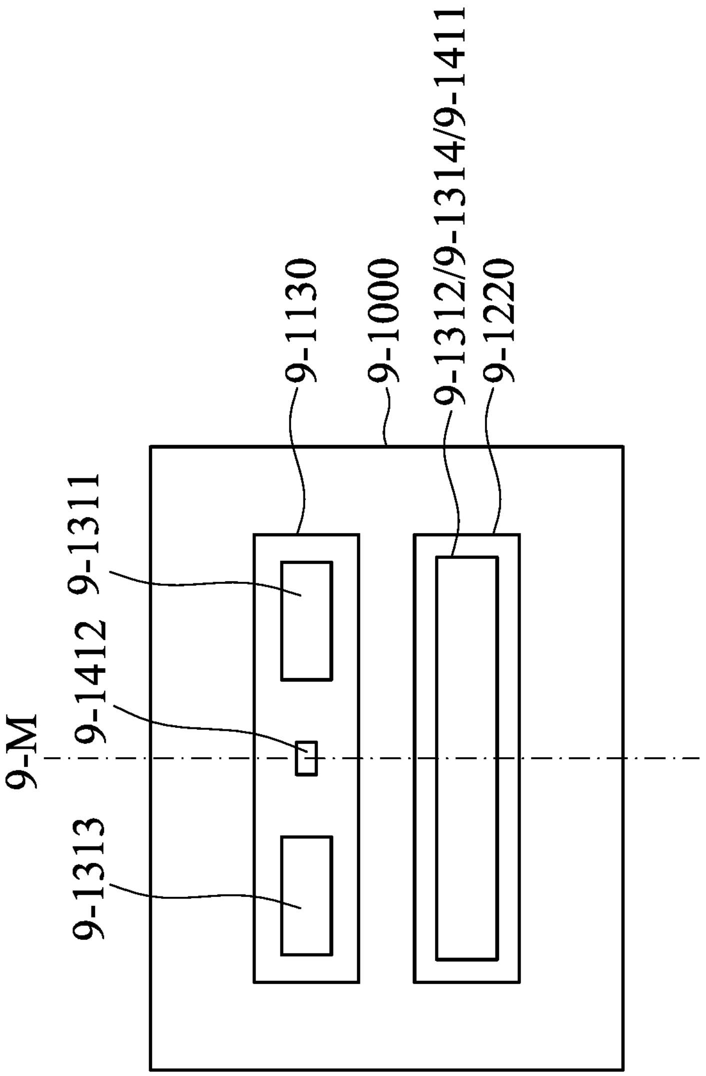

In the examples of FIG. 108 and FIG. 109, the first reference element 9-1411, the first magnetic element 9-1312, and the second magnetic element 9-1314 have an integrated structure. That is, the magnetic element may also be used as a reference element at the same time.

In the example of FIG. 108, the first reference element 9-1411 (the first magnetic element 9-1312/the second magnetic element 9-1314) is disposed on the frame 9-1130, and the first sensing element 9-1412, the first coil 9-1311, and the second coil 9-1313 are disposed on the holder 9-1220. In the example of FIG. 109, the first reference element 9-1411 (the first magnetic element 9-1312/the second magnetic element 9-1314) is disposes on the holder 9-1220, and the first sensing element 9-1412, the first coil 9-1311, and a second coil 9-1313 are disposed on the frame 9-1130.

Figure 110:
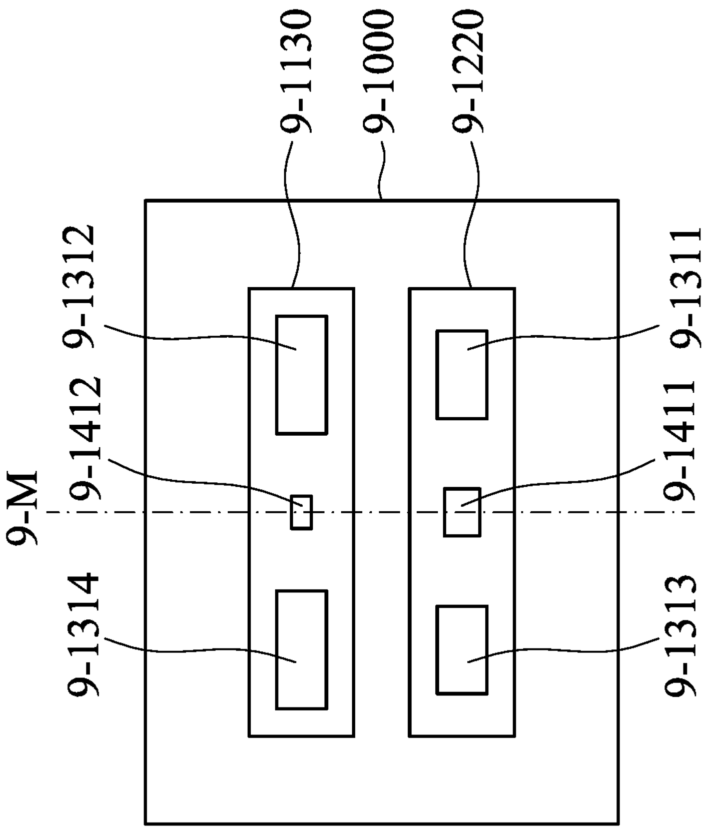
Figure 111:
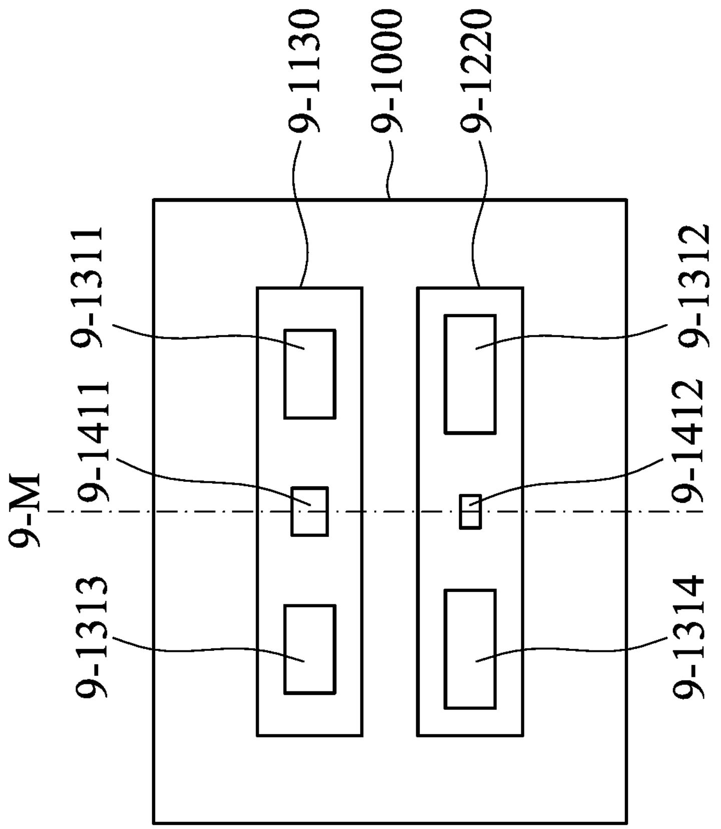

In the examples in FIG. 110 and FIG. 111, when viewed along the direction that is perpendicular to the main axis 9-M, the first sensing element 9-1412 and the first magnetic element 9-1312 at least partially overlap, and the first reference element 9-1411 and the first coil 9-1311 at least partially overlap. That is, the first sensing element 9-1412 is disposed between the first magnetic element 9-1312 and the second magnetic element 9-1314, and the first reference element 9-1411 is disposed between the first coil 9-1311 and the second coil 9-1313.

In the example of FIG. 110, the first sensing element 9-1412, the first magnetic element 9-1312, and the second magnetic element 9-1314 are disposed on the frame 9-1130, and the first reference element 9-1411, the first coil 9-1311, and the second coil 9-1313 are disposed on the holder 9-1220. In the example of FIG. 111, the first sensing element 9-1412, the first magnetic element 9-1312, and the second magnetic element 9-1314 are disposed on the holder 9-1220, and the first reference element 9-1411, the first coil 9-1311, and the second coil 9-1313 are disposed on the frame 9-1130.

The above-mentioned example with the position sensing module 9-1400 is driven by a closed-loop control. That is, the position sensing module 9-1400 is used to sense whether the movable portion 9-1200 reaches the expected position, and if it does not reach the expected position, a command may be made by a controller of the driving mechanism 9-1300 to make corrections until the movable portion 9-1200 reaches the expected position. However, the present disclosure is not limited to this. It may also be driven by an open-loop control without the position sensing module 9-1400 with the position feedback, and by establishing a database in advance, then the movable portion 9-1200 may be driven directly to the expected position.

Figure 112:
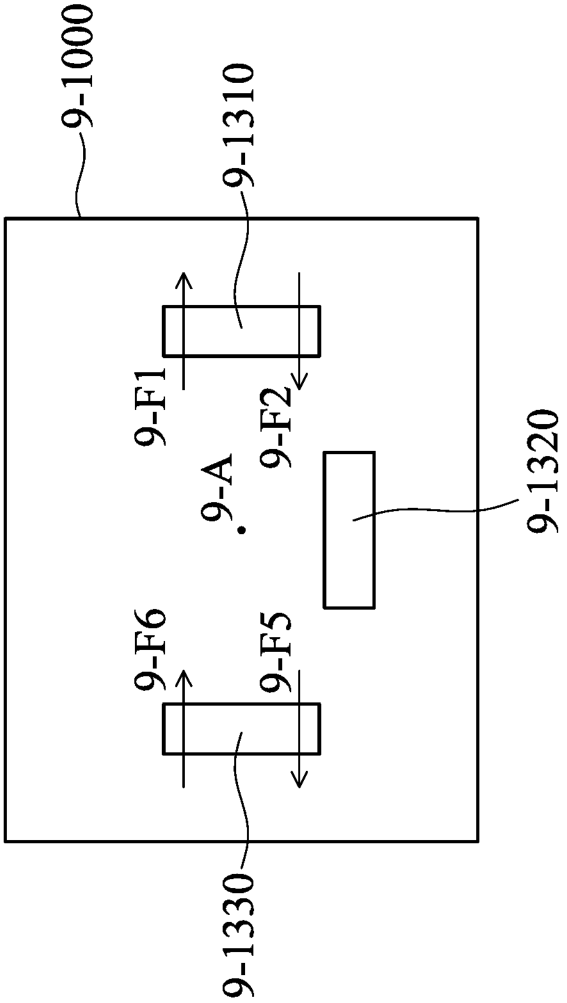
Figure 113:
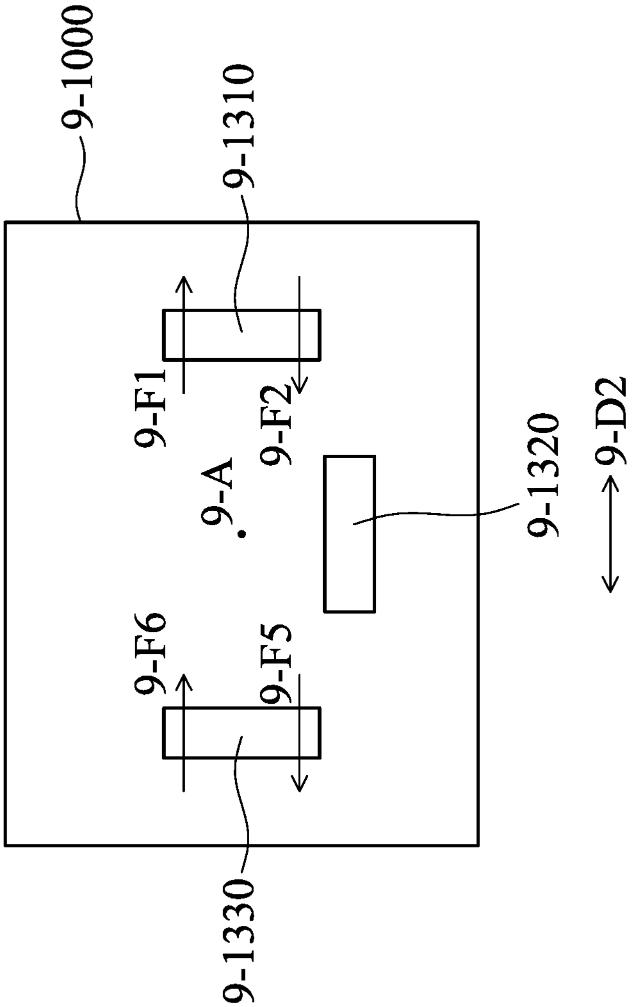

Next, refer to FIG. 112 to FIG. 114, and the operation of the driving mechanism is described as the following. FIG. 112 to FIG. 114 are schematic diagrams of a partial structure of the optical module 9-1000 according to an embodiment of the disclosure. In some embodiments, the first driving assembly 9-1310 is configured to drive the movable portion 9-1200 to move relative to the fixed portion 9-1100, and the first driving assembly 9-1310 is configured to drive the movable portion 9-1200 to rotates in the rotating axis 9-A relative to the fixed portion 9-1100. The second driving assembly 9-1320 is configured to drive the movable portion 9-1200 to move relative to the fixed portion 9-1100, but the second driving assembly 9-1320 is not configured to drive the movable portion 9-1200 to rotate relative to the fixed portion 9-1100. The third driving assembly 9-1330 is configured to drive the movable portion 9-1200 to move relative to the fixed portion 9-1100, and the third driving assembly 9-1330 is configured to drive the movable portion 9-1200 to rotate relative to the fixed portion 9-1100.

The first driving assembly 9-1310 is configured to generate a first driving force 9-F1 and a second driving force 9-F2. The second driving assembly 9-1320 is configured to generate a third driving force 9-F3 and a fourth driving force 9-F4. The third driving assembly 9-1330 is configured to generate a fifth driving force 9-F5 and a sixth driving force 9-F6. When viewed along the direction that is parallel to the main axis 9-M, the first driving force 9-F1, the second driving force 9-F2, the third driving force 9-F3, the fourth driving force 9-F4, the fifth driving force 9-F5, and the sixth driving force 9-F6 do not pass through the rotating axis 9-A. The first driving force 9-F1, the second driving force 9-F2, and the third driving force 9-F3, the fourth driving force 9-F4, the fifth driving force 9-F5, and the sixth driving force 9-F6 are generated at different positions.

As shown in FIG. 112, the movable portion 9-1200 may move relative to the fixed portion 9-1100 by switching on different magnitude of current to the coil to generate a driving force between the coil and the magnetic element. That is, the first driving assembly 9-1310, the second driving assembly 9-1320, and the third driving assembly 9-1330 may be separately controlled to make the first driving force 9-F1 and the second driving force 9-F2 have the same magnitude and opposite directions, the fifth driving force 9-F5 and the sixth driving force 9-F6 have the same magnitude and opposite directions, the first driving force 9-F1 and the fifth driving force 9-F5 have the same magnitude, the second driving force 9-F2 and the sixth driving force 9-F6 have the same magnitude, the first driving force 9-F1 and the sixth driving force 9-F6 have the same direction, and the second driving force 9-F2 and the fifth driving force 9-F5 have the same direction, so that the movable portion 9-1200 is driven to rotate relative to the fixed portion 9-1100.

In another control mode, as shown in FIG. 113, the magnitude of the first driving force 9-F1 and the magnitude of the second driving force 9-F2 are different, the magnitude of the fifth driving force 9-F5 and the magnitude of the sixth driving force 9-F6 are different, the magnitude of the first driving force 9-F1 is different from the magnitude of the fifth driving force 9-F5, the magnitude of the second driving force 9-F2 is different from the magnitude of the sixth driving force 9-F6, the magnitude difference between the first driving force 9-F1 and the second driving force 9-F2 is the same as the magnitude difference between the fifth driving force 9-F5 and the sixth driving force 9-F6, so that the movable portion 9-1200 is driven to rotate relative to the fixed portion 9-1100 and simultaneously move in the second direction 9-D2.

In addition, in another control mode, as shown in FIG. 114, the magnitude of the first driving force 9-F1 and the magnitude of the second driving force 9-F2 are different, the magnitude of the fifth driving force 9-F5 and the magnitude of the sixth driving force 9-F6 are different, the magnitude of the first driving force 9-F1 and the magnitude of the fifth driving force 9-F5 are different, the magnitude of the second driving force 9-F2 and the magnitude of the sixth driving force 9-F6 are different, and the magnitude of the third driving force 9-F3 and the magnitude of the fourth driving force 9-F4 are the same, so that the movable portion 9-1200 is driven to rotate relative to the fixed portion 9-1100 and move along the first direction 9-D1 at the same time. Although some examples of the movement that the driving mechanism drives the movable portion relative to the fixed portion have disclosed above, it is not limited to this, and may be changed as required.

As described above, an embodiment of the present invention provides an optical system includes an optical module with a main axis. The optical module includes a fixed portion, a movable portion, and a driving mechanism. The movable portion is connected with an optical element and is moved relative to the fixed portion. The driving mechanism drives the movable portion to move relative to the fixed portion. When viewed along a direction that is parallel to the main axis, the fixed portion is a polygonal structure with a first side, a second side, a third side, and a fourth side, the first side is parallel to the third side, the second side is parallel to the fourth side, the first side is not parallel to the second side. The special position and size relationship of each element disclosed in the present invention may enable the optical element drive mechanism to achieve a specific direction of thinning and overall miniaturization. In addition, by applying with different optical modules, the optical element driving mechanism may further improve the optical quality (such as shooting quality or depth sensing accuracy, etc.).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical system, comprising:
an optical module with a main axis, comprising:
an immovable part;
a movable part connected to an optical element, wherein the movable part is movable relative to the immovable part;
a drive mechanism driving the movable part to move relative to the immovable part; and
an optical path adjustment element, wherein the optical path adjustment element and the optical element are arranged along the main axis; and
an additional optical module,
wherein a light enters the additional optical module of the optical system along a first incident direction that is parallel with the main axis, the light enters the optical path adjustment element along a second incident direction that is not parallel with the main axis, the optical path adjustment element changes the direction of light from the second incident direction to align with the main axis, allowing the light to enter the optical element through a light-incident surface of the optical element, and a distance between the first incident direction and the main axis is greater than zero, and
wherein a normal vector of the light-incident surface of the optical element is parallel with the main axis and the first incident direction.

2. The optical system as claimed in claim 1, wherein when viewed from the main axis, the optical system is polygonal, having a first side, a second side, a third side opposite to the first side, and a fourth side opposite to the second side.

3. The optical system as claimed in claim 2, further comprising a position sensing module sensing movement of the movable part relative to the immovable part, wherein the position sensing module is not disposed on the fourth side.

4. The optical system as claimed in claim 2, wherein the drive mechanism is not disposed on the fourth side.

5. The optical system as claimed in claim 4, wherein the drive mechanism comprises a first drive assembly disposed on the first side.

6. The optical system as claimed in claim 5, wherein the drive mechanism further comprises a second drive assembly disposed on the second side and a third drive assembly disposed on the third side.

7. The optical system as claimed in claim 5, wherein the first drive assembly comprises a first coil and a first magnetic element corresponding to the first coil, and the first coil and the first magnetic element are arranged along the main axis.

8. The optical system as claimed in claim 7, wherein the first drive assembly further comprises a second coil and a second magnetic element corresponding to the second coil, and the second coil and the first coil are arranged along a direction that is parallel with the first side.

9. The optical system as claimed in claim 8, wherein a winding axis of the second coil is parallel with a winding axis of the first coil.

10. The optical system as claimed in claim 2, wherein the drive mechanism comprises a first drive assembly and a second drive assembly, and neither the first drive assembly nor the second drive assembly is disposed on the fourth side.

11. The optical system as claimed in claim 1, wherein the optical element is an image sensor.

12. The optical system as claimed in claim 1, wherein the optical path adjustment element is a prism.

13. The optical system as claimed in claim 1, further comprising a circuit mechanism electrically connected to the drive mechanism.

14. The optical system as claimed in claim 1, wherein the movable part comprises a frame, the optical path adjustment element is connected to the frame, and the optical path adjustment element along with the frame are movable relative to the immovable part.

15. The optical system as claimed in claim 14, wherein the frame has an inclined surface, and the optical path adjustment element is disposed on the inclined surface.

16. The optical system as claimed in claim 1, wherein the movable part comprises a pedestal with a plate-like structure and a holder disposed on the pedestal.

17. The optical system as claimed in claim 16, wherein the optical element is connected to the pedestal.

18. The optical system as claimed in claim 16, wherein the holder comprises a shielding portion protruding along the main axis, when viewed from a direction that is perpendicular to the main axis, the shielding portion and the optical element at least partially overlap.

19. The optical system as claimed in claim 16, further comprising a supporting assembly, wherein the supporting assembly comprises a first elastic element extending along the main axis and a second elastic element that is not parallel with the first elastic element.

20. The optical system as claimed in claim 19, wherein when viewed from a direction that is perpendicular to the main axis, the second elastic element is located between the pedestal and the holder, and the second elastic element is in contact with the holder and not in contact with the pedestal.

* * * * *